US009553981B2

(12) United States Patent
Czarnecki et al.

(10) Patent No.: US 9,553,981 B2
(45) Date of Patent: *Jan. 24, 2017

(54) DEVICES AND METHODS OF PROVIDING RESPONSE MESSAGE IN THE DEVICES

(71) Applicant: SAMSUNG ELECTRONICS CO., LTD., Suwon-si (KR)

(72) Inventors: Piotr Czarnecki, Warsaw (PL); Agata Kedzia, Lodz (PL); Mariusz Wnorowski, Warsaw (PL); Seung-soo Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/855,521

(22) Filed: Sep. 16, 2015

(65) Prior Publication Data
US 2016/0006867 A1 Jan. 7, 2016

Related U.S. Application Data

(63) Continuation of application No. 14/694,585, filed on Apr. 23, 2015.

(30) Foreign Application Priority Data

Aug. 26, 2014 (KR) .................. 10-2014-0111623
Dec. 5, 2014 (KR) .................. 10-2014-0174292

(51) Int. Cl.
H04M 3/42 (2006.01)
H04L 12/58 (2006.01)
(Continued)

(52) U.S. Cl.
CPC .......... *H04M 3/42093* (2013.01); *H04L 51/00* (2013.01); *H04L 51/02* (2013.01);
(Continued)

(58) Field of Classification Search
CPC ............... G06Q 30/02; H04L 29/08108; H04L 29/08657; H04L 51/00; H04M 2207/18; H04M 3/42093; H04M 3/42382; H04M 2250/60; H04M 2203/651; H04W 4/02; H04W 8/18; H04W 4/00
(Continued)

(56) References Cited

U.S. PATENT DOCUMENTS 7,698,729 B2  4/2010  Miyata
8,249,627 B2  8/2012  Olincy et al.
(Continued)

FOREIGN PATENT DOCUMENTS

EP    2672687 A2    12/2013
JP    2008-303317 A  11/2008
(Continued)

OTHER PUBLICATIONS

"Safe downloads and expert advice", 11 pages total, World Wide Web.
(Continued)

*Primary Examiner* — Sharad Rampuria
(74) *Attorney, Agent, or Firm* — Sughrue Mion, PLLC

(57) ABSTRACT

A device includes a communication unit configured to receive a call request from a calling user; and a control unit configured to control the communication unit to provide a response message including information about a current situation based on information about an application currently being executed to the calling user in response to a rejection regarding the call request.

23 Claims, 82 Drawing Sheets

Related U.S. Application Data

(60) Provisional application No. 61/983,117, filed on Apr. 23, 2014.

(51) Int. Cl.
*H04M 3/436* (2006.01)
*H04M 1/663* (2006.01)

(52) U.S. Cl.
CPC ... *H04M 3/42374* (2013.01); *H04M 3/42382* (2013.01); *H04M 3/436* (2013.01); *H04M 1/663* (2013.01); *H04M 2203/651* (2013.01); *H04M 2207/18* (2013.01); *H04M 2250/60* (2013.01)

(58) Field of Classification Search
USPC .............................. 455/466, 556.1–557, 41.2
See application file for complete search history.

(56) References Cited

U.S. PATENT DOCUMENTS

| | | | |
|---|---|---|---|
| 8,335,497 | B2 | 12/2012 | Olincy et al. |
| 8,364,183 | B2 | 1/2013 | Olincy et al. |
| 8,385,975 | B2 * | 2/2013 | Forutanpour ........... H04L 51/02 455/415 |
| 8,412,161 | B2 | 4/2013 | Olincy et al. |
| 2003/0138087 | A1 * | 7/2003 | Takeda .................. H04M 1/663 379/207.02 |
| 2005/0099491 | A1 | 5/2005 | Miyata |
| 2005/0159146 | A1 * | 7/2005 | Lee ................... H04M 3/42017 455/418 |
| 2006/0141926 | A1 | 6/2006 | Anttilla et al. |
| 2010/0273447 | A1 * | 10/2010 | Mann ................. H04M 1/72519 455/405 |
| 2010/0317377 | A1 * | 12/2010 | Zou ........................ G06Q 10/02 455/466 |
| 2011/0077033 | A1 | 3/2011 | Shuai |
| 2011/0151838 | A1 | 6/2011 | Olincy et al. |
| 2011/0151842 | A1 * | 6/2011 | Olincy ............. H04M 3/42348 455/414.1 |
| 2011/0176670 | A1 | 7/2011 | Kaplan et al. |
| 2011/0207441 | A1 * | 8/2011 | Wood ...................... G01S 19/17 455/414.1 |
| 2012/0058750 | A1 | 3/2012 | Olincy et al. |
| 2012/0058755 | A1 | 3/2012 | Olincy et al. |
| 2012/0058756 | A1 | 3/2012 | Olincy et al. |
| 2013/0189964 | A1 * | 7/2013 | Thompson ............... H04W 4/14 455/414.1 |
| 2013/0203393 | A1 | 8/2013 | Bugalia et al. |
| 2013/0324093 | A1 * | 12/2013 | Santamaria ....... H04M 1/72519 455/414.1 |
| 2014/0051406 | A1 | 2/2014 | Kim |
| 2014/0118465 | A1 * | 5/2014 | Scott ................. H04M 1/72519 348/14.03 |
| 2014/0308930 | A1 * | 10/2014 | Tran ...................... H04W 4/001 455/414.1 |
| 2016/0127534 | A1 * | 5/2016 | Celik ................ H04M 1/72597 455/566 |

FOREIGN PATENT DOCUMENTS

| | | |
|---|---|---|
| JP | 2008-079359 A | 10/2009 |
| JP | 2009-239369 A | 10/2009 |
| JP | 2010-130379 A | 6/2010 |
| KP | 10-2005-0044995 A | 5/2005 |
| KP | 10-2013-0100422 A | 9/2013 |
| KR | 10-2005-0044995 A | 5/2005 |
| KR | 10-2013-0100422 A | 9/2013 |
| WO | 2011/162825 A1 | 12/2011 |

OTHER PUBLICATIONS

Agarwal, "How to Reject Calls With a Text and Change the Default Texts in WP8", Guiding Tech, 12 pages total, World Wide Web.
Ashish, "Enable Text Reply Incoming Calls and Add more text presets on Windows Phone", WPXBOX, Jan. 29, 2013, 4 pages total, World Wide Web.
Bernedo, "How to Answer Calls on iPhone With Pre-defined Text Messages Instantly", Guiding Tech, 9 pages total, World Wide Web.
Cipriani, "How to decline a phone call with a custom text message on ICS", CNET, Jan. 4, 2012, 7 pages total, World Wide Web.
Ingram, "Windows Phone 8 Update Lets You Reject Calls with Text Reply and More", Gotta Be Mobile, Dec. 11, 2012, 3 pages total, World Wide Web.
Narzedzia, "Reject Call Answer Free", Aplikacje, Sep. 1, 2013, 3 pages total, World Wide Web.
Wallen, "Block unwanted calls on your Android phone with Call Blocker", Google Apps, Nov. 11, 2013, 12 pages total, World Wide Web.
Wikipedia, "Point of Interest", 2013, 2 pages total, World Wide Web.
Office Action dated Dec. 5, 2014 in Korean Patent Application 10-2014-0174292.
International Search Report dated Aug. 5, 2015 in International Application PCT/KR2015/004050.
Communication issued Aug. 4, 2015, issued by the Korean Intellectual Property Office in counterpart Korean Patent Application No. 10-2014-0174292.
Communication dated Nov. 2, 2016, issued by the European Patent Office in counterpart European Application No. 15738562.6.

* cited by examiner

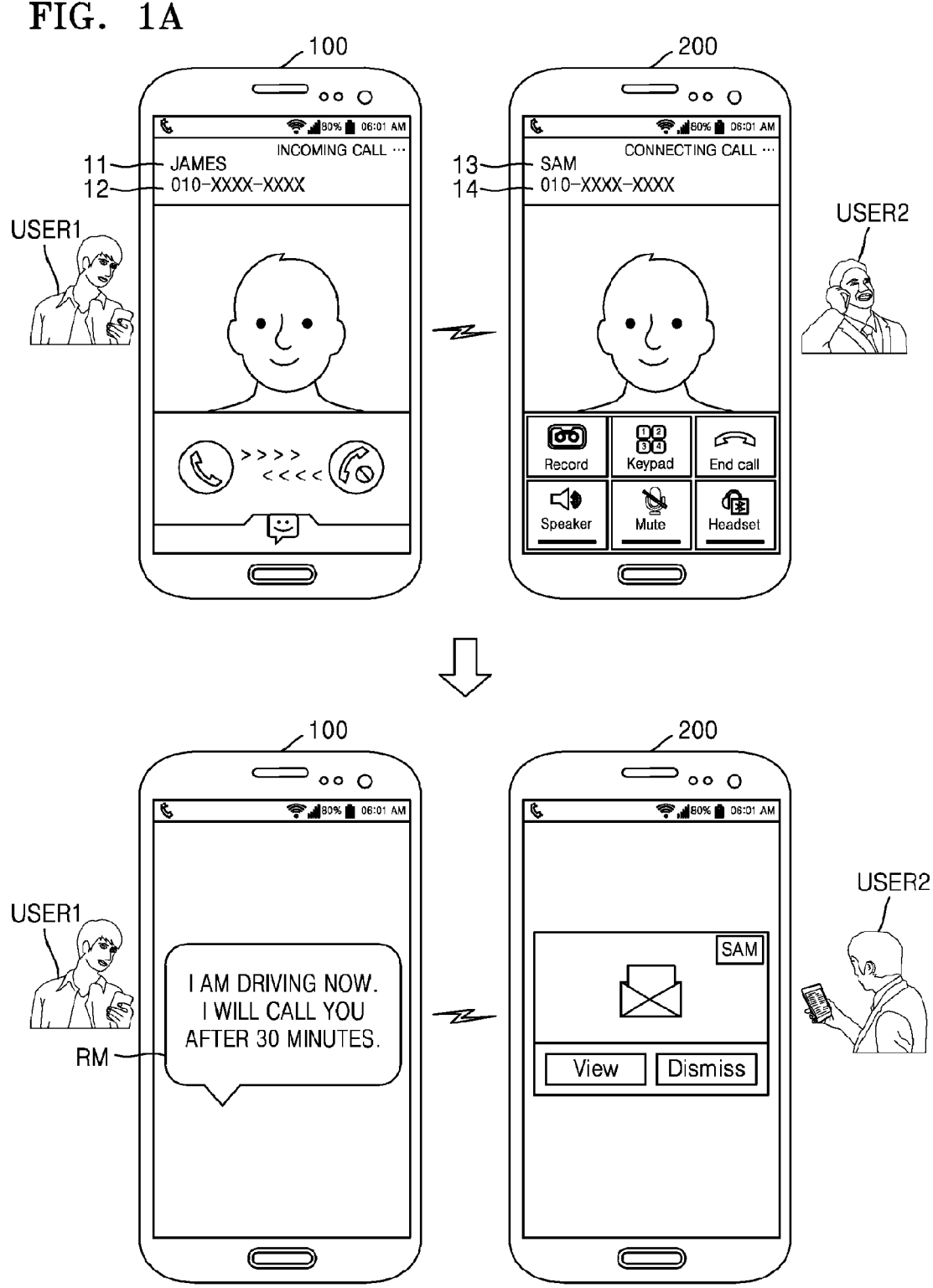

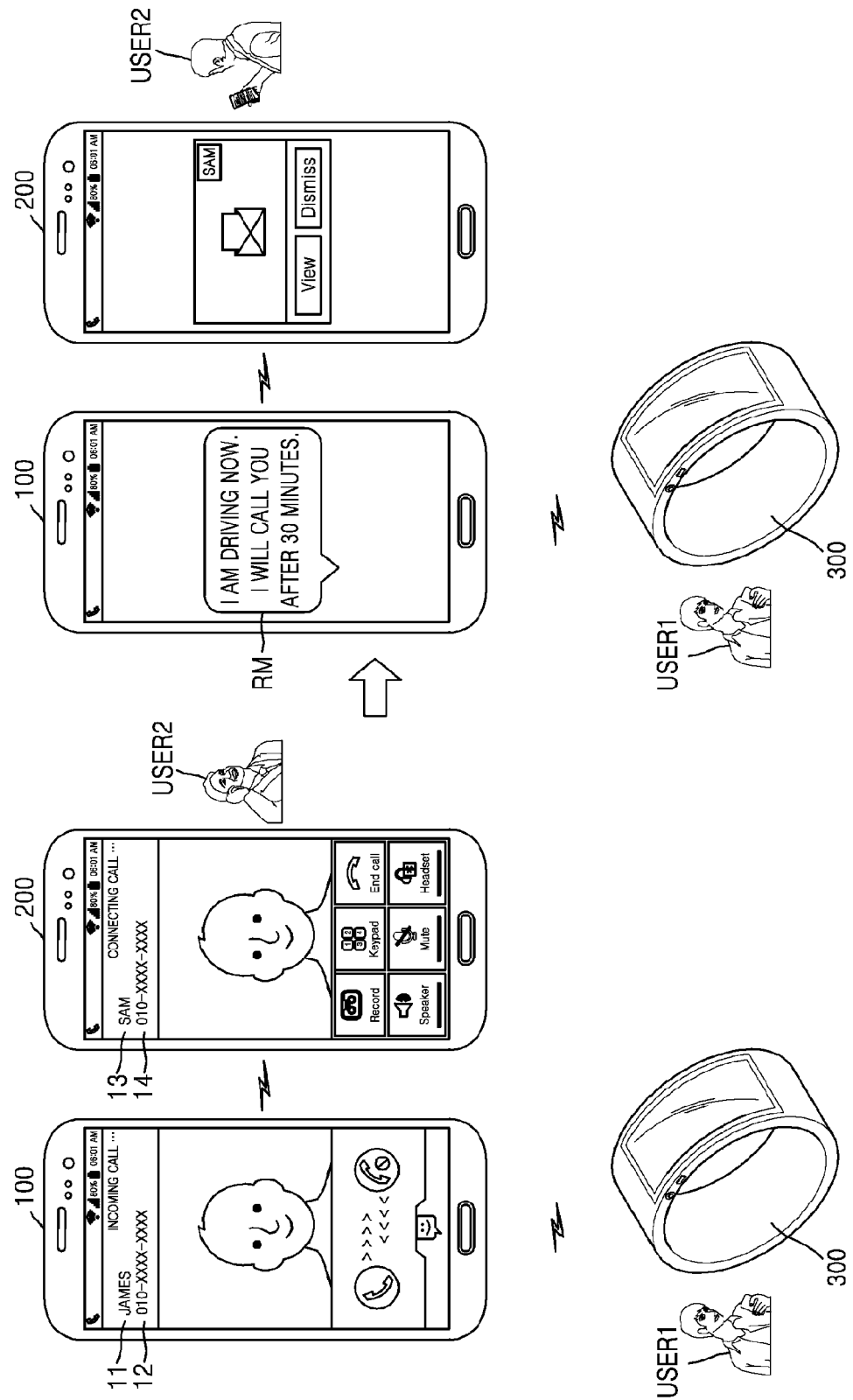

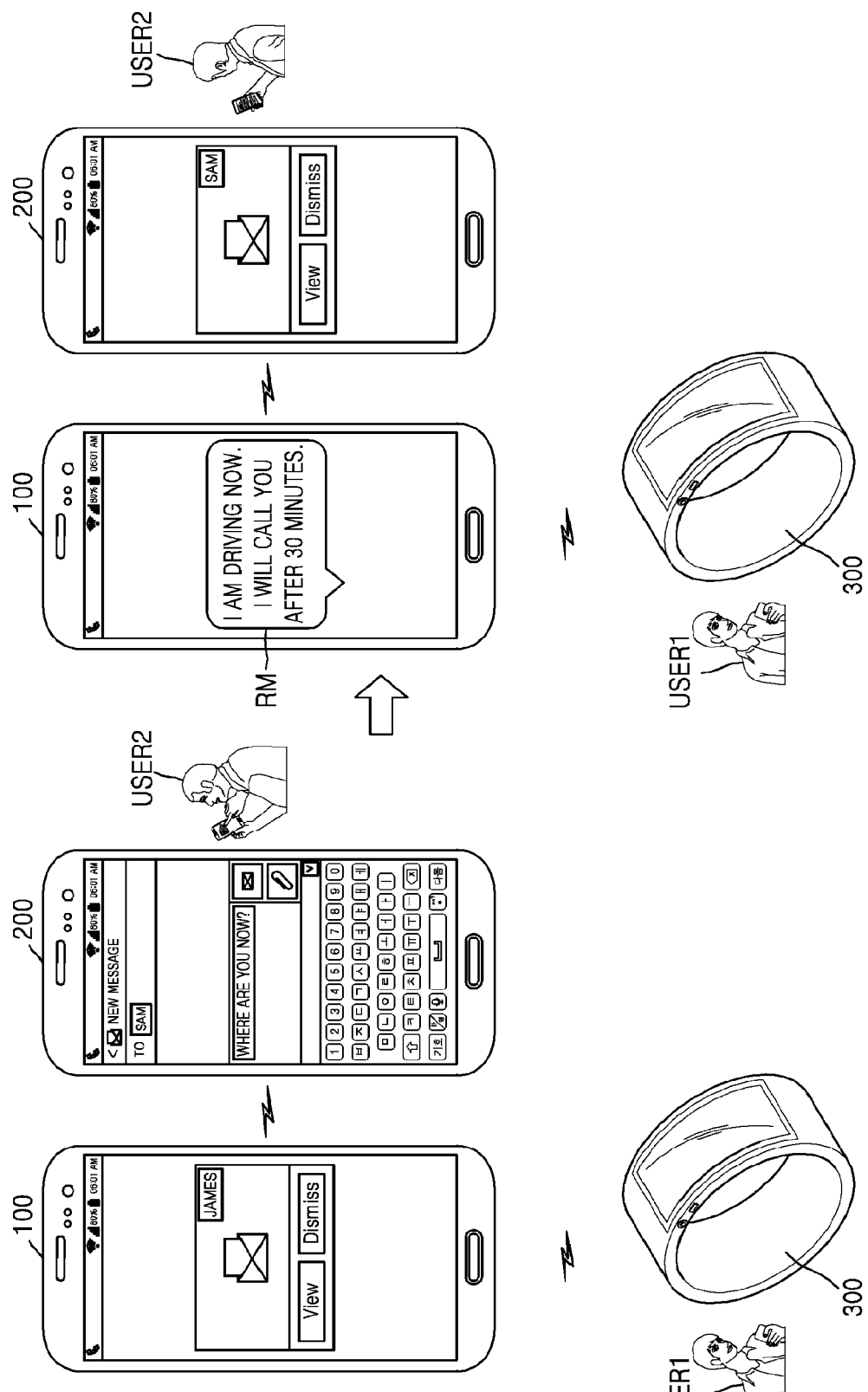

FIG. 9

|  | NAME OF CALLING USER | CURRENT SITUATION | POINT TO REPLY TO INCOMING CALL |
|---|---|---|---|
| NAVIGATION | CHIEF KIM | DRIVING | 12 MINUTES |
| FITNESS | CHIEF KIM | EXERCISING | 10 MINUTES |

FIG. 13

| TYPE | INFORMATION TO TRANSMIT | EXAMPLES |
|---|---|---|
| TYPE1 | CURRENT SITUATION | I AM DRIVING NOW |
| TYPE2 | CURRENT SITUATION AND FUTURE SITUATION | I AM DRIVING NOW<br>I WILL CALL YOU IN 1 HOUR |
| TYPE3 | FUTURE SITUATION | I WILL CALL YOU IN 1 HOUR |
| TYPE4 | – | I AM NOT AVAILABLE FOR PHONE CALL RIGHT NOW |

FIG. 17

| GROUP | ENGLISH | |
|---|---|---|
| | RECEIVER FORMAT | SENDER FORMAT |
| FIRST GROUP | Mr./Ms. LAST NAME | Yours sincerely |
| SECOND GROUP | FIRST NAME | regards |

FIG. 30

|  | NAME OF CALLING USER | CURRENT SITUATION | POINT OF TIME TO REPLY TO INCOMING CALL |
|---|---|---|---|
| SCHEDULER | CHIEF KIM | CONFERENCE ROOM | 30 MINUTES |
| MOVIE TICKET RESERVATION | CHIEF KIM | MOVIE THEATER | 1 HOUR |

DEVICES AND METHODS OF PROVIDING RESPONSE MESSAGE IN THE DEVICES

RELATED APPLICATIONS

This is a Continuation application of U.S. patent application Ser. No. 14/694,585, filed on Apr. 23, 2015, which claims the benefit of U.S. Provisional Application No. 61/983,117, filed on Apr. 23, 2014, in the US Patent Office, and claims priority from Korean Patent Application No. 10-2014-0111623, filed on Aug. 26, 2014, in the Korean Intellectual Property Office and Korean Patent Application No. 10-2014-0174292, filed on Dec. 5, 2014, in the Korean Intellectual Property Office, the disclosures of which are incorporated herein by reference in their entireties.

BACKGROUND

1. Field

Apparatuses and methods consistent with exemplary embodiments relate to providing response messages in the devices.

2. Description of the Related Art

With developments in multimedia technologies, users may use a variety of devices for calling. When a user is unable to respond to an incoming call, such as a phone call or a message, e.g., text message, from another device, the user may choose to reject the incoming call or to send a response message. Here, since general response messages do not include detailed information about a current situation of a user, the user may need to compose a text message, for example, to inform a caller about the user's current situation.

SUMMARY

One or more exemplary embodiments include a device capable of easily transmitting a response message that responds with a current situation of a user when it is difficult for the user to respond to an incoming call, and a method of providing a response message in the device.

Additional aspects will be set forth in part in the description which follows and will be apparent from the description or may be learned by practice of exemplary embodiments.

According to an aspect of an exemplary embodiment, there is provided a device including a communication unit configured to receive a call request from a calling user; and a control unit configured to, in response to a rejection regarding the call request, control the communication unit to provide a response message to the calling user, which includes a current situation based on application information about an application being currently executed.

The response message may further include time information obtained from the application being currently executed and information about a time when a user will be available to respond to the call request based on a point of time when the call request is received.

The application being currently executed may be an application being executed on the device when the call request is received.

The application being currently executed may be an application being executed on an external device at a time when the call request is received, and the communication unit is configured to obtain application information regarding the application from the external device.

The control unit may be further configured to control the communication unit to provide a message to the calling user in response to changing.

The control unit may be further configured to control the communication unit to provide the response message to the calling user via at least one communication medium from among a plurality of communication media.

The control unit may be further configured to control the communication unit to communicate with a wearable device.

According to an aspect of another exemplary embodiment, there is provided a device including a communication unit configured to receive a call request from a calling user; a memory configured to store time information received via an application installed on the device; and a control unit configured to, in response to a rejection regarding the call request and a time at which the call request is received corresponding to the stored time information, control the communication unit to provide a response message to the calling user, which includes a current situation based on application information regarding the application currently being executed.

The response message may further include information about a time when a user will be available to respond to the call request based on the stored time information and the time at which the call request is received.

The application information may include schedule information and ticket reservation details, which are input via the application and the stored time information.

The control unit may be further configured to control the communication unit to provide a message in response to the current situation changing.

The control unit is further configured to control the communication unit to provide the response message to the calling user via at least one communication medium from among a plurality of communication media.

According to an aspect of another exemplary embodiment, there is provided a method, the method including receiving a call request from a calling user; obtaining application information regarding an application currently being executed at a time at which the call request is received; and in response to a rejection regarding the call request, providing a response message to the calling user including a current situation based on the application information.

In the obtaining of the application information, property information and time information regarding the application may be obtained, and the providing of the response message may further include the current situation based on the property information and information about a time when a user will be available to respond to the call request based on the time information and the time at which the call request is received is provided.

The application being executed may be an application being executed on the device at the time at which the call request is received.

The application being executed may be an application being executed on an external device at the time at which the call request is received. The method may further include receiving the information regarding the application from the external device.

The method may further include providing a message to the calling user in response to the current situation changing.

According to one or more exemplary embodiments, a method that a device provides a response message, the method includes obtaining time information from an application installed in a device; receiving a call request from a calling user; and in response to a rejection regarding the call request and a time when the call request is received corresponding to the obtained time information, providing a response message to the calling user, which includes a current situation based on application information about the application currently being executed to the calling user.

The response message may further include information about a time when a user will be available to respond to the call request based on the obtained time information and the time when the call request is received.

The application information may include schedule information and ticket reservation detail input from the application and the time information.

The method may further include providing a message in response to the current situation changing.

According to an aspect of another exemplary embodiment, there is provided a method of responding to a phone call or message, the method including setting up a call rejection function on a first electronic device; receiving an incoming phone call or an incoming message on the first electronic device; obtaining information related to at least one application on the first electronic device that is being executed when the phone call or the message is received; transmitting a response message according to the obtained information.

The setting up the call rejection function may include a first user inputting parameters through a user interface.

Inputting the parameters may include setting at least one application of a plurality of applications to be an application that invokes the call rejection function.

Inputting the parameters may include setting a type of response message corresponding to each group of contacts of a plurality of groups of contacts listed in a contact list.

BRIEF DESCRIPTION OF THE DRAWINGS

These and/or other aspects will become apparent and more readily appreciated from the following description of the exemplary embodiments, taken in conjunction with the accompanying drawings, in which:

FIG. 1A is a diagram illustrating a system that performs a function for providing a response message with respect to an incoming call, according to an exemplary embodiment;

FIG. 1B is a diagram illustrating a system that performs a function for providing a response message with respect to an incoming call, according to another exemplary embodiment;

FIG. 2B is a diagram illustrating a system that performs a function for providing a response message with respect to an incoming message, according to another exemplary embodiment;

FIG. 9 is a table illustrating examples of information included in a response message according to an exemplary embodiment;

FIG. 13 is a table illustrating various types of response messages according to an exemplary embodiment;

FIG. 17 is a table illustrating sender formats and receiver formats according to groups, according to an exemplary embodiment;

FIG. 30 is a table illustrating examples of information included in a response message according to an exemplary embodiment;

DETAILED DESCRIPTION

Figure 2A:
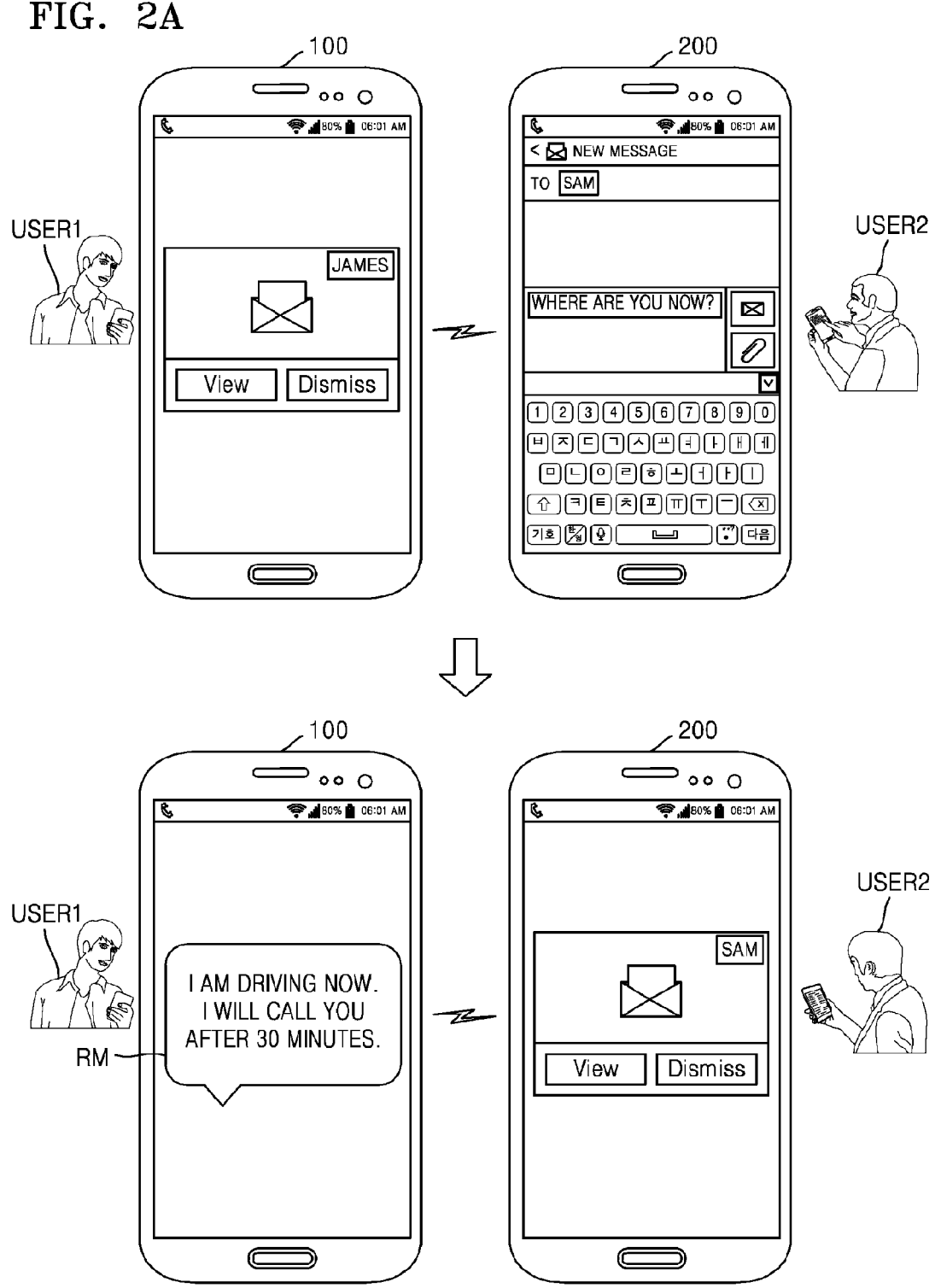
FIG. 2A is a diagram illustrating a system that performs a function for providing a response message with respect to an incoming message, according to an exemplary embodiment.

Although the terms used in the disclosure are selected from generally known and used terms, some of the terms mentioned in the description of one or more exemplary embodiments have been selected by the applicant at his or her discretion, the detailed meanings of which are described in relevant parts of the description herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

Reference will now be made in detail to exemplary embodiments, examples of which are illustrated in the accompanying drawings, wherein like reference numerals refer to like elements throughout. In this regard, one or more exemplary embodiments may have different forms and should not be construed as being limited to the descriptions set forth herein. Accordingly, the exemplary embodiments are merely described below, by referring to the figures, to explain aspects of the disclosure. Expressions such as "at least one of," when preceding a list of elements, modify the entire list of elements and do not modify the individual elements of the list.

FIG. 1A is a diagram illustrating a system that performs a function for providing a response message with respect to an incoming call, according to an exemplary embodiment.

Referring to FIG. 1A, a response message providing system includes first and second devices 100 and 200, in which the first and second devices 100 and 200 are electronic devices supporting at least a voice call function or a video call function. For example, the first and second devices 100 and 200 may be smart phones, tablet PCs, PCs, smart TVs, mobile phones, personal digital assistants (PDAs), laptop PCs, media players, micro servers, global positioning system (GPS) devices, e-book terminals, digital broadcasting terminals, navigation devices, kiosks, MP3 players, digital camera, and other mobile or non-mobile computing devices, but are not limited thereto. Furthermore, the first and second devices 100 and 200 may include various devices capable of receiving touch inputs, including, e.g., electronic blackboards and touch tables.

According to an exemplary embodiment, the first device 100 may be a device that executes software and performs particular functions via the software. Software may be executed by one from among an application, an operating system (OS), and a middleware, or any combination thereof. Particularly, a function of generating a response message according to an exemplary embodiment may be performed by one from among an application, an OS, and a middleware. Hereinafter, an embodiment in which the function is executed by an application and an embodiment in which the function is executed by a middleware will be described in detail. Furthermore, software may be executed not only by the first device 100, but also by other devices connected to the first device 100, e.g., a wearable device, a server, a navigation device, etc.

The term "application" may refer to a set of a series of computer programs designed to perform a particular task. The disclosure may include various applications. For example, applications may include a web browser, a camera application, a dictionary application, a translator application, a data transmission application, a music player application, a movie player application, a phone application, a message application, a social communicator application, a map application, a picture folder application, a broadcasting application, a game application, a fitness application, a payment application, a memo application, a calendar application, and a phone book application, but are not limited thereto.

"Middleware" may include a plurality of modules that are prepared in advance to provide functions that are commonly demanded by various applications. Middleware may provide functions via application program interfaces (APIs), such that applications may efficiently utilize resources in a device. For example, middleware may include at least one of a plurality of modules including an application manager, a window manager, a multimedia manager, a resource manager, a power manager, a database manager, a package manager, a connection manager, a notification manager, a location manager, a graphic manager, and a security manager. Furthermore, if a device has a phone call function, middleware may further include a phone call manager to manage a voice call function or a video call function. Middleware may further include runtime libraries or other library modules.

According to an exemplary embodiment, the first device 100 may receive a call request, e.g., an incoming call from the second device 200. In other words, a second user USER2 of the second device 200 may attempt to establish a phone call to a first user USER1 of the first device 100. Therefore, the first user USER1 may be referred to as a receiver, whereas the second user USER2 may be referred to as a caller or a sender.

A phone number of the second device 200 may be displayed on a display screen of the first device 100 (phone number 12, FIG. 1A), and the phone number 12 of the second device 200 may be referred to as a caller ID or a caller's number. If the phone number 12 of the second device 200 is included in contact information, e.g., a phone book stored in the first device 100, a name 11 of the second user USER2 stored in the contact information may be displayed on the display screen of the first device 100.

A phone number 14 of the first device 100 may be displayed on a display screen of the second device 200, and the phone number 14 of the first device 100 may be referred to as a receiver's number. Furthermore, if the phone number 14 of the first device 100 is included in contact information, e.g., a phone book stored in the second device 200, a name 13 of the first user USER1 stored in the contact information may be displayed on the display screen of the second device 200.

According to an exemplary embodiment, the first user USER1 of the first device 100 might not be able to respond to an incoming call from the second device 200. For example, the first user USER1 may be in a situation in which it is difficult to respond to the incoming call or the first user USER1 may not want to respond to the incoming call from the second user USER2.

According to an exemplary embodiment, when an incoming call is received from the second device 200, the first device 100 may automatically generate a response message (RM) by referring to information regarding an application that is being currently executed or previously executed and may automatically transmit the generated response message RM to the second device 200. To notify the first user USER1 that the response message RM is transmitted, the first device 100 may provide a notification that transmission of the response message RM is completed on the display screen of the first device 100 in the form of a message, for example. Here, the response message RM may include information regarding a current situation, a future situation, or both a current situation and a future situation of the first user USER1, or may be a simple response message.

According to another exemplary embodiment, when an incoming call is received from the second device 200, the first device 100 may provide a user interface (UI) element corresponding to the incoming call on the display screen of the first device 100. Here, the UI element may display options with respect to the received incoming call including allow, reject, or transmit a response message. If the first user USER1 selects to reject the incoming call or to transmit a response message, the first device 100 may automatically generate a response message RM by referring to information regarding an application that is being currently executed or previously executed and may automatically transmit the generated response message RM to the second device 200. Here, the response message RM may include information regarding a current situation, a future situation, or both a current situation and a future situation of the first user USER1, or may be a simple response message.

According to another exemplary embodiment, when an incoming call is received from the second device 200, the first device 100 may provide a user interface (UI) element corresponding to the incoming call on the display screen of the first device 100. Here, the UI element may display options with respect to the received incoming call including allow, reject, or transmit a response message. If the first user USER1 selects to reject the incoming call or to transmit a response message, the first device 100 may automatically generate response message candidates by referring to information regarding an application that is being currently executed or previously executed and provide the generated response message candidates on the display screen of the first device 100 together with general frequently used messages. As described above, the first device 100 may provide a response message list including response message candidates and general frequently used messages, the response message candidates may include information regarding a current situation, a future situation, or both a current situation and a future situation of the first user USER1, and the general frequently used messages may be simple response messages. Next, when the first user USER1 selects one response message in the response message list, the first device 100 may transmit a selected response message RM to the second device 200.

Here, the "current situation" may refer to a reason that the first user USER1 is unable to respond to an incoming call at a time point of reception of the incoming call, the reason determined by referring to information regarding an application that is being currently executed or previously executed and may be a specific activity, a location, or a route of the first user USER1. For example, if a navigation application is being executed on the first device 100, a current situation of the first user USER1 may be determined as 'driving' by referring to information regarding the navigation application (e.g., if the navigation application determines the phone is moving at or above a predetermined speed). For another example, if a fitness application is being executed on the first device 100, a current situation of the first user USER1 may be determined as 'exercising' by referring to information regarding the fitness application. As another example, if a phone application is being executed on the first device 100, a current situation of the first user USER1 may be determined as 'on the phone' by referring to information regarding the phone application.

The "future situation" may be a change of situation of the first user USER1 after termination of an incoming call, which may be estimated by referring to information regarding an application that is being currently executed or was previously executed and may correspond to an estimated point of time when the first user USER1 will be available to respond to an incoming call. For example, if a navigation application is being executed on the first device 100, a future situation of the first user USER1 may be estimated to 'arrive at a destination in a few minutes' based on information regarding the navigation application (e.g., a destination set by the first user USER1, current traffic conditions, etc.). As another example, if a fitness application is being executed on the first device 100, a future situation of the first user USER1 may be estimated to 'finish exercise in a few minutes' based on information regarding the fitness application (e.g., a target exercise time set by the first user USER1). As another example, if a phone application is being executed on the first device 100, a future situation of the first user USER1 may be estimated to 'finish a phone call in a few minutes' based on information regarding the phone application (e.g., an average call time of the first user USER1).

According to an exemplary embodiment, an application that is being currently executed or previously executed on the first device 100 may be executed by the first user USER1. In other words, functions of an application that is being currently executed or was previously executed on the first device 100 may be initiated based on a user input, such as a touch input from the first user USER1. The first user USER1 may intentionally execute an application installed on the first device 100 to perform a particular task. For example, the particular task may be driving, exercising, making or receiving phone calls, sending or receiving messages, inputting schedules, reserving movie tickets, reserving transportation tickets, watching movies, playing games, internet banking, etc. As described above, an application that is being currently executed or previously executed on the first device 100 are not limited to applications that are executed to determine a current situation of the first user USER1 or to estimate a future situation of the first user USER1 and may also be applications intentionally selected by the first user USER1 to perform particular tasks.

The first device 100 may generate a response message RM by using an application or middleware. Detailed descriptions thereof will be given below.

According to an exemplary embodiment, the first device 100 may generate a response message RM by using a phone application or a message application. In detail, a phone application or a message application installed on the first device 100 may receive information regarding another application via an API and generate a response message RM. Here, the response message RM generated by the phone application or the message application may be transmitted to the second device 200 via the message application.

According to another exemplary embodiment, the first device 100 may generate a response message RM by using a separate dedicated application. In detail, a separate dedicated application installed on the first device 100 may receive information regarding another application via an API and generate a response message RM. Here, the response message RM generated by the separate dedicated application may be transmitted to the second device 200 via a message application.

According to another exemplary embodiment, the first device 100 may generate a response message RM by using middleware. In detail, a particular module of middleware of the first device 100 may collect and manage information regarding various applications. Furthermore, a particular module of the middleware may generate a response message RM by using information regarding an application. Here, the response message RM generated by the particular module of the middleware may be transmitted to the second device 200 via a message application.

For example, methods of generating response messages RM via a phone application or a message application, a separate dedicated application, or middleware in a case in which a navigation application is being executed on the first device 100 at a point of time when an incoming call is received from the second device 200 will be described below in detail.

According to an exemplary embodiment, a phone application or a message application installed on the first device 100 may receive information regarding a navigation application via an API and generate a response message RM. In detail, the phone application or the message application determines a current situation of the first user USER1 as 'driving' based on information regarding execution of the navigation application and may estimate a future situation of the first user USER1 to 'arrive at a destination in 30 minutes' by referring to information regarding the destination and information regarding current traffic conditions from the navigation application. Therefore, the phone application or the message application may generate a response message RM saying "I am driving right now. I will contact you in 30 minutes." The first device 100 may transmit the generated response message RM to the first device 100 via the message application.

According to another exemplary embodiment, a separate dedicated application installed on the first device 100 may receive information regarding a navigation application via an API and generate a response message RM. In detail, the separate dedicated application determines a current situation of the first user USER1 as 'driving' based on information regarding execution of the navigation application and may estimate a future situation of the first user USER1 to 'arrive at a destination in 30 minutes' by referring to information regarding the destination and information regarding current traffic conditions from the navigation application. Therefore, the separate dedicated application may generate a response message RM saying "I am driving right now. I will contact you in 30 minutes." The first device 100 may transmit the generated response message RM to the first device 100 via a message application.

According to another exemplary embodiment, a particular module of middleware or an OS of the first device 100 may receive information regarding a navigation application via an API and generate a response message RM. In detail, the particular module of the middleware determines a current situation of the first user USER1 as 'driving' based on information regarding execution of the navigation application and may estimate a future situation of the first user USER1 to 'arrive at a destination in 30 minutes' by referring to information regarding the destination and information regarding current traffic conditions from the navigation application. Therefore, the particular module of the middleware may generate a response message RM saying "I am driving right now. I will contact you in 30 minutes." The first device 100 may transmit the generated response message RM to the first device 100 via a message application.

FIG. 1B is a diagram illustrating a system that performs a function for providing a response message with respect to an incoming call, according to another exemplary embodiment.

Referring to FIG. 1B, a response message providing system may include first through third devices 100 through 300. Here, the first and second devices 100 and 200 may be substantially similar to the first and second devices 100 and 200 shown in FIG. 1A, and descriptions thereof given above with reference to FIG. 1A may be applied here.

The third device 300 may be a wearable device having communication function and data processing function, e.g., a watch-type device, an eyewear-type device, a hairband-type device, a ring-type device, etc. In detail, the first user USER1 may be wearing the third device 300, and the third device 300 may wirelessly communicate with and link to the first device 100

A user wears the third device 300, such that the third device 300 contacts the body of the user in a pre-set manner. For example, the third device 300 worn by the user may be in the form of a wristwatch, eyewear, an earring, a necklace, earphones, shoes, clothing, a helmet, etc.

According to an exemplary embodiment, the first user USER1 of the first and third devices 100 and 300 may not be able to respond to an incoming call from the second device 200. For example, the first user USER1 may be in a situation in which it is difficult to respond to the incoming call or the first user USER1 may not want to respond to the incoming call from the second user USER2.

According to an exemplary embodiment, the first device 100 may generate a response message RM by referring to an application that is being currently executed or previously executed on the first device 100 or an application that is being currently executed or previously executed on the third device 300. According to another exemplary embodiment, the third device 300 may generate a response message RM by referring to an application that is being currently executed or previously executed on the first device 100 or an application that is being currently executed or previously executed on the third device 300.

An exemplary embodiment in which operations for generating a response message RM and transmitting the response message RM are performed on the third device 300 will now be described. However, as described above, operations for generating a response message RM and transmitting the response message RM may also be performed on the first device 100. Detailed descriptions thereof will be given below with reference to FIGS. 41 through 51 and 57 through 60.

According to an exemplary embodiment, when an incoming call is received from the second device 200, the third device 300 may automatically generate a response message RM by referring to information regarding an application that is being currently executed or previously executed on the first device 100 or the third device 300 and automatically transmit the generated response message RM to the second device 200. Next, to notify the first user USER1 that the response message RM is transmitted, the third device 300 may provide a notification that transmission of the response message RM is completed on a display screen of the third device 300 in the form of a message, for example. Here, the response message RM may include information regarding a current situation, a future situation, or both a current situation and a future situation of the first user USER1, or may be a simple response message.

According to another exemplary embodiment, when an incoming call is received from the second device 200, the third device 300 may provide a user interface (UI) element corresponding to the incoming call on the display screen of the third device 300. Here, the UI element may display options with respect to the received incoming call including allow, reject, or transmit a response message. Next, if the first user USER1 selects to reject the incoming call or to transmit a response message, the third device 300 may automatically generate a response message RM by referring to information regarding an application that is being currently executed or previously executed on the first device 100 or the third device 300 and automatically transmit the generated response message RM to the second device 200. Here, the response message RM may include information regarding a current situation, a future situation, or both a current situation and a future situation of the first user USER1 or may be a simple response message.

According to another exemplary embodiment, when an incoming call is received from the second device 200, the third device 300 may provide a user interface (UI) element corresponding to the incoming call on the display screen of the third device 300. Here, the UI element may display options with respect to the received incoming call including allow, reject, or transmit a response message. Next, if the first user USER1 selects to reject the incoming call or to transmit a response message, the third device 300 may automatically generate a response message candidates by referring to information regarding an application that is being currently executed or previously executed on the first device 100 or the third device 300 and provide the generated response message candidates on the display screen of the third device 300 together with general frequently used messages. As described above, the third device 300 may provide a response message list including response message candidates and general frequently used messages, the response message candidates may include information regarding a current situation, a future situation, or both a current situation and a future situation of the first user USER1, and the general frequently used messages may be simple response messages. Next, when the first user USER1 selects one response message in the response message list, the third device 300 may transmit a selected response message RM to the second device 200.

According to an exemplary embodiment, an application that is being currently executed or previously executed on the first device 100 or the third device 300 may be executed by the first user USER1. In other words, functions of an application that is being currently executed or was previously executed on the first device 100 or the third device 300 may be initiated based on a user input, such as a touch input from the first user USER1. The first user USER1 may intentionally execute an application installed on the first device 100 or the third device 300 to perform a particular task. For example, the particular task may be driving, exercising, making or receiving phone calls, sending or receiving messages, inputting schedules, reserving movie tickets, reserving transportation tickets, watching movies, playing games, internet banking, etc. As described above, an application that is being currently executed or previously executed on the first device 100 or the third device 300 are not limited to applications that are executed to determine a current situation of the first user USER1 or to estimate a future situation of the first user USER1 and may also be applications intentionally selected by the first user USER1 to perform particular tasks.

The third device 300 may generate a response message RM by using an application or middleware. Detailed descriptions thereof will be given below.

According to an exemplary embodiment, the third device 300 may generate a response message RM by using a phone application or a message application. In detail, a phone application or a message application installed on the third device 300 may receive information regarding another application via an API and generate a response message RM. Here, the response message RM generated by the phone application or the message application may be transmitted to the second device 200 via the message application.

According to another exemplary embodiment, the third device 300 may generate a response message RM by using a separate dedicated application. In detail, a separate dedicated application installed on the third device 300 may receive information regarding another application via an API and generate a response message RM. Here, the response message RM generated by the separate dedicated application may be transmitted to the second device 200 via a message application.

According to another exemplary embodiment, the third device 300 may generate a response message RM by using middleware. In detail, a particular module of middleware of the third device 300 may collect and manage information regarding various applications. Furthermore, a particular module of the middleware may generate a response message RM by using information regarding an application. Here, the response message RM generated by the particular module of the middleware may be transmitted to the second device 200 via a message application.

FIG. 2A is a diagram illustrating a system that performs a function for providing a response message with respect to an incoming message, according to an exemplary embodiment.

Referring to FIG. 2A, a response message providing system may include first and second devices 100 and 200, and the first and second devices 100 and 200 may be electronic devices supporting message transmitting/receiving function. The first and second devices 100 and 200 according to an exemplary embodiment may be substantially similar to the first and second devices 100 and 200 shown in FIG. 1A. Therefore, descriptions thereof given above with reference to FIG. 1A may also be applied here.

According to an exemplary embodiment, the first device 100 may receive a message from the second device 200. In an exemplary embodiment, an incoming call includes reception of a message. Therefore, the first user USER1 may be referred to as a receiver, whereas the second user USER2 may be referred to as a caller or a sender. According to an exemplary embodiment, the first user USER1 of the first device 100 may not be able to respond to a message from the second device 200. For example, the first user USER1 may be in a situation in which it is difficult to input a message or to make a phone call or the first user USER1 may not want to respond to the message from the second user USER2, or to establish a phone call to the second user USER2.

According to an exemplary embodiment, when a message is received from the second device 200, the first device 100 may automatically generate a response message RM by referring to information regarding an application that is being currently executed or previously executed and automatically transmit the generated response message RM to the second device 200. Next, to notify the first user USER1 that the response message RM is transmitted, the first device 100 may provide a notification that transmission of the response message RM is completed on the display screen of the first device 100 in the form of a message. Here, the response message RM may include information regarding a current situation, a future situation, or both a current situation and a future situation of the first user USER1, or may be a simple response message.

According to another exemplary embodiment, when a message is received from the second device 200, the first device 100 may provide a user interface (UI) element corresponding to the received message on the display screen of the first device 100. Here, the UI element may display options with respect to the received message including reply or transmit a response message. Next, if the first user USER1 selects to transmit a response message, the first device 100 may automatically generate a response message RM by referring to information regarding an application that is being currently executed or previously executed and automatically transmit the generated response message RM to the second device 200. Here, the response message RM may include information regarding a current situation, a future situation, or both a current situation and a future situation of the first user USER1 or may be a simple response message.

According to another exemplary embodiment, when a message is received from the second device 200, the first device 100 may provide a user interface (UI) element corresponding to the received message on the display screen of the first device 100. Here, the UI element may display options with respect to the received message including reply or transmit a response message. Next, if the first user USER1 selects to transmit a response message, the first device 100 may automatically generate response message candidates by referring to information regarding an application that is being currently executed or previously executed and provide the generated response message candidates on the display screen of the first device 100 together with general frequently used messages. As described above, the first device 100 may provide a response message list including response message candidates and general frequently used messages, the response message candidates may include information regarding a current situation, a future situation, or both a current situation and a future situation of the first user USER1, and the general frequently used messages may be simple response messages. Next, when the first user USER1 selects one response message in the response message list, the first device 100 may transmit a selected response message RM to the second device 200.

Here, the "current situation" may refer to a reason that the first user USER1 is unable to respond to an incoming call at a time point of reception of the incoming call, the reason determined by referring to information regarding an application that is being currently executed or previously executed and may be a specific activity, a location, or a route of the first user USER1. Furthermore, the "future situation" may be a change of situation of the first user USER1 after termination of an incoming call estimated by referring to information regarding an application that is being currently executed or previously executed and may correspond to an estimated point of time when the first user USER1 will be available to respond to an incoming call.

According to an exemplary embodiment, an application that is being currently executed or previously executed on the first device 100 may be executed by the first user USER1. In other words, functions of an application that is being currently executed or was previously executed on the first device 100 may be initiated based on a user input, such as a touch input from the first user USER1. The first user USER1 may intentionally execute an application installed on the first device 100 to perform a particular task. For example, the particular task may be driving, exercise, making or receiving phone calls, sending or receiving messages, inputting schedules, reserving movie tickets, reserving transportation tickets, watching movies, playing games, internet banking, etc. As described above, an application that is being currently executed or previously executed on the first device 100 are not limited to applications that are executed to determine a current situation of the first user USER1 or to estimate a future situation of the first user USER1 and may also be applications intentionally selected by the first user USER1 to perform particular tasks.

The first device 100 may generate a response message RM by using an application or middleware. Detailed descriptions thereof will be given below.

According to an exemplary embodiment, the first device 100 may generate a response message RM by using a message application. In detail, a message application installed on the first device 100 may receive information regarding another application via an API and generate a response message RM. Here, the response message RM generated by the message application may be transmitted to the second device 200 via the message application.

According to another exemplary embodiment, the first device 100 may generate a response message RM by using a separate dedicated application. In detail, a separate dedicated application installed on the first device 100 may receive information regarding another application via an API and generate a response message RM. Here, the response message RM generated by the separate dedicated application may be transmitted to the second device 200 via a message application.

According to another exemplary embodiment, the first device 100 may generate a response message RM by using middleware. In detail, a particular module of middleware of the first device 100 may collect and manage information regarding various applications. Furthermore, a particular module of the middleware may generate a response message RM by using information regarding an application. Here, the response message RM generated by the particular module of the middleware may be transmitted to the second device 200 via a message application.

FIG. 2B is a diagram illustrating a system that performs a function for providing a response message with respect to an incoming message, according to another exemplary embodiment.

Referring to FIG. 2B, a response message providing system may include first through third devices 100 through 300. Here, the first and second devices 100 and 200 may be substantially similar to the first and second devices 100 and 200 shown in FIG. 1A, and descriptions thereof given above with reference to FIG. 1A may also be applied to an exemplary embodiment. The third device 300 may be a wearable device having communication function and data processing function, e.g., a watch-type device, an eyewear-type device, a hairband-type device, a ring-type device, etc. In detail, the first user USER1 may be wearing the third device 300, and the third device 300 may wirelessly communicate with and link to the first device 100

According to an exemplary embodiment, the first user USER1 of the first and third devices 100 and 300 may not be able to respond to a message from the second device 200. For example, the first user USER1 may be in a situation in which it is difficult to respond to input a message or to make a phone call, or the first user USER1 may not want to respond to establish a phone call to the second user USER2.

According to an exemplary embodiment, the first device 100 may generate a response message RM by referring to an application that is being currently executed or previously executed on the first device 100 or an application that is being currently executed or previously executed on the third device 300. According to another exemplary embodiment, the third device 300 may generate a response message RM by referring to an application that is being currently executed or previously executed on the first device 100 or an application that is being currently executed or previously executed on the third device 300.

An exemplary embodiment in which operations for generating a response message RM and transmitting the response message RM are performed on the third device 300 will now be described. However, as described above, operations for generating a response message RM and transmitting the response message RM may also be performed on the first device 100. Detailed descriptions thereof will be given below with reference to FIGS. 41 through 51 and 57 through 60.

According to an exemplary embodiment, when a message is received from the second device 200, the third device 300 may automatically generate a response message RM by referring to information regarding an application that is being currently executed or previously executed on the first device 100 or the third device 300 and automatically transmit the generated response message RM to the second device 200. Next, to notify the first user USER1 that the response message RM is transmitted, the third device 300 may provide a notification that transmission of the response message RM is completed on a display screen of the third device 300 in the form of a message, for example. Here, the response message RM may include information regarding a current situation, a future situation, or both a current situation and a future situation of the first user USER1 or may be a simple response message.

According to another exemplary embodiment, when a message is received from the second device 200, the third device 300 may provide a user interface (UI) element corresponding to the received message on the display screen of the third device 300. Here, the UI element may display options with respect to the received message including reply or transmit a response message. Next, if the first user USER1 selects to transmit a response message, the third device 300 may automatically generate a response message RM by referring to information regarding an application that is being currently executed or previously executed on the first device 100 or the third device 300 and automatically transmit the generated response message RM to the second device 200. Here, the response message RM may include information regarding a current situation, a future situation, or both a current situation and a future situation of the first user USER1 or may be a simple response message.

According to another exemplary embodiment, when a message is received from the second device 200, the third device 300 may provide a user interface (UI) element corresponding to the message on the display screen of the third device 300. Here, the UI element may display options with respect to the received message including reply or transmit a response message. Next, if the first user USER1 selects to transmit a response message, the third device 300 may automatically generate response message candidates by referring to information regarding an application that is being currently executed or previously executed on the first device 100 or the third device 300 and provide the generated response message candidates on the display screen of the third device 300 together with general frequently used messages. As described above, the third device 300 may provide a response message list including response message candidates and general frequently used messages, the response message candidates may include information regarding a current situation, a future situation, or both a current situation and a future situation of the first user USER1, and the general frequently used messages may be simple response messages. Next, when the first user USER1 selects one response message in the response message list, the third device 300 may transmit a selected response message RM to the second device 200.

According to an exemplary embodiment, an application that is being currently executed or previously executed on the first device 100 may be executed by the first user USER1. In other words, functions of an application that is being currently executed or was previously executed on the first device 100 may be initiated based on a user input, such as a touch input from the first user USER1. The first user USER1 may intentionally execute an application installed on the first device 100 to perform a particular task. For example, the particular task may be driving, exercise, making or receiving phone calls, sending or receiving messages, inputting schedules, reserving movie tickets, reserving transportation tickets, watching movies, playing games, internet banking, etc. As described above, an application that is being currently executed or previously executed on the first device 100 are not limited to applications that are executed to determine a current situation of the first user USER1 or to estimate a future situation of the first user USER1 and may also be applications intentionally selected by the first user USER1 to perform particular tasks.

The third device 300 may generate a response message RM by using an application or middleware. Detailed descriptions thereof will be given below.

According to an exemplary embodiment, the third device 300 may generate a response message RM by using a message application. In detail, a message application installed on the third device 300 may receive information regarding another application via an API and generate a response message RM. Here, the response message RM generated by the message application may be transmitted to the second device 200 via the message application.

According to another exemplary embodiment, the third device 300 may generate a response message RM by using a separate dedicated application. In detail, a separate dedicated application installed on the third device 300 may receive information regarding another application via an API and generate a response message RM. Here, the response message RM generated by the separate dedicated application may be transmitted to the second device 200 via a message application.

According to another exemplary embodiment, the third device 300 may generate a response message RM by using middleware. In detail, a particular module of middleware of the third device 300 may collect and manage information regarding various applications. Furthermore, a particular module of the middleware may generate a response message RM by using information regarding an application. Here, the response message RM generated by the particular module of the middleware may be transmitted to the second device 200 via a message application.

Figure 3:
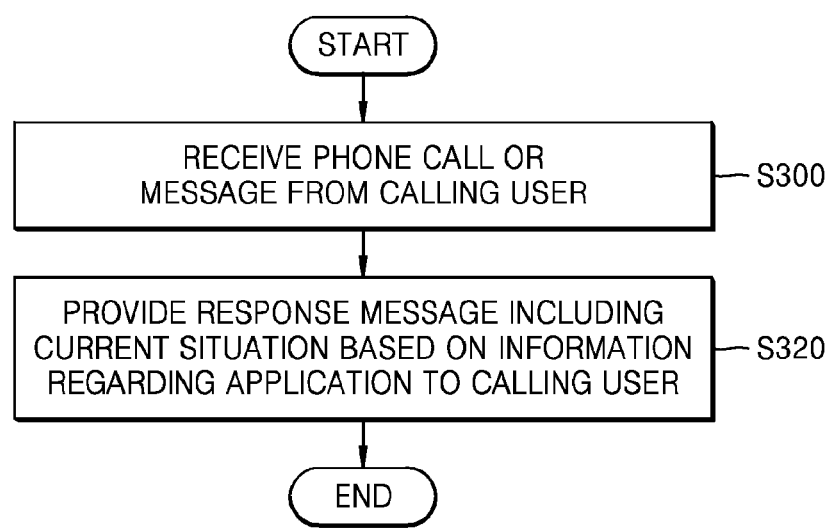
FIG. 3 is a flowchart illustrating a method of providing a response message according to an exemplary embodiment.

FIG. 3 is a flowchart illustrating a method of providing a response message according to an exemplary embodiment.

Referring to FIG. 3, the method of providing a response message according to an exemplary embodiment is a method for processing a rejection with respect to an incoming call or a message received by a device and includes below operations that are performed on the device. For example, the method of providing a response message according to an exemplary embodiment may include operations that are chronologically performed by the first device 100 of FIGS. 1A through 2B.

In an operation S300, a call request, and more particularly, an incoming call including a phone call or a message is received from a calling user (e.g., caller). Here, a phone call may be a phone call via a mobile communication network, a voice over internet protocol (VoIP) call, or a voice over long-term evolution (LTE) (VoLTE) call, etc. Here, a message may be a short message service (SMS), a multimedia message service (MMS), or a message provided by a chatting service, such as KakaoTalk or Line. However, the phone call or message is not limited to these methods.

In an operation S320, a response message including information regarding a current situation based on information regarding an application is provided to the calling user. Here, the "current situation" may refer to a reason that a user is unable to respond to an incoming call at a time point of reception of the incoming call, the reason determined by referring to information regarding an application that is being currently executed or previously executed and may be a specific activity, a location, or a route of the user.

According to an exemplary embodiment, information regarding an application may be information regarding an application that is being currently executed or previously executed on the first device 100 by the first user USER1. For example, the information regarding an application may be information regarding an application executed on the first device 100 based on a user input, such as a touch input, of the first user USER1. The first user USER1 may intentionally execute an application installed on the first device 100 to perform a particular task. For example, the particular task may be driving, exercising, making or receiving phone calls, sending or receiving messages, inputting schedules, reserving movie tickets, reserving transportation tickets, watching a movie, playing games, internet banking, etc. As described above, an application that is being currently executed or previously executed on the first device 100 is not limited to applications that are executed to determine a current situation of the first user USER1 or to estimate a future situation of the first user USER1 and may also be applications intentionally selected by the first user USER1 to perform particular tasks.

According to an exemplary embodiment, based on information set in advance before a phone call or a message is received, a response message may be automatically generated and transmitted to a calling user without notifying reception of the phone call or the message to a receiving user. Detailed descriptions thereof will be given below with reference to FIGS. 6 through 11B.

According to an exemplary embodiment, reception of the phone call or the message to a receiving user may be notified to a receiving user and a response message may be generated based on a user input indicating rejection of the call or message. In detail, after a user inputs an input to reject a call, a response message may be generated based on a user input regarding content of a response message and a communication medium for transmitting the response message. Detailed descriptions thereof will be given below with reference to FIGS. 20 through 27.

According to an exemplary embodiment, the operation S320 may be performed by a phone application or a message application installed on the first device 100. In other words, a phone application or a message application installed on the first device 100 may include the call rejection function described above. Therefore, when a phone call or a message is received by the first device 100, a call rejection function may be activated in a phone application or a message application. In detail, an application installed on the first device 100 may provide necessary information for generating a response message to a phone application or a message application via an API, and the phone application or the message application may generate a response message based on information received from the application.

According to another exemplary embodiment, the operation S320 may be performed by a dedicated response message providing application installed on the first device 100, and the response message providing application may be executed in conjunction with a phone application or a message application installed on the first device 100. Therefore, when a phone call or a message is received by the first device 100, the phone application or the message application may activate a call rejection function of a response message providing application. In detail, an application installed on the first device 100 may provide necessary information for generating a response message to a response message providing application via an API, and the response message providing application may generate a response message based on information received from the application.

According to another exemplary embodiment, the operation S320 may be performed by a platform of the first device 100. Therefore, when a phone call or a message is received by the first device 100, a platform may activate call rejection function. In detail, an application installed on the first device 100 may provide necessary information for generating a response message to a platform, and the platform may generate a response message based on information received from the application.

According to another exemplary embodiment, the operation S320 may be performed by an external server. Therefore, when a phone call or a message is received by the first device 100, a server may activate a call rejection function. In detail, an application installed on the first device 100 may provide necessary information for generating a response message to a server, and the server may generate a response message based on information received from the application.

Figure 4:
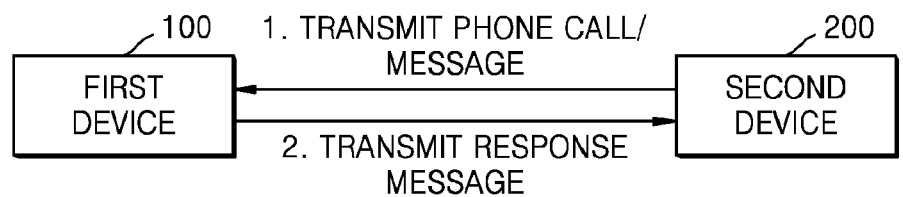
FIG. 4 is a block diagram illustrating a system for performing a response message providing function according to an exemplary embodiment.

FIG. 4 is a block diagram illustrating a system 10a for performing a response message providing function according to an exemplary embodiment.

Referring to FIG. 4, the system 10a includes first and second devices 100 and 200, and the first and second devices 100 and 200 may be substantially similar to the first and second devices 100 and 200 shown in FIG. 1A. Therefore, descriptions thereof given above with reference to FIG. 1A may also be applied here. According to an exemplary embodiment, the second device 200 transmits a phone call or a message and, in response thereto, the first device 100 transmits a response message.

According to an exemplary embodiment, the first device 100 may generate a response message by using an application that is being currently executed or previously executed on the first device 100. For example, an application that is being currently executed or previously executed may be a navigation application, a map application, a fitness application, an e-learning application, an internet banking application, a movie player application, a game application, an e-book application, a phone application, or a message application. However, exemplary embodiments are not limited thereto. For example, a previously executed application may be a scheduler application, a reservation application (e.g., a movie ticket reservation, a concert reservation, a flight ticket reservation, a train ticket reservation, a bus ticket reservation, etc.), or an alarm application. However, exemplary embodiments are not limited thereto.

Figure 5:
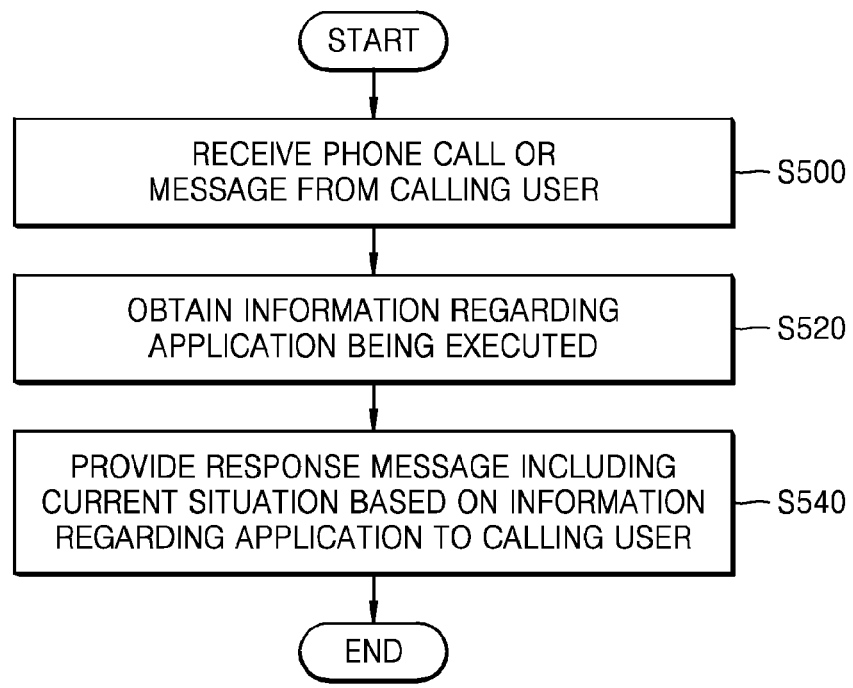
FIG. 5 is a flowchart illustrating a method of providing a response message according to another exemplary embodiment.

FIG. 5 is a flowchart illustrating a method of providing a response message according to another exemplary embodiment.

Referring to FIG. 5, the method of providing a response message according to an exemplary embodiment is a modification of the method of providing a response message shown in FIG. 3. Therefore, descriptions given above with reference to FIG. 3 may also be applied here, and thus, repeated descriptions will be omitted.

In an operation S500, a call request, and more particularly, an incoming call including a phone call or a message is received from a calling user. In an operation S520, information regarding an application being executed is obtained. In an operation S540, a response message including information regarding a current situation based on information regarding an application is provided to the calling user.

Figure 6:
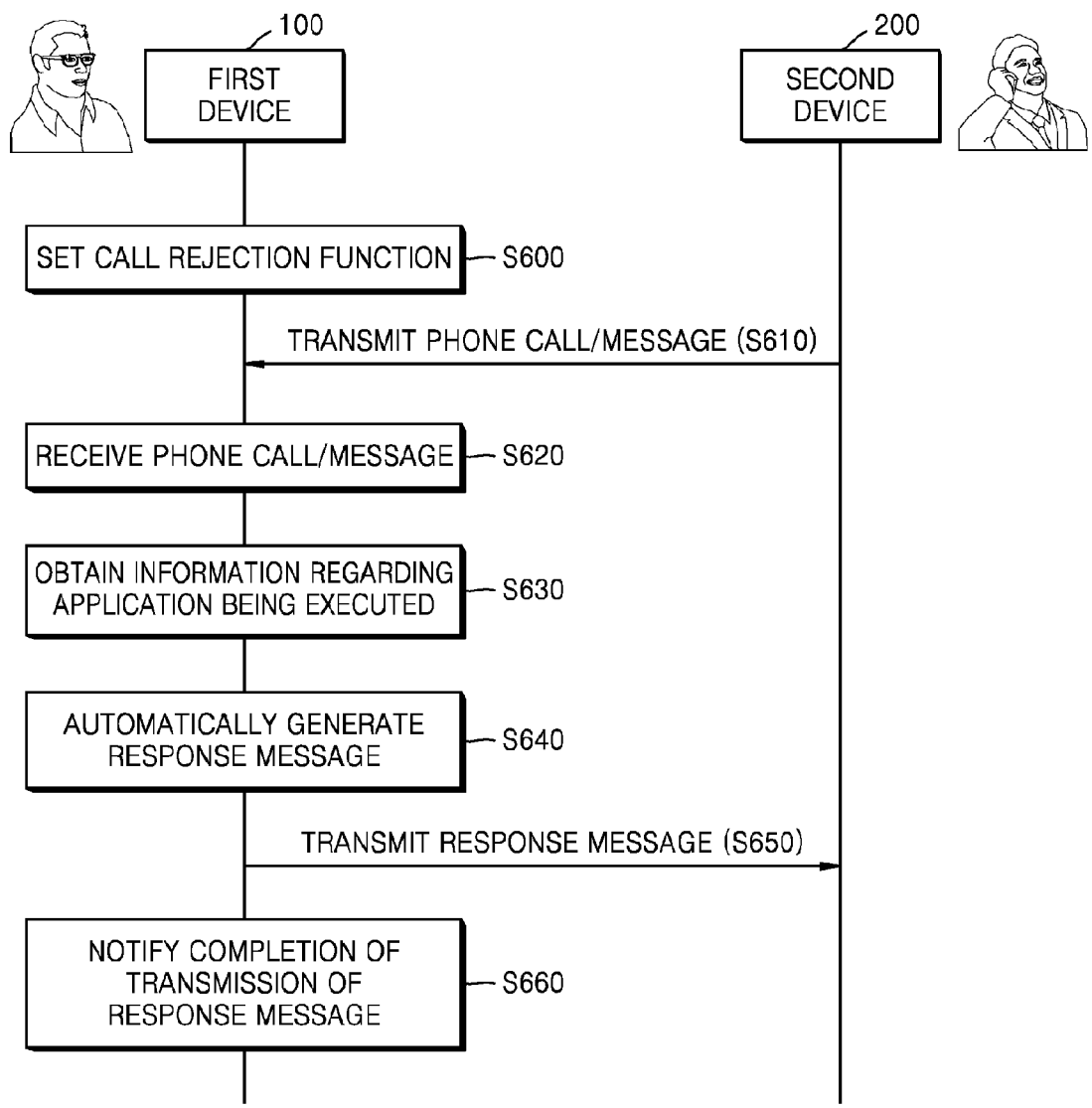
FIG. 6 is a flowchart illustrating examples of operations of first and second devices according to the method of providing a response message of FIG. 5.

FIG. 6 is a flowchart illustrating examples of operations of the first and second devices 100 and 200 according to a method of providing a response message.

Referring to FIG. 6, a method of providing a response message according to an exemplary embodiment includes operations that are chronologically performed by the first and second devices 100 and 200. Descriptions given above with respect to the first and second devices 100 and 200 shown in FIG. 4 may also be applied to a method of providing a response message according to an exemplary embodiment.

In an operation S600, the first device 100 sets up a call rejection function. The call rejection function may be set up with respect to at least a particular application, a particular contact, or a particular time slot. Detailed descriptions thereof will be given below with reference to FIGS. 7A through 7F. In an operation S610, the second device 200 transmits a phone call or a message to the first device 100. In an operation S620, the first device 100 receives the phone call or the message from the second device 200.

In an operation S630, the first device 100 obtains information regarding an application being executed. In detail, the first device 100 may obtain information from an application being executed on the first device 100 during the operation S620. In an operation S640, the first device 100 automatically generates a response message. In detail, the first device 100 may automatically generate a response message including at least one of a current situation and a future situation of the first user USER1 based on information regarding an application.

According to an exemplary embodiment, the operations S630 and S640 may be performed by a phone application or a message application installed on the first device 100. In other words, a phone application or a message application installed on the first device 100 may include a call rejection function. Therefore, when a phone call or a message is received by the first device 100, a call rejection function may be activated in a phone application or a message application. In detail, an application being currently executed on the first device 100 may provide necessary information for generating a response message to a phone application or a message application via an API, and the phone application or the message application may generate a response message based on information received from the application.

According to another exemplary embodiment, the operations S630 and S640 may be performed by a dedicated response message providing application installed on the first device 100, and the response message providing application may be executed in conjunction with a phone application or a message application installed on the first device 100. Therefore, when a phone call or a message is received by the first device 100, the phone application or the message application may activate a call rejection function of a response message providing application. In detail, an application installed on the first device 100 may provide necessary information for generating a response message to a response message providing application via an API, and the response message providing application may generate a response message based on information received from the application.

According to another exemplary embodiment, the operations S630 and S640 may be performed by a platform of the first device 100. Therefore, when a phone call or a message is received by the first device 100, a platform may activate a call rejection function. In detail, an application installed on the first device 100 may provide necessary information for generating a response message to a platform, and the platform may generate a response message based on information received from the application.

According to another exemplary embodiment, the operations S630 and S640 may be performed by an external server. Therefore, when a phone call or a message is received by the first device 100, a server may activate a call rejection function. In detail, an application installed on the first device 100 may provide necessary information for generating a response message to a server, and the server may generate a response message based on information received from the application.

In an operation S650, the first device 100 transmits a response message to the second device 200. Here, the response message may be transmitted via a SMS, a social network service (SNS), such as Facebook or Twitter, a chatting service, such as KakaoTalk or Line, or e-mail, or any other method.

In an operation S660, the first device 100 provides a notification to the first user USER1 that transmission of a response message is completed. Therefore, the first user USER1 may learn that a phone call or a message is received from the second device 200 and a response message automatically generated in correspondence thereto may be transmitted to the second device 200.

FIGS. 7A through 7F are diagrams illustrating an example operation for setting up a call rejection function according to an exemplary embodiment.

Figure 7A:
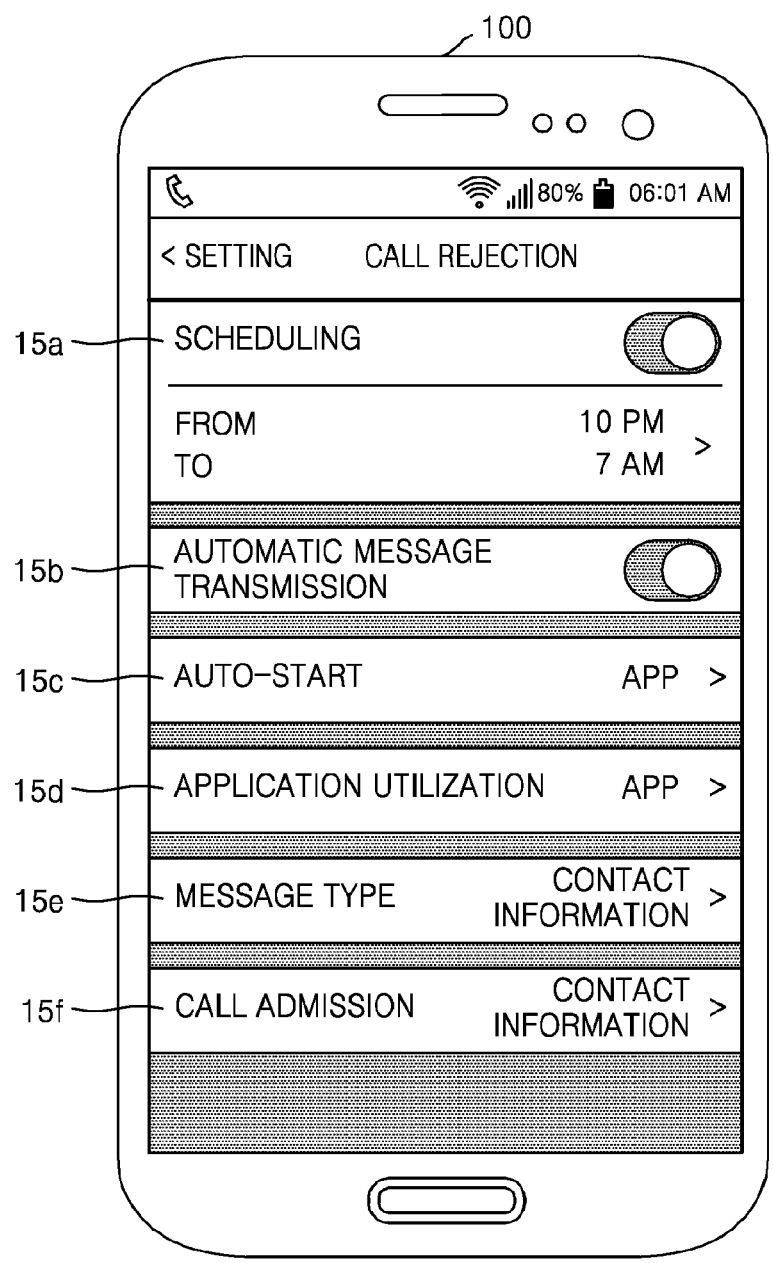
FIGS. 7A through 7F are diagrams illustrating an example operation for setting up a call rejection function according to an exemplary embodiment.

Referring to FIG. 7A, a user may set up a call rejection function in advance before a phone call or a message is received. For example, the first user USER1 may set up the call rejection function in the first device 100 in advance. According to an exemplary embodiment, the call rejection function may include settings for scheduling 15a, automatic message transmission 15b, auto-start 15c, application utilization 15d, message type 15e, and call admission 15f. However, exemplary embodiments are not limited thereto. According to another exemplary embodiment, the call rejection function may include more settings or less settings than those described above.

The scheduling 15a may be an icon for automatically performing a call rejection function during a particular time slot. During a particular time slot selected via the scheduling 15a, a response message may be automatically transmitted to a calling user without providing a notification regarding reception of a phone call or a message to a user.

The automatic message transmission 15b is an icon for automatically completing a response message by referring to information regarding an application and automatically transmitting the completed response message to a calling user. Therefore, if the automatic message transmission 15b is selected, it is not necessary to receive user inputs for selecting a type of a response message and a medium for transmitting a response message.

The auto-start 15c is an icon for automatically performing a call rejection function while a particular application is being executed. If the auto-start 15c is selected, a response message may be automatically generated and the generated response message may be automatically transmitted to a calling user (e.g., the second user USER2). According to an exemplary embodiment, if the auto-start 15c is selected, a call rejection function may be automatically performed without providing a notification regarding reception of a phone call or a message to the first user USER1. According to another exemplary embodiment, if the auto-start 15c is selected, a notification regarding reception of a phone call or a message may be provided to the first user USER1, and then a call rejection function may be automatically performed. If the auto-start 15c is selected, a screen image displayed on the first device 100 may be changed to the screen image shown in FIG. 7B.

Figure 7B:
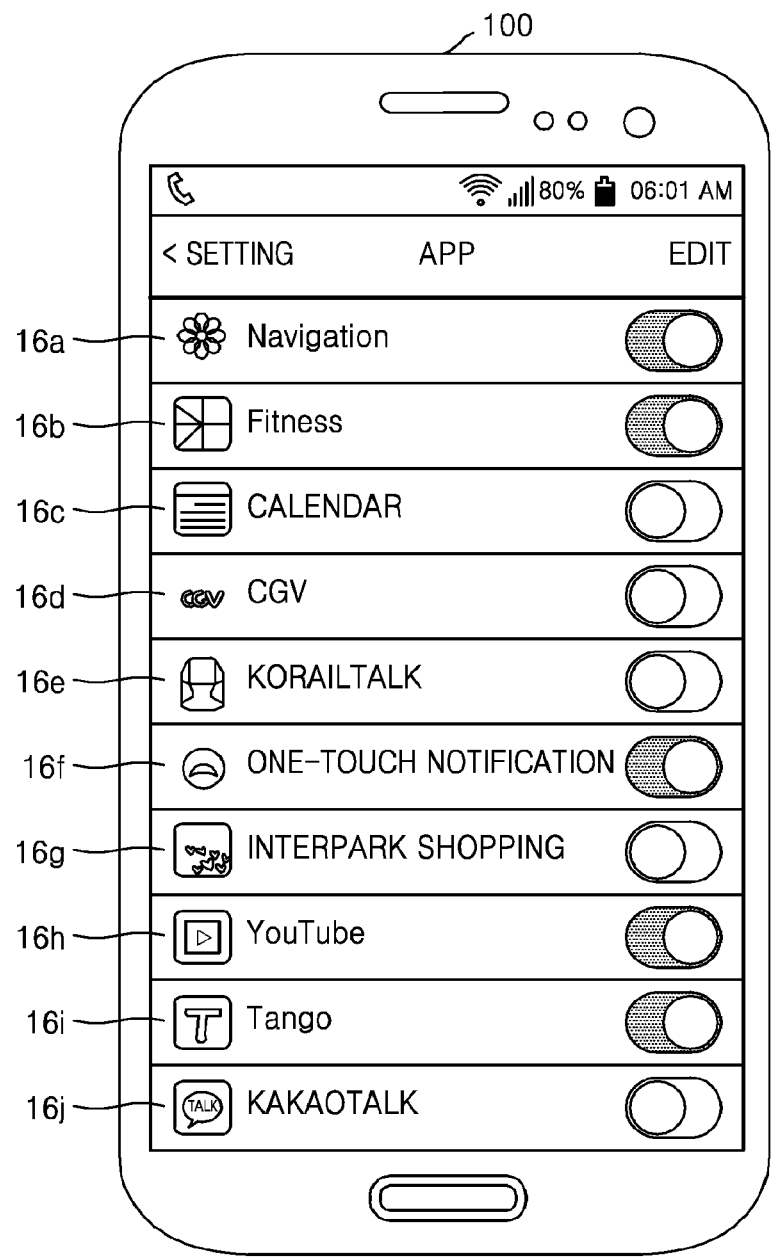

Referring to FIG. 7B, any number of a plurality of applications 16a through 16j may be selected and, while the selected applications are being executed, a response message may be automatically transmitted to the second user USER2 without providing a notification regarding reception of a phone call or a message. For example, as illustrated in FIG. 7B, the first user USER1 may select a navigation application 16a, a fitness application 16b, an internet banking application 16f, a movie player application 16h, and a VoIP application 16i to automatically generate a response message. Therefore, if the first device 100 receives a phone call or a message from the second device 200 while the navigation application 16a, the fitness application 16b, the internet banking application 16f, the movie player application 16h, or the VoIP application 16i is being executed, the first device 100 may automatically generate a response message.

Referring back to FIG. 7A, the application utilization 15d is an icon for selecting an application for providing information for generating a response message. If the application utilization 15d is selected, a screen image displayed on the first device 100 may be changed to the screen image shown in FIG. 7C.

Figure 7C:
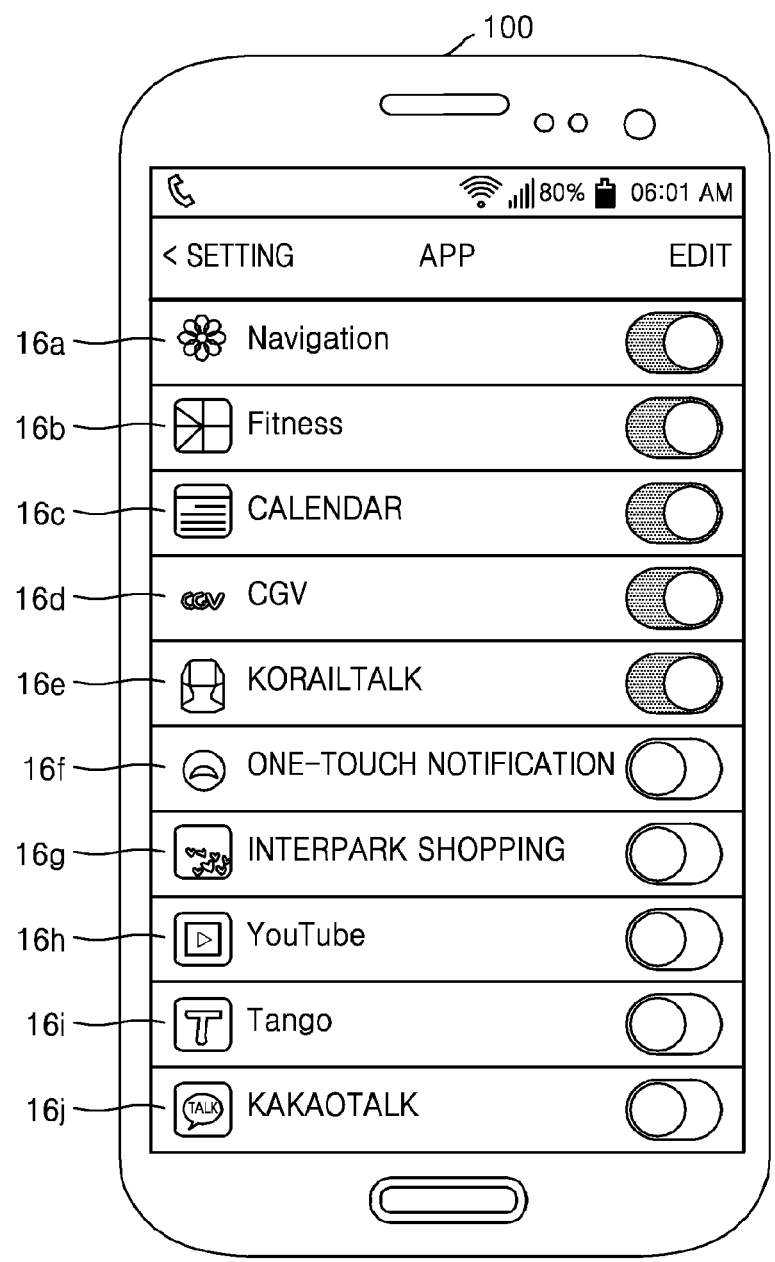

Referring to FIG. 7C, any number of a plurality of applications 16a through 16j may be selected and a response message may be generated by referring to information regarding the selected application. For example, to generate a response message, the first user USER1 may select the navigation application 16a, the fitness application 16b, a calendar application 16c, a movie ticket reservation application 16d, and a train ticket reservation application 16e. Therefore, the first device 100 may generate a response message by referring to information provided by the navigation application 16a and the fitness application 16b being currently executed on the first device 100 or the calendar application 16c, the movie ticket reservation application 16d, or the movie ticket reservation application 16d previous executed on the first device 100.

Referring back to FIG. 7A, the message type 15e is an icon for selecting various message types based on information to provide via a response message. If the message type 15e is selected, a screen image displayed on the first device 100 may be changed to the screen image shown in FIG. 7D.

Figure 7D:
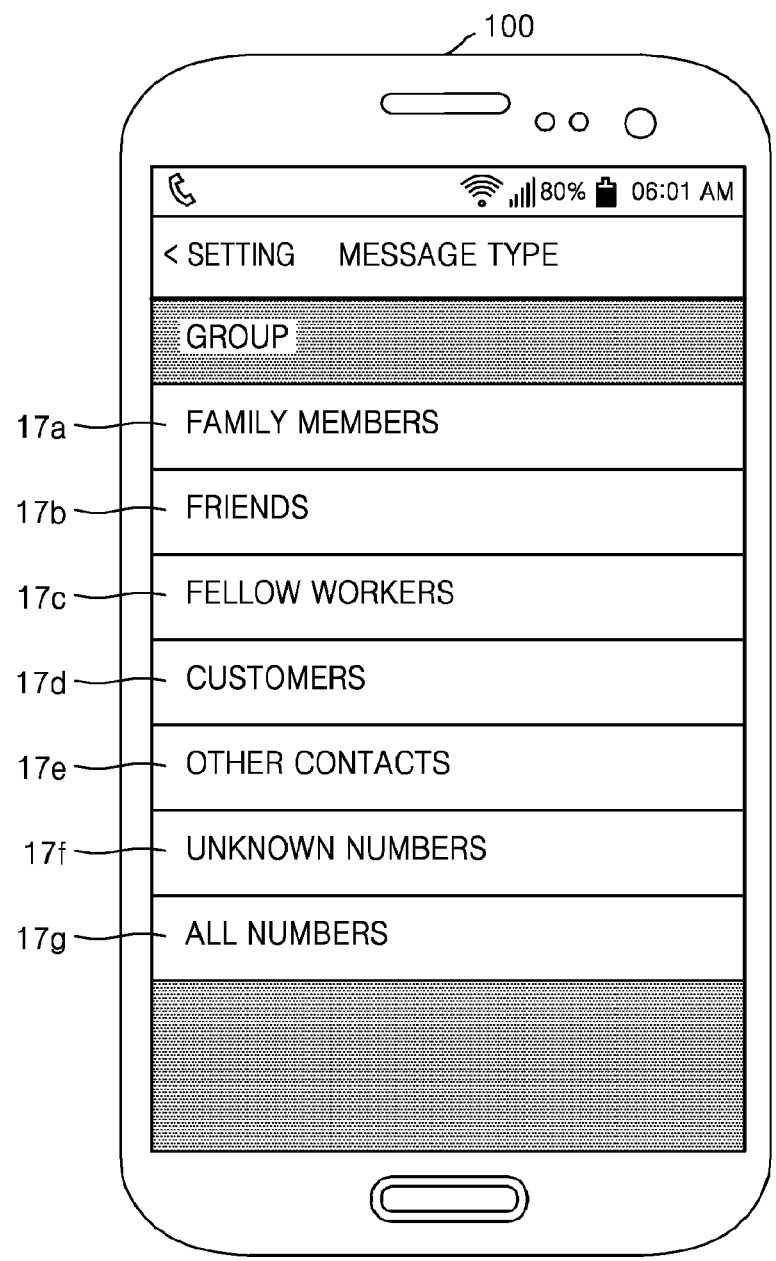

Referring to FIG. 7D, message types may be selected for respective groups stored in a phone book or contact information stored in the first device 100. For example, the first user USER1 may select different message types for family members 17a, friends 17b, fellow workers 17c, customers 17d, and other contacts 17e, respectively. Furthermore, the first user USER1 may select a separate message type for unknown numbers 17f, which are numbers not stored in the first device 100.

Furthermore, regardless of groups stored in a phone book or contact information stored in the first device 100, a same message type may be selected with respect to all incoming call IDs. For example, if the first user USER1 selects all numbers 17g, a same message type may be set with respect to all incoming call IDs. If the first user USER1 selects one from among the family members 17a, the friends 17b, the fellow workers 17c, the customers 17d, the other contacts 17e, the unknown numbers 17f, and the all numbers 17g, a screen image displayed on the first device 100 may be changed to the screen image shown in FIG. 7E.

Figure 7E:
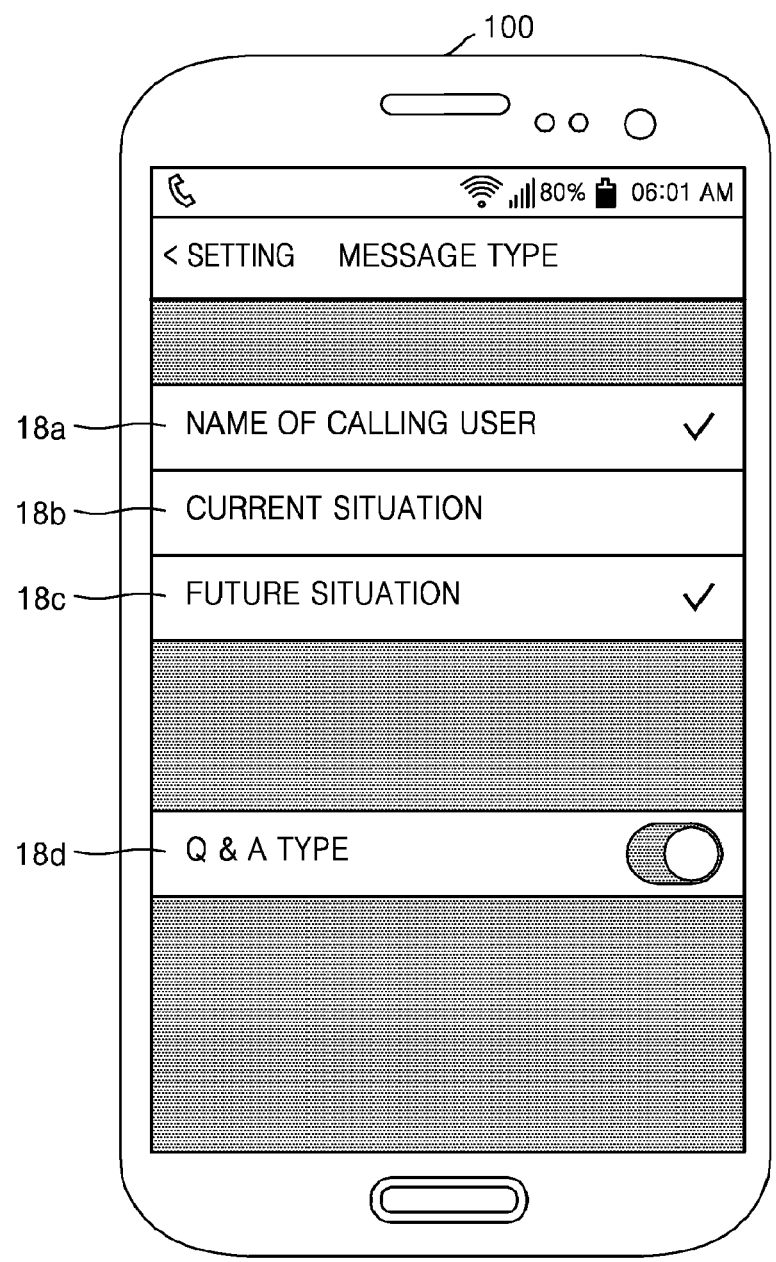

Referring to FIG. 7E, the first user USER1 may select information to be included in a response message with respect to a phone call or a message received from a calling user included in a selected group. In detail, the USER1 may select at least one of a name of calling user 18a, current situation 18b, and a future situation 18c or may select none of the name of calling user 18a, the current situation 18b, and the future situation 18c. For example, if the first user USER1 selects the family members 17a, the first user USER1 may select all of the name of calling user 18a, the current situation 18b, and the future situation 18c. For another example, if the first user USER1 selects the unknown numbers 17f, the first user USER1 may select none of the name of calling user 18a, the current situation 18b, and the future situation 18c. Detailed descriptions thereof will be given below with reference to FIGS. 14 through 16.

Furthermore, the first user USER1 may generate response messages with respect to a phone call or a message from a calling user included in a selected group as a Q & A type 18d. If the Q & A type 18d is selected, the first device 100 may generate a first response message including only the current situation 18b and transmit the first response message to a calling party, for example. Next, if a message inquiring a point of time when the first user USER1 will be available to reply to the phone call or the message is received, the first device 100 may generate a second response message including the future situation 18c and transmit the second response message to the calling user. Detailed descriptions thereof will be given below with reference to FIG. 17.

Referring back to FIG. 7A, the call admission 15f is an icon for forwarding a phone call or a message from a particular contact to a user without automatically transmitting a response message. If the call admission 15f is selected, a screen image displayed on the first device 100 may be changed to the screen image shown in FIG. 7F.

Figure 7F:
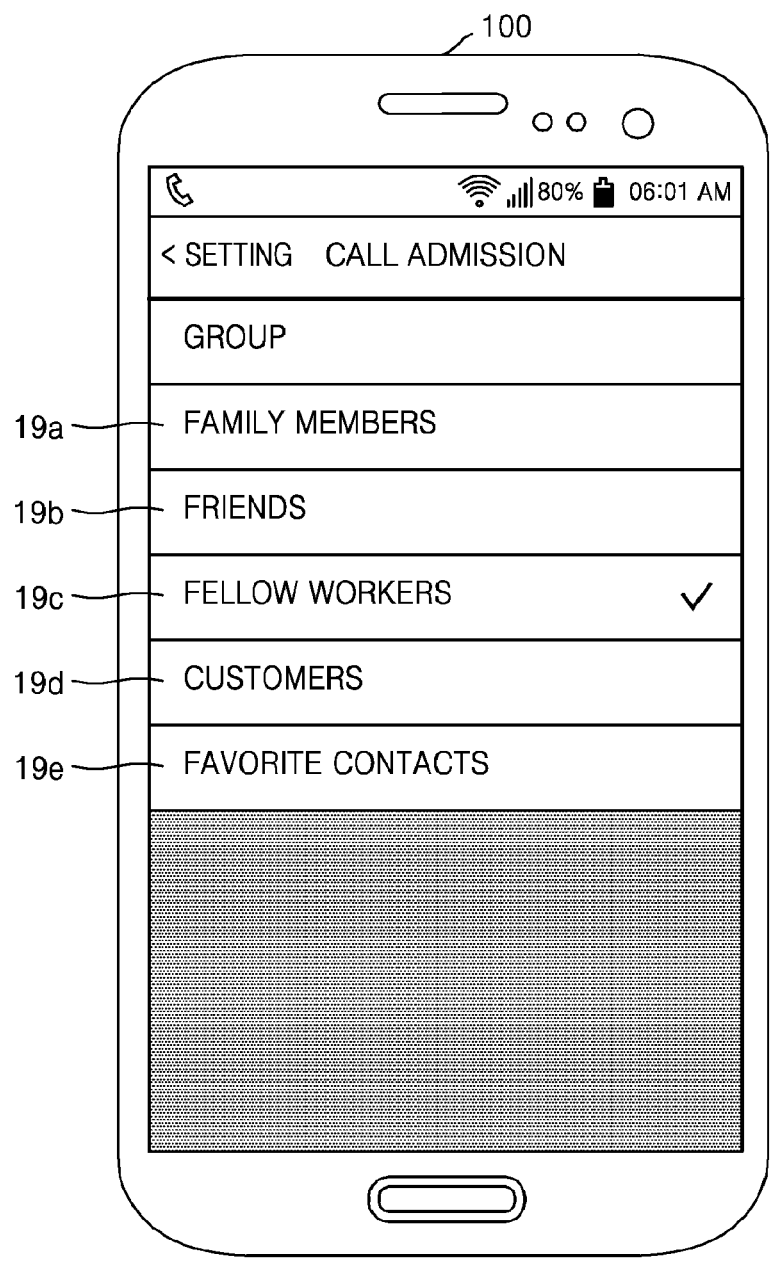

Referring to FIG. 7F, the first user USER1 may set call admission with respect to each of groups stored in contact information stored in the first device 100. For example, the first user USER1 may set call admission with respect to family members 19a, friends 19b, fellow workers 19c, customers 19d, and favorite contacts 19e. Therefore, if a phone call or a message is received from a calling user included in a selected group, a response message may not be generated even in call rejection mode.

Figure 8A:
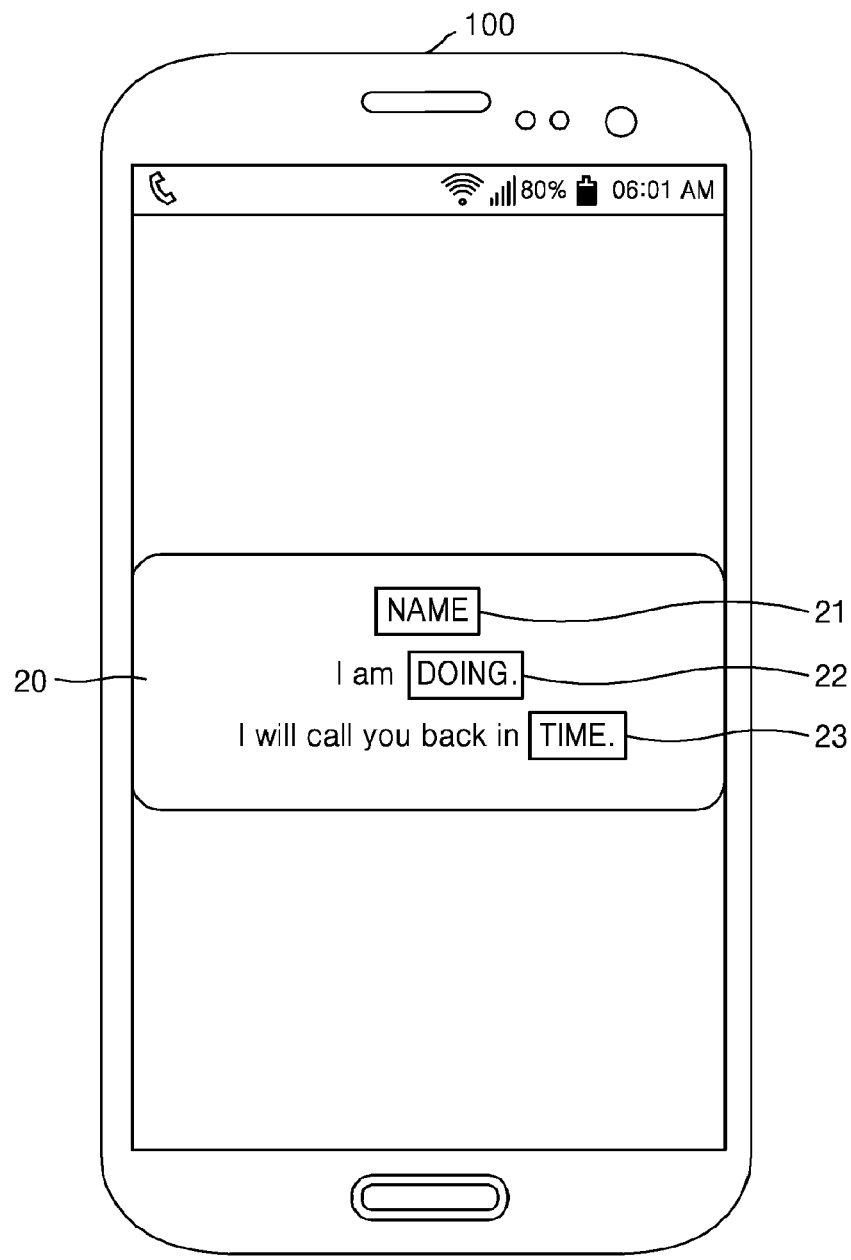
FIGS. 8A and 8B are diagrams illustrating examples of response messages according to an exemplary embodiment.
Figure 8B:
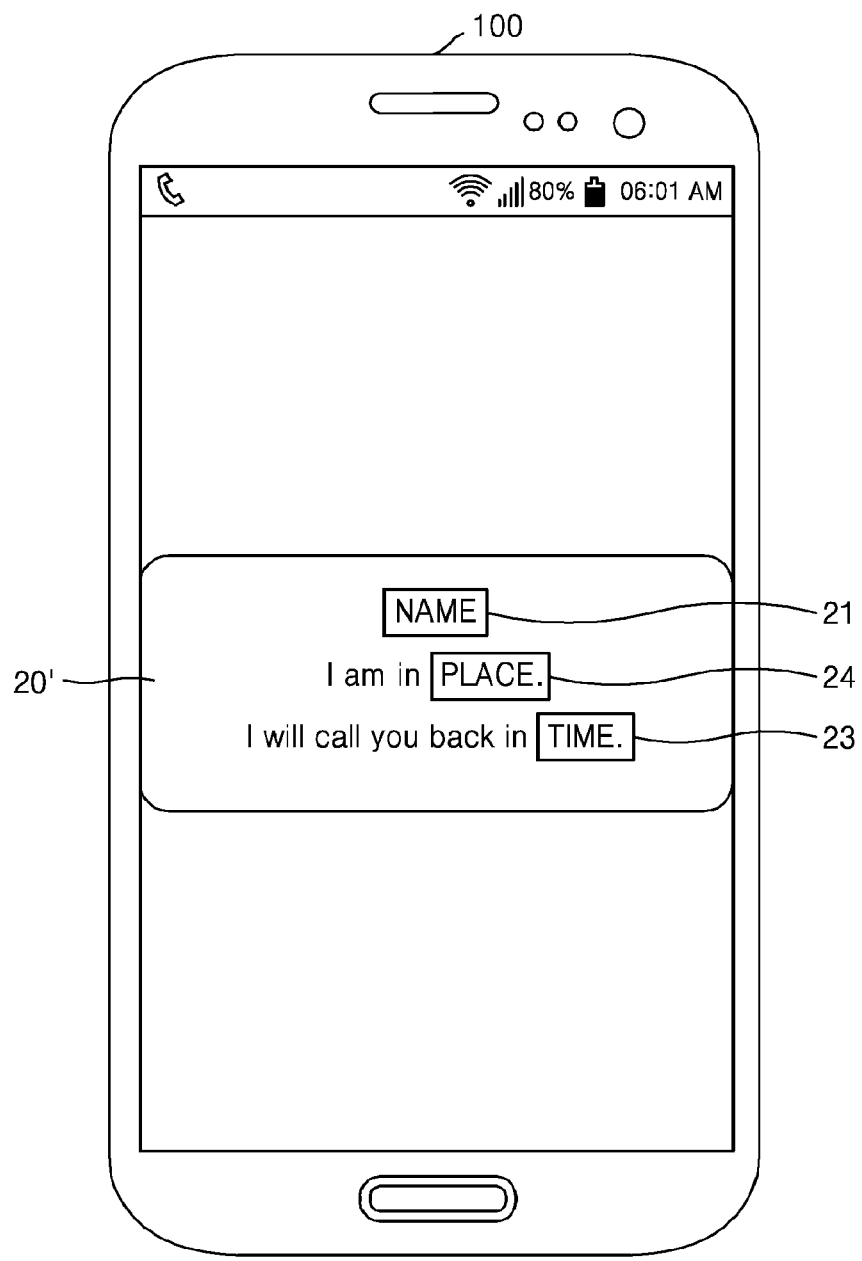

FIGS. 8A and 8B are diagrams illustrating examples of response messages according to an exemplary embodiment.

Referring to FIG. 8A, a response message 20 may include name information 21, activity information 22, and time information 23. However, exemplary embodiments are not limited thereto. According to another exemplary embodiment, the response message 20 may include the activity information 22 and the time information 23 only. According to another exemplary embodiment, the response message 20 may include the time information 23 only.

Referring to FIG. 8B, the response message 20' is a modified embodiment of the response message 20 shown in FIG. 8A, in which the response message 20' may include the name information 21, location information 24, and the time information 23. However, exemplary embodiments are not limited thereto. According to another exemplary embodiment, the response message 20' may include the location information 24 and the time information 23 only. Meanwhile, the response message 20' may include route information instead of the location information 24.

FIG. 9 is a table illustrating examples of information included in a response message according to an exemplary embodiment.

Referring to FIG. 9, a response message may include a name of a calling party, a current situation, and an estimated point of time when the user will reply to an incoming call, and information included in a response message may vary based on types of applications. The name of a calling user may correspond to the name information 21 of FIGS. 8A and 8B, the current situation may correspond to the activity information 22 and the location information 24 of FIGS. 8A and 8B, and the estimated point of time when the user will reply to an incoming call may correspond to the time information 23 of FIGS. 8A and 8B.

Hereinafter, configuration of a response message will be described in detail with reference to FIGS. 4, 8A, 8B, and 9.

The name information 21 may be generated based on a name of the second user USER2 of the second device 200. According to an exemplary embodiment, the name information 21 may be generated based on a name corresponding to a number of the second device 200 stored in contact information stored in the first device 100. For example, if a name corresponding to a number of the second device 200 stored in contact information stored in the first device 100 is "Chief Kim," the name information 21 may be generated as "Chief Kim." According to another exemplary embodiment, the name information 21 may be generated based on a nickname of the second user USER2 based on a history of exchanging messages between the first device 100 and the second device 200. According to another exemplary embodiment, if contact information stored in the first device 100 does not include a number of the second device 200, the response message 20 may not include the name information 21.

The activity information 22 may be generated based on a current situation of the first user USER1, which may be determined based on information regarding an application being executed on the first device 100. Here, a current situation of the first user USER1 may be automatically completed based on a type of surrounding environment and a current activity.

The time information 23 may be generated based on a future situation of the first user USER1 estimated based on information regarding an application being executed on the first device 100. Here, a future situation of the first user USER1 may be automatically completed based on an estimated time. In detail, the first device 100 may include an estimation module, and the estimation module may estimate a point of time when the first user USER1 will be available to reply to an incoming call.

Figure 10A:
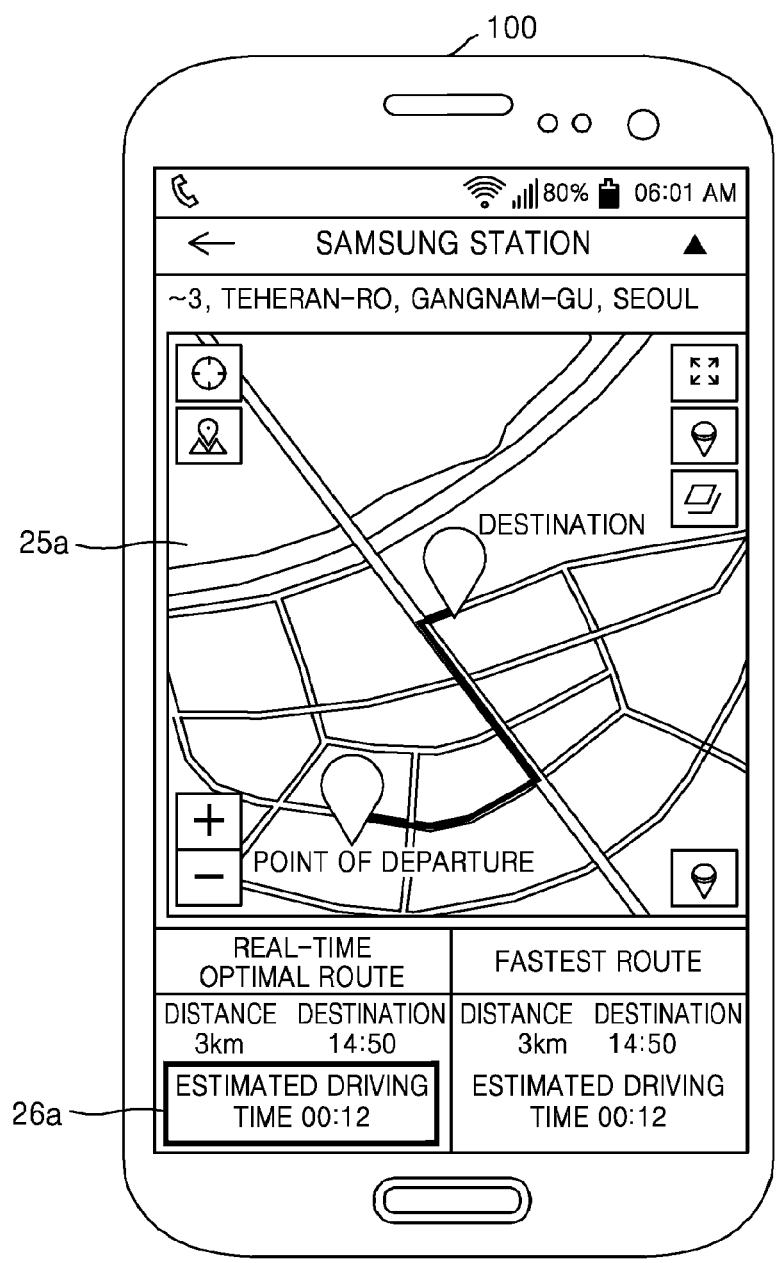
FIGS. 10A and 10B are diagrams illustrating an example operation for generating a response message based on information provided by a navigation application, according to an exemplary embodiment.
Figure 10B:
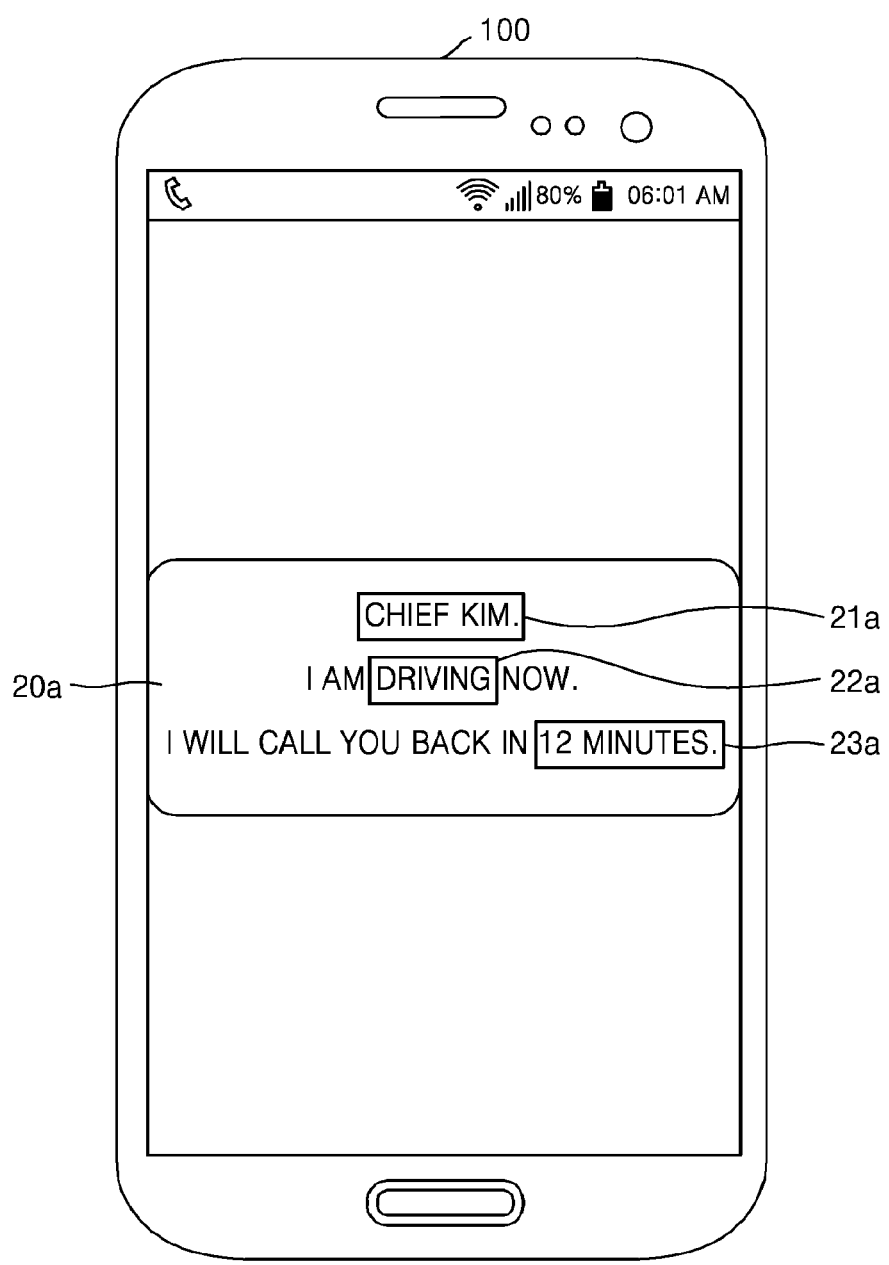

FIGS. 10A and 10B are diagrams illustrating an example operation for generating a response message 20a based on information provided by a navigation application 25a, according to an exemplary embodiment.

Referring to FIG. 10A, if the navigation application 25a is being executed on the first device 100, the first device 100 may determine a current situation and a future situation of the first user USER1 based on information provided by the navigation application 25a. In detail, the first device 100 may determine a current situation that the first user USER1 is driving based on execution information provided by the navigation application 25a. Furthermore, based on information regarding estimated driving time 26a provided by the navigation application 25a, the first device 100 may estimate a future situation that the first user USER1 will arrive at a destination in 12 minutes, for example.

According to an exemplary embodiment, an estimation module included in the first device 100 may estimate a time period that the first user USER1 stays at a current location based on current traffic conditions. According to another exemplary embodiment, an estimation module included in the first device 100 may provide an estimated time of arrival at a destination based on location information of the destination and current traffic conditions.

Referring to FIG. 10B, the first device 100 may generate name information 21a as "Chief Kim" based on contact information, may generate situation information 22a as "I am driving now" based on execution information provided by the navigation application 25a, and may generate time information 23a as "I will call you back in 12 minutes" based on the information regarding estimated driving time 26a provided by the navigation application 25a.

Figure 11A:
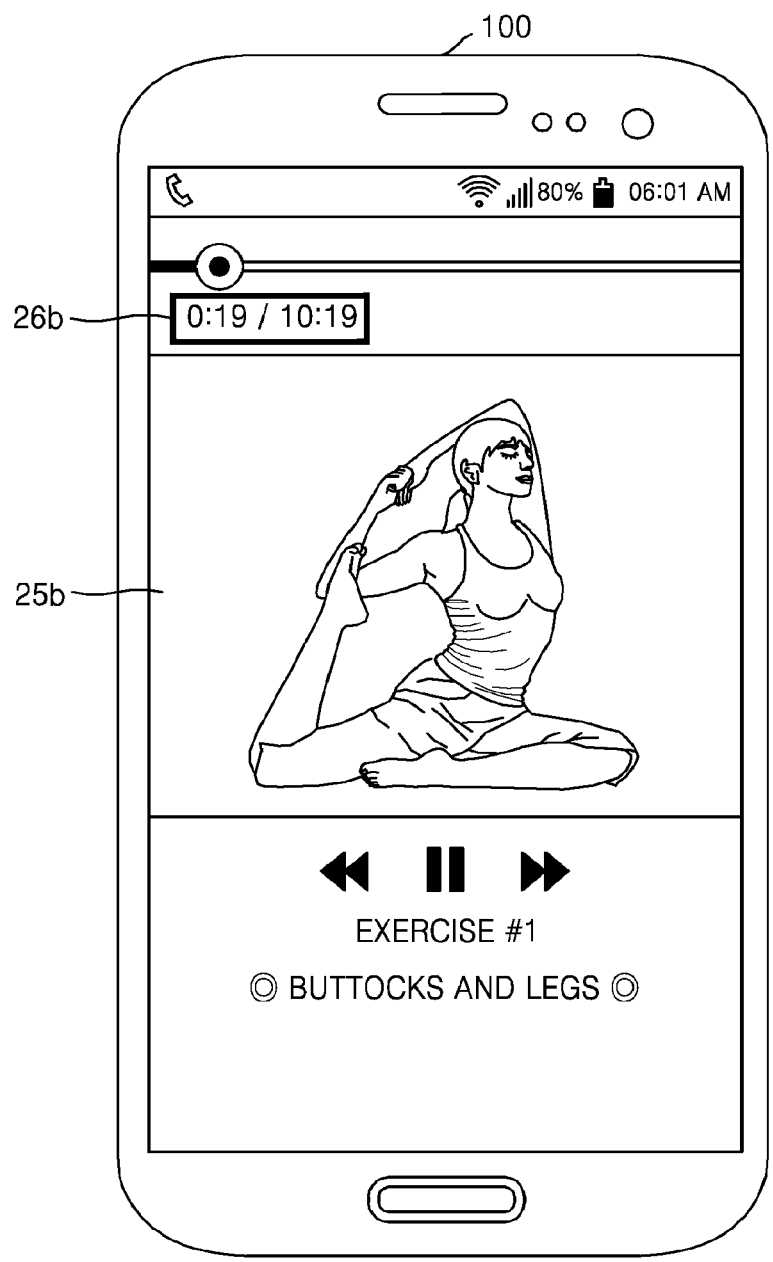
FIGS. 11A and 11B are diagrams illustrating an example operation for generating a response message based on information provided by a fitness application, according to an exemplary embodiment.
Figure 11B:
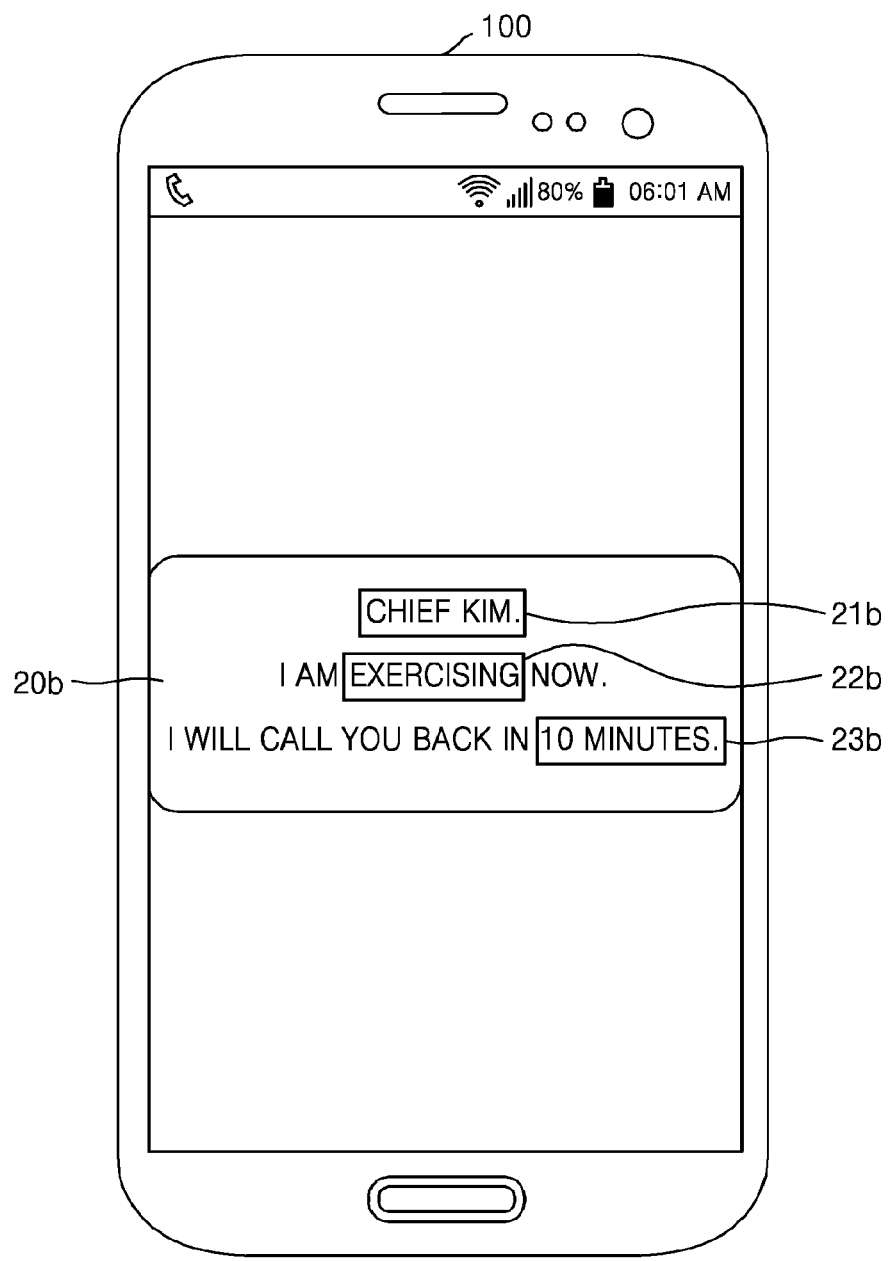

FIGS. 11A and 11B are diagrams illustrating an example operation for generating a response message 20b based on information provided by a fitness application 25b, according to an exemplary embodiment.

Referring to FIG. 11A, if the fitness application 25b is being executed on the first device 100, the first device 100 may determine a current situation and a future situation of the first user USER1 based on information provided by the fitness application 25b. In detail, the first device 100 may determine a current situation that the first user USER1 is exercising based on execution information provided by the fitness application 25b. Furthermore, based on information regarding estimated exercising time 26b provided by the fitness application 25b, the first device 100 may estimate a future situation that the first user USER1 will finish exercising, for example, in 10 minutes.

According to an exemplary embodiment, if the first user USER1 has set a target exercise time on the fitness application 25b, the first device 100 may estimate an exercise finish time based on the set target exercise time. According to another exemplary embodiment, if the first user USER1 has not set a target exercise time on the fitness application 25b, the first device 100 may estimate an exercise finish time based on an average exercise time of the first user USER1.

Referring to FIG. 11B, the first device 100 may generate name information 21b as "Chief Kim" based on contact information, may generate situation information 22b as "I am exercising now" based on execution information provided by the fitness application 25b, and may generate time information 23b as "I will call you back in 10 minutes" based on the information regarding estimated time 26b provided by the fitness application 25b.

Referring back to FIGS. 8B and 9, the location information 24 may be generated based on current situation of the first user USER1 that is determined based on information regarding an application being executed on the first device 100. Here, the current situation of the first user USER1 may be automatically completed based on a type of surrounding environment and a current location.

According to an exemplary embodiment, the location information 24 may be generated based on an activity of the first user USER1. In detail, if a current activity of the first user USER1 is maintained for an activity determination time interval, the current activity is determined as the activity of the first user USER1, and the location information 24 may be generated based on the determined activity. For example, if the first user USER1 continues to ride a bicycle for an activity determination time interval, an activity of the first user USER1 may be determined as bicycle riding, and the location information 24 may be generated based on a result of the determination.

In the case of generating the location information 24 based on an activity of the first user USER1, various parameters may be considered. For example, a parameter "distance between MyPlaces" for comparing distance between MyPlaces when shorter MyPlaces are considered as same and merged, a parameter "location accuracy" for indicating the minimum accuracy of a location log that is considered to be valid, a parameter "minimum hit count" indicating the minimum my location hit count to be displayed on a map, a parameter "average location" for using an average of location logs as my location, a parameter "activity pattern init time" or "activity pattern time since driving" for indicating a duration of an activity to initiate an activity pattern, a parameter "driving confidence" for indicating percentage reliability of a driving based on an activity recognition for stopping an activity pattern, a parameter "activity pattern max walk time" for indicating the maximum activity time during which a user is walking, a parameter "activity pattern total time" for indicating a total time regarding an activity pattern after a current location is considered as my location, and a parameter "merge location logs" for merging location logs adjacent to one another to a single log and drawing a single marker corresponding thereto on a map may be considered.

Referring to FIGS. 8B and 10a, if the navigation application 25a is being executed on the first device 100, information indicating that the first user USER1 is currently driving may be obtained from the navigation application 25a. If the first user USER1 is currently "driving," the location information 24 may be generated as "I am in a car."

Referring to FIGS. 8B and 11A, for example, if the fitness application 25b is being executed on the first device 100, information indicating that the first user USER1 is currently exercising may be obtained from the fitness application 25b. If the first user USER1 is currently "swimming," the location information 24 may be generated as "I am at a swimming pool."

Referring back to FIGS. 8A and 9, according to another exemplary embodiment, the location information 24 may be generated based on a location of the first user USER1. In detail, if the first device 100 is moved for a distance smaller than a critical distance during an activity determination time interval, a current location may be determined as a location of the first user USER1 and the location information 24 may be generated based on the determined location. For example, if the first device 100 is moved for a distance smaller than 500 m during an activity determination time interval, a current location of the first device 100 may be determined as a location of the first user USER1 and the location information 24 may be generated based on a result of the determination.

In case of generating the location information 24 based on a location of the first user USER1, various parameters may be considered. For example, a parameter "distance between my locations," a parameter "minimum hit count," a parameter "time spent in MyPlace," and a parameter "same close location when still" for continuing a location pattern for a change of location of up to 500 m unless a final location log is changed may be considered.

Referring to FIGS. 8B, 9, and 10A, if the navigation application 25a is being executed on the first device 100, information regarding a current location, a point of departure, a destination, and a route of the first user USER1 may be obtained from the navigation application 25a. If the current location of the first user USER1 is 'near the City Hall,' the location information 24 may be generated as "I am near the City Hall now." Furthermore, if the destination of the first user USER1 is 'home,' the location information 24 may be generated as "I am driving home, and I am near the City Hall now."

Examples of the response messages 20a and 20b that may be generated while the navigation application 25a and the fitness application 25b are being executed on the first device 100 are described above with respect to FIGS. 10A through 11B. Hereinafter, examples of response messages that may be generated while other applications are being executed on the first device 100 will be described in detail.

For example, if an e-learning application is being executed on the first device 100, information indicating that the first user USER1 is currently studying may be obtained from the e-learning application, and thus the activity information 22 may be generated as 'I am studying.' Furthermore, since information regarding playback time of corresponding study content may be obtained from the e-learning application, the time information 23 may be generated based on a finish time estimated based on the obtained information.

For another example, if an internet banking application is being executed on the first device 100, information indicating that the first user USER1 is currently doing internet banking may be obtained from the internet banking application, and thus the activity information 22 may be generated as 'I am doing banking.' Furthermore, since information regarding types of banking (e.g., account transfer, balance check) may be obtained from the internet banking application, the time information 23 may be generated based on a finish time estimated based on the obtained information.

For another example, if a movie player application is being executed on the first device 100, information indicating that the first user USER1 is currently watching a movie may be obtained from the movie player application, and thus the activity information 22 may be generated as 'I am watching a movie.' Furthermore, since information regarding playback time of corresponding movie content may be obtained from the movie player application, the time information 23 may be generated based on a finish time estimated based on the obtained information.

For another example, if a game application is being executed on the first device 100, information indicating that the first user USER1 is currently playing a game may be obtained from the game application, and thus the activity information 22 may be generated as 'I am playing a game.' Furthermore, since information regarding an average game play time of the first user USER1 may be obtained from the game application, the time information 23 may be generated based on a finish time estimated based on the obtained information For another example, if a e-book application is being executed on the first device 100, information indicating that the first user USER1 is currently reading a book may be obtained from the e-book application, and thus the activity information 22 may be generated as 'I am reading a book.' Furthermore, since information regarding an average reading time of the first user USER1 or a number of unread pages may be obtained from the e-book application, the time information 23 may be generated based on a finish time estimated based on the obtained information.

For another example, if a phone call application (e.g., a VoIP application) is being executed on the first device 100, information indicating that the first user USER1 is currently on another phone call may be obtained from the phone call application, and thus the activity information 22 may be generated as 'I am on the phone.' Furthermore, since information regarding an average calling time of the first user USER1 may be obtained from the phone call application, the time information 23 may be generated based on a finish time estimated based on the obtained information Although embodiments for generating the activity information 22 and the time information 23 based on information provided by an application being executed on the first device 100 are described above, exemplary embodiments are not limited thereto. According to another exemplary embodiment, the first device 100 may operate in conjunction with a wearable device (e.g., 300 of FIG. 1B or 300 of FIG. 2B) that the first user USER1 is wearing. In detail, the activity information 22 and the time information 23 may be generated based on information provided by an application being executed on a wearable device. Detailed descriptions thereof will be given below with reference to FIGS. 41 through 51 and 57 through 60.

According to another exemplary embodiment, the first device 100 may operate in conjunction with an electronic device located near the first user USER1 (e.g., a smart TV or a navigation device). In detail, the activity information 22 and the time information 23 may be generated based on information provided by an application being executed on an electronic device. Detailed descriptions thereof will be given below with reference to FIGS. 52 through 60.

Figure 12:
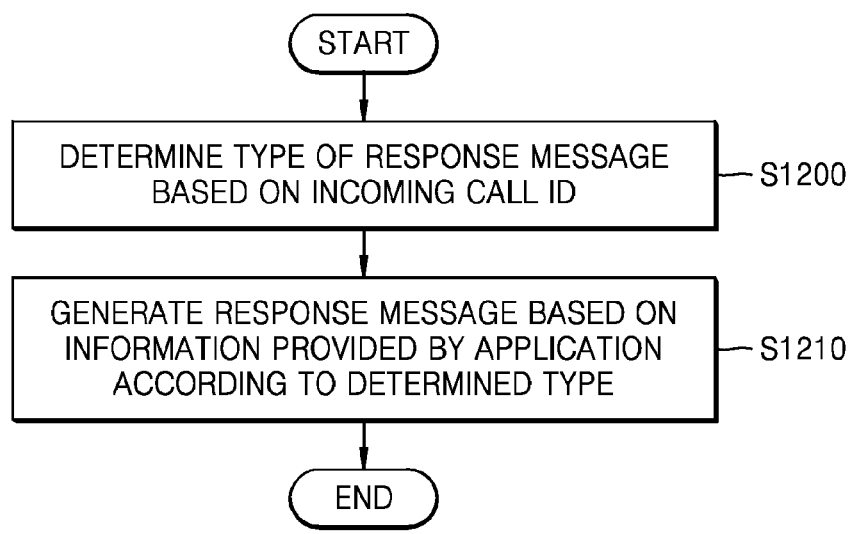
FIG. 12 is a flowchart illustrating an example operation for generating a response message according to an exemplary embodiment.

FIG. 12 is a flowchart illustrating an example operation for generating a response message according to an exemplary embodiment.

Referring to FIG. 12, an operation for generating a response message according to an exemplary embodiment may correspond to an example of the operation S640 of FIG. 6 and includes operations that are chronologically performed by the first device 100 of FIG. 1. In detail, an operation for generating a response message according to an exemplary embodiment corresponds to an operation for generating a response message when the first user USER1 has selected types of messages for respective groups as shown in FIGS. 7D and 7E before a phone call or a message is received from the second device 200.

In an operation S1200, types of response messages are determined with respect to incoming call IDs. In detail, information to be transmitted to calling users may be determined based on at least one of contact information, recent call history, recent message transmission and reception history, and setting information, or any other method.

According to an exemplary embodiment, the first device 100 may determine information to be transmitted to a calling user, e.g., the second user USER2, via a response message based on at least one of contact information (e.g., a phone book), recent call history, and recent message transmission and reception history stored in the first device 100. Here, the information to be transmitted may be information regarding a current situation or a future situation of the first user USER1.

In detail, if the second user USER2 is not included in contact information stored in the first device 100, the second user USER2 is not likely be in a close relationship with to the first user USER1. Furthermore, even if the second user USER2 is included in contact information stored in the first device 100, if the first user USER1 and the second user USER2 exchange phone calls or text messages with a frequency less than a critical frequency, the second user USER2 is not likely be in a close relationship with the first user USER1. In these cases, it may not be preferable to include details regarding a current situation of a future situation of the first user USER1 in a response message.

Meanwhile, if the second user USER2 is included in contact information stored in the first device 100 and the first user USER1 and the second user USER2 exchange phone calls or text messages with a frequency equal to or greater than a critical frequency, the second user USER2 may likely be in a close relationship with the first user USER1. Furthermore, if the second user USER2 is categorized as a favorite contact or a VIP in contact information stored in the first device 100, the second user USER2 may likely be in a close relationship with first user USER1. In such cases, it may be preferable to include details regarding a current situation and a future situation of the first user USER1 in a response message.

According to another exemplary embodiment, information to be transmitted to a calling user, e.g., the second user USER2, via a response message may be based on a setting information input by the first user USER1 in advance. For example, the first user USER1 may designate particular users to transmit a current situation or a future situation via a response message individually.

In an operation S1210, based on a determined type, a response message is generated based on information provided by an application. In detail, the first device 100 may generate a response message including only information determined in the operation S1200. Therefore, response messages may be categorized into various types.

FIG. 13 is a table illustrating various types of response messages according to an exemplary embodiment.

Referring to FIG. 13, a first type response message TYPE1 may include a current situation of a user. For example, if the first user USER1 is driving for a long time or is in a long conference, it may be difficult to estimate a point of time when the first user USER1 will be available to reply to an incoming call. In this case, the first type response message TYPE1 may be selected. In detail, the first device 100 may generate a first type response message TYPE1 including a current situation of the first user USER1, such as a location, a route, or a situation of the first user USER1. For example, a first type response message TYPE1 may be generated as "I am exercising now," "I am on my way to the company now," or "I am driving now."

A second type response message TYPE2 may include a current situation and a future situation of a user. For example, if the second user USER2 is a member of the family of first user USER1, the first user USER1 may select a second type response message TYPE2. In detail, the first device 100 may generate a second type response message TYPE2 including a current situation of the first user USER1, such as a location, a route, or a situation of the first user USER1 and a future situation including a point of time when the first user USER1 will be available to reply to an incoming call. For example, a second type response message TYPE2 may be generated as "I am driving now. I will call you in 1 hour," "I am exercising now. I will be available for a phone call in 30 minutes," or "I am watching a movie at a theater now. I will be available for a phone call in 2 hours."

A third type response message TYPE3 may include a future situation of a user. For example, if the second user USER2 is a fellow worker, the first user USER1 may not want to transmit information regarding private life of the first user USER1. In this case, the first user USER1 may select a third type response message TYPE3. In detail, the first device 100 may generate a third type response message TYPE3 including a future situation including a point of time when the first user USER1 will be available to reply to an incoming call. For example, a third type response message TYPE3 may be generated as "I will call you in 1 hour" or "I will be available for a phone call in 20 minutes. Is this an urgent business?"

A fourth type response message TYPE4 may not include a current situation and a future situation. For example, if the second user USER2 is not included in contact information stored in the first device 100 or the first user USER1 and the second user USER2 contact each other with a low frequency, the first user USER1 may select a fourth type response message TYPE4. For example, a fourth type response message TYPE4 may be generated as "I am not available for a phone call right now" or "I will call you back later."

Figure 14:
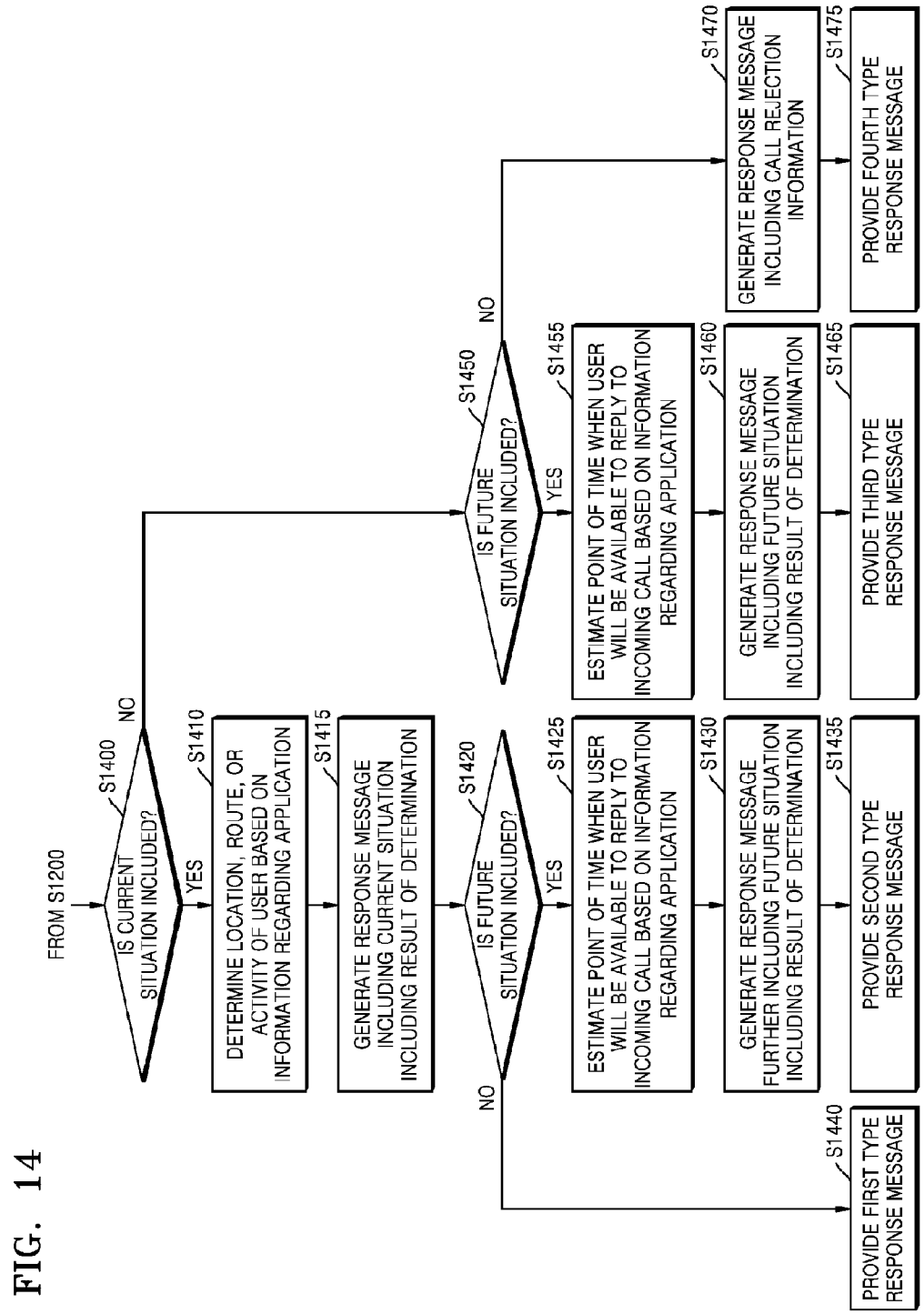
FIG. 14 is a diagram illustrating an example operation for generating various types of response messages according to an exemplary embodiment.

FIG. 14 is a diagram illustrating an example operation for generating various types of response messages as shown in FIG. 13.

Referring to FIG. 14, a method of generating a response message according to an exemplary embodiment may correspond to an embodiment of the operation S640 shown in FIG. 6 and includes operations that are chronologically performed by the first device 100 of FIG. 1. Furthermore, a method of generating a response message according to an exemplary embodiment may correspond to an embodiment of the operation S1210 shown in FIG. 12 and may be performed after the operation S1200.

In an operation S1400, it is determined whether determined information includes a current situation. If the determined information includes a current situation, an operation S1410 is performed. If not, an operation S1450 is performed.

In the operation S1410, at least one of a location, a route, and an activity of a user is determined based in information regarding an application. In detail, while an incoming call is being received by the first device 100, the first device 100 may determine at least one of a location, a route, and an activity of a user based in information regarding an application.

According to an exemplary embodiment, the application may be a navigation application or a map application, and information regarding the application may be a point of departure, a destination input to the navigation application, or a current location. According to another exemplary embodiment, the application may be a scheduler application, and information regarding the application may be type of a current schedule or location of the current schedule input to the scheduler application. According to another exemplary embodiment, the application may be a fitness application, and information regarding the application may be type of a current exercise or location of the current exercise input to the fitness application.

In an operation S1415, a response message including a current situation obtained as a result of the determination is generated. In detail, the first device 100 may generate a response message including a current location, a current schedule, a current exercise, or a current situation of the first user USER1.

In an operation 1420, it is determined whether determined information includes a future situation. If the determined information includes a future situation, an operation S1425 is performed. If not, an operation S1440 is performed. In the operation S1440, a first type response message TYPE1 is provided. In detail, the first device 100 may provide a first type response message TYPE1 including a current situation of the first user USER1.

In the operation S1425, a point of time when the first user USER1 will be available to reply to an incoming call is estimated based on information regarding an application. In detail, the first device 100 may estimate a point of time when the first user USER1 will be available to reply to an incoming call based on information regarding an application that is being executed while the first device 100 is receiving an incoming call.

According to an exemplary embodiment, the application may be a navigation application or a map application, and information regarding the application may be a destination input to the navigation application, a current location, a distance to the destination, an estimated driving time to the destination, or a current traffic condition. According to another exemplary embodiment, the application may be a scheduler application, and information regarding the application may be a start time of a current schedule or an end time of the current schedule input to the scheduler application. According to another exemplary embodiment, the application may be a fitness application, and information regarding the application may be a start time of a current exercise or an end time of the current exercise input to the fitness application.

In an operation S1430, a response message further including a future situation including a result of estimation is generated. In detail, the first device 100 may generate a response message which includes a current situation of the first user USER1 and a future situation of the first user USER1, such as a point of time when the first user USER1 will be available to reply to an incoming call. In an operation S1435, a second type response message TYPE2 is provided. In detail, the first device 100 may provide a second type response message TYPE2 including a current situation and a future situation of the first user USER1.

In an operation S1450, it is determined whether determined information includes a future situation. If the determined information includes a future situation, an operation S1455 is performed. If not, an operation S1470 is performed.

In the operation S1455, a point of time when the first user USER1 will be available to reply to an incoming call is estimated based on information regarding an application. The operation S1455 may be substantially similar to the operation S1425. In an operation S1460, a response message including a future situation including a result of estimation is generated. In an operation S1465, a third type response message TYPE3 is provided. In detail, the first device 100 may provide a third type response message TYPE3 including a future situation of the first user USER1.

In the operation S1470, a response message including a call rejection message is generated. In other words, the first device 100 may generate a response message in the form of a general response message without a current situation and a future situation of the first user USER1. In an operation S1475, a fourth type response message TYPE4 is provided. In detail, the first device 100 may provide a fourth type response message TYPE4 that does not include a current situation and a future situation of the first user USER1.

Figure 15:
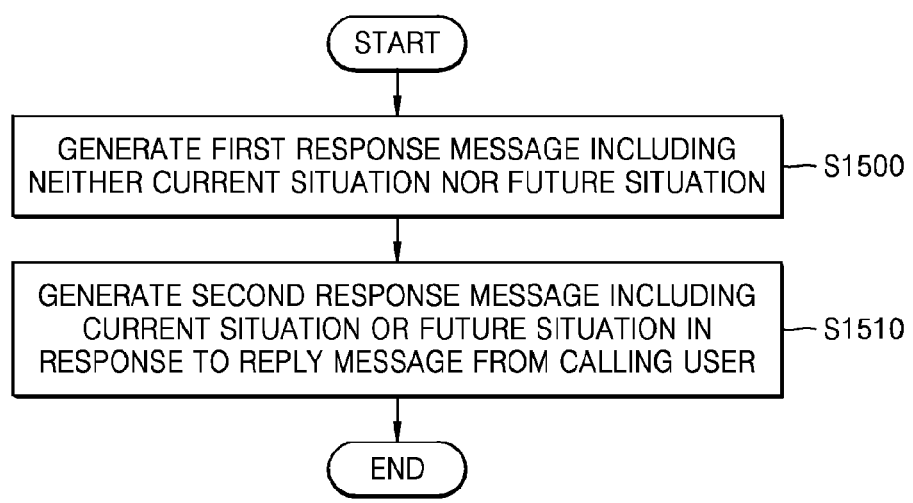
FIG. 15 is a flowchart illustrating another example operation for generating a response message according to an exemplary embodiment.

FIG. 15 is a flowchart illustrating another example operation for generating a response message according to an exemplary embodiment.

Referring to FIG. 15, a method of generating a response message according to an exemplary embodiment may correspond to an embodiment of the operation S640 shown in FIG. 6 and includes operations that are chronologically performed by the first device 100 of FIG. 1. In detail, the operation of generating a response message according to an exemplary embodiment corresponds to an operation for generating a response message in a case in which the first user USER1 has selected the Q & A type 18d function as shown in FIG. 7E before a phone call or a message is received from the second device 200.

In an operation S1500, a first response message including neither a current situation nor a future situation is generated. In detail, a first response message initially transmitted to the second user USER2 may be generated to include information indicating that the first user USER1 is unable to respond to an incoming call from the second user USER2. Here, the first response message may correspond to a fourth type response message TYPE4 as described above with reference to FIG. 13. For example, the first response message may be generated as "I am not available for a phone call right now." In this case, it is not necessary for the first user USER1 to perform a separate selection for generating the first response message, and it is not necessary for the first device 100 to receive information from other applications and process the information for generating the first response message.

In an operation S1510, a second response message including at least one of a current situation and a future situation is generated in response to a reply message from a caller user. For example, the first device 100 may receive a reply message "Where are you now?" from the second user USER2. Here, the first device 100 may generate a second response message including a current situation regarding a current location (e.g., "I am near the City Hall now").

The operation S1510 may be repeatedly performed in response to reply messages from a calling user. For example, the first device 100 may further receive a reply message "When will you be available for a phone call?" from the second user USER2. Here, the first device 100 may further generate a second response message including a future situation regarding point of time when the first user USER1 will be available for a phone call (e.g., "I will call you in 1 hour").

Figure 16:
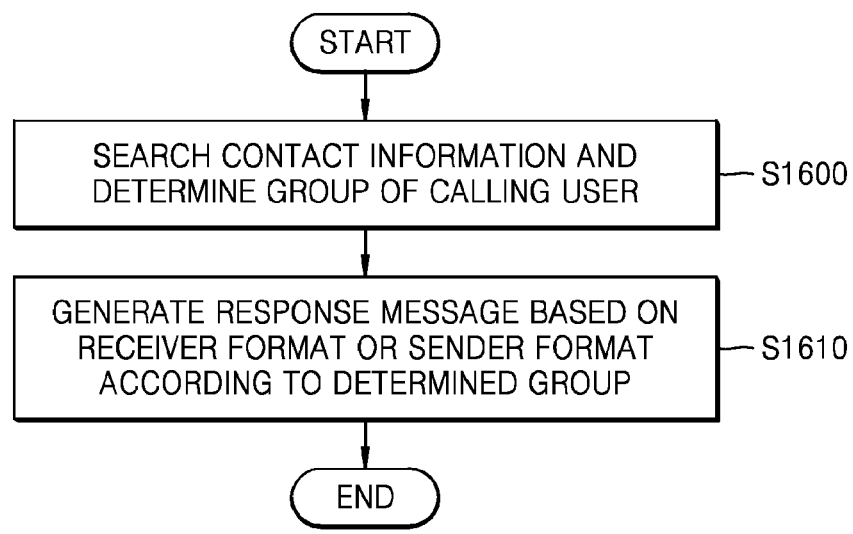
FIG. 16 is a flowchart illustrating another example operation for generating a response message according to an exemplary embodiment.

FIG. 16 is a flowchart illustrating another example operation for generating a response message according to an exemplary embodiment.

Referring to FIG. 16, an operation for generating a response message according to an exemplary embodiment may correspond to an embodiment of the operation S640 shown in FIG. 6 and includes operations that are chronologically performed by the first device 100 of FIG. 1.

In an operation S1600, contact information is searched and a group including a calling user is determined. Here, the contact information may be a phone book stored in the first device 100, and the phone book may be divided into a plurality of groups. The plurality of groups may include fellow workers, friends, family members, etc. Generally, it is necessary to transmit polite and formal messages to people in the fellow workers group. On the other hand, messages in an informal and casual manner may be transmitted to people in the friends group or the family members group.

In an operation S1610, a response message is generated based on at least one of a receiver format and a sender format according to a determined group.

FIG. 17 is a table illustrating sender formats and receiver formats according to groups, according to an exemplary embodiment.

Referring to FIG. 17, a first group may be a fellow workers group, as an example, whereas a second group may be a friends group or a family members group, as an example. The first group and the second group may be set by a user in advance.

In a case of transmitting a message to the first group, a receiver format may be 'Mr.' or 'Ms.,' for example, whereas a sender format may be 'Yours sincerely,' for example. For example, if the name of the second user USER2 is stored in a phone book stored in the first device 100 as 'Mark Brown,' a response message may be generated to include a phrase "Mr. Brown."

In a case of transmitting a to the first group, a receiver format may be a first name, for example, whereas a sender format may be 'regards,' for example. For example, if the name of the second user USER2 is stored in a phone book stored in the first device 100 as 'Mark Brown,' a response message may be generated to include the first name "Mark."

Figure 18A:
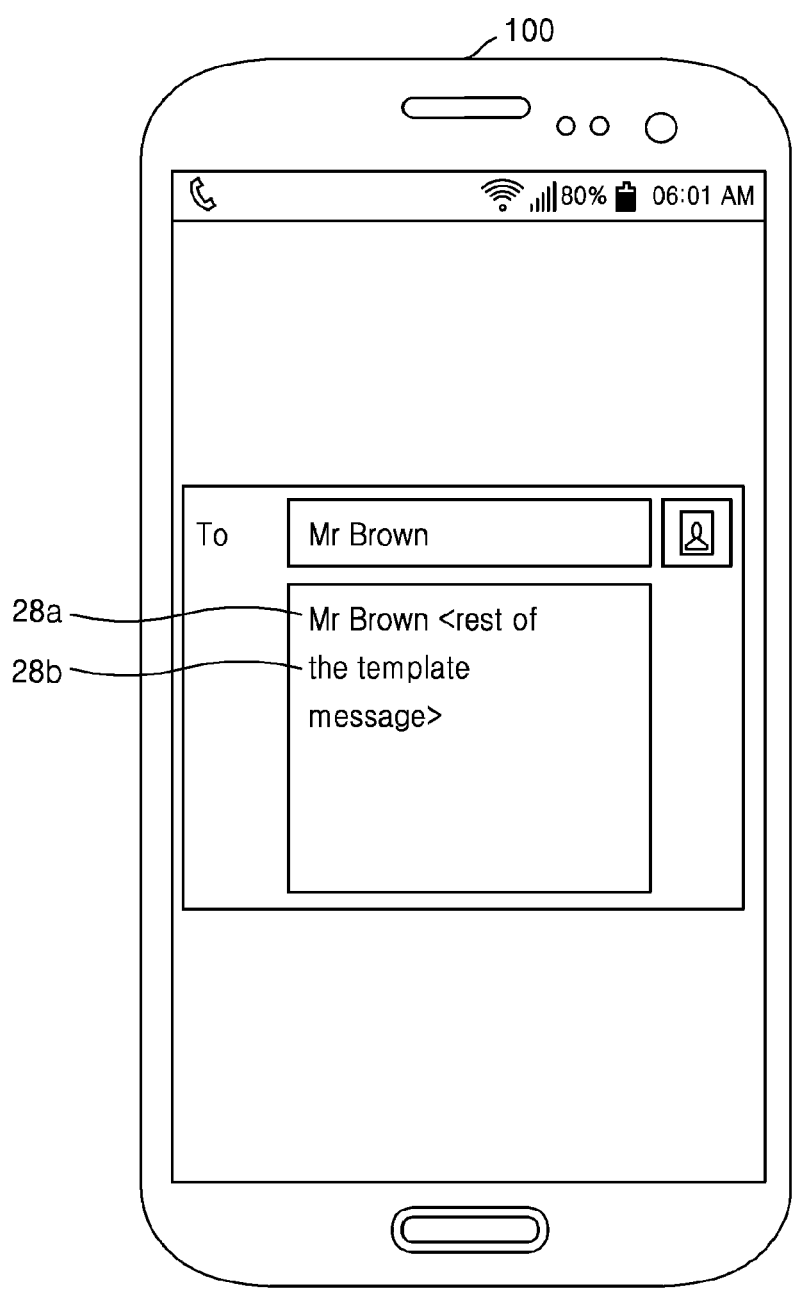
FIGS. 18A and 18B are diagrams illustrating examples of response messages including receiver formats corresponding to a first group.
Figure 18B:
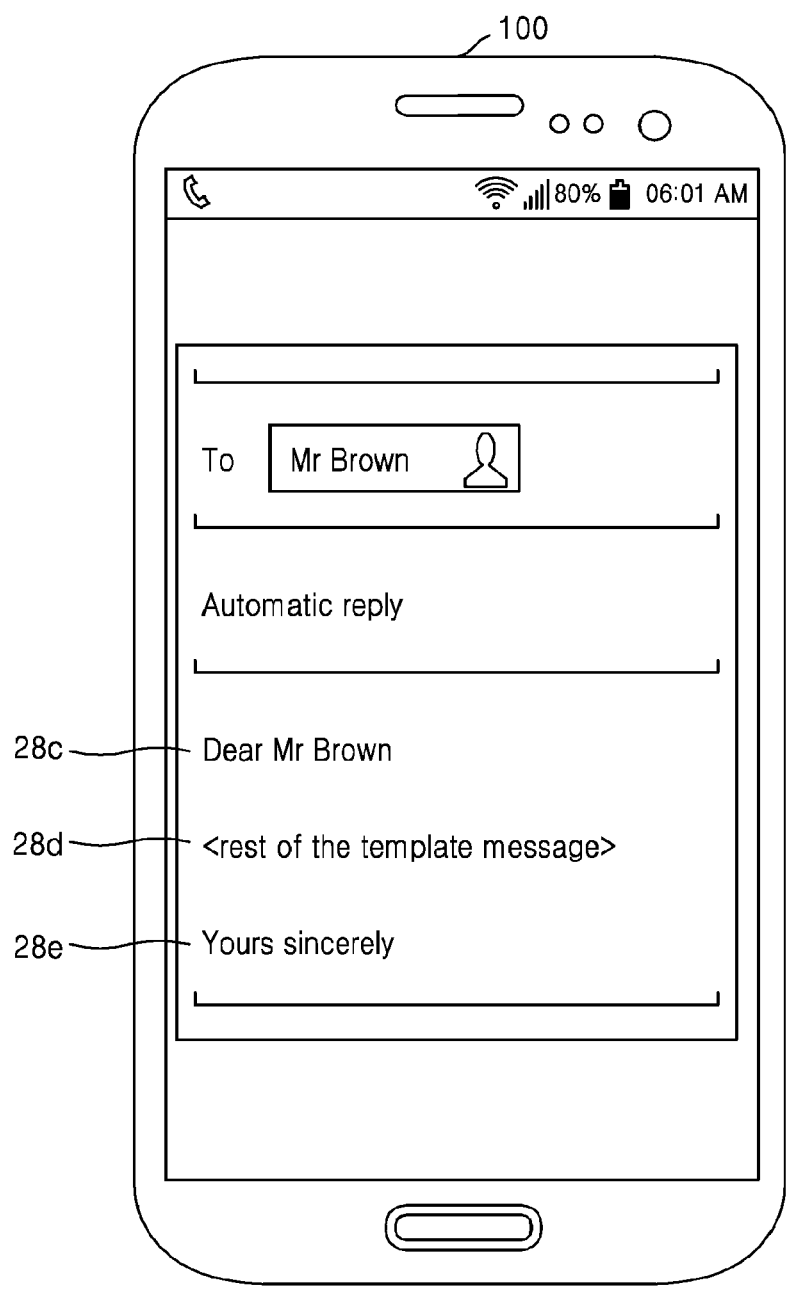

FIGS. 18A and 18B are diagrams illustrating examples of response messages including receiver formats corresponding to the first group of FIG. 17.

FIG. 18A shows an example of transmitting a response message to the second user USER2 via a text message if it is determined that the second user USER2 is in the first group. Here, a receiver 28a may be generated as 'Mr. Brown,' and a text 28b may be automatically generated to include a current situation or a future situation determined or estimated by the first device 100.

FIG. 18B shows an example of transmitting a response message to the second user USER2 via an e-mail if it is determined that the second user USER2 is in the first group. Here, a receiver 28c may be generated as 'Dear Mr. Brown,' a sender 28e may be generated as 'Yours sincerely,' and a text 28d may be automatically generated to include a current situation or a future situation of the first user USER1 determined or estimated by the first device 100.

Figure 19A:
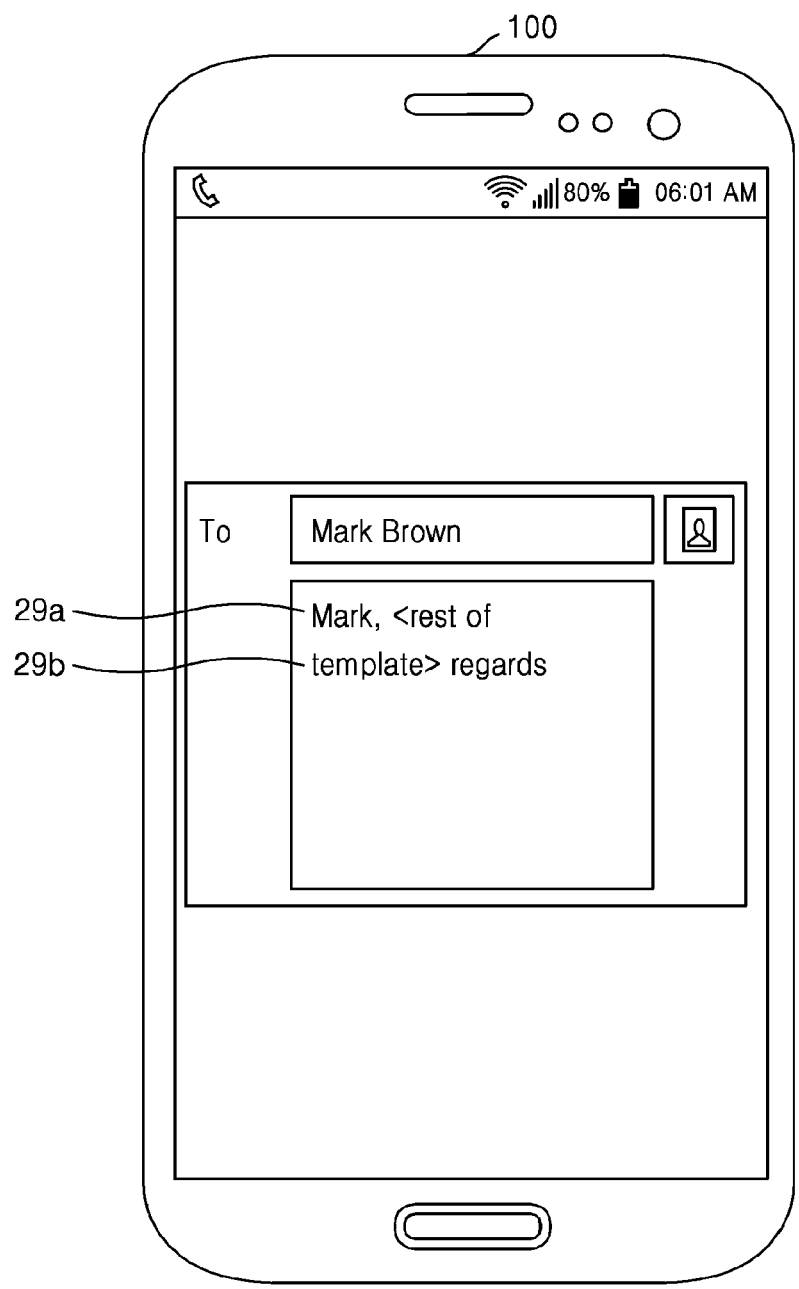
FIGS. 19A and 19B are diagrams illustrating examples of response messages including receiver formats corresponding to a second group.
Figure 19B:
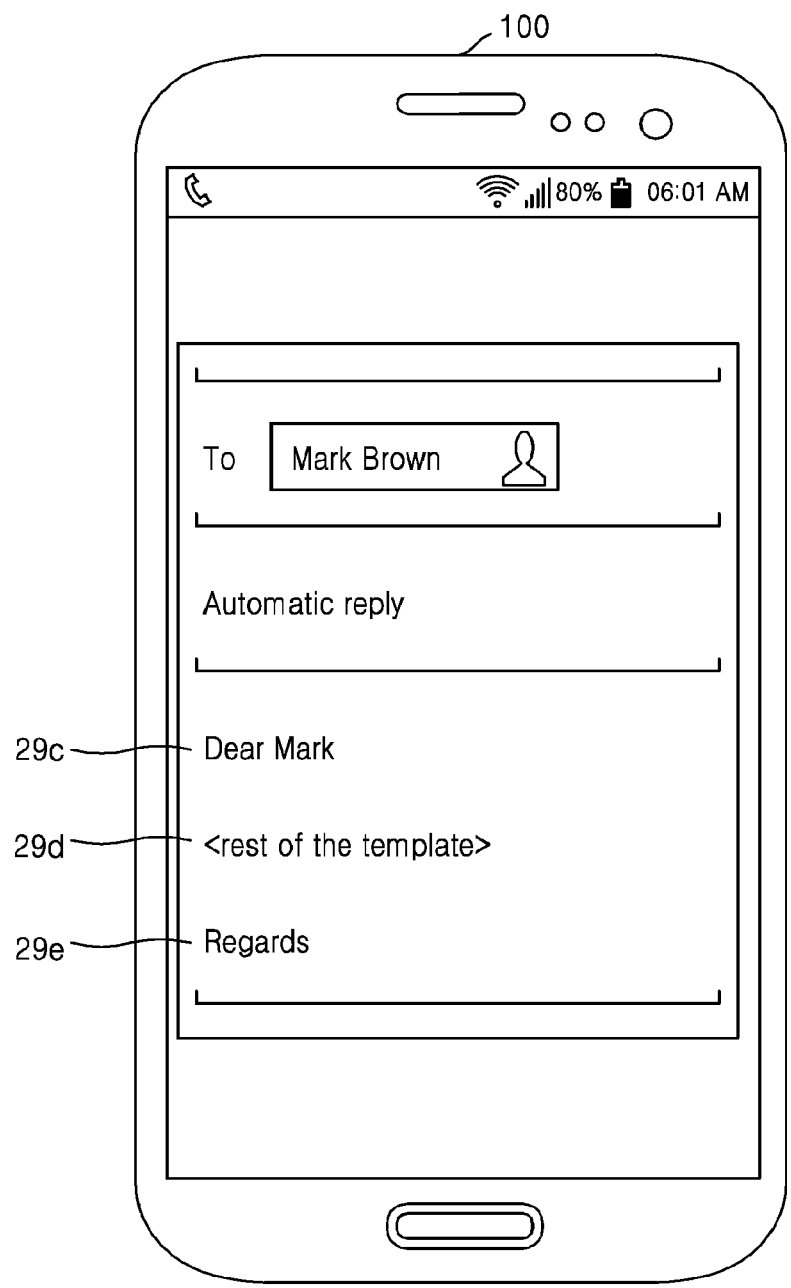

FIGS. 19A and 19B are diagrams illustrating examples of response messages including receiver formats corresponding to the second group of FIG. 17.

FIG. 19A shows an example of transmitting a response message to the second user USER2 via a text message if it is determined that the second user USER2 is in the second group. Here, a receiver 29a may be generated as 'Mark,' and a text 29b may be automatically generated to include a current situation or a future situation determined or estimated by the first device 100.

FIG. 19B shows an example of transmitting a response message to the second user USER2 via an e-mail if it is determined that the second user USER2 is in the second group. Here, a receiver 29c may be generated as 'Dear Mark,' a sender 29e may be generated as 'regards,' and a text 29d may be automatically generated to include a current situation or a future situation of the first user USER1 determined or estimated by the first device 100.

Figure 20:
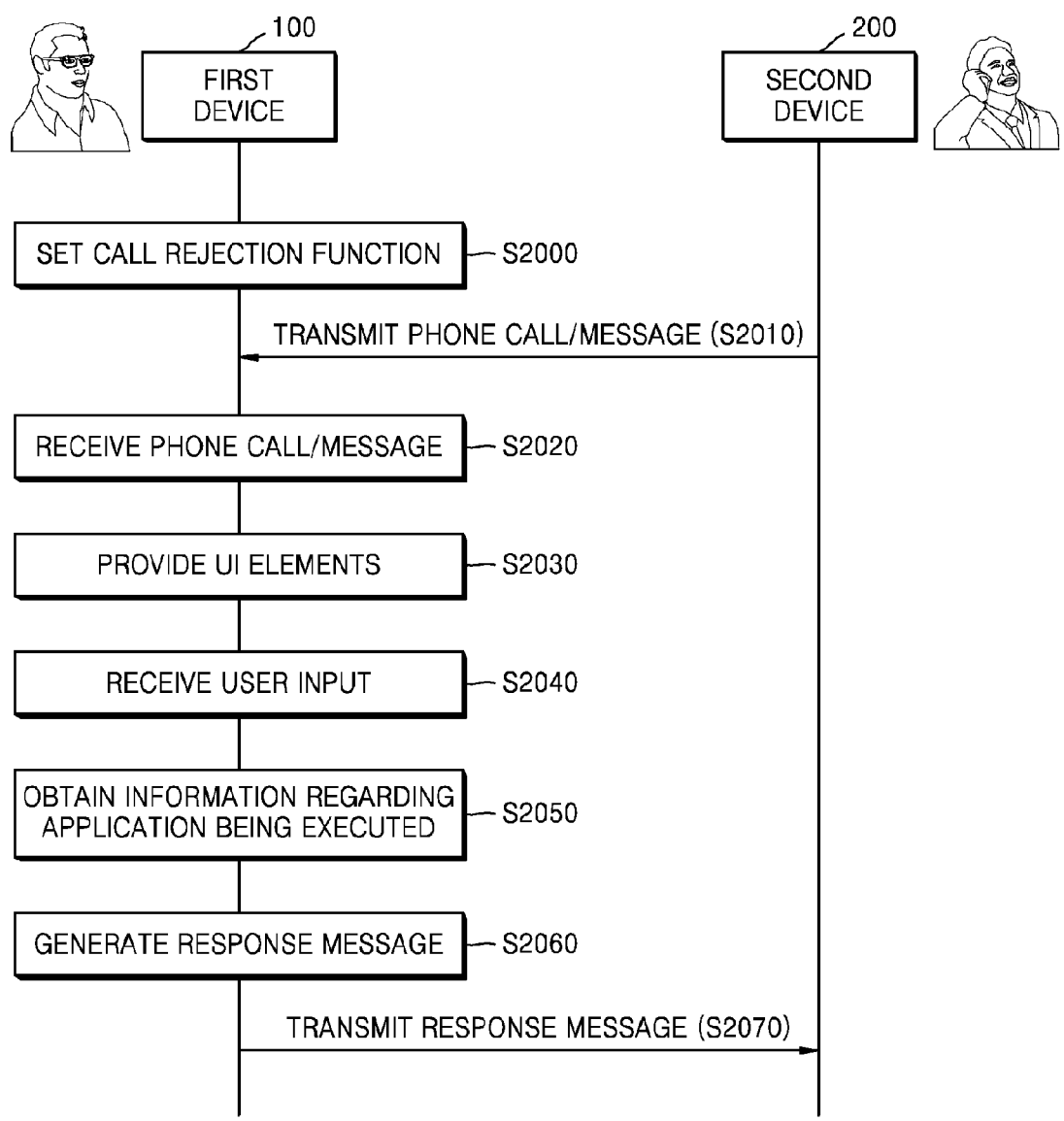
FIG. 20 is a flowchart illustrating examples of operations of first and second devices according to a method of providing a response message according to another exemplary embodiment.

FIG. 20 is a flowchart illustrating examples of operations of the first and second devices 100 and 200 according to a method of providing a response message according to another exemplary embodiment.

Referring to FIG. 20, the method of providing a response message is a modified embodiment of the method of providing a response message of FIG. 6 and includes operations that are chronologically performed by the first and second devices 100 and 200. Descriptions given above with respect to the first and second devices 100 and 200 shown in FIG. 4 may also be applied to the method of providing a response message according to an exemplary embodiment.

In an operation S2000, the first device 100 sets up a call rejection function. Here, the call rejection function may be set up with respect to a particular application, a particular contact, or a particular time slot, in which the descriptions given above with reference to FIGS. 7A through 7F may also be applied here. In an operation S2010, the second device 200 transmits a phone call or a message to the first device 100. In an operation S2020, the first device 100 receives the phone call or the message from the second device 200.

In an operation S2030, when a phone call or a message is received from the second device 200, the first device 100 provides a UI element corresponding to the received phone call or the received message. For example, the first device 100 may display a UI element corresponding to a phone call or a message on a display screen of the first device 100. As another example, the first device 100 may output a UI element corresponding to a phone call or a message via a speaker of the first device 100.

Here, the UI element may provide options including accept/answer, reject/decline, or transmit a response message with respect to a received phone call. Furthermore, the UI element may provide options including reply or transmit a response message with respect to a received message. Here, a response message transmitting mode may be referred to as a Do Not Disturb mode, a Reject With Message mode, or a Reply With Message mode.

Here, a UI element may refer to an icon, a text, an image, a button, or a sound for the first device 100 to interact with the first user USER1. For example, a UI element may include an element that may be operated by a user and element for providing information to the user. Furthermore, a UI element may include a graphical user interface (GUI) element and a character user interface (CUI) element. However, exemplary embodiments are not limited thereto.

In an operation S2040, a user input for selecting to reject/decline or to transmit a response message with respect to a phone call or selecting to transmit a response message with respect to a message is received. According to an exemplary embodiment, the first user USER1 may select a UI element corresponding to transmission of a response message from among UI elements displayed on the display screen of the first device 100, and the first device 100 may receive a user input corresponding to the selection via a UI. According to another exemplary embodiment, the first user USER1 may select a UI element corresponding to reject/decline from among UI elements displayed on the display screen of the first device 100, and the first device 100 may receive a user input corresponding to the selection via a UI.

According to an exemplary embodiment, a user input may be detected by the first device 100 based on a gesture or a movement of a user. According to another exemplary embodiment, a user input may be received by the first device 100 based on a user's voice.

In an operation S2050, the first device 100 obtains information regarding an application being executed on the first device 100. In detail, the first device 100 may obtain information regarding an application being executed on the first device 100 in the operations 2020 through 2040. In an operation S2060, the first device 100 may generate a response message including at least one of a current situation and a future situation based on the obtained information regarding the application.

According to an exemplary embodiment, the first device 100 may generate a response message list including a plurality of response message candidates and display the generated response message list on the display screen of the first device 100. Next, by receiving a user input based on a selection of the first user USER1, the first device 100 may provide a selected response message. In other words, a plurality of response message candidates may be automatically generated by the first device 100, and one from among the plurality of response message candidates may be manually selected by the first user USER1.

According to another exemplary embodiment, the first device 100 may generate a plurality of response message candidates, select one from among the generated response message candidates based on a history of transmitting a response message in the first device 100, and provide the selected response message. In other words, a plurality of response message candidates may be automatically generated by the first device 100, and one from among the plurality of response message candidates may be automatically selected by the first device 100.

According to another exemplary embodiment, the first device 100 may generate one response message based on a history of transmitting a response message in the first device 100 and provide the generated response message. In other words, a response message may be automatically generated by the first device 100.

According to an exemplary embodiment, the operations S2050 and S2060 may be performed by a phone application or a message application installed on the first device 100. In other words, a phone application or a message application installed on the first device 100 may include a call rejection function. Therefore, when a phone call or a message is received by the first device 100, a call rejection function may be activated in a phone application or a message application. In detail, an application installed on the first device 100 may provide necessary information for generating a response message to a phone application or a message application via an API, and the phone application or the message application may generate a response message based on information received from the application.

According to another exemplary embodiment, the operations S2050 and S2060 may be performed by a dedicated response message providing application installed on the first device 100, and the response message providing application may be executed in conjunction with a phone application or a message application installed on the first device 100. Therefore, when a phone call or a message is received by the first device 100, the phone application or the message application may activate a call rejection function of a response message providing application. In detail, an application installed on the first device 100 may provide necessary information for generating a response message to a response message providing application via an API, and the response message providing application may generate a response message based on information received from the application.

According to another exemplary embodiment, the operations S2050 and S2060 may be performed by a platform of the first device 100. Therefore, when a phone call or a message is received by the first device 100, a platform may activate a call rejection function. In detail, an application installed on the first device 100 may provide necessary information for generating a response message to a platform, and the platform may generate a response message based on information received from the application.

According to another exemplary embodiment, the operations S2050 and S2060 may be performed by an external server. Therefore, when a phone call or a message is received by the first device 100, a server may activate a call rejection function. In detail, an application installed on the first device 100 may provide necessary information for generating a response message to a server, and the server may generate a response message based on information received from the application.

In an operation S2070, the first device 100 transmits a response message to the second device 200. Here, the response message may be transmitted via a SMS, a SNS, such as Facebook or Twitter, a chatting service, such as KakaoTalk or Line, or e-mail, etc.

Figure 21:
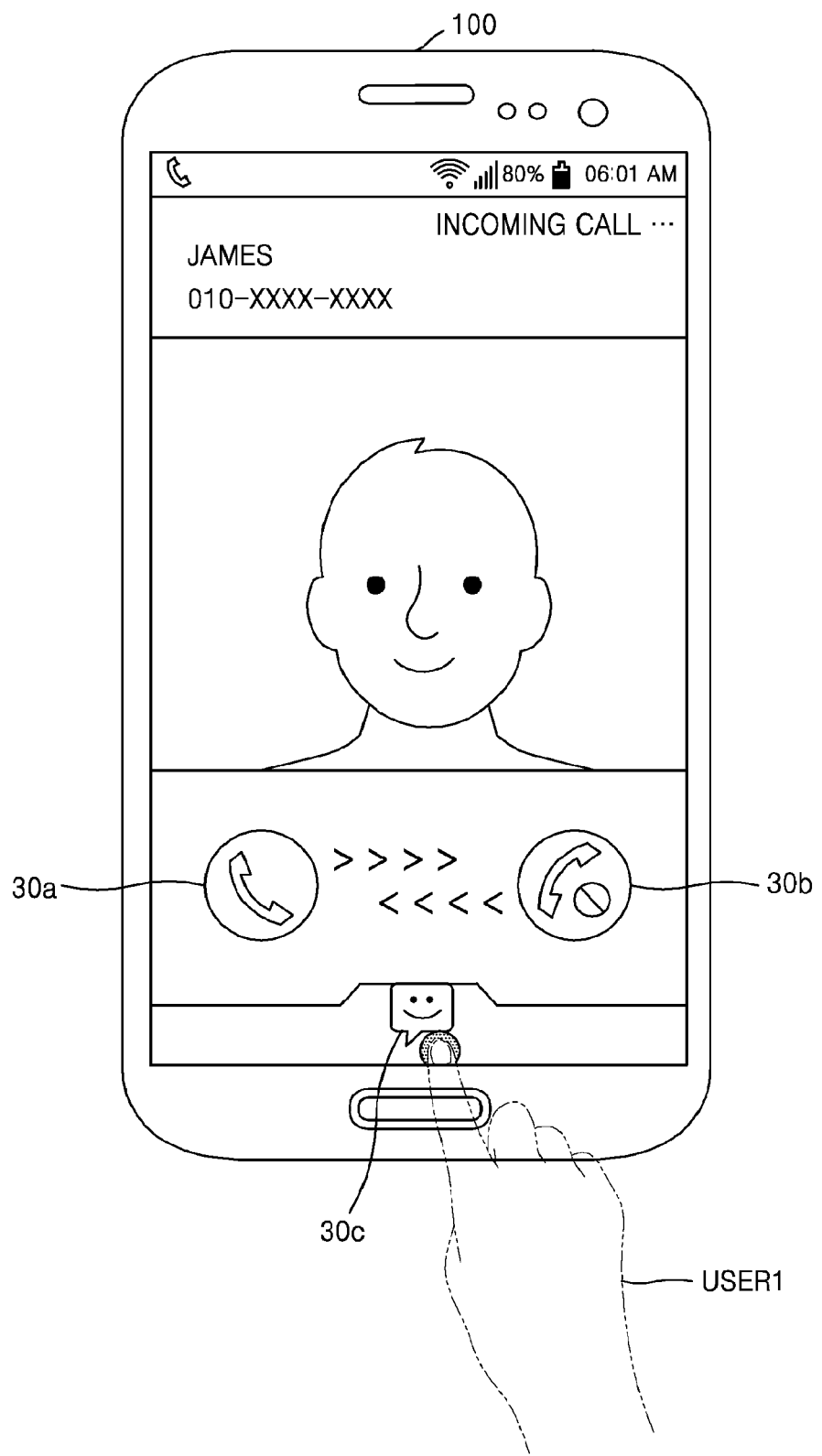
FIG. 21 is a diagram illustrating an example operation for receiving a user input according to an exemplary embodiment.

FIG. 21 is a diagram illustrating an example operation for receiving a user input of FIG. 20.

Referring to FIG. 21, when a phone call is received by the first device 100, a plurality of options 30a, 30b, and 30c corresponding to the received phone call may be displayed on a screen image via UI elements. According to an exemplary embodiment, a first option 30a may be an icon corresponding to acceptance with respect to a phone call, a second option 30b may be an icon corresponding to rejection with respect to a phone call, and a third option 30c may be an icon corresponding to transmitting a response message with respect to a phone call.

The first device 100 may detect a selecting gesture of the first user USER1 with respect to the plurality of options 30a, 30b, and 30c. According to an exemplary embodiment, the first user USER1 may select the third option 30c. According to another exemplary embodiment, the first user USER1 may select the second option 30b. Here, various selecting gestures may be employed according to exemplary embodiments. For example, selecting gestures may include tapping, double-tapping, dragging, swiping, flicking, and drag-and-drop, but are not limited thereto.

Here, the term "tapping" refers to a motion in which a user touches a display screen by using a finger or a stylus (e.g., an electronic pen) and lifts the finger or the stylus off the display screen without moving the same on the display screen. The term "double-tapping" refers to a motion in which a user touches a display screen twice by using a finger or a stylus.

The term "dragging" refers to a motion that a user touches a display screen by using a finger or a stylus and moving the finger or the stylus to another location on the display screen without lifting up the finger or the stylus. An object may be moved or a panning operation described below may be performed via a dragging operation. The term "flicking" refers to a motion that a user drags a finger or a stylus on a display screen at a speed equal to or greater than a critical speed (e.g., 100 pixels/s). Based on whether a moving speed of a finger or a stylus is equal to or greater than a critical speed (e.g., 100 pixels/s), a dragging (or panning) may be distinguished from a flicking.

The term "drag-and-drop" refers to a motion that a user drags an object on the display to a designated location on a display screen by using a finger or a stylus and lifts up the finger or the stylus. The term "swiping" refers to a motion that a user touches an object on a display screen by using a finger or a stylus and moving the finger or the stylus for a designated distance in a horizontal direction or a vertical direction. A movement in a diagonal direction may not be recognized as a swiping event.

Figure 22:
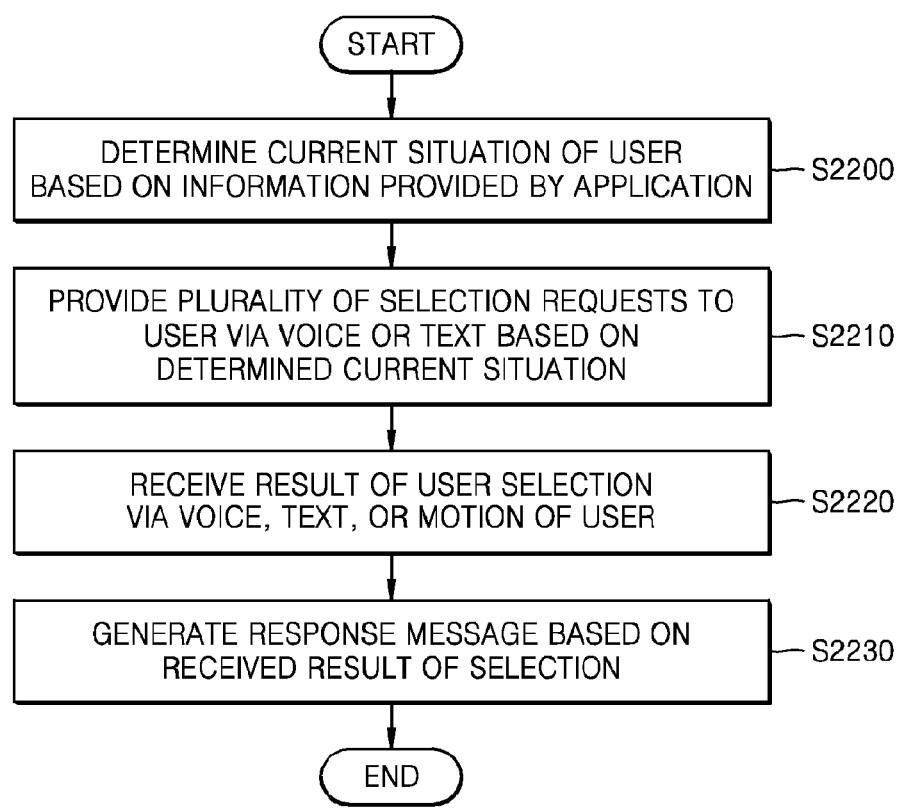
FIG. 22 is a flowchart illustrating an example operation for generating a response message according to an exemplary embodiment.

FIG. 22 is a flowchart illustrating an example operation for generating a response message according to an exemplary embodiment.

Referring to FIG. 22, an operation for generating a response message according to an exemplary embodiment may correspond to an example of the operation S2060 of FIG. 20 and includes operations that may be chronologically performed by the first device 100 of FIG. 1.

In an operation S2200, a current situation of a user is determined based on information provided by an application. For example, based on schedule information provided by a scheduler application, the first device 100 may determine that the first user USER1 is currently in conference. For another example, based on exercise information provided by a fitness application, the first device 100 may determine that the first user USER1 is currently exercising. For another example, based on destination information or current location information provided by a navigation application, the first device 100 may determine that the first user USER1 is currently driving.

In an operation S2210, a plurality of selection requests are provided to a user via voice or text based on the determined current situation. In detail, the first device 100 provides a plurality of selection requests, such as a request to select type of a message, a request to select content of the message, a request to select a medium for message communication, and a request to select a message form, to the first user USER1.

Figure 23A:
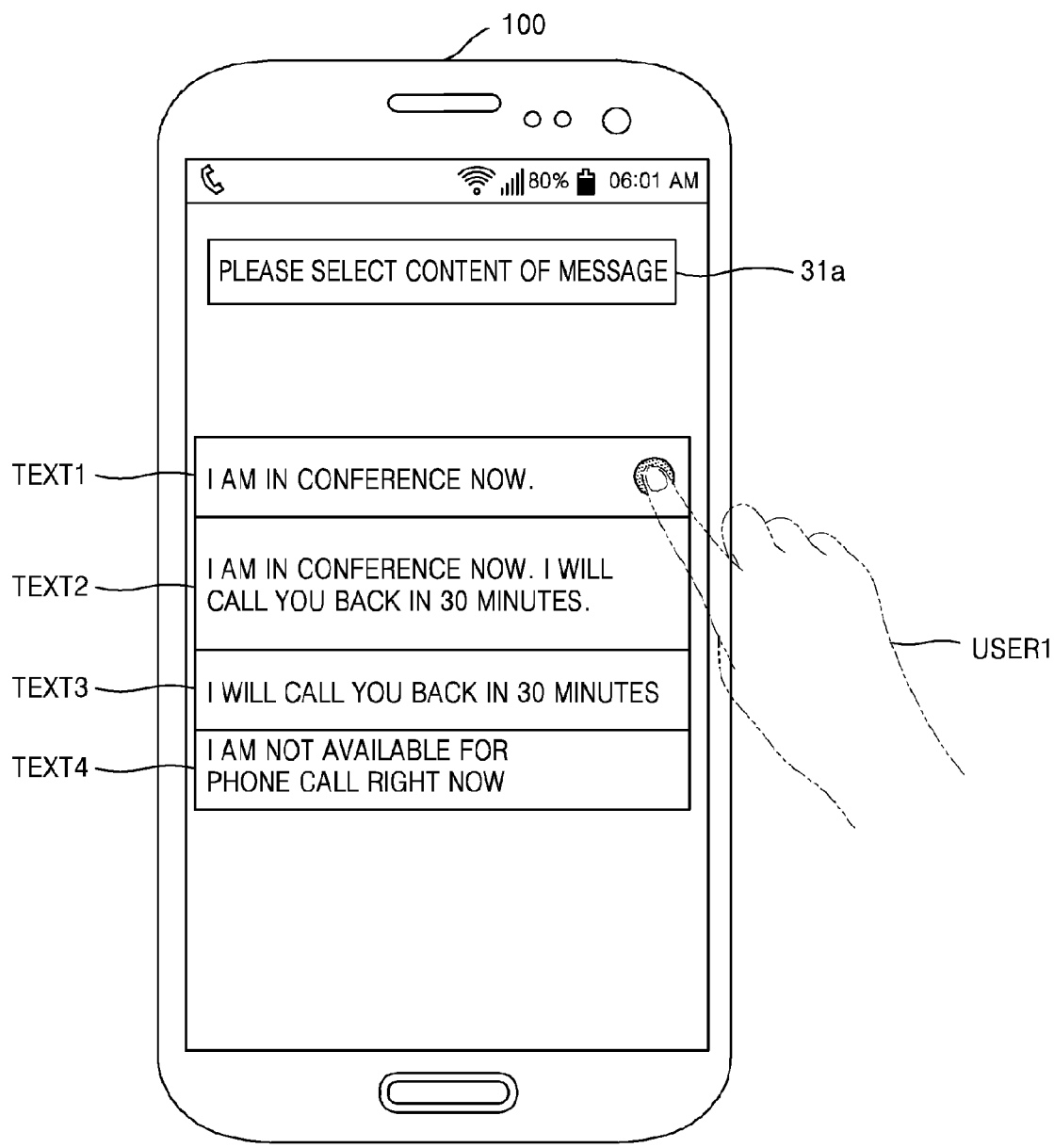
FIGS. 23A and 23B are diagrams illustrating example operations for providing a plurality of selection requests according to an exemplary embodiment.

FIG. 23A is a diagram illustrating an example operation for providing a plurality of selection requests of FIG. 22.

Referring to FIG. 23A, a selection request 31a may be provided as a text on the display screen of the first device 100. For example, if the first user USER1 is in conference, the first device 100 may provide a plurality of selection requests as texts on the display screen of the first device 100. Here, the term 'text' is used in a broad sense and may include icons and emoticons, etc.

According to an exemplary embodiment, the selection request 31a may be a request to select content of a message, may be displayed on the display screen of the first device 100 as "Please select content of message," and message contents to be selected may be displayed on the display screen of the first device 100 as a plurality of texts TEXT1, TEXT2, TEXT3, and TEXT4.

According to an exemplary embodiment, the plurality of texts TEXT1, TEXT2, TEXT3, and TEXT4 may be automatically generated based on information regarding an application being executed on the first device 100. Furthermore, a sequence of displaying the plurality of texts TEXT1, TEXT2, TEXT3, and TEXT4 on the display screen of the first device 100 may be automatically determined based on a selection history of a user, selection frequencies, contact information, etc. For example, a latest text used by the first user USER1 may be displayed at an uppermost location.

According to an exemplary embodiment, a first text TEXT1 may be a first type response message (e.g., "I am in conference now"), a second text TEXT2 may be a second type response message (e.g., "I am in conference now. I will call you in 30 minutes"), a third text TEXT3 may be a third type response message (e.g., "I will call you in 30 minutes"), and a fourth text TEXT4 may be a fourth type response message (e.g., "I am not available for a phone call right now").

Figure 23B:
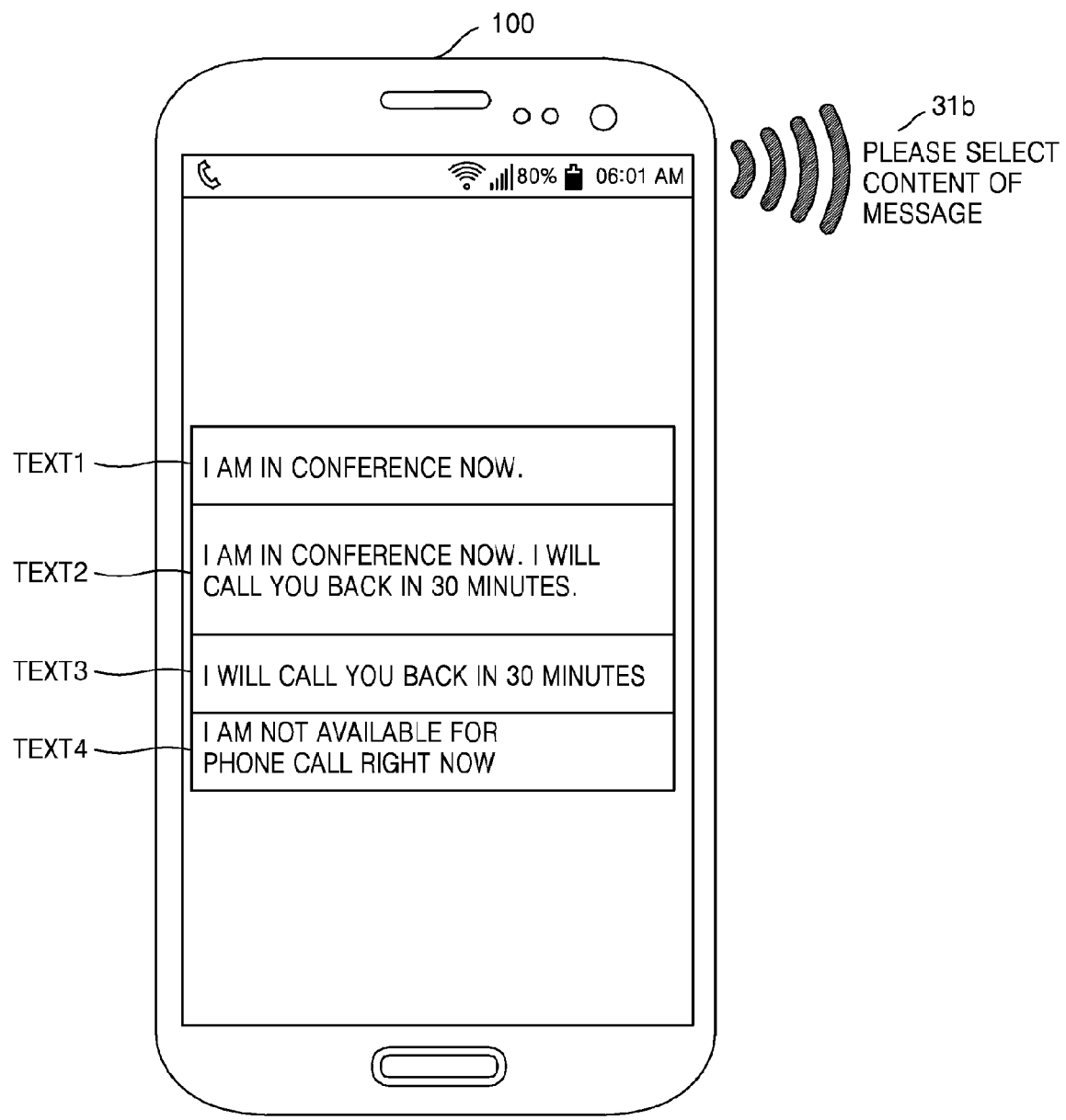

FIG. 23B is a diagram illustrating another example operation for providing a plurality of selection requests.

Referring to FIG. 23B, a selection request 32b may be provided via a speaker of the first device 100 as a voice. For example, if the first user USER1 is driving, the first device 100 may provide a plurality of selection requests via the speaker as voices.

According to an exemplary embodiment, the selection request 32b may be a request to select content of a message, may be output via the speaker of the first device 100 as "Please select content of message," and message contents to be selected may be output via the speaker of the first device 100 as voices corresponding to reading of a plurality of texts TEXT1, TEXT2, TEXT3, and TEXT4.

According to an exemplary embodiment, the plurality of texts TEXT1, TEXT2, TEXT3, and TEXT4 may be automatically generated based on information regarding an application being executed on the first device 100. Furthermore, a sequence of outputting the plurality of texts TEXT1, TEXT2, TEXT3, and TEXT4 via the speaker of the first device 100 may be automatically determined based on a selection history of a user, selection frequencies, contact information, etc. For example, a latest text used by the first user USER1 may be output first.

According to an exemplary embodiment, the first device 100 may output a first text TEXT1 through the speaker as "Do you want to select a message saying "I am in conference now"?," output a second text TEXT2 as "Do you want to select a message saying "I am in conference now. I will call you in 30 minutes"?," output a third text TEXT3 as "Do you want to select a message saying "I will call you in 30 minutes"?," and output a fourth text TEXT4 as "Do you want to select a message saying "I am not available for a phone call right now"?."

Referring back to FIG. 22, in the operation S2220, a result of a user selection may be received via a voice, a text, or a motion of a user.

According to an exemplary embodiment, if the selection request 31a is displayed on a display screen as a text as shown in FIG. 23A, a result of user selection may be detected from a selecting gesture. Here, various selecting gestures may be employed according to exemplary embodiments. For example, selecting gestures may include tapping, double-tapping, dragging, swiping, flicking, and drag-and-drop, but are not limited thereto.

According to another exemplary embodiment, if the selection request 31b is output as a voice via a speaker as shown in FIG. 23B, a result of user selection may be detected from a voice of a user. For example, the first user USER1 may answer with either "Yes" or "No," and the first device 100 may receive a result of selection of the first user USER1 based on an answer of the first user USER1.

According to another exemplary embodiment, if the selection request 31b is output as a voice via a speaker as shown in FIG. 23B, a result of user selection may be detected from a motion of a user. For example, the first user USER1 may perform a motion for shaking or rotating a wearable device during an exercise, and thus the first device 100 may receive a result of selection of the first user USER1 by using movement of the wearable device.

In an operation S2230, a response message is generated based on a received result of selection. In detail, the first device 100 may generate a response message based on a result of selection of the first user USER1 and transmit the generated response message to the second device 200.

Figure 24:
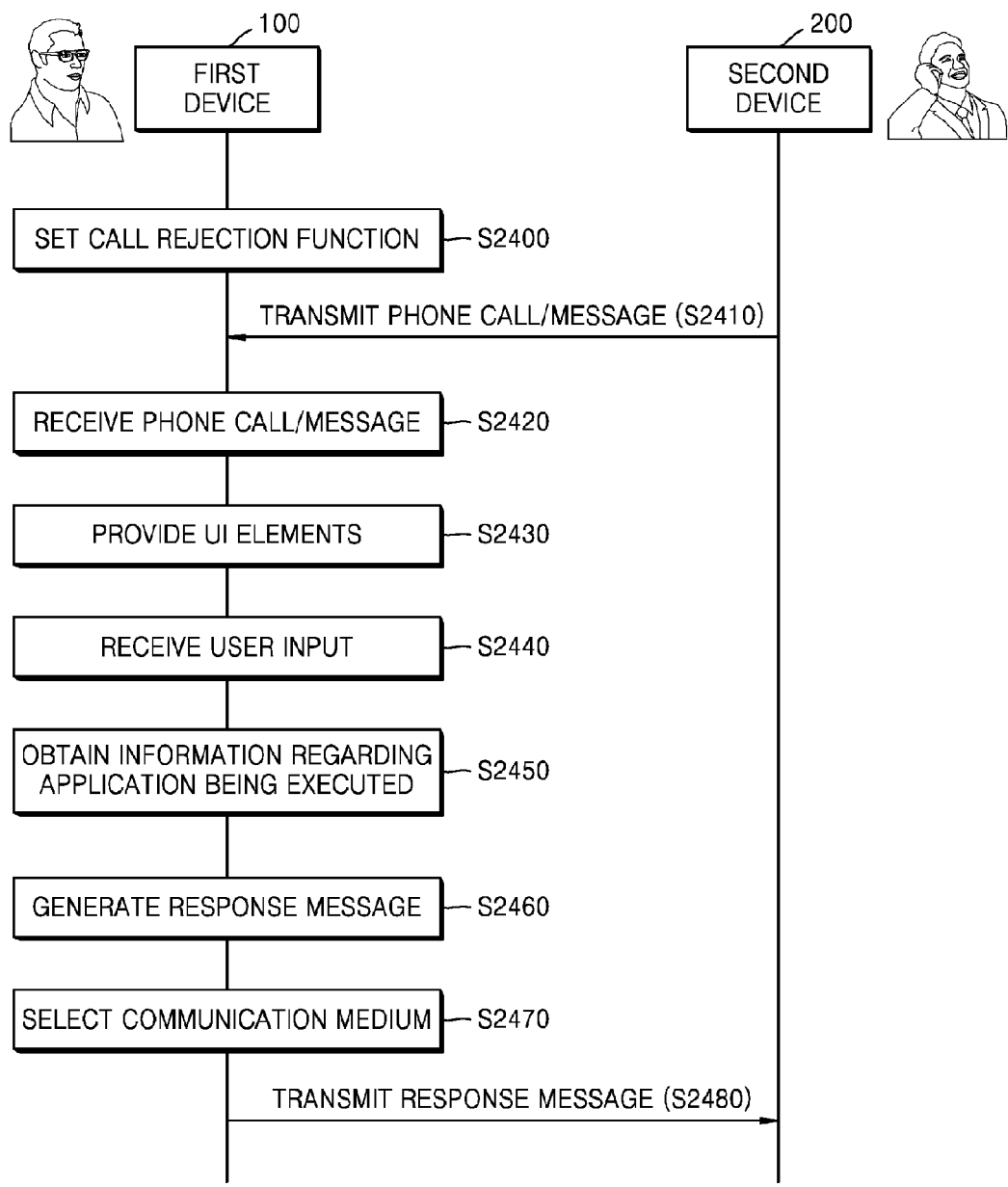
FIG. 24 is a flowchart illustrating another example of operations of the first and second devices according to a method of providing a response message according to another exemplary embodiment.

FIG. 24 is a flowchart illustrating another example of operations of the first and second devices 100 and 200 according to a method of providing a response message according to another exemplary embodiment.

Referring to FIG. 24, a method of providing a response message according to an exemplary embodiment is a modified embodiment of the method of providing a response message of FIG. 20 and includes operations that may be chronologically performed by the first and second devices 100 and 200. Descriptions given above with respect to the first and second devices 100 and 200 shown in FIG. 4 may also be applied to the method of providing a response message here.

In an operation S2400, the first device 100 sets up a call rejection function. In an operation S2410, the second device 200 transmits a phone call or a message to the first device 100. In an operation S2420, the first device 100 receives the phone call or the message from the second device 200. In an operation S2430, when the phone call or the message is received from the second device 200, the first device 100 provides UI elements corresponding to the received phone call or the received message. In an operation S2440, the first device 100 receives a user input for selecting to reject or to transmit a response message.

In an operation S2450, the first device 100 obtains information regarding an application being executed on the first device 100. In detail, the first device 100 may obtain information regarding an application being executed on the first device 100 in the operations 2420 through 2440. In an operation S2460, the first device 100 may generate a response message including at least one of a current situation and a future situation based on the obtained information regarding the application.

In an operation S2470, the first device 100 selects at least one from among a plurality of communication media. Here, the plurality of communication media may include at least one of a SMS, a SNS, such as Facebook or Twitter, a chatting service, such as KakaoTalk or Line, or e-mail.

According to an exemplary embodiment, the first device 100 may select one from among a plurality of communication media based on contact information stored in the first device 100. For example, if a phone number of the second device 200 is not included in the contact information stored in the first device 100, the first device 100 may select a SMS. According to another exemplary embodiment, the first device 100 may select at least one from among a plurality of communication media based on frequencies with which the first user USER1 and the second user USER2 have used respective communication media or a recent history of use of the communication media by the first user USER1 and the second user USER2.

According to an exemplary embodiment, at least one from among a plurality of communication media may be manually selected by the first user USER1 based on preferences of the first user USER1. Detailed descriptions thereof will be given below with reference to FIGS. 25 and 26. According to another exemplary embodiment, at least one from among a plurality of communication media may be automatically selected by the first device 100 based on preferences of the first user USER1. Detailed descriptions thereof will be given below with reference to FIG. 27.

In an operation S2480, the first device 100 transmits a response message to the second device 200. In detail, the first device 100 may transmit a response message to the second device 200 via the communication medium selected in the operation S2470.

Figure 25:
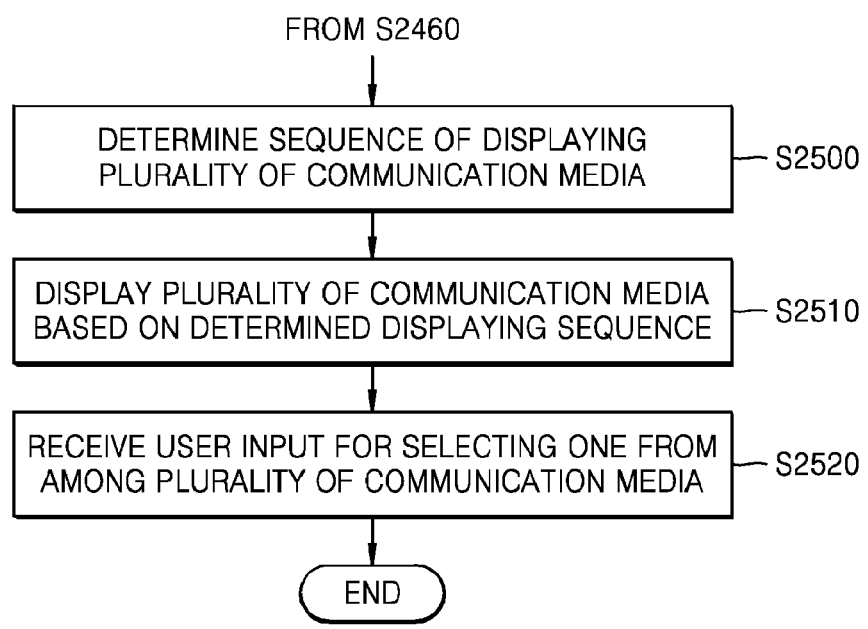
FIG. 25 is a flowchart illustrating an example operation for selecting a communication medium according to an exemplary embodiment.

FIG. 25 is a flowchart illustrating an example operation for selecting a communication medium according to an exemplary embodiment.

Referring to FIG. 25, an operation for selecting a communication medium according to an exemplary embodiment may correspond to an example of the operation S2470 of FIG. 24, may be performed after the operation S2460, and may include operations that are chronologically performed by the first device 100.

In an operation S2500, a sequence of displaying a plurality of communication media is determined.

First, the first device 100 determines available communication media with respect to the second device 200 based on contact information stored in the first device 100. In detail, the first device 100 determines a plurality of available communication media options to be provided to a first user USER1 based on information regarding the second user USER2 stored in contact information, e.g., a phone number, an e-mail address, a homepage address, an ID of a SNS, an ID of a chatting service, etc.

Next, the first device 100 may determine a sequence of displaying a plurality of communication media based on frequencies with which the first user USER1 and the second user USER2 have used respective communication media, a recent history of use of the communication media by the first user USER1 or the second user USER2, whether the second user USER2 uses a communication service, and a history of transmitting response messages. For example, if the latest response message transmitted with respect to the second device 200 was transmitted via an e-mail, the first device 100 may determine to display e-mail at the top of a plurality of communication media.

In an operation S2510, a plurality of communication media are displayed in the determined sequence. In an operation S2520, a user input for selecting one from among the plurality of communication media is received.

Figure 26:
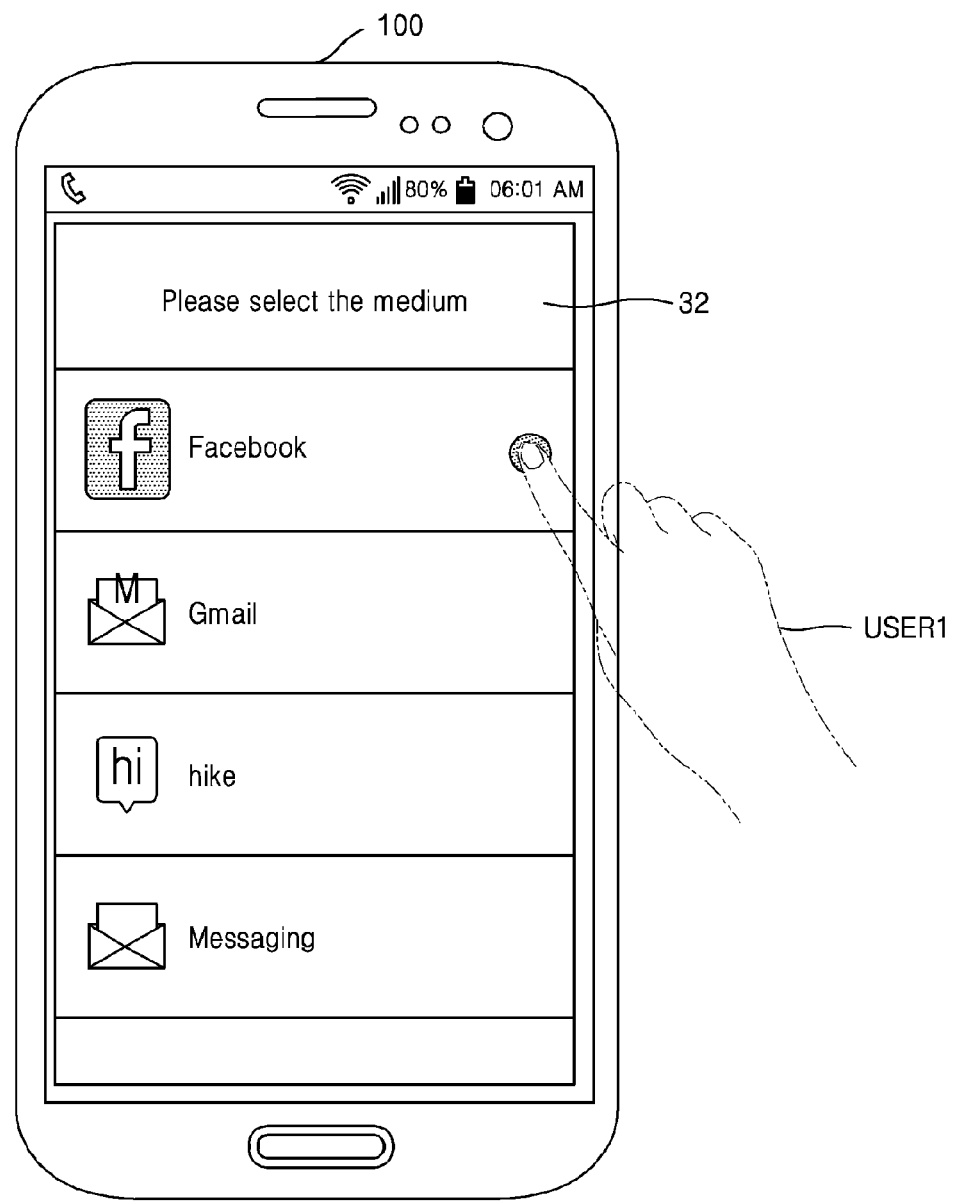
FIG. 26 is a diagram illustrating an example operation for receiving a user input according to an exemplary embodiment.

FIG. 26 is a diagram illustrating an example operation for receiving the user input of FIG. 25.

Referring to FIG. 26, the first device 100 may display a communication medium selection request 32 on the display screen. However, exemplary embodiments are not limited thereto. According to another exemplary embodiment, the first device 100 may output a communication media selection request via a speaker.

Furthermore, the first device 100 may display a plurality of communication media according to a displaying sequence determined in the operation S2500 of FIG. 25. Here, a communication medium displayed at the top of the plurality of communication media may be a communication medium that is mostly likely be selected by a user.

The first user USER1 may select at least one from among a plurality of communication media via a selecting gesture, such as tapping, double-tapping, dragging, swiping, flicking, and drag-and-drop, and the first device 100 may detect a selection of the first user USER1 and transmit a response message via a communication medium selected by the first user USER1.

Figure 27:
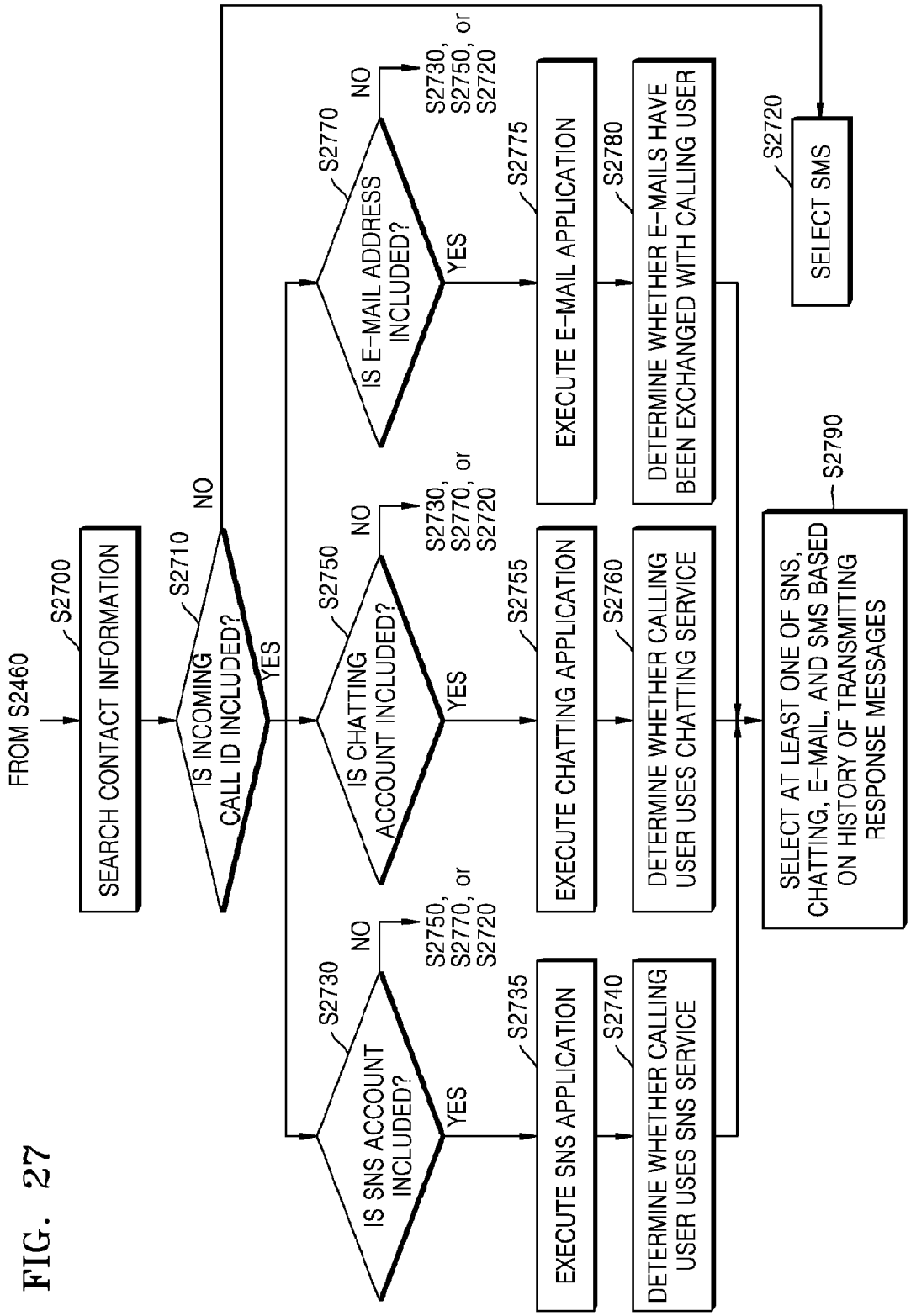
FIG. 27 is a flowchart illustrating another example operation for selecting a communication medium according to an exemplary embodiment.

FIG. 27 is a flowchart illustrating another example operation for selecting a communication medium according to an exemplary embodiment.

Referring to FIG. 27, an operation for selecting a communication medium according to an exemplary embodiment may correspond to an example of the operation S2470 of FIG. 24, may be performed after the operation S2460, and may include operations that may be chronologically performed by the first device 100.

In an operation S2700, contact information is searched. In detail, the first device 100 looks up contact information stored in the first device 100, that is, a phone book.

In an operation S2710, it is determined whether the contact information includes an incoming call ID. In detail, the first device 100 may determine whether the contact information includes a phone number of the second device 200. If it is determined that the contact information includes the incoming call ID, one from among operations S2730, S2750, and S2770 is performed. Here, a sequence of performing the operations S2730, S2750, and S2770 may be set by the first user USER1 in advance. Meanwhile, if the contact information does not include the incoming call ID, an operation 2720 is performed. In the operation S2720, the first device 100 selects a SMS.

In the operation S2730, it is determined whether the contact information includes a SNS account. In detail, the first device 100 may determine whether the contact information includes a SNS account of the second user USER2. If it is determined that the contact information includes a SNS account, an operation S2735 is performed. If not, an operation S2750, S2770, or S2720 is performed.

In the operation S2735, a SNS application is executed. In an operation S2740, it is determined whether a calling user uses a SNS. In detail, the first device 100 may execute a SNS application, such as Facebook and Twitter and determine whether the second user USER2 actually uses a SNS by searching for a history of the second user USER2 using the SNS.

In the operation S2750, it is determined whether the contact information includes a chatting account. In detail, the first device 100 may determine whether the contact information includes a chatting account of the second user USER2. If it is determined that the contact information includes a chatting account, an operation S2755 is performed. If not, the operation S2730, S2770, or S2720 is performed.

In the operation S2755, a chatting application is executed. In an operation S2760, it is determined whether a calling user uses a chatting service. In detail, the first device 100 may execute a chatting application, such as KakaoTalk and Line and determine whether the second user USER2 actually uses a chatting service by searching for a history of the second user USER2 using the chatting service.

In the operation S2770, it is determined whether the contact information includes an e-mail address. In detail, the first device 100 may determine whether the contact information includes an e-mail address of the second user USER2. If it is determined that the contact information includes an e-mail address, an operation S2775 is performed. If not, the operation S2730, S2750, or S2720 is performed.

In the operation S2775, an e-mail application is executed. In an operation S2780, it is determined whether a calling user has exchanged e-mails with the calling user. In detail, the first device 100 may execute an e-mail application and determine whether the first user USER1 has exchanged e-mails with the second user USER2 by searching for a history of exchanging e-mails with the second user USER2.

In an operation S2790, at least one of a SNS, a chatting, an e-mail, and a SMS is selected based on contact information and a history of transmitting response messages. In detail, the first device 100 may determine frequencies with which the first user USER1 and the second user USER2 have used respective services based on a history indicating that the first user USER1 and the second user USER2 have exchanged response messages and select SNS, chatting service, e-mail, or SMS based a result of the determination. For example, if the first user USER1 mainly transmits response messages to the second user USER2 via SMS even though all of an SNS account, a chatting account, and an e-mail address of the second user USER2 are stored in contact information stored in the first device 100, the first device 100 may select SMS.

Figure 28:
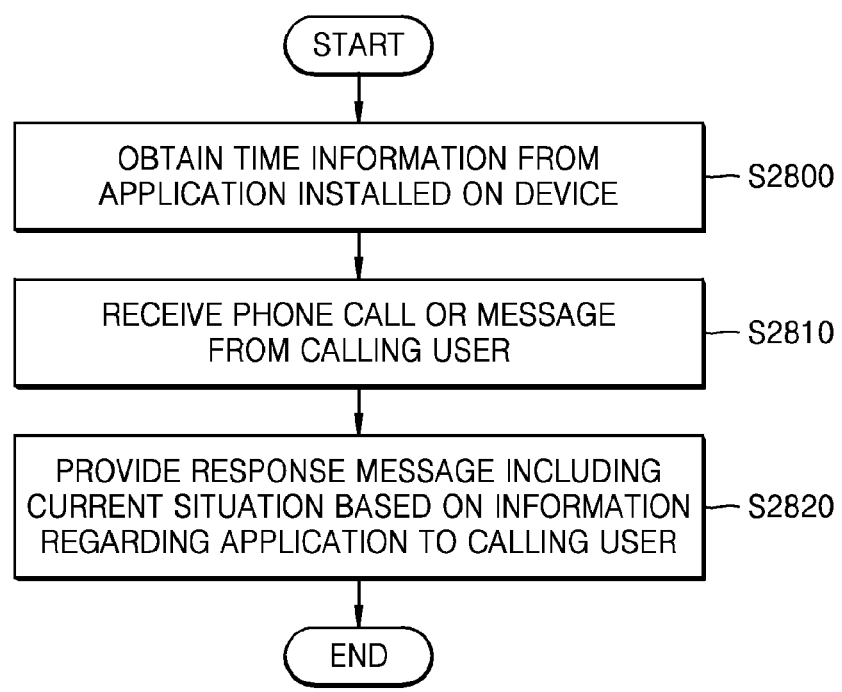
FIG. 28 is a diagram illustrating a method of providing a response message according to another exemplary embodiment.

FIG. 28 is a diagram illustrating a method of providing a response message according to another exemplary embodiment.

Referring to FIG. 28, the method of providing a response message according to an exemplary embodiment is a modified method of providing a response message of FIG. 3. Therefore, descriptions given above with reference to FIG. 3 may also be applied here.

In an operation S2800, time information is obtained from an application installed on a device. In an operation S2810, a call request, and more particularly, a phone call or a message is received from a calling user. In an operation S2820, a response message including information regarding a current situation based on information regarding an application is provided to the calling user.

Figure 29:
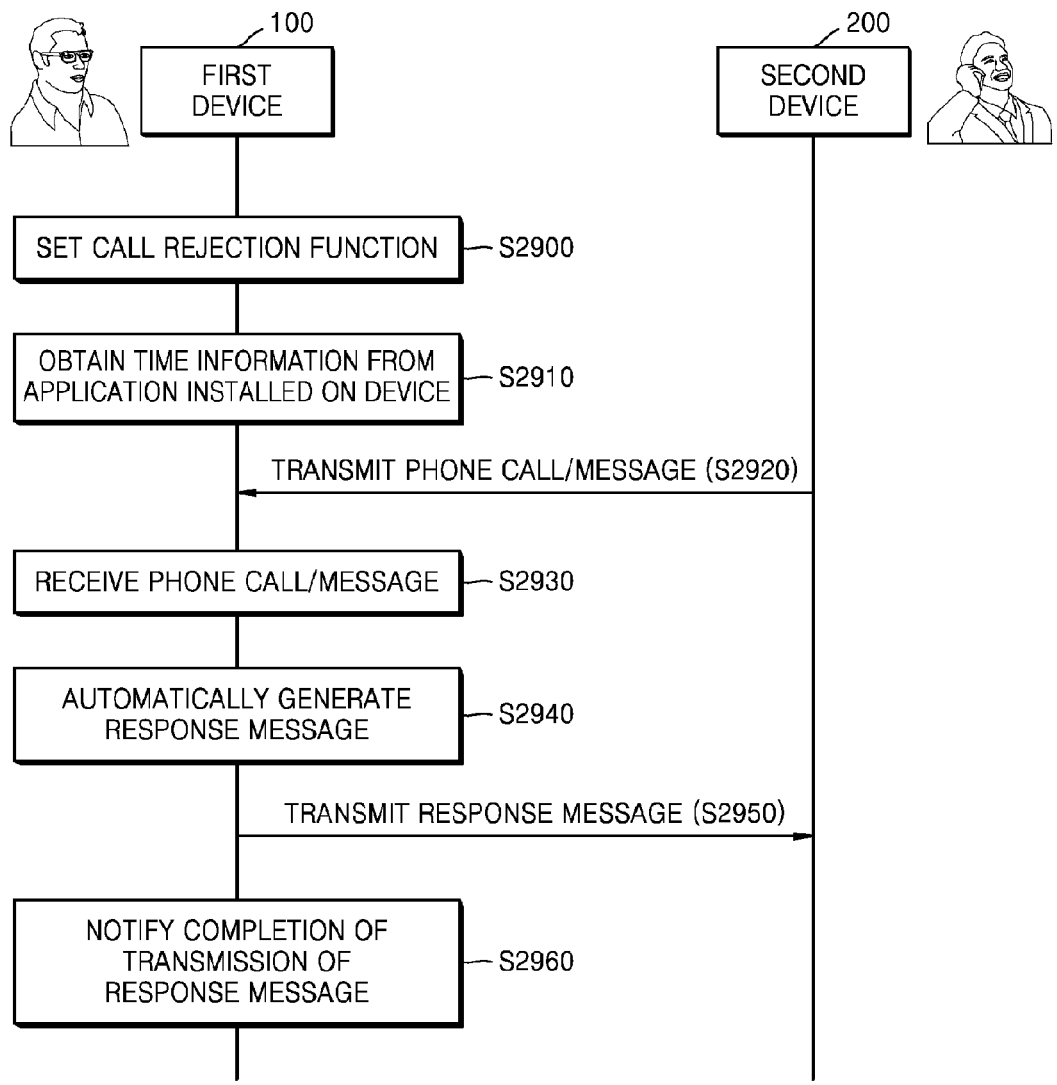
FIG. 29 is a flowchart illustrating examples of operations of the first and second devices according to a method of providing a response message according to an exemplary embodiment.

FIG. 29 is a flowchart illustrating examples of operations of the first and second devices 100 and 200 according to a method of providing a response message.

Referring to FIG. 29, a method of providing a response message according to an exemplary embodiment includes operations that may be chronologically performed by the first and second devices 100 and 200. Descriptions given above with respect to the first and second devices 100 and 200 shown in FIG. 4 may also be applied to the method of providing a response message according to an exemplary embodiment.

In an operation S2900, the first device 100 sets up a call rejection function. The call rejection function may be set up with respect to a particular application, a particular contact, or a particular time slot, in which any of the descriptions given above with reference to FIGS. 7A through 7F may also be applied.

In an operation S2910, the first device 100 obtains time information from an application installed on the first device 100. For example, in the case of a movie ticket reservation application, the time information may include a start time and an end time of a movie. As another example, in the case of a scheduler application, the time information may include a start time and an end time of a scheduled appointment.

According to an exemplary embodiment, the operation S2910 may be performed by a phone application or a message application installed on the first device 100. In other words, a phone application or a message application installed on the first device 100 may include a call rejection function. Therefore, when time information is input to an application installed on the first device 100, a phone application or a message application may be activated. In detail, an application being currently executed on the first device 100 may provide time information for generating a response message to a phone application or a message application via an API, and the phone application or the message application may store the received time information.

According to another exemplary embodiment, the operation S2910 may be performed by a dedicated call rejection application installed on the first device 100, and the call rejection application may be executed in conjunction with a phone application or a message application installed on the first device 100. Therefore, when time information is input to an application installed on the first device 100, the call rejection application may be activated. In detail, an application installed on the first device 100 may provide time information for generating a response message to a call rejection application via an API, and the call rejection application may store the received time information.

According to another exemplary embodiment, the operation S2910 may be performed by a platform of the first device 100. Therefore, when time information is input to an application installed on the first device 100, a platform may activate a call rejection function. In detail, an application installed on the first device 100 may provide time information for generating a response message to a platform, and the platform may store the received time information.

According to another exemplary embodiment, the operation S2910 may be performed by an external server. Therefore, when time information is input to an application installed on the first device 100, a server may activate a call rejection function. In detail, an application installed on the first device 100 may provide time information for generating a response message to a server, and the server may store the received time information.

In an operation S2920, the second device 200 transmits a phone call or a message to the first device 100. In an operation S2930, the first device 100 receives the phone call or the message from the second device 200.

In an operation S2940, if a point of time when the phone call or the message is received corresponds to time information obtained in the operation S2910, the first device 100 automatically generates a response message. In detail, the first device 100 may automatically generate a response message including at least one of a current situation and a future situation of the first user USER1 based on information regarding an application.

According to an exemplary embodiment, the operation S2940 may be performed by a phone application or a message application installed on the first device 100. In other words, a phone application or a message application installed on the first device 100 may include the call rejection function. Therefore, when a phone call or a message is received by the first device 100, a phone application or a message application may be activated. In detail, if a point of time when a phone call or a message is received corresponds to time information obtained, the phone application or the message application may automatically generate a response message.

According to another exemplary embodiment, the operation S2940 may be performed by a dedicated call rejection application installed on the first device 100, and the call rejection application may be executed in conjunction with a phone application or a message application installed on the first device 100. Therefore, when a phone call or a message is received by the first device 100, the call rejection application may be activated. In detail, if a point of time when a phone call or a message is received corresponds to stored time information, the call rejection application may automatically generate a response message.

According to another exemplary embodiment, the operation S2940 may be performed by a platform of the first device 100. Therefore, when a phone call or a message is received by the first device 100, a platform may activate a call rejection function. In detail, if a point of time when a phone call or a message is received corresponds to stored time information, the platform of the first device 100 may automatically generate a response message.

According to another exemplary embodiment, the operation S2940 may be performed by an external server. Therefore, when a phone call or a message is received by the first device 100, a server may activate a call rejection function. In detail, if a time point at which a phone call or a message is received corresponds to stored time information, a server may automatically generate a response message.

In an operation S2950, the first device 100 transmits a response message to the second device 200. Here, the response message may be transmitted via a SMS, a social network service (SNS), such as Facebook or Twitter, a chatting service, such as KakaoTalk or Line, or e-mail, etc.

In an operation S2960, the first device 100 provides a notification to the first user USER1 that transmission of a response message is completed. Therefore, the first user USER1 may learn that a phone call or a message is received from the second device 200 and a response message automatically generated in correspondence thereto is transmitted to the second device 200.

FIG. 30 is a table illustrating examples of information included in a response message according to an exemplary embodiment.

Referring to FIG. 30, a response message may include a name of a calling party, a current situation, and an estimated time point to reply to an incoming call, in which information included in a response message may vary based on types of applications. The name of a calling user may correspond to the name information 21 of FIGS. 8A and 8B, the current situation may correspond to the activity information 22 and the location information 24 of FIGS. 8A and 8B, and the estimated point of time when the user will reply to an incoming call may correspond to the time information 23 of FIGS. 8A and 8B. Therefore, any of the descriptions given above with reference to FIGS. 8A and 8B may also be applied here.

Hereinafter, configuration of a response message will be described with reference to FIGS. 4, 8A, 8B, and 30.

The name information 21 may be generated based on a name of the second user USER2 of the second device 200. According to an exemplary embodiment, the name information 21 may be generated based on a name corresponding to a number of the second device 200 stored in contact information stored in the first device 100. For example, if a name corresponding to a number of the second device 200 stored in contact information stored in the first device 100 is "Chief Kim," the name information 21 may be generated as "Chief Kim." According to another exemplary embodiment, the name information 21 may be generated based on a nickname of the second user USER2 based on a history of exchanging messages between the first device 100 and the second device 200. According to another exemplary embodiment, if contact information stored in the first device 100 does not include a number of the second device 200, the response messages 20 and 20' may not include the name information 21.

The activity information 22 may be generated based on a current situation of the first user USER1 determined based on information regarding an application being executed on the first device 100. Here, a current situation of the first user USER1 may be automatically completed based on a type of surrounding environment and a current activity.

The time information 23 may be generated based on a future situation of the first user USER1 estimated based on information regarding an application being executed on the first device 100. Here, a future situation of the first user USER1 may be automatically completed based on an estimated time. In detail, the first device 100 may include an estimation module, and the estimation module may estimate a point of time when the first user USER1 will be available to reply to an incoming call.

Figure 31A:
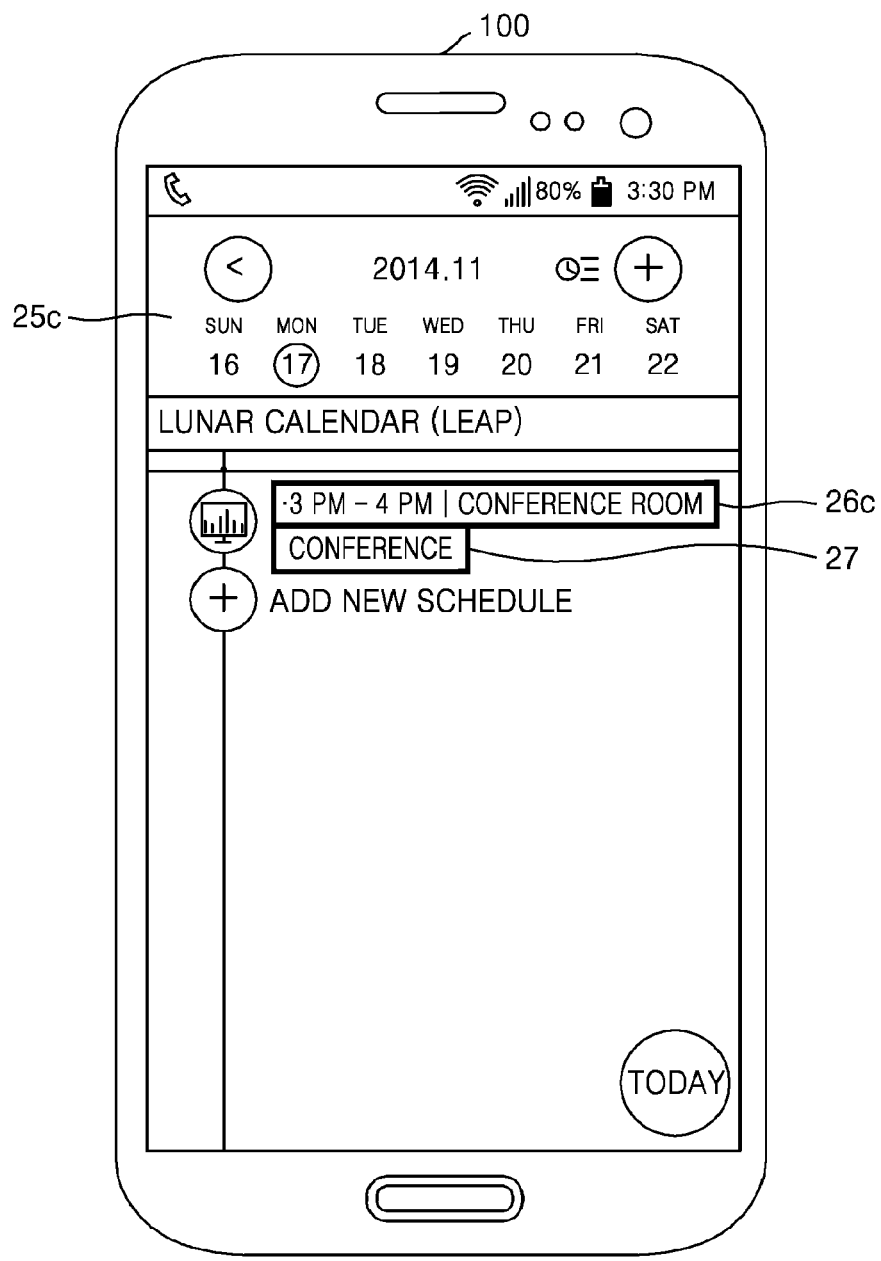
FIGS. 31A and 31B are diagrams illustrating an example operation for generating a response message based on information provided by a scheduler application, according to an exemplary embodiment.
Figure 31B:
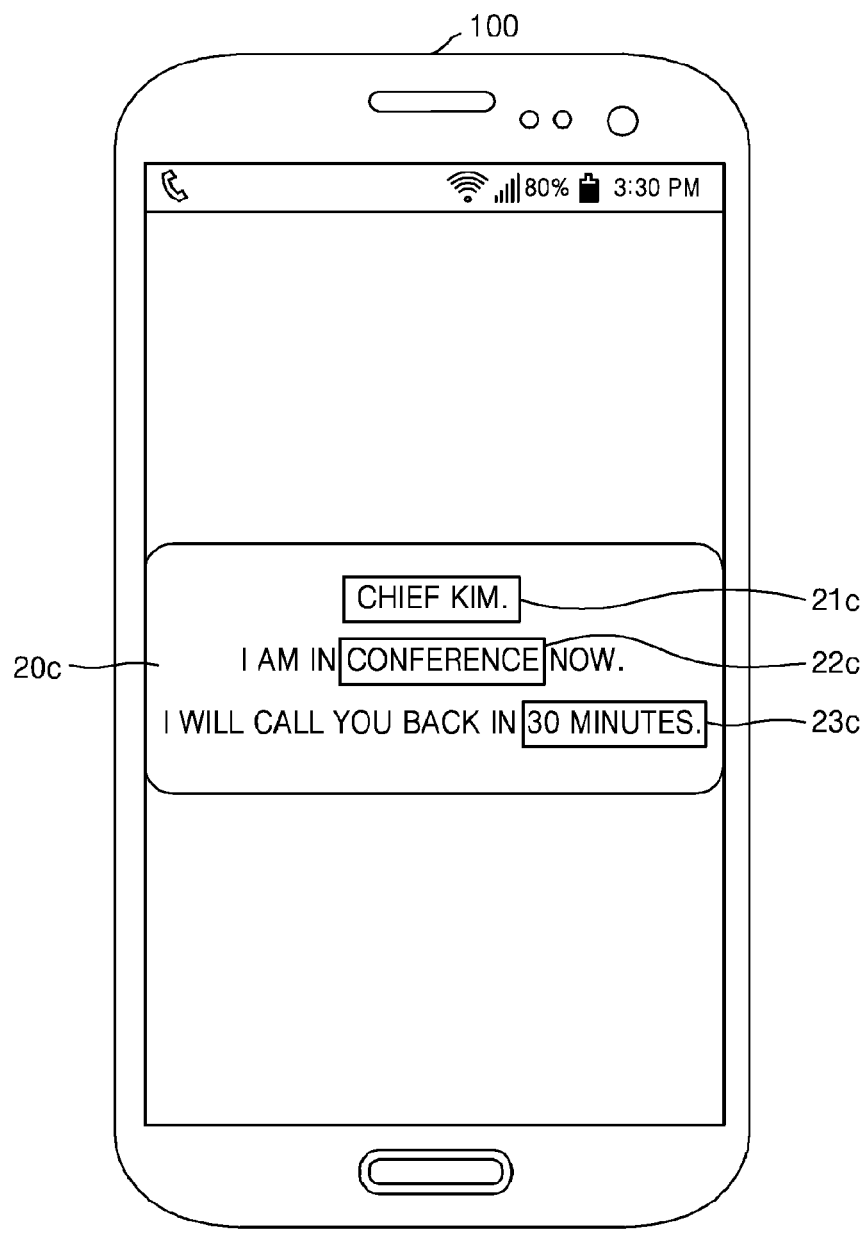

FIGS. 31A and 31B are diagrams illustrating an example operation for generating a response message 20c based on information provided by the scheduler application 25c, according to an exemplary embodiment.

Referring to FIG. 31A, when a scheduler application 25c is executed on the first device 100, a current situation and a future situation of the first user USER1 may be determined based on information provided by the scheduler application 25c. In detail, based on schedule information 27 provided by the scheduler application 25c, a current situation of the first user USER1 may be determined as being that the first user USER1 is in conference at a conference room. Furthermore, based on schedule time information 26c and current time information provided by the scheduler application 25c, a future situation of the first user USER1 may be determined as being that the conference will end in 30 minutes.

Referring to FIG. 31B, the first device 100 may generate name information 21c as "Chief Kim" based on contact information, generate activity information 22c as "I am in conference now" based on the schedule information 27 provided by the scheduler application 25c, and generate time information 23c as "I will call you in 30 minutes" based on the schedule time information 26c provided by the scheduler application 25c. In other words, the first device 100 may generate location information as "I am at the conference room" based on the schedule information 27 provided by the scheduler application 25c.

Figure 32A:
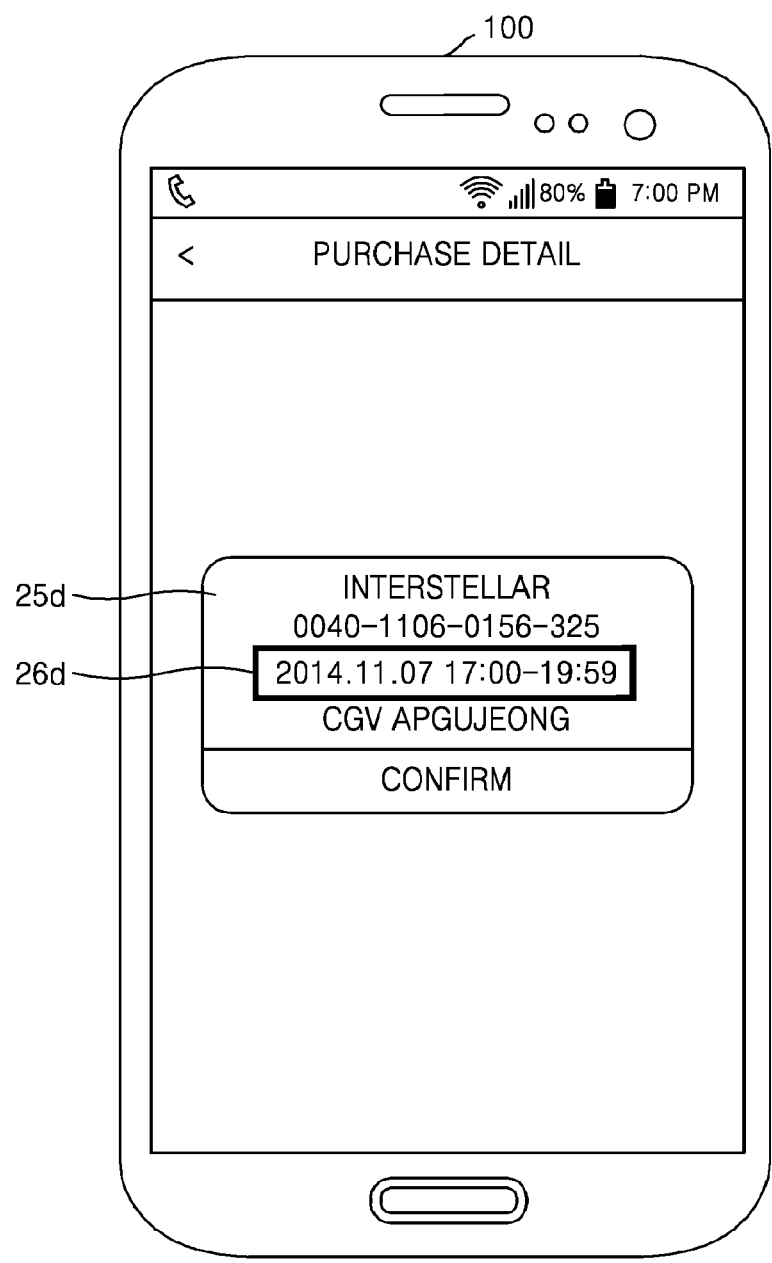
FIGS. 32A and 32B are diagrams illustrating an example operation for generating a response message based on information provided by a movie ticket reservation application, according to an exemplary embodiment.
Figure 32B:
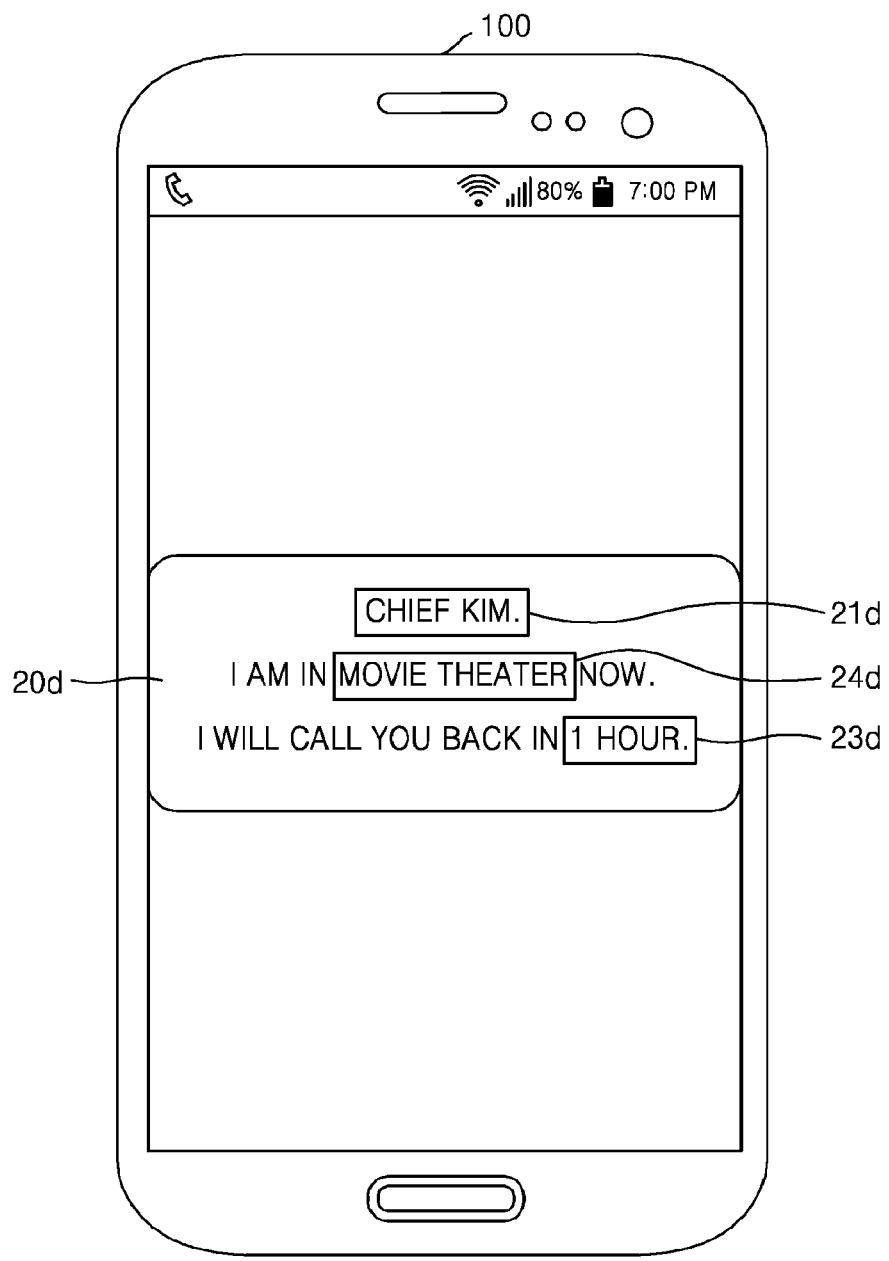

FIGS. 32A and 32B are diagrams illustrating an example operation for generating a response message 20d based on information provided by a movie ticket reservation application 25d, according to an exemplary embodiment.

Referring to FIG. 32A, when a movie ticket reservation application 25d is executed on the first device 100, a current situation and a future situation of the first user USER1 may be determined based on information provided by the movie ticket reservation application 25d. In detail, based on execution information provided by the movie ticket reservation application 25d, a current situation of the first user USER1 may be determined as being that the first user USER1 is watching a movie at a movie theater. Furthermore, based on movie time information 26d and current time information provided by the movie ticket reservation application 25d, a future situation of the first user USER1 may be determined as being that the movie will end in 1 hour.

Referring to FIG. 32B, the first device 100 may generate name information 21d as "Chief Kim" based on contact information, generate location information 24d as "I am at a movie theater" based on reservation information provided by the movie ticket reservation application 25d, and generate time information 23d as "I will call you in 1 hour" based on the movie time information 26d provided by the movie ticket reservation application 25d.

Respective examples of the response messages 20c and 20d that may be generated when the scheduler application 25c and the movie ticket reservation application 25d are executed on the first device 100 are described above with reference to FIGS. 31A through 32B. Hereinafter, examples of response messages that may be generated while other applications are being executed on the first device 100 will be described in detail.

For example, if a transportation reservation application is executed on the first device 100, information indicating that the first user USER1 is currently moving by a means of transportation may be obtained from the transportation reservation application. For example, if the first user USER1 is 'currently moving by plane,' the activity information 22 may be generated as "I'm on a flight." Furthermore, since information regarding a time of arrival may be obtained from the transportation reservation application, the time information 23 may be generated based on a remaining time until arrival.

As another example, if an alarm application is executed on the first device 100, information indicating that the first user USER1 is currently sleeping, for example, may be obtained from the alarm application. If the first user USER1 is currently 'sleeping,' the activity information 22 may be generated as "I am sleeping." Furthermore, since information regarding an alarm time may be obtained from the alarm application, the time information 23 may be generated based on a remaining time until the alarm time.

One or more exemplary embodiments for generating the activity information 22, the time information 23, and the location information 24 based on information provided by applications executed on the first device 100 are described above. However, exemplary embodiments are not limited thereto. According to another exemplary embodiment, the first device 100 may operate in conjunction with a wearable device the first user USER1 is wearing. In detail, the activity information 22, the time information 23, and the location information 24 may be generated based on information provided by an application executed on a wearable device.

Detailed descriptions thereof will be given below with reference to FIGS. 41 through 51 and 57 through 60.

Figure 33:
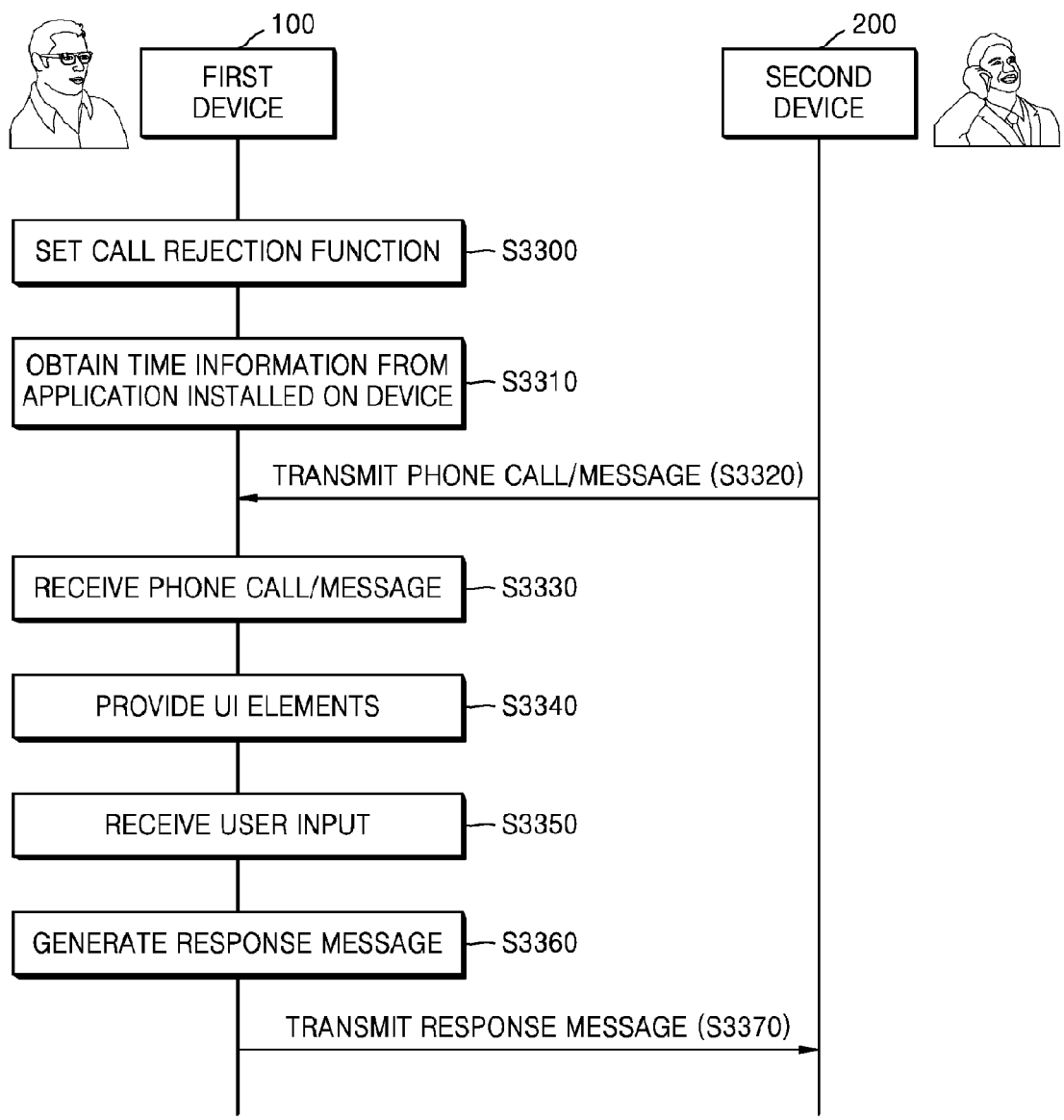
FIG. 33 is a flowchart illustrating examples of operations of the first and second devices according to a method of providing a response message according to another exemplary embodiment.

FIG. 33 is a flowchart illustrating examples of operations of the first and second devices 100 and 200 according to a method of providing a response message according to another exemplary embodiment.

Referring to FIG. 33, the method of providing a response message is a modified embodiment of the method of providing a response message of FIG. 29 and includes operations that may be chronologically performed by the first and second devices 100 and 200. Therefore, even if omitted below, descriptions given above with respect to the first and second devices 100 and 200 shown in FIG. 29 may also be applied to the method of providing a response message according to an exemplary embodiment.

In an operation S3300, the first device 100 sets up a call rejection function. In an operation S3310, the first device 100 obtains time information from an application installed on the first device 100. In an operation S3320, the second device 200 transmits a phone call or a message to the first device 100. In an operation S3330, the first device 100 receives the phone call or the message from the second device 200.

In an operation S3340, when the phone call or the message is received from the second device 200, the first device 100 provides UI elements corresponding to the received phone call or the received message. For example, the first device 100 may display a UI element corresponding to a phone call or a message on a display screen of the first device 100. For another example, the first device 100 may output a UI element corresponding to a phone call or a message via a speaker of the first device 100.

In an operation S3350, the first device 100 receives a user input for selecting to reject/decline or to transmit a response message. According to an exemplary embodiment, the first user USER1 may select a UI element corresponding to transmission of a response message from among UI elements displayed on the display screen of the first device 100, and the first device 100 may receive a user input corresponding to the selection via a UI. According to another exemplary embodiment, the first user USER1 may select a UI element corresponding to reject/decline the message from among UI elements displayed on the display screen of the first device 100, and the first device 100 may receive a user input corresponding to the selection via a UI.

According to an exemplary embodiment, a user input may be detected by the first device 100 based on a gesture or a movement of a user. According to another exemplary embodiment, a user input may be received by the first device 100 based on a user's voice.

In an operation S3360, if a point of time when the phone call or the message is received corresponds to time information obtained in the operation S3310, the first device 100 automatically generates a response message. In detail, the first device 100 may automatically generate a response message including at least one of a current situation and a future situation of the first user USER1 based on information regarding an application.

In an operation S3370, the first device 100 transmits a response message to the second device 200.

Figure 34:
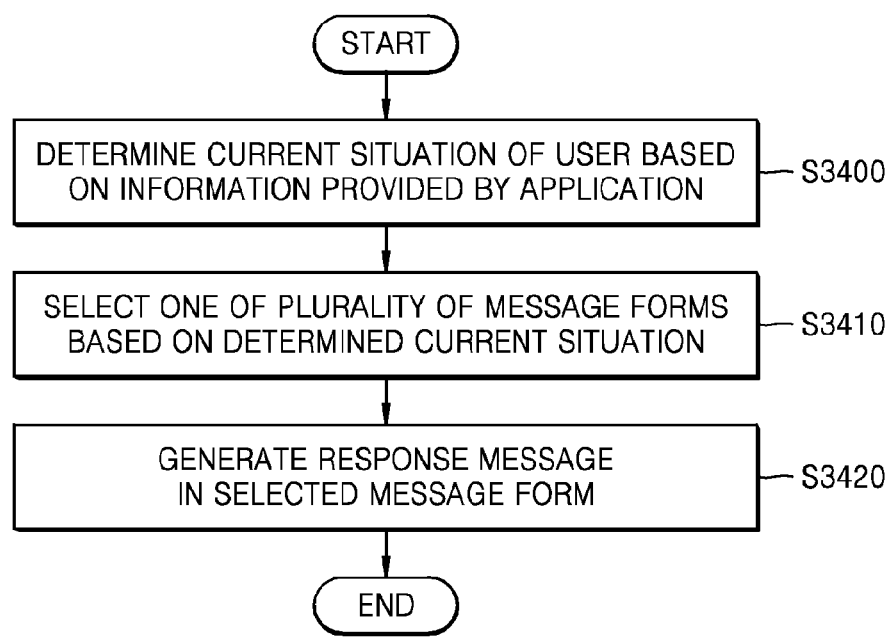
FIG. 34 is a flowchart illustrating an example operation for providing a response message according to an exemplary embodiment.

FIG. 34 is a flowchart illustrating an example operation for providing a response message according to an exemplary embodiment.

Referring to FIG. 34, an operation for providing a response message according to an exemplary embodiment may correspond to an example of the operation S320 of FIG. 3 and may include operations that may be chronologically performed by the first device 100 of FIG. 1.

In an operation S3400, a current situation of a user is determined based on information provided by an application. For example, based on schedule information provided by a scheduler application, the first device 100 may determine that the first user USER1 is currently in conference. For another example, based on exercise information provided by a fitness application, the first device 100 may determine that the first user USER1 is currently exercising. For another example, based on destination information or current location information provided by a navigation application, the first device 100 may determine that the first user USER1 is currently driving.

In an operation S3410, one from among a plurality of message forms is selected based on the determined current situation. Message forms may also be referred to as message modalities. In detail, the plurality of message forms may include at least one of text and voice. If it is determined that the first user USER1 is currently in conference, the first device 100 may select a text message form. As another example, if it is determined that the first user USER1 is currently exercising or driving, it may be difficult to input or select a text message, and thus the first device 100 may select a voice message form.

In an operation S3420, a response message is generated in the selected message form. For example, the first device 100 may automatically or manually generate information including a current situation or a future situation of the first user USER1 and may generate a text message including the information. For another example, the first device 100 may automatically or manually generate information including a current situation or a future situation of the first user USER1 and may generate a voice message including the information. As described above, according to an exemplary embodiment, user convenience may be improved by selecting a form of a message to be transmitted based on a current situation of a user.

Figure 35:
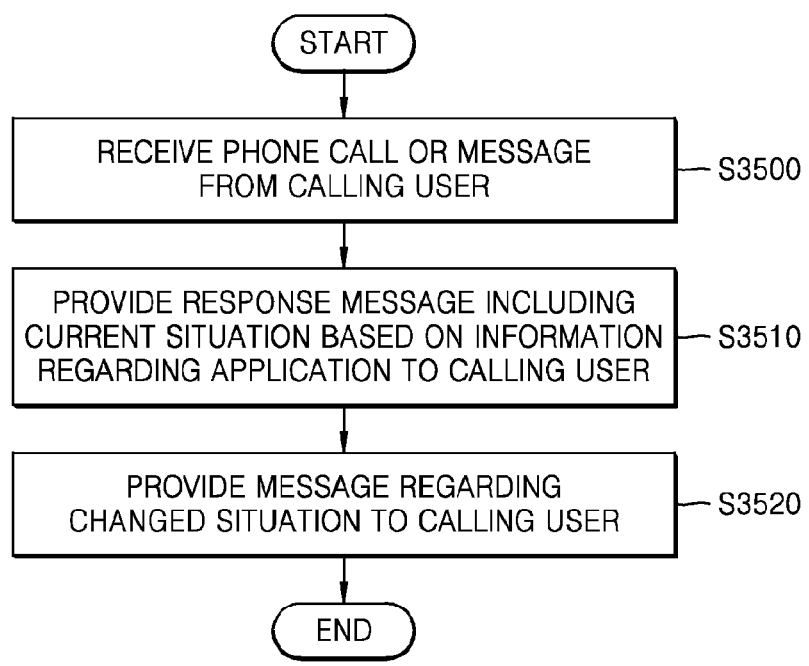
FIG. 35 is a flowchart illustrating a method of providing a response message according to another exemplary embodiment.

FIG. 35 is a flowchart illustrating a method of providing a response message according to another exemplary embodiment.

Referring to FIG. 35, the method of providing a response message according to an exemplary embodiment is a modified embodiment of the method of providing a response message of FIG. 3. Therefore, descriptions given above with reference to FIG. 3 may also be applied to an exemplary embodiment, and thus repeated descriptions will be omitted.

In an operation S3500, a phone call or a message is received from a calling user. In an operation S3510, a response message including a current situation based on information regarding an application is provided to the calling user. In an operation S3520, a message regarding a changed situation is provided to the calling user.

Referring to FIGS. 4 and 35, in detail, in an operation S3520, based on information regarding an application, if a situation regarding the first user USER1 is changed, the first device 100 transmits a message regarding a changed situation to the second user USER2. In detail, the first device 100 monitors termination of execution of an application, termination of playback of content provided by an application, or termination of an activity input to an application. Based on a result of the monitoring, if it is determined that the first user USER1 becomes available for a phone call, the first device 100 may transmit a message regarding the changed situation to the second user USER2.

According to an exemplary embodiment, if execution of an application being executed on the first device 100 during the operations S3500 and S3510 is terminated, it may be determined that a situation regarding the first user USER1 is changed, and a message regarding a changed situation may be transmitted to the second user USER2.

For example, if a navigation application is being executed on the first device 100 during the operations S3500 and S3510, a phone application, a message application, or a call rejection application installed on the first device 100 or a platform of the first device 100 may continuously monitor execution of the navigation application after the operation S3510. When execution of the navigation application is terminated, it may be determined that the first user USER1 is no longer driving, and thus, the first device 100 may transmit a message regarding a changed situation (e.g., "I am now available for a phone call") to the second device 200.

As another example, if a fitness application is being executed on the first device 100 during the operations S3500 and S3510, a phone application, a message application, or a call rejection application installed on the first device 100 or a platform of the first device 100 may continuously monitor execution of the fitness application after the operation S3510. When execution of the fitness application is terminated, it may be determined that the first user USER1 is no longer exercising, and thus the first device 100 may transmit a message regarding a changed situation (e.g., "I finished exercising. I am now available for a phone call") to the second device 200.

According to an exemplary embodiment, if content being provided by an application being executed on the first device 100 during the operations S3500 and S3510 is terminated, it may be determined that a situation regarding the first user USER1 is changed and the first device 100 may transmit a message regarding a changed situation to the second device 200.

For example, if a movie player application is being executed on the first device 100 during the operations S3500 and S3510, a call rejection application installed on the first device 100 or a platform of the first device 100 may continuously monitor content being played back by the movie player application after the operation S3510. When the content played back by the movie player application is terminated, it may be determined that the first user USER1 is no longer watching the content, and thus the first device 100 may transmit a message regarding a changed situation (e.g., "I am now available for a phone call") to the second device 200.

According to another exemplary embodiment, time information input to an application previously executed on the first device 100 is monitored in the operations S3500 and S3510 and, at an end time of an activity corresponding to the time information, it may be determined that a situation regarding the first user USER1 is changed, and thus the first device 100 may transmit a message regarding a changed situation to the second device 200.

For example, at a conference end time input to a scheduler application installed on the first device 100, it may be determined that the first user USER1 is no longer in the conference, and thus the first device 100 may transmit a message regarding a changed situation (e.g., "The conference is over. I am now available for a phone call.") to the second device 200.

Figure 36:
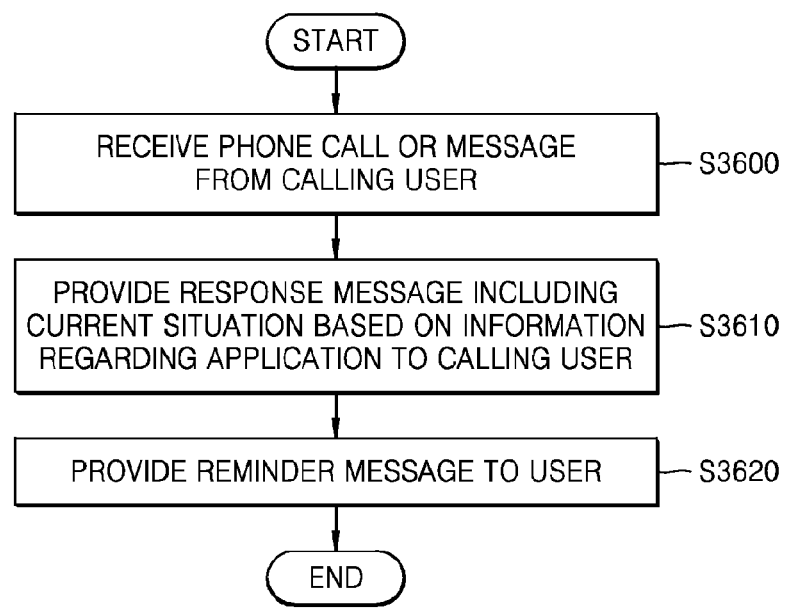
FIG. 36 is a flowchart illustrating a method of providing a response message according to another exemplary embodiment.

FIG. 36 is a flowchart illustrating a method of providing a response message according to another exemplary embodiment.

Referring to FIG. 36, the method of providing a response message according to an exemplary embodiment is a modified embodiment of the method of providing a response message of FIG. 3. Therefore, descriptions given above with reference to FIG. 3 may also be applied to an exemplary embodiment, and thus repeated descriptions will be omitted.

In an operation S3600, a phone call or a message is received from a calling user. In an operation S3610, a response message including a current situation based on information regarding an application is provided to the calling user. In an operation S3620, a reminder message is provided to a user.

Figure 37:
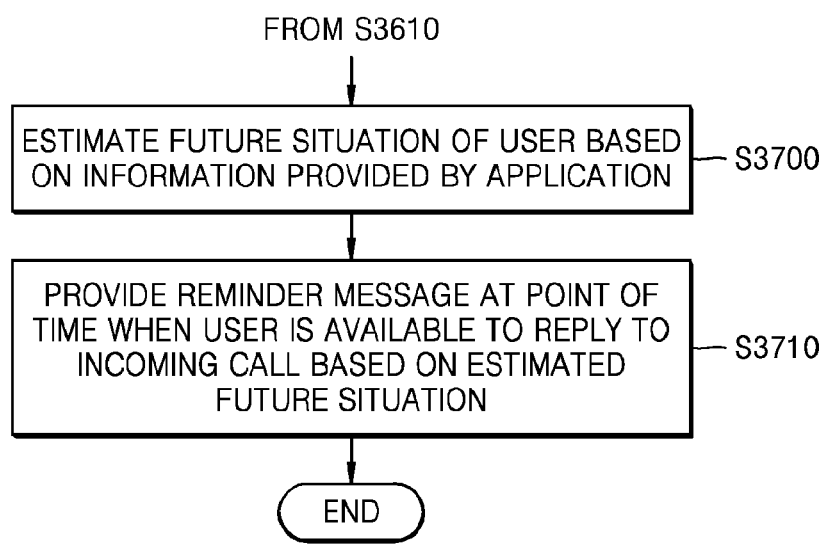
FIG. 37 is a flowchart illustrating an example operation for providing a reminder message according to an exemplary embodiment.

FIG. 37 is a flowchart illustrating an example operation for providing a reminder message according to an exemplary embodiment.

Referring to FIG. 37, an operation for providing a reminder message according to an exemplary embodiment may correspond to an example of the operation S3620 of FIG. 36, may be performed after the operation S3610, and may include operations that may be chronologically performed by the first device 100.

In an operation S3700, a future situation of a user is estimated based on information regarding an application. According to an exemplary embodiment, the application may be a navigation application or a map application, and information regarding the application may be a destination input to the navigation application, a current location, a distance to the destination, an estimated driving time to the destination, or a current traffic condition. According to another exemplary embodiment, the application may be a fitness application, and information regarding the application may be a start time of a current exercise or an end time of the current exercise input to the fitness application. According to another exemplary embodiment, the application may be a scheduler application, and information regarding the application may be a start time of a current schedule or an end time of the current schedule input to the scheduler application. According to another exemplary embodiment, the application may be a ticket reservation application, and information regarding the application may be a start time of a concert or an end time of the concert input to the ticket reservation application.

In an operation S3710, a reminder message is provided to a user at a point of time when the user will be available to reply to an incoming call. In detail, the first device 100 may display a reminder message on a display screen or provide a reminder message via a sound or vibration at a point of time when the first user USER1 is available to reply to an incoming call. For example, if the first device 100 has transmitted a response message "I'm driving now. I will call you in 30 minutes" to the second device 200, the first device 100 may provide a reminder message to the first user USER1 at a time point after 30 minutes from the time point of transmitting the response message.

According to an exemplary embodiment, a reminder message may include a missed call list. In detail, a missed call list may include incoming call IDs corresponding to missed phone calls or missed messages to which a user was unable to respond. According to the above embodiment, a user may be notified of incoming call IDs corresponding to missed phone calls or missed messages at a point of time when the user is available to reply to an incoming call.

Figure 38:
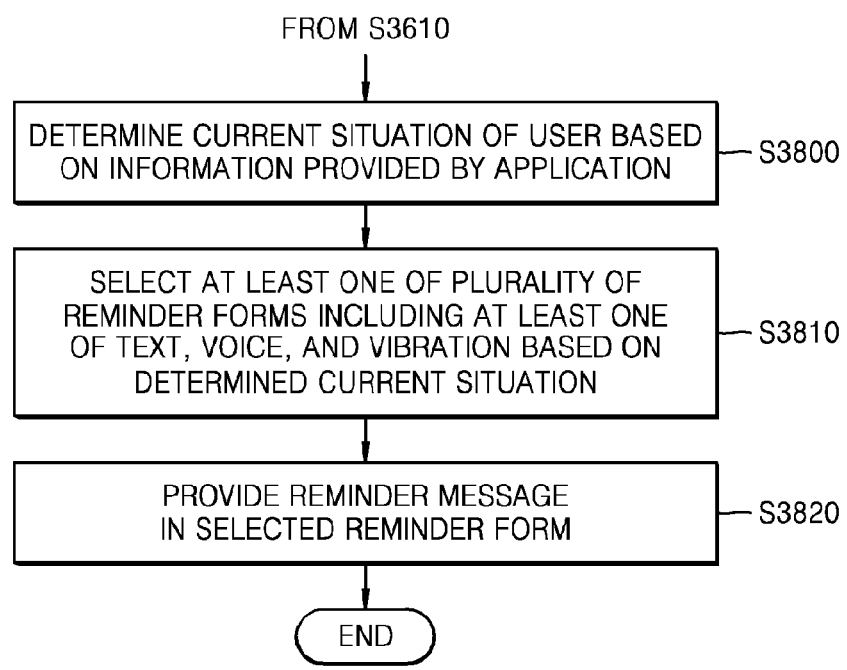
FIG. 38 is a flowchart illustrating another example operation for providing a reminder message according to an exemplary embodiment.

FIG. 38 is a flowchart illustrating another example operation for providing a reminder message according to an exemplary embodiment.

Referring to FIG. 38, an operation for providing a reminder message according to an exemplary embodiment may correspond to an example of the operation S3620 of FIG. 36, may be performed after the operation S3610, and includes operations that may be chronologically performed by the first device 100.

In an operation S3800, a current situation of a user is determined based on information regarding an application. According to an exemplary embodiment, the application may be a navigation application or a map application, and information regarding the application may be a point of departure, a destination input to the navigation application, or a current location. According to another exemplary embodiment, the application may be a scheduler application, and information regarding the application may be type of a current schedule or location of the current schedule input to the scheduler application. According to another exemplary embodiment, the application may be a fitness application, and information regarding the application may be type of a current exercise or location of the current exercise input to the fitness application.

In an operation S3810, at least one of a plurality of reminder forms including at least one of text, voice, and vibration is selected based on a determined current situation. In detail, the first device 100 may determine text, text and voice, voice and vibration, or text, voice, and vibration as the form(s) of a reminder.

In an operation S3820, a reminder message is provided to a user via the selected reminder form(s). For example, if the first user USER1 is driving, the first device 100 may determine text and voice as reminder forms, and thus the first device 100 may provide a reminder message to the first user USER1 via text and voice. As another example, if the first user USER1 is in conference, the first device 100 may determine text and vibration as reminder forms, and thus the first device 100 may provide a reminder message to the first user USER1 via text and vibration.

Figure 39:
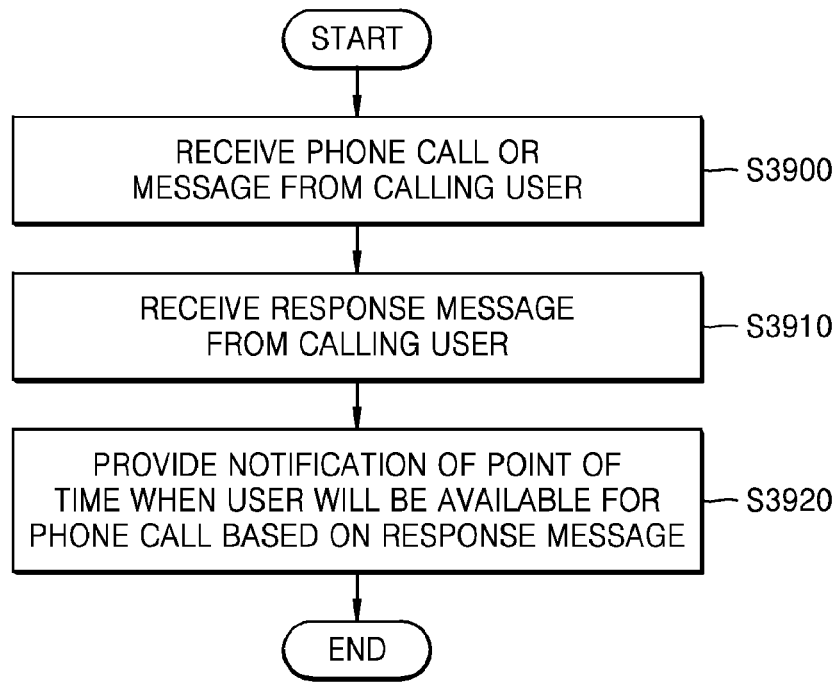
FIG. 39 is a flowchart illustrating a method of controlling a transmission according to an exemplary embodiment.

FIG. 39 is a flowchart illustrating a method of controlling a transmission according to an exemplary embodiment.

Referring to FIG. 39. a method of controlling a transmission according to an exemplary embodiment is a method of controlling a transmission when a call request is rejected and includes below operations performed by a device. For example, a method of controlling a transmission may include operations that may be chronologically performed by the second device 200.

In an operation S3900, a phone call or a message is transmitted to a receiving user. Here, a phone call may be at least one of a phone call via a mobile communication network, a voice over internet protocol (VoIP) call, or a voice over long-term evolution (LTE) (VoLTE) call. Here, a message may be at least one of a short message service (SMS), a multimedia message service (MMS), or a message provided by a chatting service, such as KakaoTalk or Line.

In an operation S3910, a response message is received from the receiving user. According to an exemplary embodiment, the response message may include a current situation of the receiving user. Here, the "current situation" refers to a reason that the receiving user is unable to respond to an incoming call at a time point of reception of the incoming call, the reason determined by referring to information regarding an application that is being currently executed or previously executed and may be a specific activity, a location, or a route of the receiving user. Furthermore, the "future situation" may be a change of situation of the receiving user after termination of an incoming call estimated by referring to information regarding an application that is being currently executed or previously executed and may correspond to an estimated point of time when the receiving user will be available to respond to an incoming call.

In an operation S3920, a notification of a point of time when the receiving user will be available for a phone call is provided based on the received response message. According to an exemplary embodiment, a device may obtain a point of time when the receiving user will be available for a phone call based on a future situation included in the response message and provide a notification of the obtained point of time when the receiving user is available for a phone call to a calling user.

Figure 40:
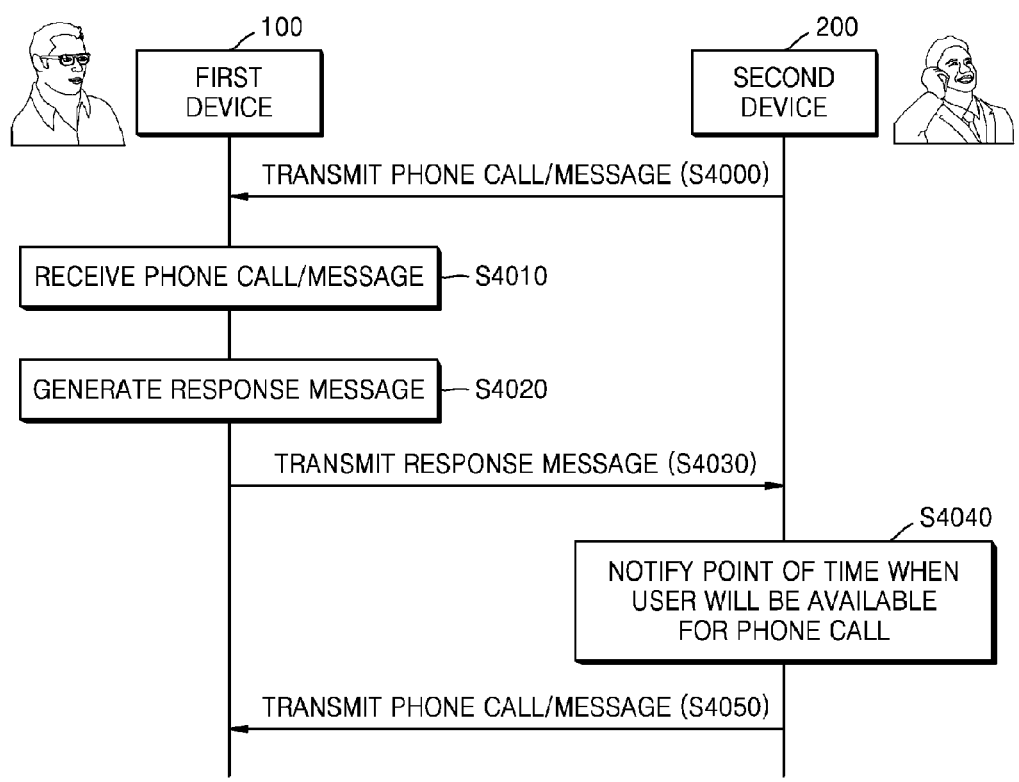
FIG. 40 is a flowchart illustrating examples of operations of the first and second devices according to a method of controlling a transmission according to an exemplary embodiment.

FIG. 40 is a flowchart illustrating examples of operations of the first and second devices 100 and 200 according to the method of controlling a transmission of FIG. 39.

Referring to FIG. 40, the method of controlling a transmission according to an exemplary embodiment includes operations that are chronologically performed by the first and second devices 100 and 200. Descriptions given above with respect to the first and second devices 100 and 200 shown in FIG. 4 may also be applied here to a method of controlling a transmission.

In an operation S4000, the second device 200 transmits a phone call or a message to the first device 100. In an operation S4010, the first device 100 receives a phone call or a message from the second device 200.

In an operation S4020, the first device 100 generates a response message indicating rejection with respect to the received phone call or the received message. Here, the response message may include a current situation or a future situation of the first user USER1. According to an exemplary embodiment, the first device 100 may automatically generate a response message based on information regarding an application that is being currently executed or previously executed. According to another exemplary embodiment, the first device 100 may provide UI elements corresponding to the received phone call or the received message and, when a user input for selecting to reject/decline the phone call or to transmit a response message with respect to a phone call or selecting to transmit a response message with respect to a message is received from the first user USER1, may automatically generate a response message based on information regarding an application that is being currently executed or previously executed.

In an operation S4030, the first device 100 transmits the response message to the second device 200. According to an exemplary embodiment, the first device 100 may automatically transmit the response message to the second device 200 based on information regarding an application that is being currently executed or previously executed. According to another exemplary embodiment, the first device 100 may transmit the response message to the second device 200 when a user input for selecting to reject/decline the phone call or to transmit a response message with respect to a phone call or selecting to transmit a response message with respect to a message is received from the first user USER1. According to another exemplary embodiment, when a user input for selecting one from among a plurality of communication media is input from the first user USER1, the first device 100 may transmit the response message to the second device 200 via the selected communication medium. The methods of providing response messages described above with reference to FIGS. 3 through 38 may be applied to the operations S4020 and S4030 according to an exemplary embodiment.

In an operation S4040, the second device 200 provides a notification of a point of time when the first user USER1 will be available for a phone call to the second user USER2. In detail, the second device 200 may obtain a point of time when the first user USER1 will be available for a phone call based on the response message received from the first device 100 and provide a notification of the obtained point of time when the first user USER1 is available for a phone call to the second user USER2. According to an exemplary embodiment, the second device 200 may provide a notification of a point of time when the first user USER1 will be available for a phone call to the second user USER2 at a point of time when a response message is received from the first device 100. According to another exemplary embodiment, the second device 200 may provide a notification of the obtained point of time when the first user USER1 is available for a phone call to the second user USER2 at the point of time when the first user USER1 is available for a phone call.

According to an exemplary embodiment, the second device 200 may estimate a point of time when the first user USER1 will be available for a phone call based on a current situation included in a response message and provide a notification of the estimated point of time when the first user USER1 will be available for a phone call to the second user USER2. For example, if the response message is "I am at a movie theater," the second device 200 may estimate a point of time when the first user USER1 will be available for a phone call based on an estimated playback time of a corresponding movie and provide a notification of the estimated point of time when the first user USER1 will be available for a phone call to the second user USER2.

According to another exemplary embodiment, the second device 200 may estimate a point of time when the first user USER1 will be available for a phone call based on a future situation included in a response message and provide a notification of the estimated point of time when the first user USER1 will be available for a phone call to the second user USER2. For example, if the response message is "I will call you in 30 minutes," the second device 200 may obtain a point of time when the first user USER1 will be available for a phone call and provide a notification of the estimated time point of time when the first user USER1 is available for a phone call to the second user USER2 at the obtained point of time when the first user USER1 will be available for a phone call, that is, when 30 minutes has elapsed from the time point of time when a phone call or a message is transmitted.

In an operation S4050, the second device 200 transmits a phone call or a message to the first device 100. According to an exemplary embodiment, the second device 200 may automatically transmit a phone call or a message to the first device 100 at a point of time when the first user USER1 will be available for a phone call obtained based on a response message. However, exemplary embodiments are not limited thereto. According to another exemplary embodiment, the operation S4050 may be manually performed by the second user USER2.

Figure 41:
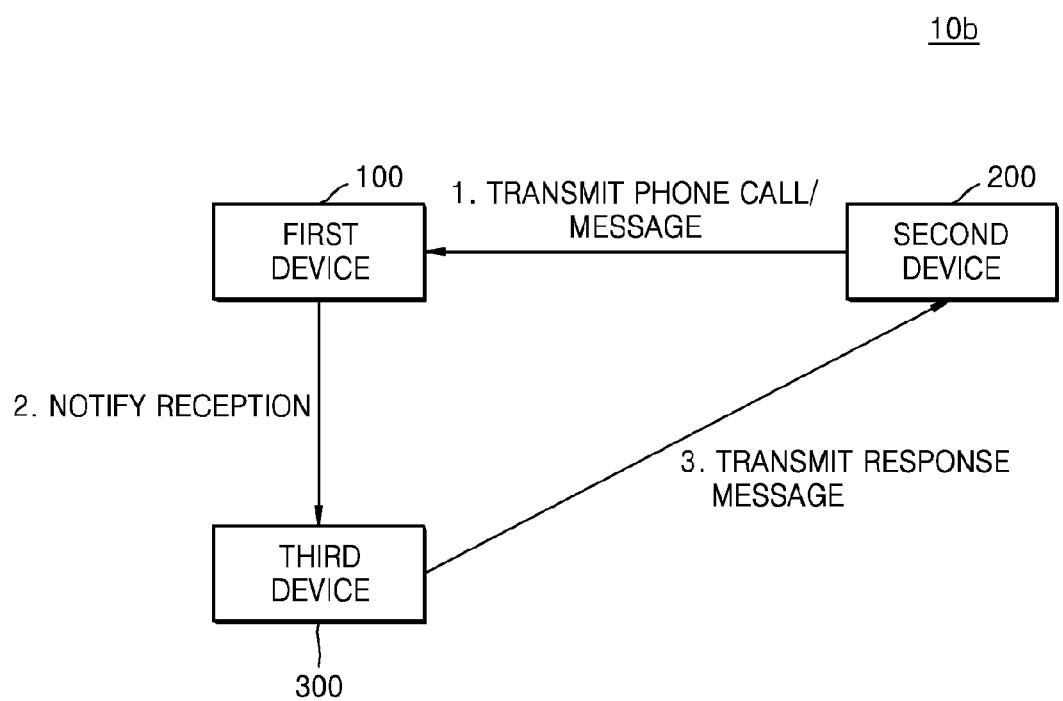
FIG. 41 is a block diagram illustrating a system for performing a response message providing function according to an exemplary embodiment.

FIG. 41 is a block diagram illustrating a system 10b for performing a response message providing function according to an exemplary embodiment.

Referring to FIG. 41, the system 10b may include the first device 100, the second device 200, and the third device 300. Here, the first and second devices 100 and 200 may be substantially similar to the first and second devices 100 and 200 shown in FIG. 1A, and thus descriptions given above with reference to FIG. 1A may also be applied to an exemplary embodiment. According to an exemplary embodiment, the third device 300 may be a wearable device of the first user USER1 and may operate in conjunction with the first device 100.

According to an exemplary embodiment, the second device 200 may transmit a phone call or a message to the first device 100, and the first device 100 may notify reception of the phone call or the message to the third device 300. The third device 300 may generate a response message and transmit the response message to the second device 200.

According to an exemplary embodiment, the third device 300 may generate a response message by using an application that is being currently executed or previously executed on the first device 100. According to another exemplary embodiment, the third device 300 may generate a response message by using an application that is being currently executed or previously executed on the third device 300.

Figure 42:
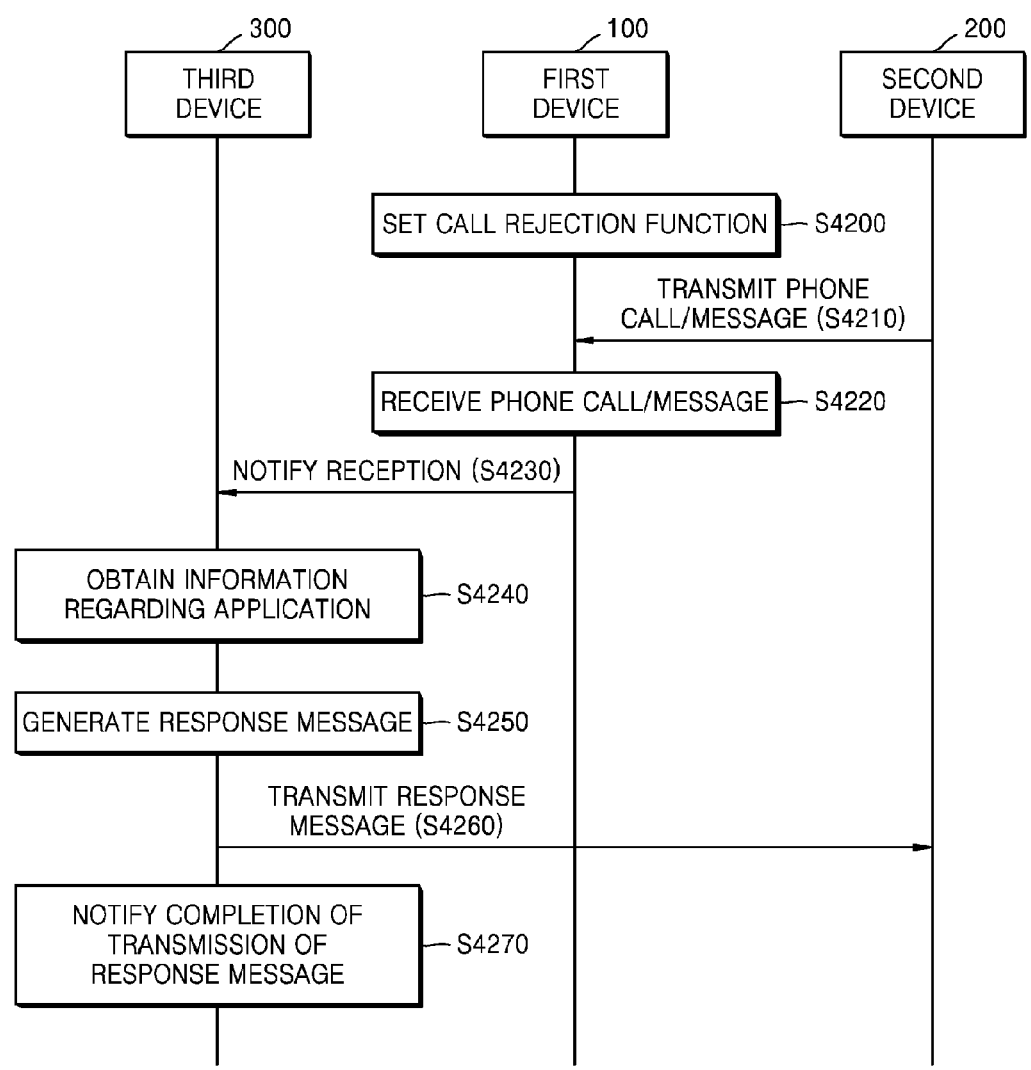
FIG. 42 is a flowchart illustrating examples of operations of first through third devices according to a method of providing a response message according to an exemplary embodiment.

FIG. 42 is a flowchart illustrating examples of operations of the first, second, and third devices 100, 200, and 300 of FIG. 41 according to a method of providing a response message according to an exemplary embodiment.

Referring to FIG. 42, a method of providing a response message according to an exemplary embodiment includes operations that may be chronologically performed by the first, second, and third devices 100, 200, and 300 of FIG. 41. Descriptions given above with respect to the first, second, and third devices 100, 200, and 300 shown in FIG. 41 may also be applied to the method of providing a response message according to an exemplary embodiment.

In an operation S4200, the first device 100 sets up call rejection function. Descriptions given above with reference to FIGS. 7A through 7F may also be applied. In an operation S4210, the second device 200 transmits a phone call or a message to the first device 100. In an operation S4220, the first device 100 receives the phone call or the message from the second device 200.

In an operation S4230, the first device 100 provides a notification of reception of the phone call or the message to the third device 300. For example, the first device 100 may provide a notification of reception to the third device 300 via a wireless communication, such as Bluetooth or Wi-Fi.

In an operation S4240, the third device 300 obtains information regarding an application. In detail, the third device 300 may obtain information regarding an application that is being currently executed or previously executed on the third device 300. Furthermore, the third device 300 may obtain information regarding an application that is being currently executed or previously executed on the first device 100. According to an exemplary embodiment, the first device 100 may provide a notification of reception together with information regarding an application. According to another exemplary embodiment, the third device 300 may request information regarding an application to the first device 100, and the first device 100 may provide the information regarding the application in response thereto.

In an operation S4250, the third device 300 automatically generates a response message. In detail, the third device 300 may automatically generate a response message including at least one of a current situation and a future situation of the first user USER1 based on information regarding an application.

According to an exemplary embodiment, the operations S4240 and S4250 may be performed by a dedicated call rejection application installed on the third device 300. Therefore, when a notification of reception is provided by the first device 100, a call rejection function of a call rejection application installed on the third device 300 may be activated. In detail, an application that is being currently executed or previously executed on the third device 300 may provide information for generating a response message to the call rejection application via an API, and the call rejection application may generate a response message based on the information received from the application that is being currently executed or previously executed.

According to another exemplary embodiment, the operations S4240 and S4250 may be performed by a platform of the third device 300. Therefore, when a notification of reception is provided by the first device 100, the platform of the third device 300 may activate a call rejection function. In detail, an application that is being currently executed or previously executed on the third device 300 may provide information for generating a response message to the platform via an API, and the platform may generate a response message based on the information received from the application that is being currently executed or previously executed.

In an operation S4260, the third device 300 transmits a response message to the second device 200. Here, the response message may be transmitted via at least one of a SMS, a social network service (SNS), such as Facebook or Twitter, a chatting service, such as KakaoTalk or Line, or e-mail.

In an operation S4270, the third device 300 provides a notification of completion of transmitting the response message to the first user USER1. Therefore, the first user USER1 may learn that a phone call or a message is received from the second device 200 and a response message automatically generated in correspondence thereto is transmitted to the second device 200.

Figure 43:
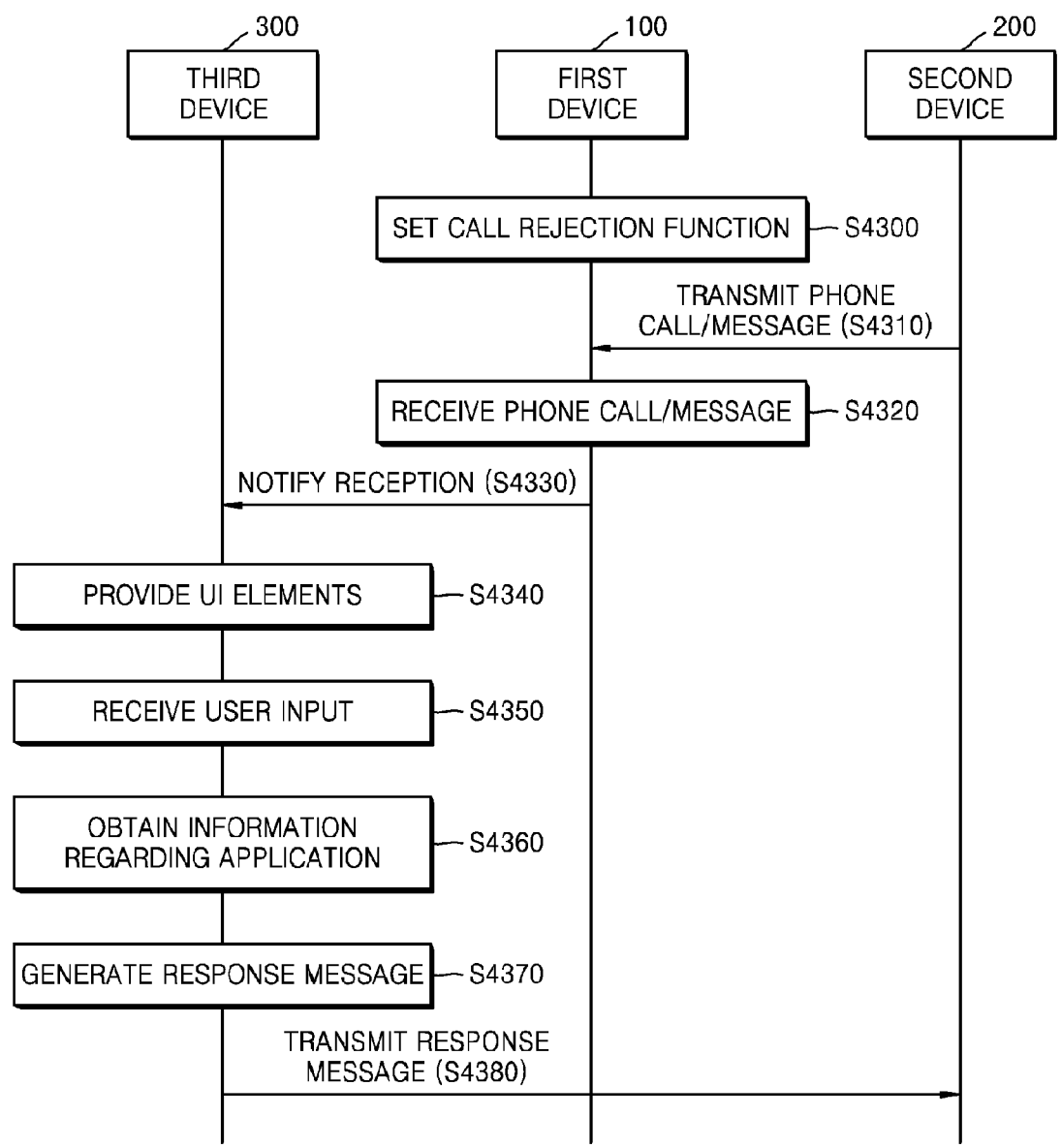
FIG. 43 is a flowchart illustrating other examples of operations of the first through third devices according to a method of providing a response message according to an exemplary embodiment.

FIG. 43 is a flowchart illustrating other examples of operations of the first, second, and third devices 100, 200, and 300 according to a method of providing a response message according to an exemplary embodiment.

Referring to FIG. 43, a method of providing a response message according to an exemplary embodiment is a modified embodiment of the method of providing a response message of FIG. 42 and includes operations that may be chronologically performed by the first, second, and third devices 100, 200, and 300 of FIG. 41. Descriptions given above with respect to the first, second, and third devices 100, 200, and 300 shown in FIG. 41 may also be applied to the method of providing a response message according to an exemplary embodiment.

In an operation S4300, the first device 100 sets up a call rejection function. In an operation S4310, the second device 200 transmits a phone call or a message to the first device 100. In an operation S4320, the first device 100 receives the phone call or the message from the second device 200. In an operation S4330, the first device 100 provides a notification of reception of the phone call or the message to the third device 300.

In an operation S4340, the third device 300 provides UI elements corresponding to the received phone call or the received message. For example, when a notification of reception is received from the first device 100, the third device 300 may display UI elements corresponding to a phone call or a message on a display screen of the third device 300. As another example, when a notification of reception is received from the first device 100, the third device 300 may output UI elements corresponding to an incoming call via a speaker of the third device 300.

Here, the UI element may display options with respect to the received incoming call including allow, reject, or transmit a response message with respect to a received phone call. Furthermore, the UI element may display options with respect to the received incoming call including allow, reject, or transmit a response message with respect to a received message.

In an operation S4350, the third device 300 receives a user input for selecting to reject/decline or to transmit a response message with respect to a phone call or message. According to an exemplary embodiment, the first user USER1 may select a UI element corresponding to transmission of a response message from among UI elements displayed on the display screen of the third device 300, and the third device 300 may receive a user input corresponding to the selection via a UI. According to another exemplary embodiment, the first user USER1 may select a UI element corresponding to rejection/declination from among UI elements displayed on the display screen of the third device 300, and the third device 300 may receive a user input corresponding to the selection via a UI.

According to an exemplary embodiment, a user input may be detected by the third device 300 based on a gesture or a movement of a user. According to another exemplary embodiment, a user input may be received by the third device 300 based on a user's voice.

In an operation S4360, the third device 300 obtains information regarding an application. In detail, the third device 300 may obtain information regarding application that is being currently executed or previously executed on the third device 300 or the first device 100.

In an operation S4370, the third device 300 generates a response message based on information regarding an application obtained by the third device 300. In detail, the third device 300 may automatically generate a response message including at least one of a current situation and a future situation of the first user USER1 based on information regarding an application.

According to an exemplary embodiment, the third device 300 may generate a response message list including a plurality of response message candidates and display the response message list on the display screen of the third device 300. Here, by receiving a user input based on selection of the first user USER1, the third device 300 may provide a selected response message. In other words, a plurality of response message candidates are automatically generated by the third device 300, and one from among the plurality of response message candidates may be manually selected by the first user USER1.

According to another exemplary embodiment, the third device 300 may generate a plurality of response message candidates, select one from among the generated response message candidates based on a history of transmitting a response message, and provide a selected response message. In other words, a plurality of response message candidates may be automatically generated by the third device 300, and one from among the plurality of response message candidates may be automatically selected by the third device 300.

According to another exemplary embodiment, the third device 300 may generate a single response message based on a history of transmitting a response message and provide the generated response message. In other words, a response message may be automatically generated by the third device 300.

In an operation S4380, the third device 300 transmits a response message to the second device 200. Here, the response message may be transmitted via at least one of a SMS, a social network service (SNS), such as Facebook or Twitter, a chatting service, such as KakaoTalk or Line, or e-mail.

Figure 44:
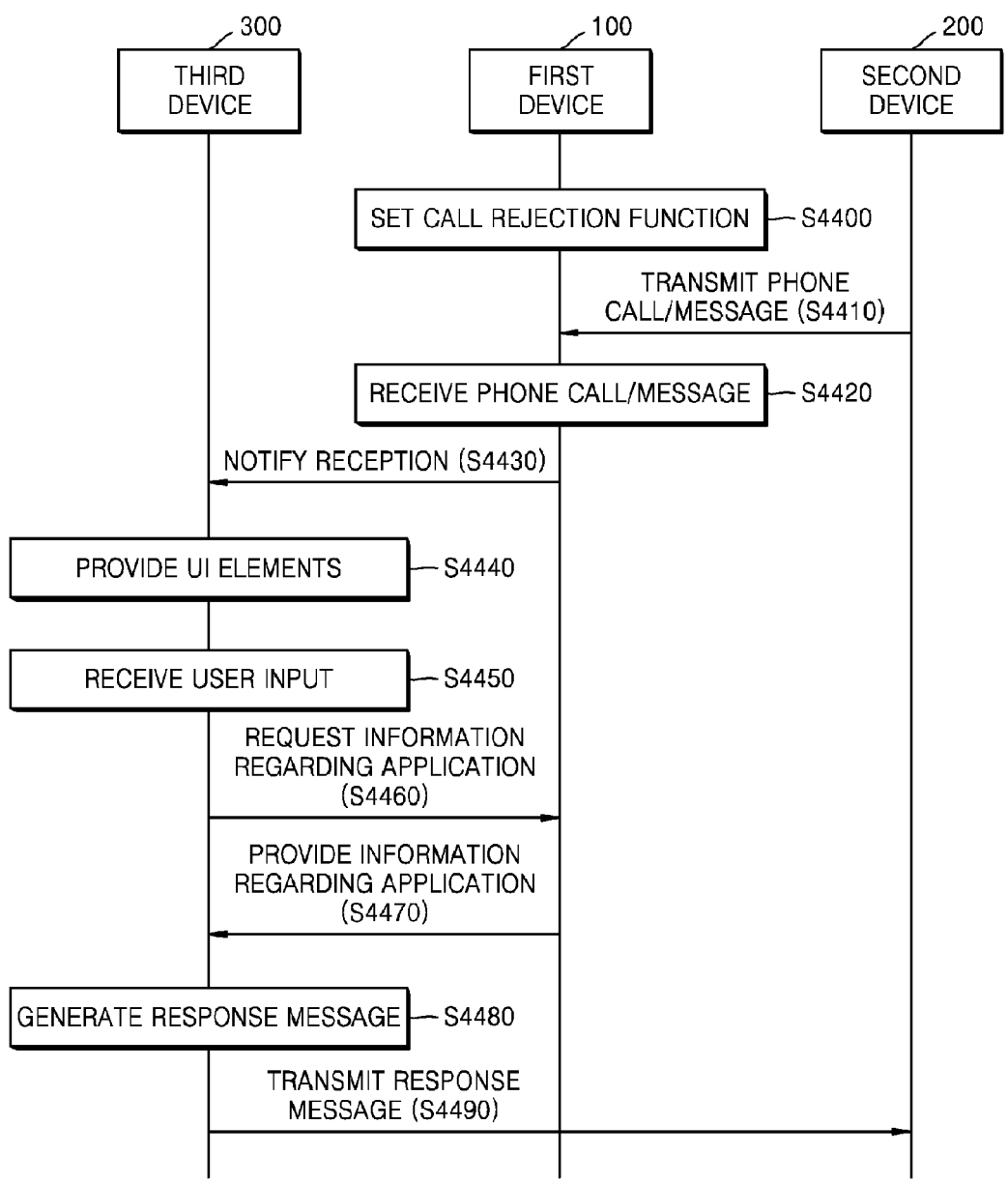
FIG. 44 is a flowchart illustrating other examples of operations of the first through third devices according to a method of providing a response message according to an exemplary embodiment.

FIG. 44 is a flowchart illustrating other examples of operations of the first, second, and third devices 100, 200, and 300 according to a method of providing a response message according to an exemplary embodiment.

Referring to FIG. 44, a method of providing a response message according to an exemplary embodiment is a modified embodiment of the method of providing a response message of FIG. 43 and includes operations that may be chronologically performed by the first, second, and third devices 100, 200, and 300. Descriptions given above with reference to FIGS. 41 through 43 may also be applied to the method of providing a response message according to an exemplary embodiment.

In an operation S4400, the first device 100 sets up a call rejection function. In an operation S4410, the second device 200 transmits a phone call or a message to the first device 100. In an operation S4420, the first device 100 receives the phone call or the message from the second device 200. In an operation S4430, the first device 100 provides a notification of reception of the phone call or the message to the third device 300. In an operation S4440, the third device 300 provides UI elements corresponding to the received phone call or the received message. In an operation S4450, the third device 300 receives a user input for selecting to reject/decline or to transmit a response message with respect to a phone call or selecting to transmit a response message with respect to a message.

In an operation S4460, the third device 300 requests information regarding an application to the first device 100. In an operation S4470, the first device 100 provides information regarding an application that is being currently executed or previously executed to the third device 300. Here, the information regarding an application may be information regarding an application that is being currently executed or previously executed on the first device 100.

In an operation S4480, the third device 300 generates a response message based on the information regarding an application provided by the first device 100. In detail, the third device 300 may generate a response message, which is based on the information regarding an application provided by the first device 100 and includes at least one of a current situation and a future situation of the first user USER1.

In an operation S4490, the third device 300 transmits the response message to the second device 200.

Figure 45:
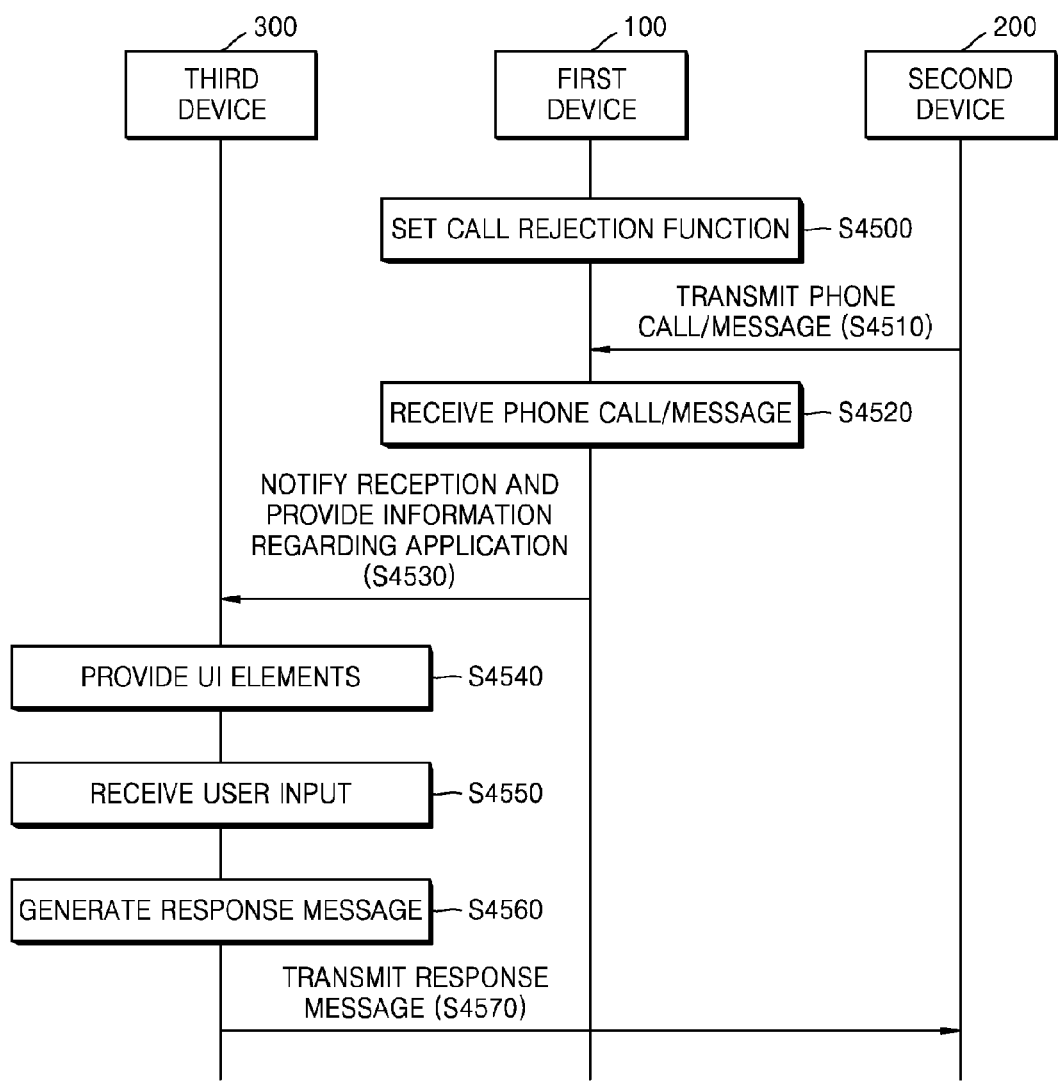
FIG. 45 is a flowchart illustrating other examples of operations of the first through third devices according to a method of providing a response message according to an exemplary embodiment.

FIG. 45 is a flowchart illustrating other examples of operations of the first, second and third devices 100, 200, and 300 according to a method of providing a response message according to an exemplary embodiment.

Referring to FIG. 45, a method of providing a response message according to an exemplary embodiment is a modified embodiment of the method of providing a response message of FIG. 44 and includes operations that may be chronologically performed by the first, second, and third devices 100, 200, and 300 of FIG. 41. Descriptions given above with reference to FIGS. 41 through 44 may also be applied to the method of providing a response message according to an exemplary embodiment.

In an operation S4500, the first device 100 sets up a call rejection function. In an operation S4510, the second device 200 transmits a phone call or a message to the first device 100. In an operation S4520, the first device 100 receives the phone call or the message from the second device 200.

In an operation S4530, the first device 100 provides a notification of reception of the phone call or the message and information regarding an application to the third device 300. Here, the information regarding an application may be information regarding an application that is being currently executed or was previously executed on the first device 100.

In an operation S4540, the third device 300 provides UI elements corresponding to the received phone call or the received message. In an operation S4550, the third device 300 receives a user input for selecting to reject/decline or to transmit a response message with respect to a phone call or selecting to transmit a response message with respect to a message.

In an operation S4560, the third device 300 generates a response message based on the information regarding an application provided by the first device 100. In detail, the third device 300 may generate a response message, which is based on the information regarding an application provided by the first device 100 and includes at least one of a current situation and a future situation of the first user USER1.

In an operation S4570, the third device 300 transmits the response message to the second device 200.

Figure 46:
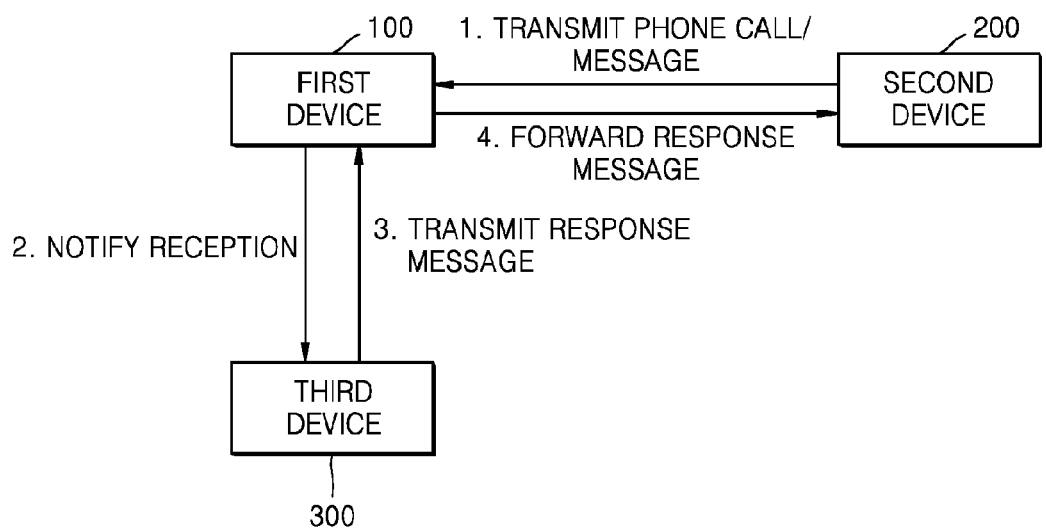
FIG. 46 is a block diagram illustrating another system for performing a response message providing function according to an exemplary embodiment.

FIG. 46 is a block diagram illustrating a system 10c for performing a response message providing function according to an exemplary embodiment.

Referring to FIG. 46, the system 10c may include the first device 100, the second device 200, and the third device 300. Here, the first and second devices 100 and 200 may be substantially similar to the first and second devices 100 and 200 shown in FIG. 1A, and thus descriptions thereof given above with reference to FIG. 1A may also be applied. According to an exemplary embodiment, the third device 300 may be a wearable device of the first user USER1 and may operate in conjunction with the first device 100.

According to an exemplary embodiment, the second device 200 may transmit a phone call or a message to the first device 100, and the first device 100 may notify reception of a phone call or a message to the third device 300. The third device 300 may transmit a response message to the first device 100, and the first device 100 may transmit the response message received from the third device 300 to the second device 200.

Therefore, according to an exemplary embodiment, an operation for generating a response message may be performed by the third device 300, and the operation for generating a response message at the third device 300 described above with reference to FIGS. 42 through 45 may be applied. However, according to an exemplary embodiment, unlike in FIGS. 42 through 45, the third device 300 may not transmit a response message directly to the second device 200, and the third device 300 may transmit a response message to the second device 200 via the first device 100.

Figure 47:
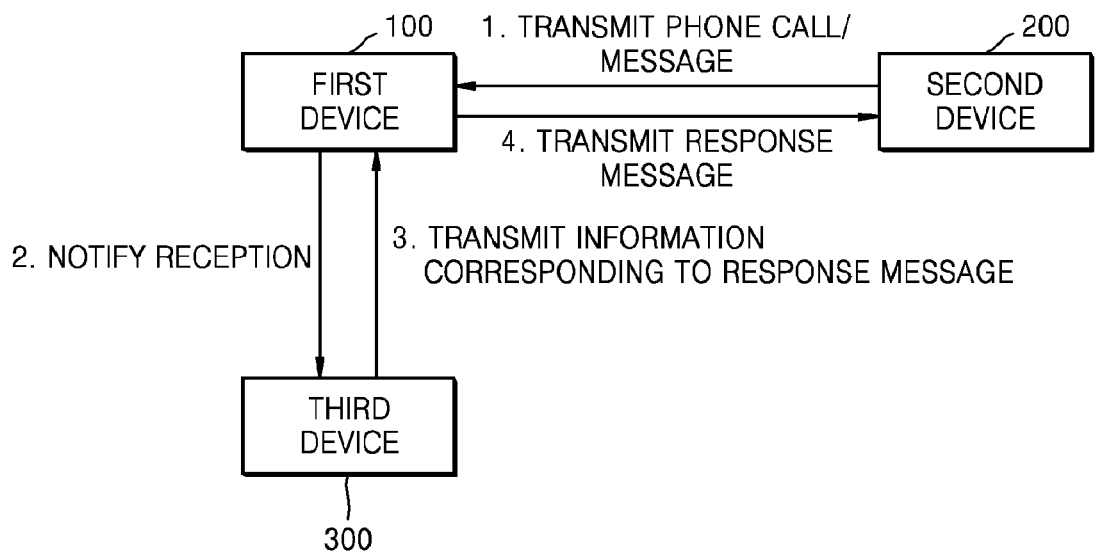
FIG. 47 is a block diagram illustrating another system for performing a response message providing function according to an exemplary embodiment.

FIG. 47 is a block diagram illustrating a system 10d for performing a response message providing function according to an exemplary embodiment.

Referring to FIG. 47, the system 10d may include the first device 100, the second device 200, and the third device 300. Here, the first and second devices 100 and 200 may be substantially similar to the first and second devices 100 and 200 shown in FIG. 1A, and thus descriptions thereof given above with reference to FIG. 1A may also be applied. According to an exemplary embodiment, the third device 300 may be a wearable device of the first user USER1 and may operate in conjunction with the first device 100.

According to an exemplary embodiment, the second device 200 may transmit a phone call or a message to the first device 100, and the first device 100 may notify reception of a phone call or a message to the third device 300. The third device 300 may transmit a code corresponding to a response message, data corresponding to a response message, or information corresponding to a response message to the first device 100. The first device 100 may generate a response message based on the codes, the data, or the information received from the third device 300 and transmit the generated response message to the second device 200. As described above, an operation for generating information included in a response message may be performed at the third device 300, and the operation for generating a response message at the third device 300 described above with reference to FIGS. 42 through 45 may be applied. However, according to an exemplary embodiment, unlike in FIGS. 42 through 45, the third device 300 may not directly generate a response message and may generate a code corresponding to a response message, data corresponding to a response message, or information corresponding to a response message. Next, the third device 300 may transmit the generated codes, the generated data, or the generated information to the first device 100. The first device 100 may generate a response message based on the codes, the data, or the information received from the third device 300 and transmit the generated response message to the second device 200.

Figure 48:
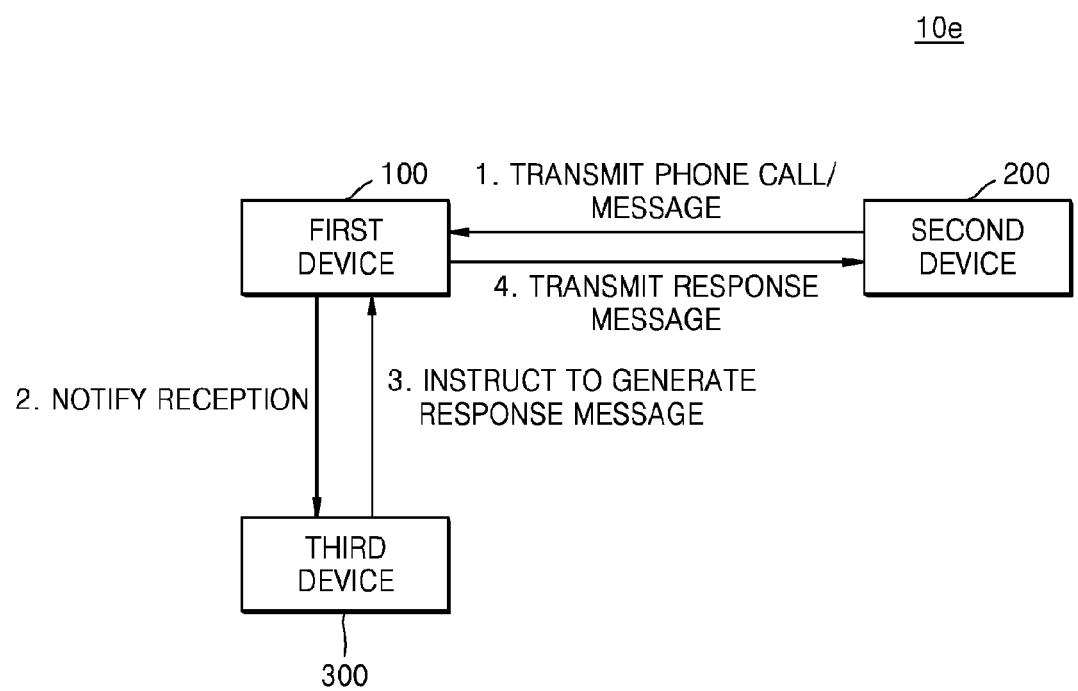
FIG. 48 is a block diagram illustrating another system for performing a response message providing function according to an exemplary embodiment.

FIG. 48 is a block diagram illustrating a system 10e for performing a response message providing function according to an exemplary embodiment.

Referring to FIG. 48, the system 10e may include the first device 100, the second device 200, and the third device 300. Here, the first and second devices 100 and 200 may be substantially similar to the first and second devices 100 and 200 shown in FIG. 1A, and thus descriptions thereof given above with reference to FIG. 1A may also be applied. According to an exemplary embodiment, the third device 300 may be a wearable device of the first user USER1 and may operate in conjunction with the first device 100.

According to an exemplary embodiment, the second device 200 may transmit a phone call or a message to the first device 100, and the first device 100 may notify reception of a phone call or a message to the third device 300. The third device 300 may instruct the first device 100 to generate a response message. The first device 100 may generate a response message and transmit the generated response message to the second device 200.

According to an exemplary embodiment, the first device 100 may generate a response message by using an application that is being currently executed or previously executed on the first device 100. According to another exemplary embodiment, the first device 100 may generate a response message by using an application that is being currently executed or previously executed on the third device 300.

Figure 49:
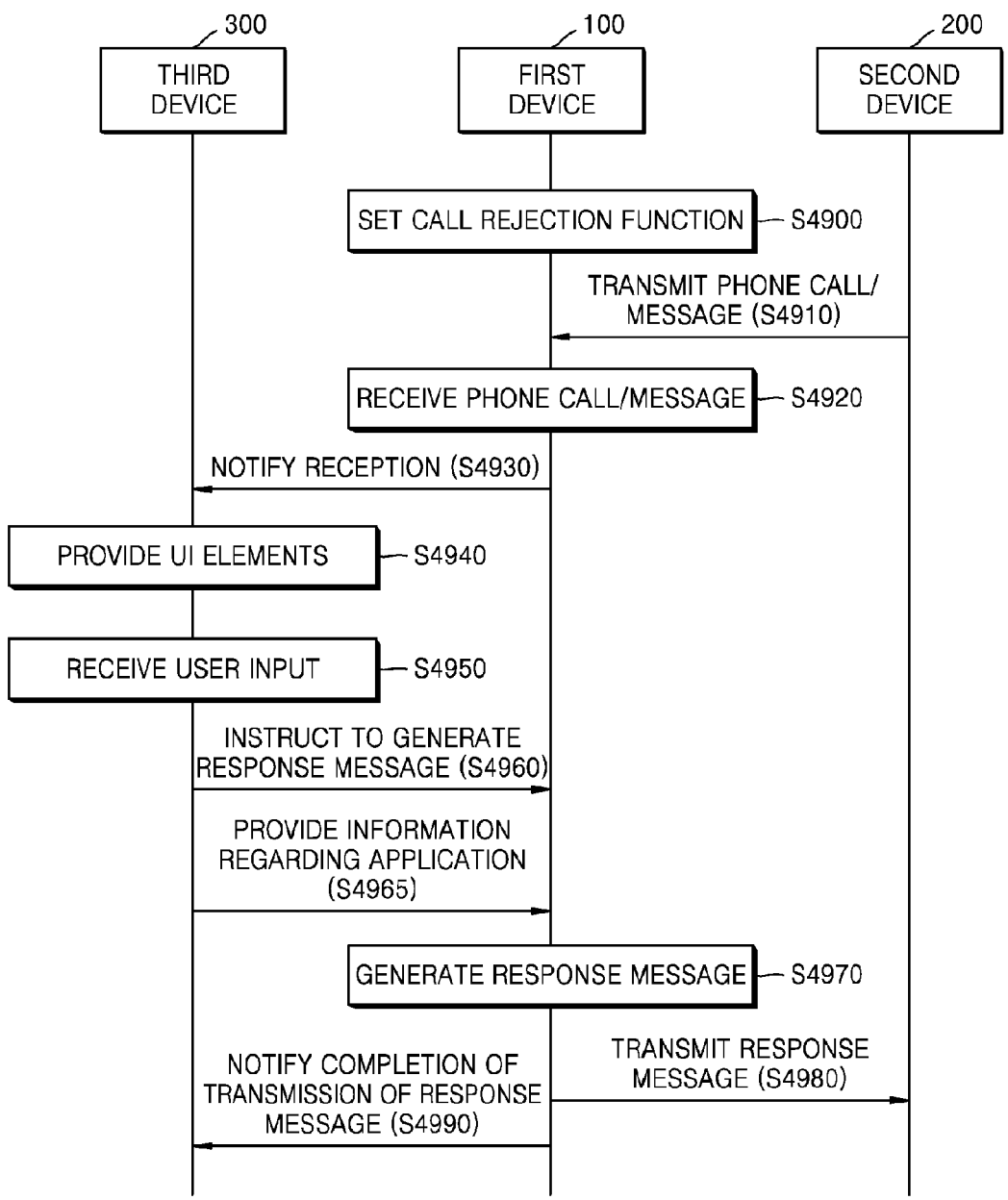
FIG. 49 is a flowchart illustrating examples of operations of first through third devices according to a method of providing a response message according to an exemplary embodiment.

FIG. 49 is a flowchart illustrating examples of operations of the first, second, and third devices 100, 200, and 300 of FIG. 48 according to a method of providing a response message according to an exemplary embodiment.

Referring to FIG. 49, a method of providing a response message according to an exemplary embodiment includes operations that may be chronologically performed by the first, second, and third devices 100, 200, and 300 of FIG. 48. Therefore, even if omitted below, descriptions given above with respect to the first, second, and third devices 100, 200, and 300 shown in FIG. 48 may also be applied to the method of providing a response message according to an exemplary embodiment.

In an operation S4900, the first device 100 sets up a call rejection function. Any of the descriptions given above with reference to FIGS. 7A through 7F may also be applied to the operation for setting up a call rejection function according to an exemplary embodiment. In an operation S4910, the second device 200 transmits a phone call or a message to the first device 100. In an operation S4920, the first device 100 receives a phone call or a message from the second device 200.

In an operation S4930, the first device 100 provides a notification of reception of the phone call or the message to the third device 300. For example, the first device 100 may provide a notification of reception to the third device 300 via a wireless communication, such as Bluetooth or Wi-Fi.

In an operation S4940, the third device 300 provides UI elements corresponding to the received phone call or the received message. For example, when a notification of reception is received from the first device 100, the third device 300 may display UI elements corresponding to a phone call or a message on a display screen of the third device 300. As another example, when a notification of reception is received from the first device 100, the third device 300 may output UI elements corresponding to an incoming call via a speaker of the third device 300.

In an operation S4950, the third device 300 receives a user input for selecting to reject/decline or to transmit a response message with respect to a phone call or selecting to transmit a response message with respect to a message. According to an exemplary embodiment, the first user USER1 may select a UI element corresponding to transmission of a response message from among UI elements displayed on the display screen of the third device 300, and the third device 300 may receive a user input corresponding to the selection via a UI. According to another exemplary embodiment, the first user USER1 may select a UI element corresponding to rejection/declination from among UI elements displayed on the display screen of the third device 300, and the third device 300 may receive a user input corresponding to the selection via a UI.

According to an exemplary embodiment, a user input may be detected by the third device 300 based on a gesture or a movement of a user. According to another exemplary embodiment, a user input may be received by the third device 300 based on a user's voice.

In an operation S4960, the third device 300 may instruct the first device 100 to generate a response message. In an operation S4965, the third device 300 may provide information regarding an application for generating a response message to the first device 100. According to another exemplary embodiment, the operation S4965 may be omitted.

In an operation S4970, the first device 100 may generate a response message including at least one of a current situation and a future situation of the first user USER1, based on information regarding an application that is being currently executed or previously executed on the first device 100. In detail, a response message may be generated based in information regarding an application being executed during the operations S4920 through S4965 or information regarding an application previously executed before the operations S4920 through S4965.

Furthermore, the first device 100 may generate a response message including at least one of a current situation and a future situation based on information regarding an application provided by the third device 300. In detail, a response message may be generated based in information regarding an application being executed on the third device 300 during the operations S4920 through S4965 or information regarding an application previously executed on the third device 300 before the operations S4920 through S4965.

According to an exemplary embodiment, the first device 100 may generate a response message list including a plurality of response message candidates, select at least one from among the generated response message candidates based on a history of transmitting a response message, and provide the selected response message. In other words, a plurality of response message candidates are automatically generated by the first device 100, and at least one from among the plurality of response message candidates may be automatically selected by the first device 100.

According to another exemplary embodiment, the first device 100 may generate a single response message based on a history of transmitting a response message and provide the generated response message. In other words, a response message may be automatically generated by the first device 100.

According to another exemplary embodiment, the first device 100 may generate a plurality of response message candidates and may provide the generated response message candidates to the third device 300. The response message candidates provided to the third device 300 may be displayed on the display screen of the third device 300. Next, a user input based on a selection of the first user USER1 is received, and thus the third device 300 may transmit a selected response message to the first device 100. In other words, a plurality of response message candidates are automatically generated by the first device 100, and one from among the plurality of response message candidates may be manually selected by the first user USER1 via the third device 300.

In an operation S4980, the first device 100 transmits a response message to the second device 200. In an operation S4990, the first device 100 notifies the third device 300 completion of a message transmission.

Figure 50:
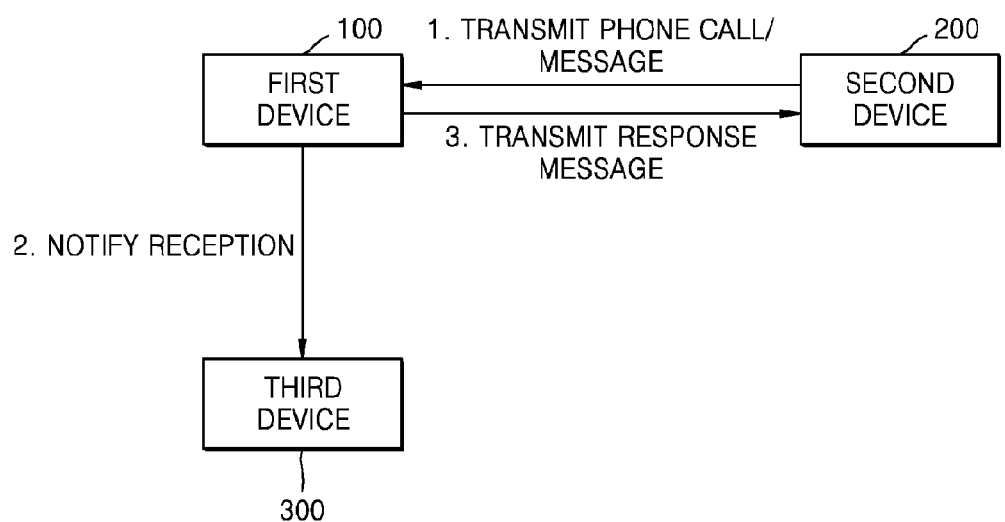
FIG. 50 is a block diagram illustrating another system for performing a response message providing function according to an exemplary embodiment.

FIG. 50 is a block diagram illustrating a system 10f for performing a response message providing function according to an exemplary embodiment.

Referring to FIG. 50, the system 10f may include the first device 100, the second device 200, and the third device 300. Here, the first and second devices 100 and 200 may be substantially similar to the first and second devices 100 and 200 shown in FIG. 1A, and thus descriptions thereof given above with reference to FIG. 1A may also be applied. According to an exemplary embodiment, the third device 300 may be a wearable device of the first user USER1 and may operate in conjunction with the first device 100.

According to an exemplary embodiment, the second device 200 may transmit a phone call or a message to the first device 100, and the first device 100 may notify reception of reject call message providing system to the third device 300. Next, the first device 100 may generate a response message and transmit the response message to the second device 200.

According to an exemplary embodiment, the first device 100 may generate a response message by using an application that is being currently executed or previously executed on the first device 100. According to another exemplary embodiment, the first device 100 may generate a response message by using an application that is being currently executed or previously executed on the third device 300.

Figure 51:
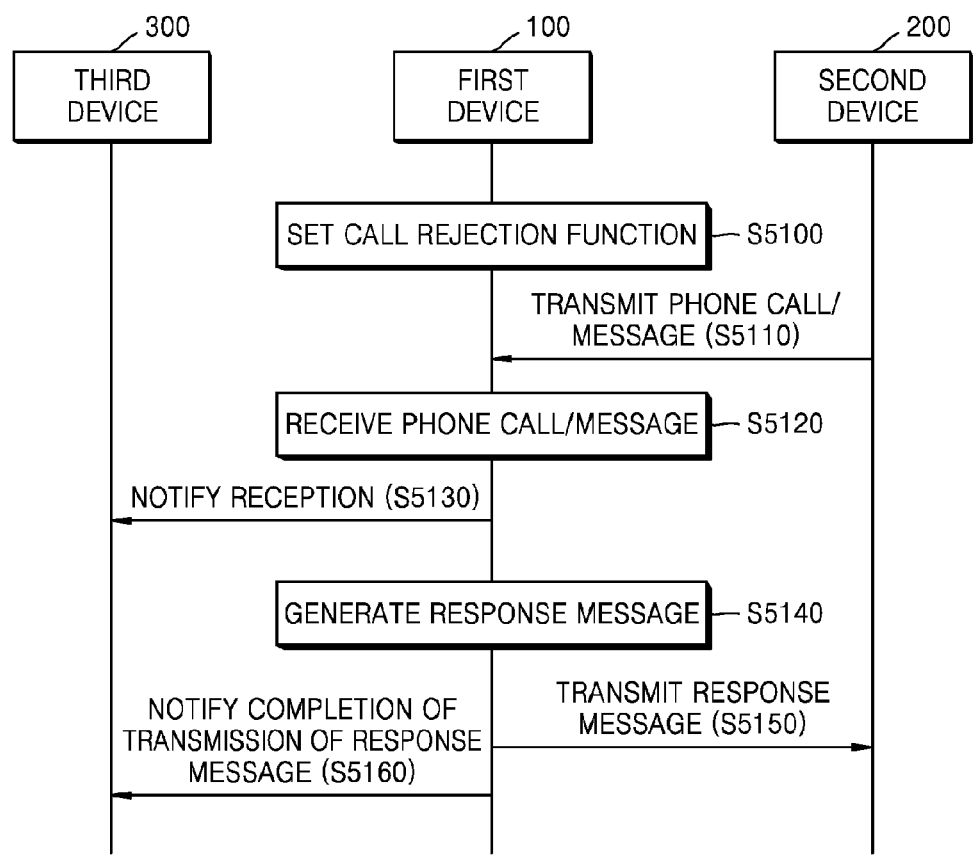
FIG. 51 is a flowchart illustrating examples of operations of first through third devices according to a method of providing a response message according to an exemplary embodiment.

FIG. 51 is a flowchart illustrating examples of operations of the first, second, and third devices 100, 200, and 300 of FIG. 50 according to a method of providing a response message according to an exemplary embodiment.

Referring to FIG. 51, a method of providing a response message according to an exemplary embodiment includes operations that are chronologically performed by the first, second, and third devices 100, 200, and 300 of FIG. 50. Therefore, even if omitted below, descriptions given above with respect to the first, second, and third devices 100, 200, and 300 shown in FIG. 50 may also be applied to the method of providing a response message according to an exemplary embodiment.

In an operation S5100, the first device 100 sets up a call rejection function. Any of the descriptions given above with reference to FIGS. 7A through 7F may also be applied to the operation for setting up a call rejection function according to an exemplary embodiment. In an operation S5110, the second device 200 transmits a phone call or a message to the first device 100. In an operation S5120, the first device 100 receives a phone call or a message from the second device 200.

In an operation S5130, the first device 100 provides a notification of reception of the phone call or the message to the third device 300. For example, the first device 100 may provide a notification of reception to the third device 300 via a wireless communication, such as Bluetooth or Wi-Fi.

In an operation S5140, the first device 100 automatically generates a response message. In detail, the first device 100 may generate a response message including at least one of a current situation and a future situation of the first user USER1 based on information provided by an application that is executed in the operation S5120 or previously executed on the first device 100.

According to another exemplary embodiment, the first device 100 may request information regarding an application from the third device 300, and the third device 300 may provide the information regarding an application to the first device 100 in response thereto. Here, the first device 100 may generate a response message including at least one of a current situation and a future situation of the first user USER1 based on the information regarding an application provided by the third device 300. In detail, the first device 100 may generate a response message based on information regarding an application that is executed on the third device 300 in the operation S120 or executed before the operation S5120.

In an operation S5150, the first device 100 transmits a response message to the second device 200. In an operation S5160, the first device 100 notifies completion of transmission of the response message to the third device 300.

Figure 52:
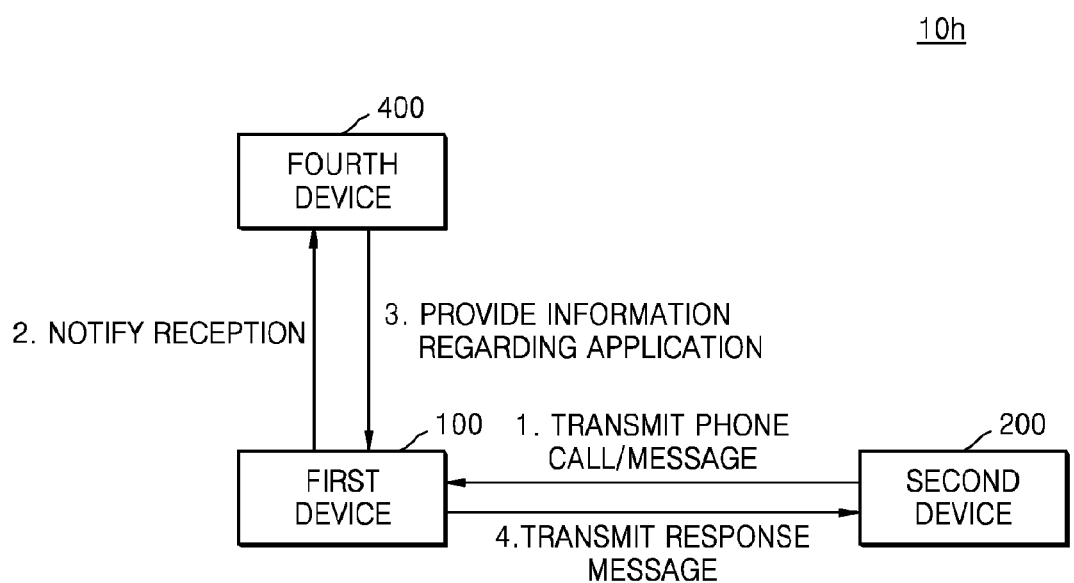
FIG. 52 is a block diagram illustrating another system for performing a response message providing function according to an exemplary embodiment.

FIG. 52 is a block diagram illustrating a system 10h for performing a response message providing function according to an exemplary embodiment.

Referring to FIG. 52, the system 10h may include the first device 100, the second device 200, and a fourth device 400. Here, the first and second devices 100 and 200 may be substantially similar to the first and second devices 100 and 200 shown in FIG. 1A, and thus descriptions thereof given above may also be applied. According to an exemplary embodiment, the fourth device 400 may be an electronic device which is capable of communicating with the first device 100 and is located near the first user USER1. For example, the fourth device 400 may be a smart TV on which an application may be executed. As another example, the fourth device 400 may be a navigation device.

According to an exemplary embodiment, the second device 200 may transmit a phone call or a message to the first device 100, and the first device 100 may notify reception of the phone call or the message to the fourth device 400. Next, the fourth device 400 may provide information regarding an application to the first device 100, and the first device 100 may generate a response message based on the received information regarding an application and transmit the response message to the second device 200.

According to an exemplary embodiment, the first device 100 may generate a response message by using an application that is being currently executed or previously executed on the first device 100. According to another exemplary embodiment, the first device 100 may generate a response message by using an application that is being currently executed or previously executed on the fourth device 400.

Figure 53:
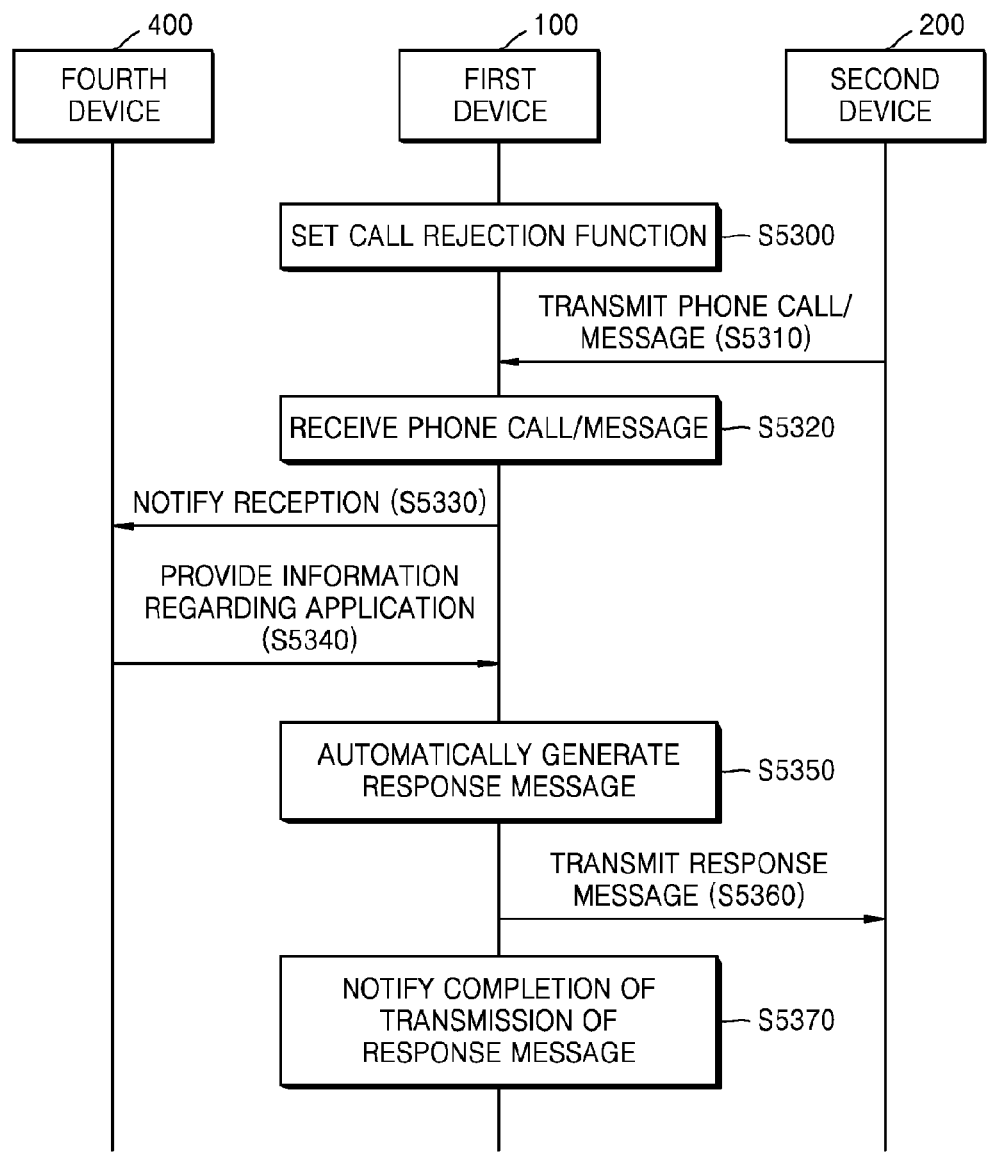
FIG. 53 is a flowchart illustrating examples of operations of first, second and fourth devices according to a method of providing a response message according to an exemplary embodiment.

FIG. 53 is a flowchart illustrating examples of operations of the first, second and fourth devices 100, 200, and 400 of FIG. 52 according to a method of providing a response message according to an exemplary embodiment.

Referring to FIG. 53, a method of providing a response message according to an exemplary embodiment includes operations that are chronologically performed by the first, second, and fourth devices 100, 200, and 400 of FIG. 52. Therefore, descriptions given above with respect to the first, second and fourth devices 100, 200, and 400 shown in FIG. 52 may also be applied to the method of providing a response message according to an exemplary embodiment.

In an operation S5300, the first device 100 sets up a call rejection function. Any of the descriptions given above with reference to FIGS. 7A through 7F may also be applied to the operation for setting up a call rejection function according to an exemplary embodiment. In an operation S5310, the second device 200 transmits a phone call or a message to the first device 100. In an operation S5320, the first device 100 receives a phone call or a message from the second device 200.

In an operation S5330, the first device 100 provides a notification of reception of the phone call or the message to the fourth device 400. For example, the first device 100 may provide a notification of reception to the fourth device 400 via a wireless communication, such as Bluetooth or Wi-Fi.

In an operation S5340, the fourth device 400 provides information regarding an application to the first device 100. For example, if the fourth device 400 is a smart TV, the fourth device 400 may provide information regarding an application that is being currently executed or previously executed on the smart TV to the first device 100. For example, the first user USER1 may execute a fitness application on the smart TV and exercise according to the fitness application. According to another exemplary embodiment, if the fourth device 400 is a navigation device, the fourth device 400 may provide information regarding an application that is being currently executed or previously executed on the navigation device to the first device 100. For example, the fourth device 400 may provide information regarding a point of time when the first user USER1 will be available for responding currently driving and an estimated driving time to a destination to the first device 100.

In an operation S5350, the first device 100 automatically generates a response message. In detail, the first device 100 may generate a response message including at least one of a current situation and a future situation of the first user USER1 based on information provided by an application that is executed in the operation S5320 or previously executed on the first device 100.

According to another exemplary embodiment, the first device 100 may automatically generate a response message including at least one of a current situation and a future situation of the first user USER1 based on information regarding an application provided by the fourth device 400. In detail, the first device 100 may generate a response message based on information regarding an application that is executed on the fourth device 400 in operation S5320 or executed before operation S5320.

In an operation S5360, the first device 100 transmits a response message to the second device 200. In an operation S5370, the first device 100 notifies completion of transmission of the response message to the first user USER1.

Figure 54:
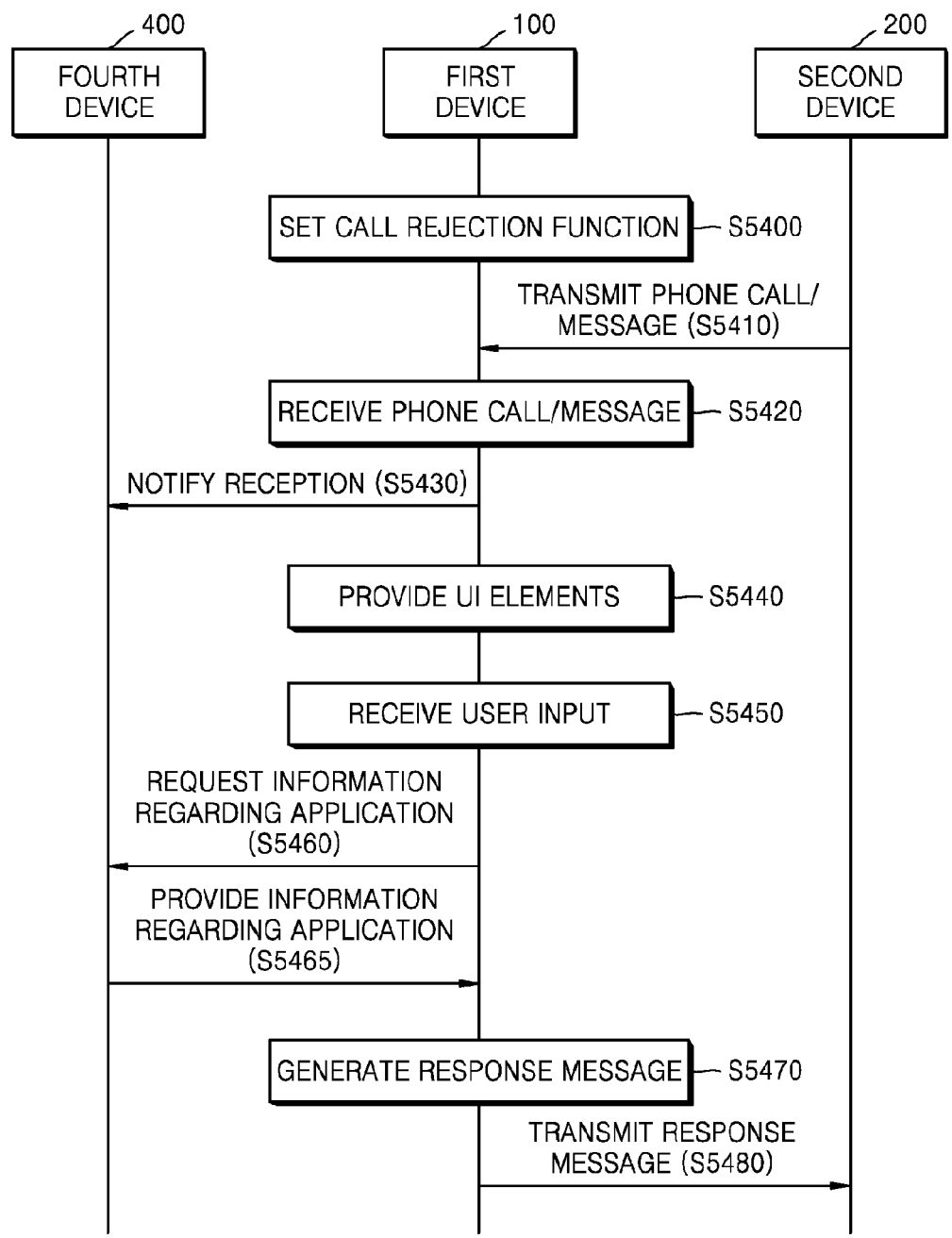
FIG. 54 is a flowchart illustrating other examples of operations of the first, second and fourth devices according to a method of providing a response message according to an exemplary embodiment.

FIG. 54 is a flowchart illustrating other examples of operations of the first, second and fourth devices 100, 200, and 400 of FIG. 52 according to a method of providing a response message according to an exemplary embodiment.

Referring to FIG. 54, a method of providing a response message according to an exemplary embodiment is a modified embodiment of the method of providing a response message of FIG. 53 and includes operations that may be chronologically performed by the first, second and fourth devices 100, 200, and 400 of FIG. 52. Therefore, descriptions given above with reference to FIGS. 52 and 53 may also be applied to the method of providing a response message according to an exemplary embodiment.

In an operation S5400, the first device 100 sets up a call rejection function. In an operation S5410, the second device 200 transmits a phone call or a message to the first device 100. In an operation S5420, the first device 100 receives the phone call or the message from the second device 200. In an operation S5430, the first device 100 provides a notification of reception of the phone call or the message and information regarding an application to the fourth device 400.

In an operation S5440, the first device 100 provides UI elements corresponding to the received phone call or the received message. In an operation S5450, the first device 100 receives a user input for selecting to reject/decline or to transmit a response message with respect to a phone call or selecting to transmit a response message with respect to a message.

In an operation S5460, the first device 100 requests information regarding an application from the fourth device 400. In an operation S5465, the fourth device 400 provides information regarding an application to the first device 100. According to an exemplary embodiment, if the fourth device 400 is a smart TV, the fourth device 400 may provide information regarding an application that is being currently executed or previously executed on the smart TV to the first device 100. For example, the first user USER1 may execute a fitness application on the smart TV and exercise according to the fitness application. According to another exemplary embodiment, if the fourth device 400 is a navigation device, the fourth device 400 may provide information regarding an application that is being currently executed or previously executed on the navigation device to the first device 100. For example, the fourth device 400 may provide information regarding a point of time when the first user USER1 will be available to respond to an incoming call based on a current situation of the first user USER1 who is currently driving and an estimated driving time to a destination to the first device 100.

In an operation S5470, the first device 100 generates a response message. In detail, the first device 100 may generate a response message including at least one of a current situation and a future situation of the first user USER1 based on information provided by an application that is executed in the operations S5420 through S5466 or previously executed on the first device 100.

According to another exemplary embodiment, the first device 100 may generate a response message including at least one of a current situation and a future situation of the first user USER1 based on information regarding an application provided by the fourth device 400. In detail, the first device 100 may generate a response message based on information regarding an application that is executed on the fourth device 400 in the operations S5420 through S5465 or executed before the operations S5320 through S5465.

In an operation S5480, the first device 100 transmits a response message to the second device 200.

Figure 55:
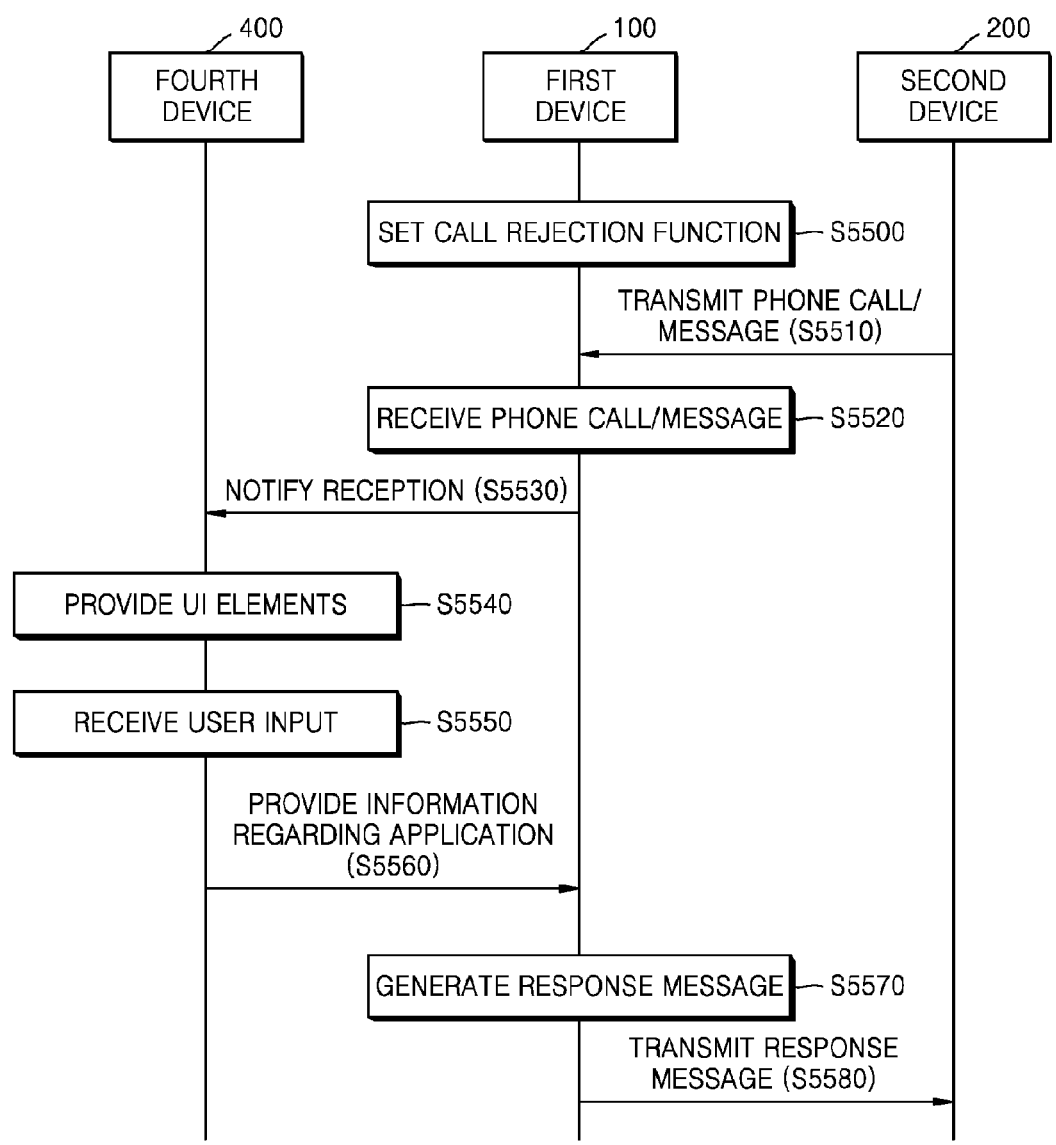
FIG. 55 is a flowchart illustrating other examples of operations of the first, second and fourth devices according to a method of providing a response message according to an exemplary embodiment.

FIG. 55 is a flowchart illustrating other examples of operations of the first, second and fourth devices 100, 200, and 400 of FIG. 52 according to a method of providing a response message according to an exemplary embodiment.

Referring to FIG. 55, a method of providing a response message according to an exemplary embodiment is a modified embodiment of the method of providing a response message of FIG. 54 and includes operations that may be chronologically performed by the first, second and fourth devices 100, 200, and 400 of FIG. 52. Therefore, descriptions given above with reference to FIGS. 52 through 54 may also be applied to the method of providing a response message according to an exemplary embodiment.

In an operation S5500, the first device 100 sets up a call rejection function. In an operation S5510, the second device 200 transmits a phone call or a message to the first device 100. In an operation S5520, the first device 100 receives the phone call or the message from the second device 200. In an operation S5530, the first device 100 provides a notification of reception of the phone call or the message and information regarding an application to the fourth device 400.

In an operation S5540, the fourth device 400 provides UI elements corresponding to the received phone call or the received message. In an operation S5550, the fourth device 400 receives a user input for selecting to reject/decline or to transmit a response message with respect to a phone call or selecting to transmit a response message with respect to a message. According to an exemplary embodiment, if the fourth device 400 is a smart TV, UI elements may be provided on a display screen of the fourth device 400, and the first user USER1 may provide a user input via a remote controller, for example.

In an operation S5560, the fourth device 400 provides information regarding an application to the first device 100. According to an exemplary embodiment, if the fourth device 400 is a smart TV, the fourth device 400 may provide information regarding application that is being currently executed or previously executed on the smart TV to the first device 100. For example, the first user USER1 may execute a fitness application on the smart TV and exercise according to the fitness application. According to another exemplary embodiment, if the fourth device 400 is a navigation device, the fourth device 400 may provide information regarding an application that is being currently executed or previously executed on the navigation device to the first device 100. For example, the fourth device 400 may provide information regarding a point of time when the first user USER1 will be available for responding to an incoming call based on a current situation of the first user USER1 who is currently driving and an estimated driving time to a destination to the first device 100.

In an operation S5570, the first device 100 generates a response message. In detail, the first device 100 may generate a response message including at least one of a current situation and a future situation of the first user USER1 based on information provided by an application that is executed in the operations S5520 through S5560 or previously executed on the first device 100.

According to another exemplary embodiment, the first device 100 may generate a response message including at least one of a current situation and a future situation of the first user USER1 based on information regarding an application provided by the fourth device 400. In detail, the first device 100 may generate a response message based on information regarding an application that is executed on the fourth device 400 in the operations S5520 through S5565 or executed before the operations S5320 through S5565.

In an operation S5580, the first device 100 transmits a response message to the second device 200.

Figure 56:
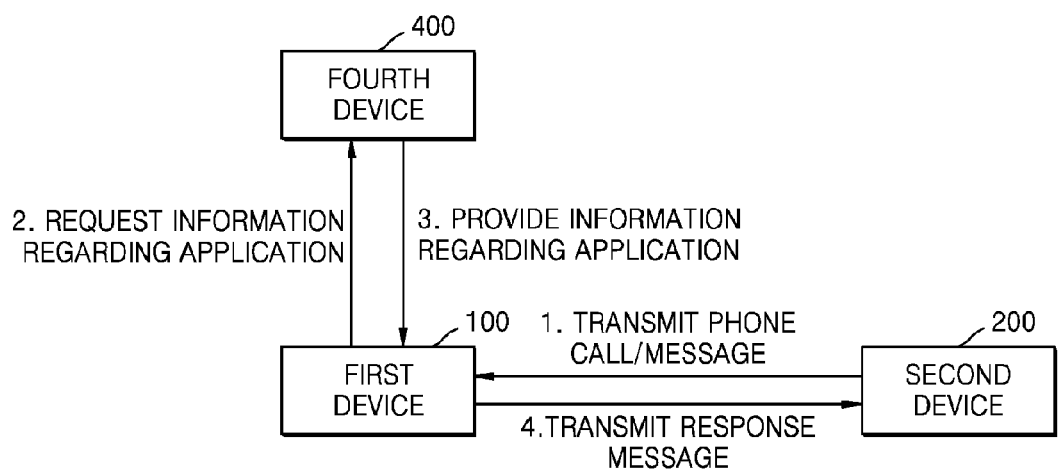
FIG. 56 is a block diagram illustrating another system for performing a response message providing function according to an exemplary embodiment.

FIG. 56 is a block diagram illustrating a system 10i for performing a response message providing function according to an exemplary embodiment.

Referring to FIG. 56, the system 10i may include the first device 100, the second device 200, and a fourth device 400. Here, the first and second devices 100 and 200 may be substantially similar to the first and second devices 100 and 200 shown in FIG. 1A, and descriptions thereof given above may also be applied. According to an exemplary embodiment, the fourth device 400 may be an electronic device which is capable of communicating with the first device 100 and is located near the first user USER1. For example, the fourth device 400 may be a smart TV on which an arbitrary application may be executed. For another example, the fourth device 400 may be a navigation device.

According to an exemplary embodiment, the second device 200 may transmit a phone call or a message to the first device 100, and the first device 100 may request information regarding an application to the fourth device 400. In response thereto, the fourth device 400 may provide information regarding an application to the first device 100, and the first device 100 may generate a response message based on the received information regarding an application and transmit the response message to the second device 200.

As described above, according to an exemplary embodiment, the first device 100 may not provide a notification of reception to the fourth device 400. Therefore, the exemplary embodiments of FIGS. 51 through 53 may be embodied without operations for notifying about reception of a phone call or a message.

Figure 57:
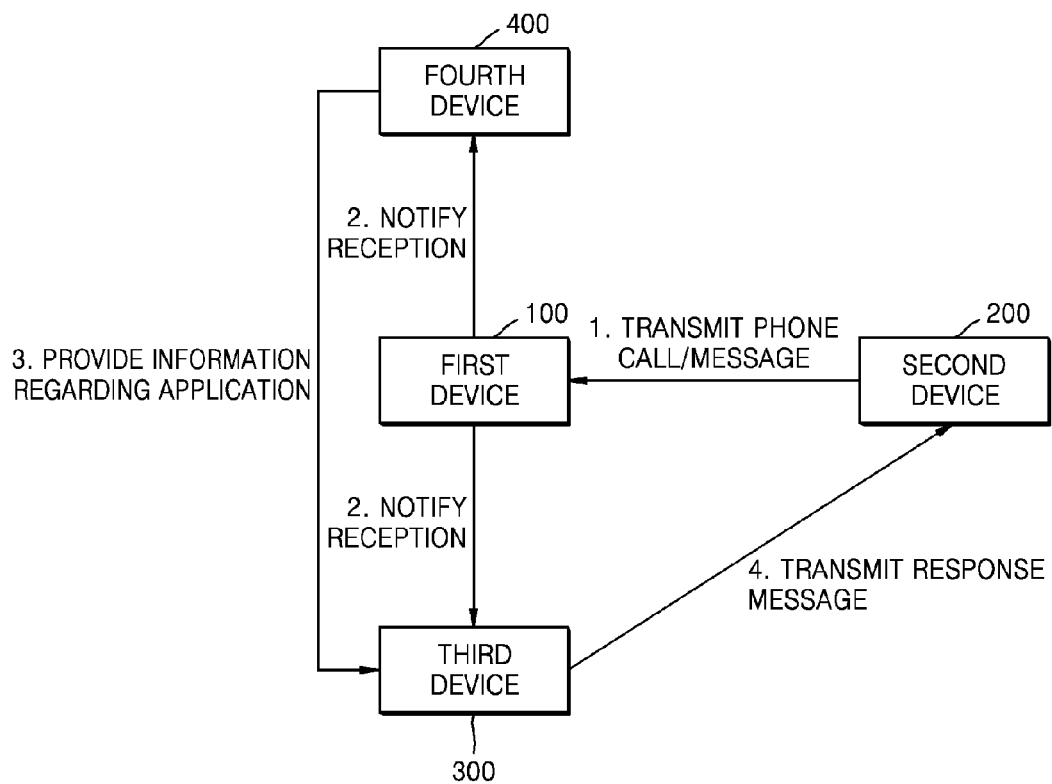
FIG. 57 is a block diagram illustrating another system for performing a response message providing function according to an exemplary embodiment.

FIG. 57 is a block diagram illustrating a system 10j for performing a response message providing function according to an exemplary embodiment.

Referring to FIG. 57, the system 10j may include the first through fourth devices 100, 200, 300, and 400. Here, the first and second devices 100 and 200 may be substantially similar to the first and second devices 100 and 200 shown in FIG. 1A, and thus descriptions thereof given above with reference to FIG. 1A may also be applied to an exemplary embodiment.

According to an exemplary embodiment, the third device 300 may be a wearable device of the first user USER1 and may operate in conjunction with the first device 100. Here, the third device 300 may be substantially similar to the third device 300 shown in FIGS. 41 through 51, and thus descriptions given above with reference to FIGS. 41 through 51 may also be applied to an exemplary embodiment.

According to an exemplary embodiment, the fourth device 400 may be an electronic device which is capable of communicating with the first device 100 and is located near the first user USER1. For example, the fourth device 400 may be a smart TV on which an arbitrary application may be executed. As another example, the fourth device 400 may be a navigation device. Here, the fourth device 400 may be substantially similar to the fourth device 400 shown in FIGS. 52 through 56, and thus descriptions given above with reference to 52 through 56 may also be applied to an exemplary embodiment.

According to an exemplary embodiment, the second device 200 may transmit a phone call or a message to the first device 100, and the first device 100 may notify reception of a phone call or a message to the third and fourth devices 300 and 400. Next, the fourth device 400 may provide information regarding an application to the third device 300, and the third device 300 may generate a response message based on the received information regarding an application and transmit the response message to the second device 200.

According to an exemplary embodiment, the third device 300 may generate a response message by using an application that is being currently executed or previously executed on the third device 300. According to another exemplary embodiment, the third device 300 may generate a response message by using an application that is being currently executed or previously executed on the fourth device 400. According to another exemplary embodiment, the third device 300 may generate a response message by using an application that is being currently executed or previously executed on the first device 100.

Figure 58:
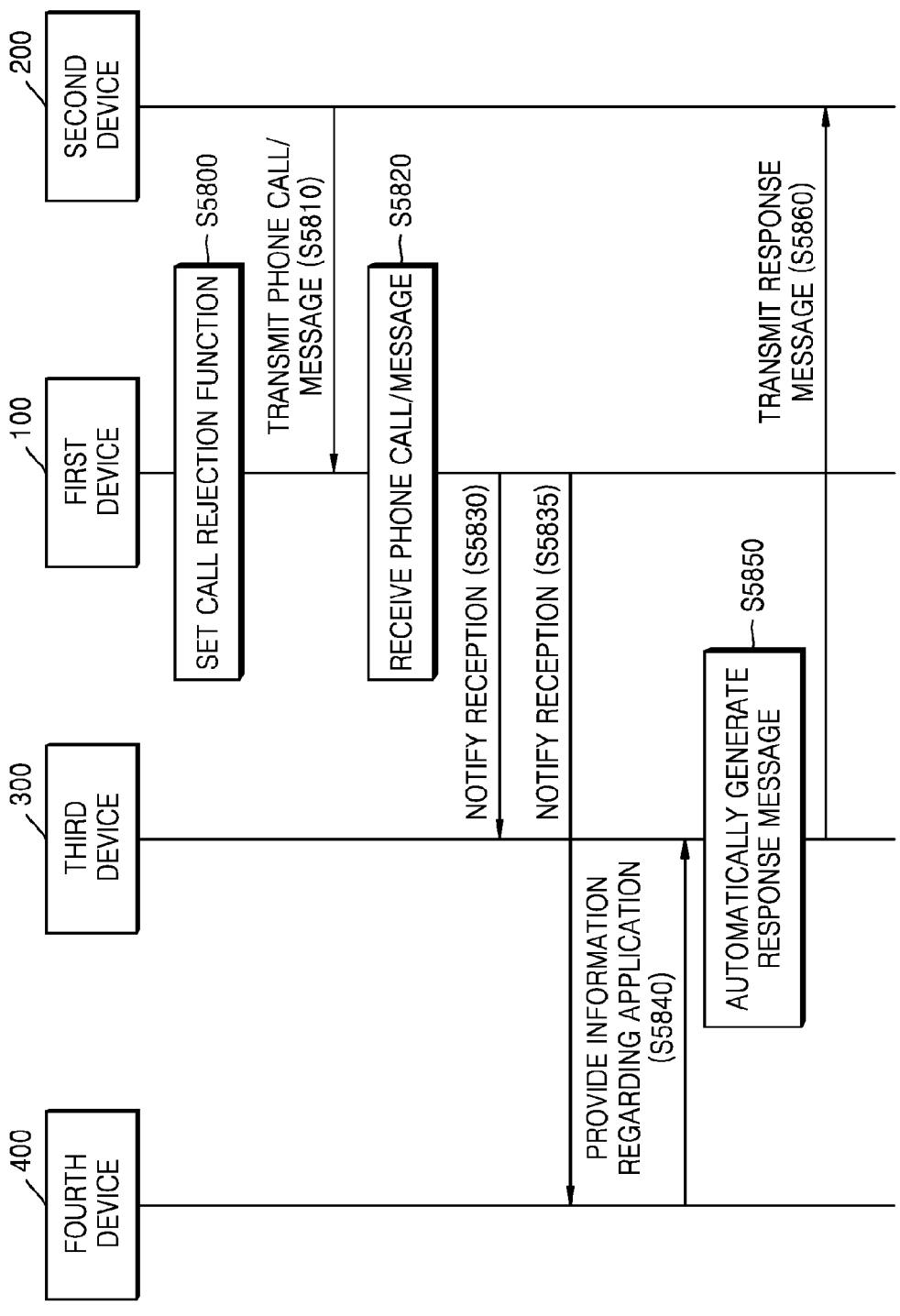
FIG. 58 is a flowchart illustrating examples of operations of first through fourth devices according to a method of providing a response message according to an exemplary embodiment.

FIG. 58 is a flowchart illustrating examples of operations of the first through fourth devices 100, 200, 300, and 400 of FIG. 57 according to a method of providing a response message according to an exemplary embodiment.

Referring to FIG. 58, a method of providing a response message according to an exemplary embodiment includes operations that may be chronologically performed by the first through fourth devices 100, 200, 300, and 400 of FIG. 57. Therefore, descriptions given above with reference to FIG. 57 may also be applied to the method of providing a response message according to an exemplary embodiment.

In an operation S5800, the first device 100 sets up a call rejection function. Any of the descriptions given above with reference to FIGS. 7A through 7F may also be applied to the operation for setting up a call rejection function according to an exemplary embodiment. In an operation S5810, the second device 200 transmits a phone call or a message to the first device 100. In an operation S5820, the first device 100 receives a phone call or a message from the second device 200.

In an operation S5830, the first device 100 provides a notification of reception of the phone call or the message to the third device 300. In an operation S5835, the first device 100 provides a notification of reception of the phone call or the message to the fourth device 400. For example, the first device 100 may provide a notification of reception to the third and fourth devices 300 and 400 via a wireless communication, such as Bluetooth or Wi-Fi. However, according to another exemplary embodiment, the operation S5635 might not be included, and thus the first device 100 might not provide a notification of reception to the fourth device 400.

In an operation S5840, the fourth device 400 provides information regarding an application to the third device 300. According to an exemplary embodiment, if the fourth device 400 is a smart TV, the fourth device 400 may provide information regarding application that is being currently executed or previously executed on the smart TV to the first device 100. For example, the first user USER1 may execute a fitness application on the smart TV and exercise according to the fitness application. According to another exemplary embodiment, if the fourth device 400 is a navigation device, the fourth device 400 may provide information regarding an application that is being currently executed or previously executed on the navigation device to the third device 300. For example, the fourth device 400 may provide information regarding a point of time when the first user USER1 will be available for responding to an incoming call based on a current situation of the first user USER1 who is currently driving and an estimated driving time to a destination to the third device 300.

In an operation S5850, the third device 300 automatically generates a response message. In detail, the third device 300 may generate a response message including at least one of a current situation and a future situation of the first user USER1 based on information provided by an application that is executed in the operation S5820 or previously executed on the third device 300.

According to another exemplary embodiment, the third device 300 may automatically generate a response message including at least one of a current situation and a future situation of the first user USER1 based on information regarding an application provided by the fourth device 400. In detail, the third device 300 may generate a response message based on information regarding an application that is executed on the fourth device 400 in the operation S5820 or executed before the operation S5820.

According to another exemplary embodiment, the third device 300 may request information regarding an application to the first device 100, and the first device 100 may provide the information regarding an application to the third device 300 in response thereto. According to another exemplary embodiment, the first device 100 may provide a notification of reception together with information regarding an application. Therefore, the third device 300 may generate a response message including at least one of a current situation and a future situation of the first user USER1 based on the information provided by an application provided by the first device 100. In detail, the third device 300 may generate a response message based on information regarding an application that is executed on the first device 100 in the operation S5820 or before the operation S5820.

In an operation S5860, the third device 300 transmits a response message to the second device 200. However, exemplary embodiments are not limited thereto. According to another exemplary embodiment, the third device 300 may transmit a response message to the first device 100, and the first device 100 may transmit the response message received from the third device 300 to the second device 200. According to another exemplary embodiment, the third device 300 may transmit information for generating a response message to the first device 100. The first device 100 may generate a response message based on the information received from the third device 300 and transmit the generated response message to the second device 200.

Figure 59:
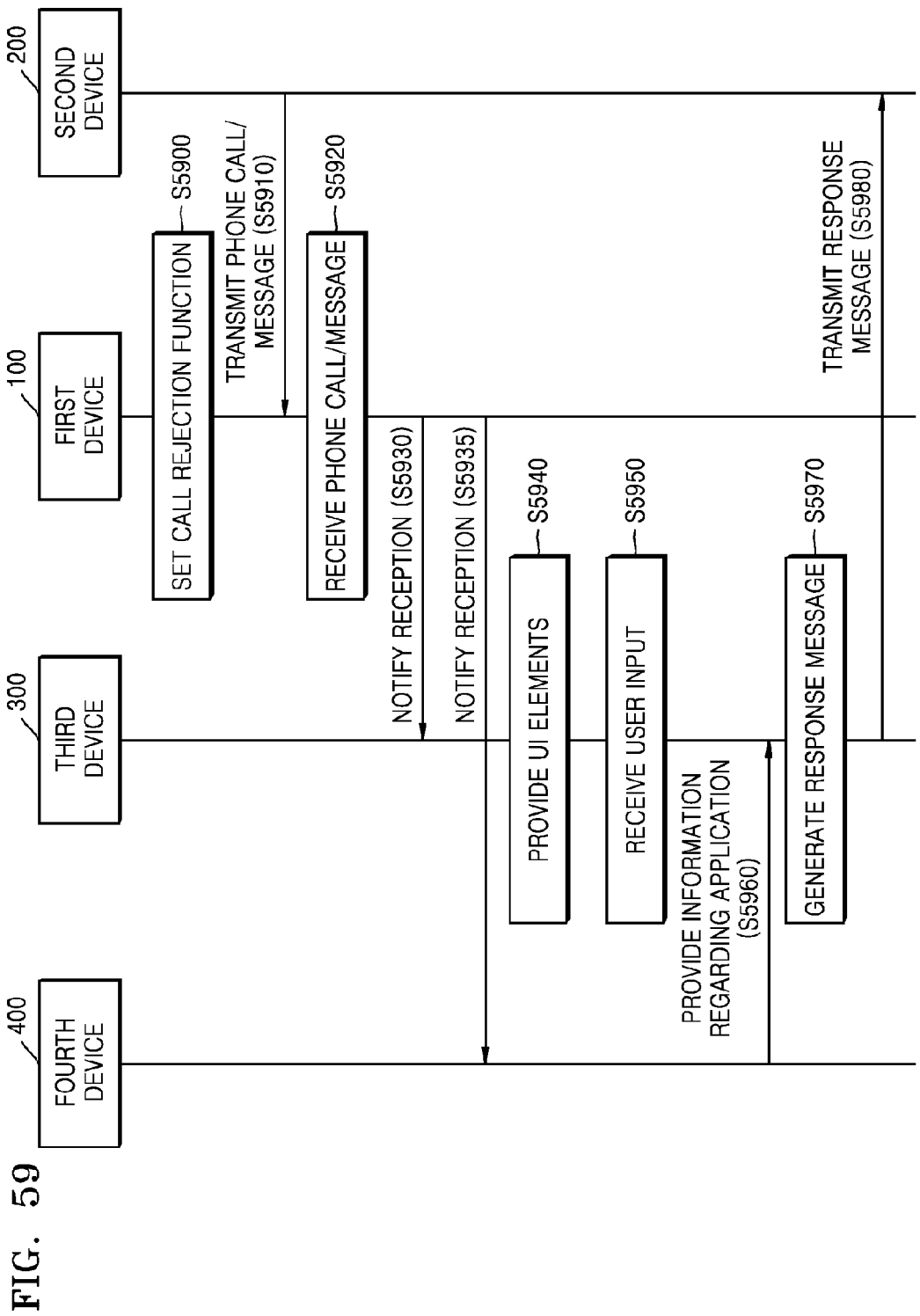
FIG. 59 is a flowchart illustrating other examples of operations of the first through fourth devices according to a method of providing a response message according to an exemplary embodiment.

FIG. 59 is a flowchart illustrating other examples of operations of the first through fourth devices 100, 200, 300, and 400 of FIG. 57 according to a method of providing a response message according to an exemplary embodiment.

Referring to FIG. 59, a method of providing a response message according to an exemplary embodiment includes operations that are chronologically performed by the first through fourth devices 100, 200, 300, and 400 of FIG. 57. Therefore, descriptions given above with reference to FIGS. 57 and 58 may also be applied to the method of providing a response message according to an exemplary embodiment.

In an operation S5900, the first device 100 sets up a call rejection function. In an operation S5910, the second device 200 transmits a phone call or a message to the first device 100. In an operation S5920, the first device 100 receives a phone call or a message from the second device 200.

In an operation S5930, the first device 100 provides a notification of reception of the phone call or the message to the third device 300. In an operation S5935, the first device 100 provides a notification of reception of the phone call or the message to the fourth device 400. However, according to another exemplary embodiment, the operation S5935 might not be included, and thus the first device 100 might not provide a notification of reception to the fourth device 400.

In an operation S5940, the third device 300 provides UI elements corresponding to the received phone call or the received message. In an operation S5950, the third device 300 receives a user input for selecting to reject/decline or to transmit a response message with respect to a phone call or selecting to transmit a response message with respect to a message. In an operation S5960, the fourth device 400 provides information regarding an application to the third device 300.

In an operation S5970, the third device 300 generates a response message. In detail, the third device 300 may generate a response message including at least one of a current situation and a future situation of the first user USER1 based on information provided by an application that is executed in the operations S5920 through S5960 or previously executed on the third device 300.

According to another exemplary embodiment, the third device 300 may generate a response message including at least one of a current situation and a future situation of the first user USER1 based on information regarding an application provided by the fourth device 400. In detail, the third device 300 may generate a response message based on information regarding an application that is executed on the fourth device 400 in the operations S5920 through S5965 or executed before the operations S5920 through S5965.

According to another exemplary embodiment, the third device 300 may request information regarding an application from the first device 100, and the first device 100 may provide the information regarding an application to the third device 300 in response thereto. According to another exemplary embodiment, the first device 100 may provide a notification of reception together with information regarding an application. Therefore, the third device 300 may generate a response message including at least one of a current situation and a future situation of the first user USER1 based on the information provided by an application provided by the first device 100. In detail, the third device 300 may generate a response message based on information regarding an application that is executed on the first device 100 in the operations S5920 through S5960 or before the operations S5920 through S5960.

In an operation S5980, the third device 300 transmits a response message to the second device 200. However, exemplary embodiments are not limited thereto. According to another exemplary embodiment, the third device 300 may transmit a response message to the first device 100, and the first device 100 may transmit the response message received from the third device 300 to the second device 200. According to another exemplary embodiment, the third device 300 may transmit information for generating a response message to the first device 100. The first device 100 may generate a response message based on the information received from the third device 300 and transmit the generated response message to the second device 200.

Figure 60:
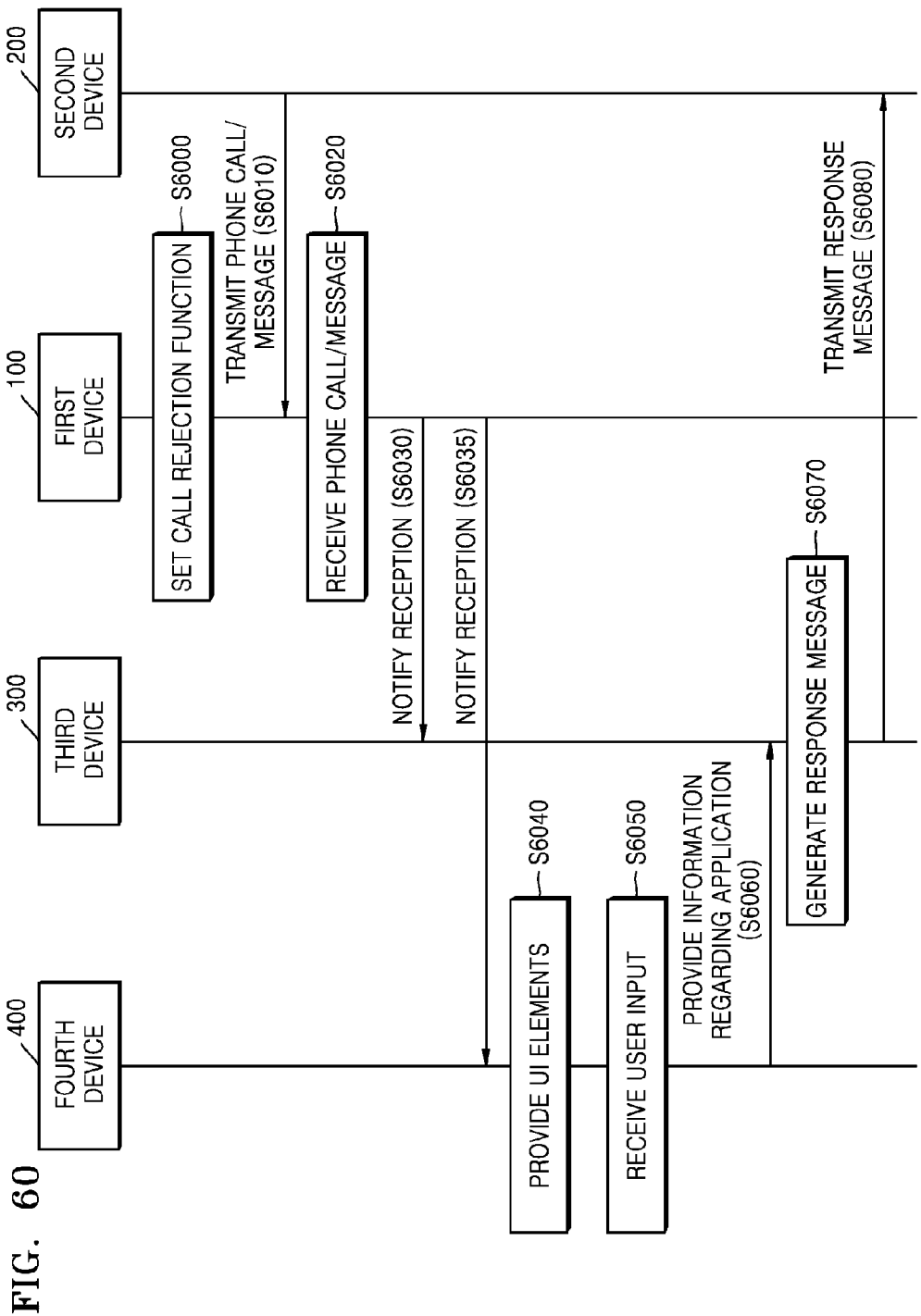
FIG. 60 is a flowchart illustrating other examples of operations of the first through fourth devices according to a method of providing a response message according to an exemplary embodiment.

FIG. 60 is a flowchart illustrating other examples of operations of the first through fourth devices 100, 200, 300, and 400 of FIG. 57 according to a method of providing a response message according to an exemplary embodiment.

Referring to FIG. 60, a method of providing a response message according to an exemplary embodiment is a modified embodiment of the method of providing a response message of FIG. 59 and includes operations that may be chronologically performed by the first through fourth devices 100, 200, 300, and 400 of FIG. 57. Therefore, descriptions given above with reference to FIGS. 57 through 59 may also be applied to the method of providing a response message according to an exemplary embodiment.

In an operation S6000, the first device 100 sets up a call rejection function. In an operation S6010, the second device 200 transmits a phone call or a message to the first device 100. In an operation S6020, the first device 100 receives a phone call or a message from the second device 200.

In an operation S6030, the first device 100 provides a notification of reception of the phone call or the message to the third device 300. In an operation S6035, the first device 100 provides a notification of reception of the phone call or the message to the fourth device 400.

In an operation S6040, the fourth device 400 provides UI elements corresponding to the received phone call or the received message. In an operation S6050, the fourth device 400 receives a user input for selecting to reject/decline or to transmit a response message with respect to a phone call or selecting to transmit a response message with respect to a message. In an operation S6060, the fourth device 400 provides information regarding an application to the third device 300.

In an operation S6070, the third device 300 generates a response message. In detail, the third device 300 may generate a response message including at least one of a current situation and a future situation of the first user USER1 based on information provided by an application that is executed in the operations S6020 through S6060 or previously executed on the third device 300.

According to another exemplary embodiment, the third device 300 may generate a response message including at least one of a current situation and a future situation of the first user USER1 based on the information provided by an application provided by the fourth device 400. In detail, the third device 300 may generate a response message based on information regarding an application that is executed on the fourth device 400 in the operations S6020 through S6060 or before the operations S6020 through S6060.

According to another exemplary embodiment, the third device 300 may request information regarding an application from the first device 100, and the first device 100 may provide the information regarding an application to the third device 300 in response thereto. According to another exemplary embodiment, the first device 100 may provide a notification of reception together with information regarding an application. Therefore, the third device 300 may generate a response message including at least one of a current situation and a future situation of the first user USER1 based on the information provided by an application provided by the first device 100. In detail, the third device 300 may generate a response message based on information regarding an application that is executed on the first device 100 in the operations S6020 through S6060 or before the operations S6020 through S6060.

In an operation S6080, the third device 300 transmits a response message to the second device 200. However, exemplary embodiments are not limited thereto. According to another exemplary embodiment, the third device 300 may transmit a response message to the first device 100, and the first device 100 may transmit the response message received from the third device 300 to the second device 200. According to another exemplary embodiment, the third device 300 may transmit information for generating a response message to the first device 100. The first device 100 may generate a response message based on the information received from the third device 300 and transmit the generated response message to the second device 200.

Figure 61:
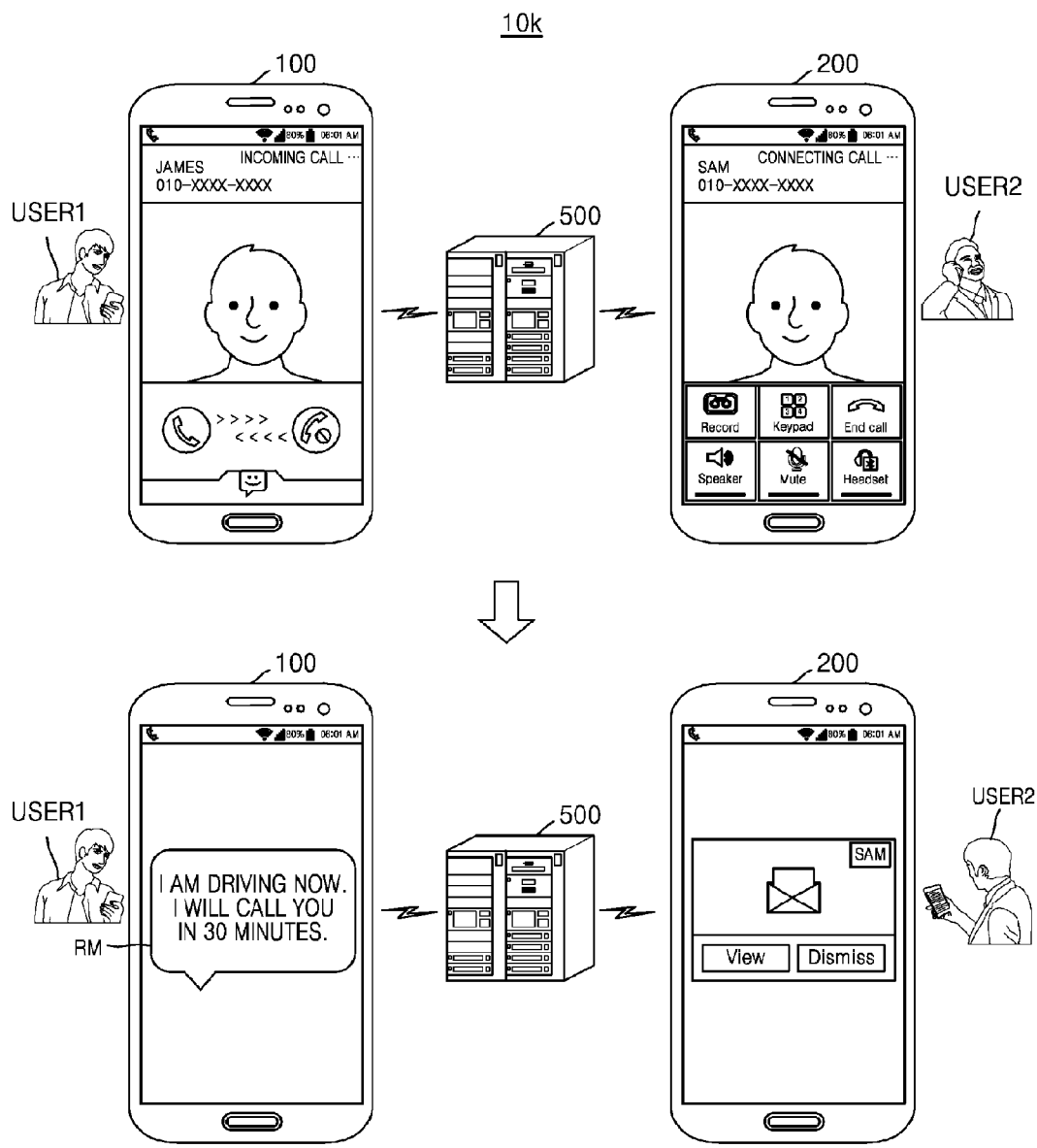
FIG. 61 is a block diagram illustrating a system for performing a response message providing function according to an exemplary embodiment.

FIG. 61 is a block diagram illustrating a system 10*k* for performing a response message providing function according to an exemplary embodiment.

Referring to FIG. 61, the first and second devices 100 and 200 may be electronic devices supporting voice call function. Here, the first and second devices 100 and 200 are substantially similar to the first and second devices 100 and 200 shown in FIGS. 1A through 2B. Therefore, descriptions of the first and second devices 100 and 200 given above may also be applied to an exemplary embodiment.

According to an exemplary embodiment, the first user USER1 of the first device 100 may not be able to respond to an incoming call from the second device 200. For example, the first user USER1 may be in a situation in which it is difficult to respond to the incoming call or the first user USER1 may not want to respond to the incoming call from the second user USER2. According to an exemplary embodiment, a server 500 may generate a response message. At least one of the operations for generating a response message according to one or more exemplary embodiments described above with reference to FIGS. 1 through 60 may be performed by the server 500.

According to an exemplary embodiment, when a phone call or a message is received by the first device 100, the server 500 may be activated and perform a call rejection function. In detail, an application being executed on the first device 100 may provide information for generating a response message to the server 500 via an API, and the server 500 may generate a response message based on information received from an application being executed on the first device 100.

According to another exemplary embodiment, when time information is input to an application installed on the first device 100, the server 500 may be activated and perform a call rejection function. In detail, an application installed on the first device 100 may provide time information for generating a response message to the server 500 via an API, and the server 500 may store the received time information. Next, when a phone call or a message is received by the first device 100, the server 500 may be activated and perform a call rejection function. In detail, if a point of time when the phone call or the message is received corresponds to time information stored in the server 500, the server 500 may automatically generate a response message.

According to an exemplary embodiment, when a phone call or a message is received by the first device 100, the server 500 may automatically generate a response message RM by referring to information regarding an application that is being currently executed or previously executed on the first device 100 and automatically transmit the generated response message RM to the second device 200. Next, to notify the first user USER1 that the response message RM is transmitted, the server 500 may provide a notification that transmission of the response message RM is completed on the display screen of the first device 100 in the form of a message, for example. Here, the response message RM may include information regarding a current situation, a future situation, or both a current situation and a future situation of the first user USER1, or it may be a simple response message.

According to another exemplary embodiment, when a phone call or a message is received by the first device 100, the server 500 may provide a user interface (UI) element corresponding to the incoming call on the display screen of the first device 100. Here, the UI element may display options with respect to the received incoming call including allow, reject, or transmit a response message. Next, if the first user USER1 selects to reject the incoming call or to transmit a response message, the server 500 may automatically generate a response message RM by referring to information regarding an application that is being currently executed or previously executed on the first device 100 and automatically transmit the generated response message RM to the second device 200. Here, the response message RM may include information regarding a current situation, a future situation, or both a current situation and a future situation of the first user USER1, or it may be a simple response message.

According to another exemplary embodiment, when a phone call or a message is received by the first device 100, the server 500 may provide a user interface (UI) element corresponding to the incoming call on the display screen of the first device 100. Here, the UI element may display options with respect to the received incoming call including allow, reject, or transmit a response message. Next, if the first user USER1 selects to reject the incoming call or to transmit a response message, the server 500 may automatically generate response message candidates by referring to information regarding an application that is being currently executed or previously executed and provide the generated response message candidates on the display screen of the first device 100 together with general frequently used messages. As described above, the first device 100 may provide a response message list including response message candidates and general frequently used messages, the response message candidates may include information regarding a current situation, a future situation, or both a current situation and a future situation of the first user USER1, and the general frequently used messages may be simple response messages. Next, when the first user USER1 selects one response message in the response message list, the server 500 may transmit a selected response message RM to the second device 200.

Figure 62:
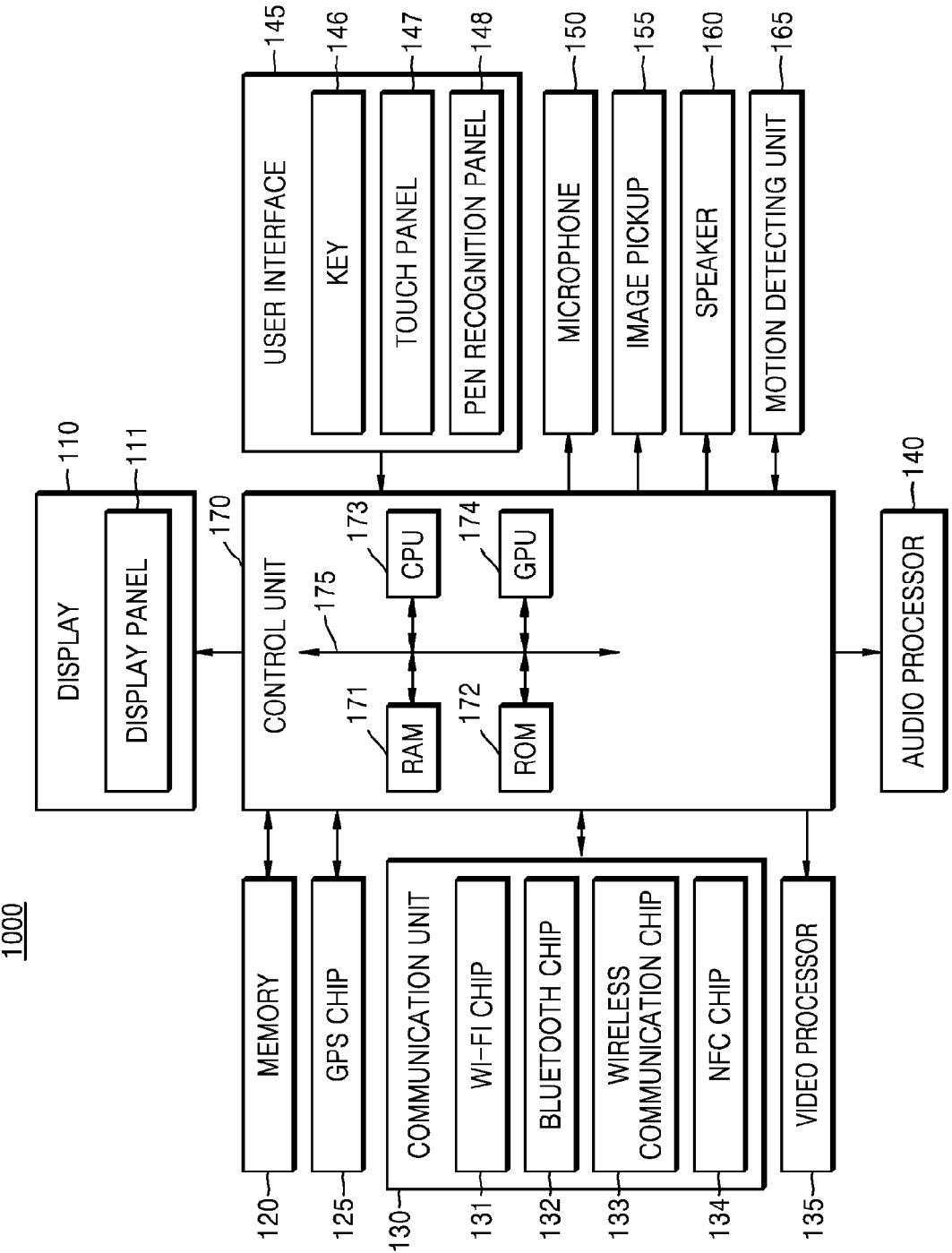
FIG. 62 is a block diagram illustrating a configuration of a device according to an exemplary embodiment.

FIG. 62 is a block diagram for describing configuration of a device 1000 according to an exemplary embodiment.

Referring to FIG. 62, configuration of the device 1000 according to an exemplary embodiment may be applied to the first and second devices 100 and 200. The configuration of the device 1000 may be applied to various types of devices, such as a mobile phone, a tablet PC, a personal digital assistant (PDA), a MP3 player, a kiosk, an electronic picture frame, a navigation device, a digital TV, or a wearable device, such as a wrist watch or a head-mounted display (HMD), etc.

Referring to FIG. 62, the device 1000 may include at least one of a display 110, a control unit 170 (e.g., controller), a memory 120, a (global positioning system) GPS chip 125, a communication unit 130 (e.g., communicator), a video processor 135, an audio processor 140, a user input unit 145 (e.g. user interface), a microphone 150, an image pickup 155, a speaker 160, and a motion detecting unit 165.

The display 110 may include a display panel 111 and a controller for controlling the display panel 111. The display panel 111 may be embodied as various types of display panels, such as a liquid crystal display (LCD) panel, an organic light emitting diode (OLED) panel, an active-matrix OLED (AM-OLED), and a plasma display panel (PDP). The display panel 111 may be flexible, transparent, or wearable. The display 110 may be combined with a touch panel 147 of the user input unit 145 (e.g. user interface) and provided as a touch screen. For example, a touch screen may include an integrated module in which the display panel 111 and the touch panel 147 are combined with each other in a stacked structure.

The memory 120 may include at least one of an internal memory and an external memory.

An internal memory may include at least one of a volatile memory (e.g., a dynamic RAM (DRAM), a static RAM (SRAM), a synchronous dynamic RAM (SDRAM), etc.), a non-volatile memory (e.g., an one time programmable ROM (OTPROM), a programmable ROM (PROM), an erasable and programmable ROM (EPROM), an electrically erasable and programmable ROM (EEPROM), a mask ROM, a flash ROM, etc.), a hard disk drive (HDD), and a solid state drive (SSD). According to an exemplary embodiment, the control unit 170 may load a received instruction or received data from at least one of a non-volatile memory or other components to a volatile memory and process the instruction or the data loaded on the volatile memory. Furthermore, the control unit 170 may store data received from or generated by other components in a non-volatile memory.

An external memory may include at least one of a compact flash (CF), a secure digital (SD), a micro secure digital (Micro-SD), a mini secure digital (Mini-SD), an extreme digital (xD), and a memory stick.

The memory 120 may store various programs and data used for operations of the device 1000.

In detail, the control unit 170 may control the display 110 to display a portion of content stored in the memory 120 on the display 110. In other words, the control unit 170 may display a portion of content stored in the memory 120 on the display 110. Furthermore, when a user performs a gesture with respect to a region of the display 110, the control unit 170 may perform a control operation corresponding to the gesture of the user.

The control unit 170 may include at least one of a RAM 171, a ROM 172, a CPU 173, a graphics processing unit (GPU) 174, and a bus 175. The RAM 171, the ROM 172, the CPU 173, and the GPU 174 may be connected to one another via the bus 175.

The CPU 173 accesses the memory 120 and performs a booting operation by using an OS stored in the memory 120. Next, the CPU 173 performs various operations by using various programs, contents, and data stored in the memory 120.

A command set for booting a system is stored in the ROM 172. For example, when a turn-on instruction is input and power is supplied, the CPU 173 may copy an OS stored in the memory 120 to the RAM 171 according to instructions stored in the ROM 172 and execute the OS, thereby booting the OS. If booting is complete, the CPU 173 copies various programs stored in the memory 120 to the RAM 171 and execute the programs copied to the RAM 171, thereby performing various operations. When the device 1000 is booted, the GPU 174 displays a UI screen image at a region of the display 110. In detail, the GPU 174 may generate a screen image in which an electronic document including various elements, such as contents, icons, and menus, is displayed. The GPU 174 calculates property values, such as coordinates, shapes, sizes, and colors of respective elements to be displayed, according to layouts of a screen image. Next, the GPU 174 may generate screen images of various layouts including the respective elements based on the calculated property values. Screen images generated by the GPU 174 are provided to the display 110 and may be displayed at regions of the display 110.

The GPS chip 125 may receive GPS signals from GPS satellites and calculate a current location of the device 1000. The control unit 170 may calculate location of a user by using the GPS chip 125 in case of using a navigation application or in cases in which a current location of the user is necessary.

The communication unit 130 may communicate with various types of external devices by using various types of communication protocols. In detail, the communication unit 130 may include at least one of a Wi-Fi chip 131, a Bluetooth chip 132, a wireless communication chip 133, and an NFC chip 134. The control unit 170 may communicate with various external devices via the communication unit 130.

The Wi-Fi chip 131 and the Bluetooth chip 132 may perform communication via the Wi-Fi protocol and the Bluetooth protocol, respectively. In the case of using the Wi-Fi chip 131 or the Bluetooth chip 132, communication may be established by transmitting connection information, such as SSIDs and session keys, first, and then information may be transmitted and received. The wireless communication chip 133 refers to a chip that performs communications via various communication protocols, such as IEEE, Zigbee, $3^{rd}$ generation (3G), $3^{rd}$ generation partnership project (3GPP), and long-term evolution (LTE). The NFC chip 134 refers to a chip that operates according to the near field communication (NFC) standard that uses a 13.56 MHz band from among various RF-ID frequency bands, such as 135 kHz, 13.56 MHz, 433 MHz, 860~960 MHz, and 2.45 GHz.

The video processor 135 may process video data included in content received via the communication unit 130 or content stored in the memory 120. The video processor 135 may perform various image processing operations, such as decoding, scaling, noise filtering, frame rate transformation, and resolution transformation, with respect to video data, etc.

The audio processor 140 may process audio data included in content received via the communication unit 130 or content stored in the memory 120. The audio processor 140 may perform various processing operations, such as decoding, amplification, and noise filtering, with respect to audio data.

When a multimedia content player program is executed, the control unit 170 may execute the video processor 135 and the audio processor 140 and play back corresponding content. The speaker 160 may output audio data generated by the audio processor 140.

The user interface 145 may receive various instructions from a user. In detail, the user interface 145 may include at least one of a key 146, a touch panel 147, and a pen or stylus recognition panel 148.

The key 146 may include various types of keys, such as mechanical buttons and scroll wheels, formed at various regions of the body of the device 1000, including a front region, a side region, and a rear region.

The touch panel 147 may detect a touch input from a user and output a touch event value corresponding to a detected touch signal. If the touch panel 147 is combined with the display panel 111 to embody a touch screen, the touch screen may be embodied to include various types of touch sensors, such as an electrostatic type, a resistive type, and a piezoelectric type. In the case of an electrostatic type touch screen, when a body part of a user touches a surface of the touch screen, coordinates of the touch are calculated by detecting fine electricity induced by the body part of the user. In the case of a resistive touch screen, when a user touches the touch screen, coordinates of the touch are calculated by detecting a current that flows as an upper plate and a lower plate at the touched location contact each other. Touch events occurring on a touch screen may be mainly generated by a person's fingers. However, touch events occurring on a touch screen may also be generated by an object formed of a conductive material that may induce changes in electrostatic capacitance.

The pen recognition panel 148 may detect a proximity input or a touch input based on a user's operation of a touch pen (e.g., a stylus pen) or a digitizer pen and output a detected pen proximity event or a pen touch event. The pen recognition panel 148 may be embodied based on electromagnetic resonance (EMR), for example, and may detect a touch or a proximity input based on change of intensity of an electromagnetic field due to approach or contact of a pen. In detail, the pen recognition panel 148 may include an electromagnetic induction coil sensor having a grid-like structure and an electromagnetic signal processing unit, which sequentially provides alternate current (AC) signals having a designated frequency to respective loop coils of the electromagnetic induction coil sensor. If a pen including a resonance circuit exists nearby a loop coil of the pen recognition panel 148, a magnetic field emanating from the corresponding loop coil induces a current at the resonance circuit inside the pen based on mutual electromagnetic induction. Based on the current, an induced magnetic field is formed from coils constituting the resonance circuit inside the pen, and the pen recognition panel 148 detects the induced magnetic field at the loop coil in a signal receiving mode, and thus a proximity location or a touch location regarding the pen may be detected. The pen recognition panel 148 may be arranged at any part of the display panel 111 in an area sufficient to cover the display area of the display panel 111.

The microphone 150 may receive voice of a user or other sounds and transform the voice or the sounds into audio data. The control unit 170 may use voice of a user input via the microphone 150 for a calling operation or transform the voice into audio data and store the audio data in the memory 120.

The image pickup 155 may pick up a still image or moving pictures under the control of a user. The image pickup 155 (e.g., camera) may be embodied as a plurality of units, such as a front camera and a rear camera.

If the image pickup 155 and the microphone unit 150 are provided, the control unit 170 may perform control operations based on voice of a user input via the microphone 150, or a motion of the user recognized by the image pickup 155. For example, the device 1000 may operate in a motion control mode or a voice control mode. If the device 1000 operates in the motion control mode, the control unit 170 may activate the image pickup unit 155, pick up images of a user, tracks changes of a motion of the user, and perform a corresponding control operation. If the device 1000 operates in the voice control mode, the control unit 170 may operate in a voice recognition mode, in which a user's voice input via the microphone 150 is analyzed and control operations are performed based on the analyzed voice of the user.

The motion detecting unit 165 may detect movement of the body unit of the device 1000. The device 1000 may be rotated or titled in various directions. Here, the motion detecting unit 165 may detect motion characteristics, such as a rotating direction, a rotating angle, and a tilted angle, by using at least one of various sensors, such as a geomagnetic sensor, a gyro sensor, and an acceleration sensor.

Furthermore, according to exemplary embodiments, the device 1000 may further include a USB port for connecting a USB connector, various external input ports for connecting various external terminals, such as a headset, a mouse, and a LAN, a digital multimedia broadcasting (DMB) chip for receiving and processing DMB signals, and various sensors.

Names of the components of the device 1000 may vary. Furthermore, the device 1000 according to exemplary embodiments may include at least one of the above-stated components, in which some of the components may be omitted or additional components may be further arranged.

Figure 63:
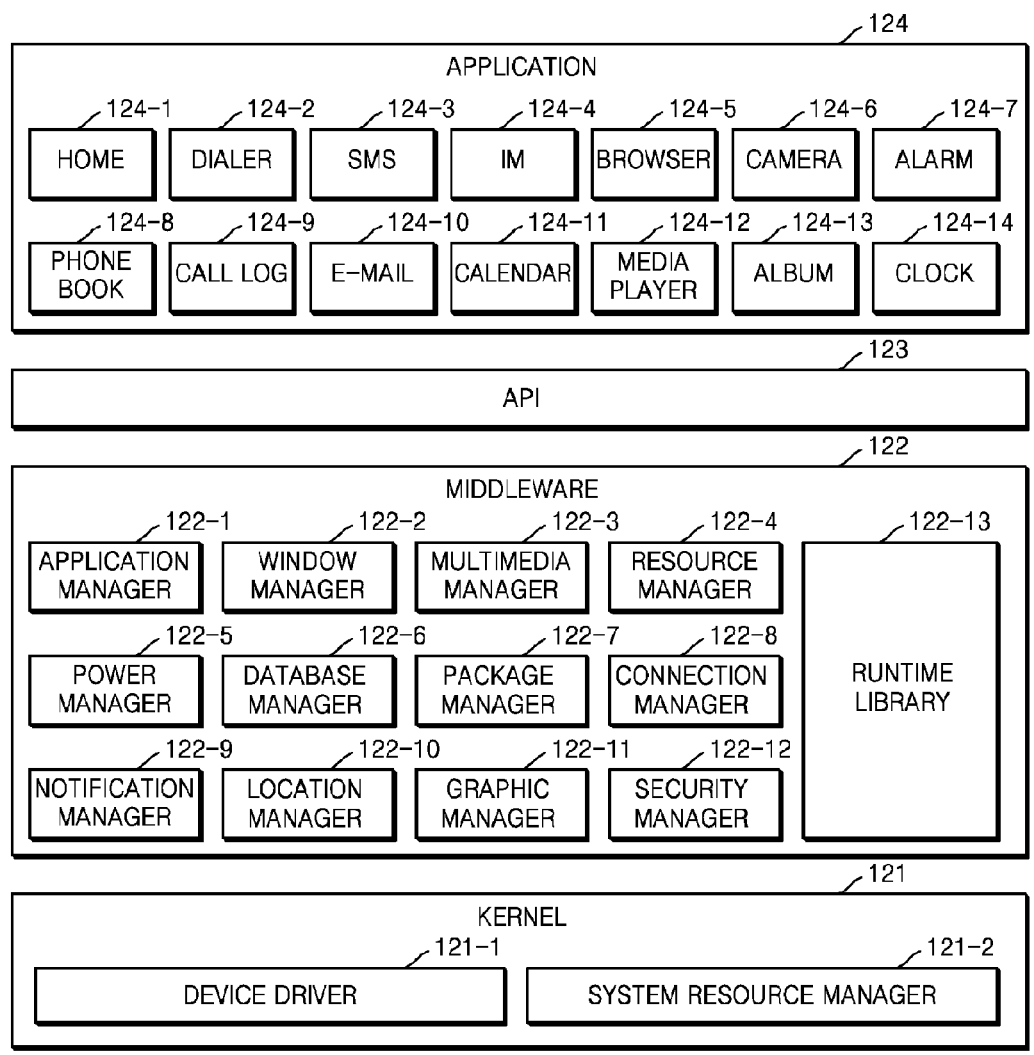
FIG. 63 is a block diagram illustrating a software configuration of the device according to an exemplary embodiment.

FIG. 63 is a block diagram illustrating software configuration of the device 1000 according to an exemplary embodiment.

Referring to FIG. 63, the memory 120 of FIG. 62 may store an OS for controlling resources of the device 1000 and application programs for operations of applications. An OS may include a kernel, middleware, and an API. Examples of an OS may include Android, iOS, Windows, Symbian, Tizen, Bada OS, etc.

A kernel 121 may include at least one of a device driver 121-1 and system resource manager 121-2 for managing resources. The device driver 121-1 may allow hardware of the device 1000 to be accessed and controlled software-wise. To this end, the device driver 121-1 may be divided into an interface and independent driver modules provided by respective hardware manufacturers. For example, the device driver 121-1 may include at least one of a display driver, a camera driver, a Bluetooth driver, a shared memory driver, a USB driver, a keypad driver, a Wi-Fi driver, an audio driver, and an inter-process communication (IPC) driver. The system resource manager 121-2 may include at least one of a process managing unit, a memory managing unit, and a file system managing unit. The system resource manager 121-2 may perform functions including controlling, allocation, and retrieval of system resources.

Middleware 122 may include a plurality of modules that are prepared in advance to provide functions that are commonly demanded by various applications. The middleware 122 may provide functions via an API 123, so that an application 124 may efficiently utilize resources in the device 1000. For example, the middleware 122 may include at least one of a plurality of modules, such as an application manager 122-1, a window manager 122-2, a multimedia manager 122-3, a resource manager 122-4, a power manager 122-5, a database manager 122-6, a package manager 122-7, a connection manager 122-8, a notification manager 122-9, a location manager 122-10, a graphic manager 122-11, and a security manager 122-12.

The application manager 122-1 may manage a life cycle of at least one of the applications 124. The window manager 122-2 may manage GUI resources used in a screen image. The multimedia manager 122-3 may determine playback formats of various media files and encode or decode media files by using correct codec. The resource manager 122-4 may manage resources of at least one of the applications 124, the resources including source codes, memory, or storage space. The power manager 122-5 may operate in conjunction with a BIOS, for example, manage a battery or power, and provide power information regarding operations. The database manager 122-6 may manage to generate, search, or modify databases to be used by at least one of the applications 124. The package manager 122-7 may manage installation or update of applications distributed in the form of package files. The connection manager 122-8 may manage wireless connections via Wi-Fi or Bluetooth, for example. The notification manager 122-9 may display or notify about an event, such as an arrival message, an appointment, or a proximity notification, to a user without inconveniencing the user. The location manager 122-10 may manage location information regarding the device 1000. The graphic manager 122-11 may mange graphic effects to be provided to a user and related user interfaces. The security manager 122-12 may provide all necessary security functions for system security or user authentication. If the device 1000 includes a phone call function, the middleware 122 may further include a call manager for managing voice call function or video call function of a user.

The middleware 122 may include a runtime library 122-13 or other library modules. The runtime library 122-13 may be a library module used by a compiler to add new functions via a programming language while an application is being executed. For example, the runtime library 122-13 may perform input/output, memory management, or functions regarding mathematical functions. The middleware 122 may generate and use a new middleware module via various combinations of functions of the above-stated internal component modules. To provide differentiated functions, the middleware 122 may provide dedicated modules for each type of OS. The middleware 122 may dynamically delete some existing components or may add new components. Some components in one or more exemplary embodiments may be partially deleted, additional components may be arranged, or components in the exemplary embodiments of the inventive concept may be replaced by components with similar functions and different names.

The API 123 is a set of API programming functions, in which different configurations thereof may be provided based on types of OS. For example, in case of Android or iOS, one API set may be provided per platform. For another example, such as Tizen, two or more API sets may be provided per platform.

The applications 124 may include preloaded applications installed by default and third-party applications that may be installed and used by a user. The applications 124 may include a home application 124-1 for returning to a home screen, a dialer application 124-2 for making a phone call to another user, a text message application 124-2 for receiving text messages from other users identified by phone numbers, an instant message (IM) application 124-4, a browser application 124-5, a camera application 124-6, an alarm application 124-7, a phone book application 124-8 for managing phone numbers or addresses of other users, a call log application 124-9 for managing a call log, a text message transmission/reception log, or a missed call log of a user, an e-mail application 124-10 for receiving messages from other users identified by e-mail addresses, a calendar application 124-11, a media player application 124-12, an album application 124-13, and a clock application 124-14. Names of the above-stated components of software according to exemplary embodiments may vary according to types of OS. Furthermore, software according to one or more exemplary embodiments may include at least one of the above-stated components, omit some of the above-stated components, or include additional components.

Figure 64:
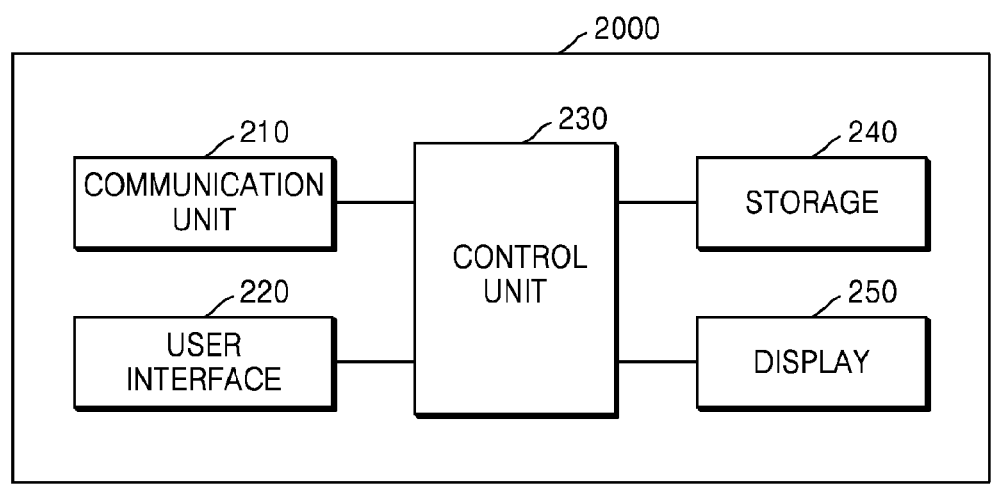
FIG. 64 is a block diagram illustrating a configuration of a device according to an exemplary embodiment.

FIG. 64 is a block diagram for describing configuration of a device 2000 according to an exemplary embodiment.

Referring to FIG. 64, configuration of the device 2000 according to an exemplary embodiment may be applied to the first and second devices 100 and 200. The device 2000 may include a communication unit 210 (e.g., communicator), a user input unit 220 (e.g., user interface), a control unit 230 (e.g., controller), a storage 240 (e.g., memory), and a display 250.

The communication unit 210 may communication with at least one other device and receive an incoming call including a phone call or a message from the at least one other device. Furthermore, the communication unit 210 may transmit a response message to the at least one other device.

The user interface 220 may receive a user input for selecting one of a plurality of options included in UI elements corresponding to an incoming call. Furthermore, the user interface 220 may receive a user input regarding a plurality of selection requests.

The control unit 230 may control the overall operation of the device 2000. According to an exemplary embodiment, the control unit 230 may determine at least one of a location, a route, or a situation of a user based on information regarding an application that is being currently executed or previously executed on the device 2000 and generate a response message including a current situation including at least one of the determined location, route, and activity. Furthermore, the control unit 230 may estimate a point of time when a user will be available to reply to an incoming call based on information regarding an application that is being currently executed or previously executed and may generate a response message including a future situation including the estimated point of time when a user will be available to reply to an incoming call.

According to another exemplary embodiment, the control unit 230 may determine at least one of a location, a route, and an activity of a user based on information regarding an application that is being currently executed or previously executed on the third device 300 or fourth device 400 and generate a response message including a current situation including at least one of the estimated location, route, and activity. Furthermore, the control unit 230 may estimate a point of time when a user will be available to reply to an incoming call based on information regarding an application that is being currently executed or previously executed on the third device 300 fourth device 400 and may generate a response message including a future situation including the estimated point of time when a user will be available to reply to an incoming call.

According to an exemplary embodiment, when an incoming call is received, the control unit 230 may automatically generate a response message by referring to information regarding an application that is being currently executed or previously executed and automatically transmit the generated response message to a calling user. Next, to notify a user that the response message is transmitted, the control unit 230 may display a notification that transmission of the response message is completed on the display 250.

According to another exemplary embodiment, when an incoming call is received, the control unit 230 may display UI elements including a plurality of options corresponding to the incoming call on the display 250 and, when transmission of a response message is selected from among the plurality of options, the control unit 230 may automatically generate a response message by referring to information regarding an application that is being currently executed or previously executed and automatically transmit the generated response message to a calling user.

According to another exemplary embodiment, when an incoming call is received, the control unit 230 may display UI elements including a plurality of options corresponding to the incoming call on the display 250 and, when rejection/declination is selected from among the plurality of options, the control unit 230 may select one of a plurality of response message types based on at least one of contact information stored in the device 2000 and a call history with respect to a calling user corresponding to the incoming call and generate a response message based on information regarding an application that is being currently executed or previously executed according to the selected message type.

According to another exemplary embodiment, the control unit 230 may display UI elements including a plurality of options corresponding to the incoming call on the display 250 and, when transmission of a response message is selected from among the plurality of options, the control unit 230 automatically generates response message candidates by referring to information regarding an application that is being currently executed or previously executed and display the generated response message candidates on the display unit 250 together with general frequently used messages. Accordingly, the control unit 230 may provide a response message list including response message candidates and general frequently used messages. Next, when a user selects one response message in the response message list, the control unit 230 may transmit the selected response message to a calling user.

According to an exemplary embodiment, the operations of the control unit 230 may be performed by a phone application or a message application installed on the device 2000. In other words, a phone application or a message application installed on the device 2000 may include the call rejection function described above. Applications installed on the device 2000 may provide necessary information for generating a response message via an API, and a phone application or a message application may generate a response message based on information received from the applications.

According to an exemplary embodiment, a phone application or a message application may periodically monitor a status of other applications regardless of reception of an incoming call and obtain information for generating a response message from the other applications. According to another exemplary embodiment, a phone application or a message application may periodically monitor status of other applications when an incoming call is received and obtain information for generating a response message from the other applications.

According to an exemplary embodiment, the operations of the control unit 230 may be performed by a separate dedicated application (e.g., a call rejection application) installed on the device 2000. When a phone call or a message is received by the device 2000, a phone application or a message application may activate a call rejection function of the call rejection application. Applications installed on the device 2000 may provide information for generating a response message via an API, and the call rejection application may generate a response message based on information received from the other applications.

According to an exemplary embodiment, a call rejection application may periodically monitor a status of other applications regardless of reception of an incoming call and obtain information for generating a response message from the other applications. According to another exemplary embodiment, a call rejection application may periodically monitor a status of other applications when an incoming call is received and obtain information for generating a response message from the other applications.

According to another exemplary embodiment, the operations of the control unit 230 may be performed by middleware or an OS, that is, platform of the device 2000. Therefore, when a phone call or a message is received by the device 2000, a call rejection function of a particular model of middleware may be activated. Applications installed on the device 2000 may provide information for generating a response message via an API, and the particular module of middleware may generate a response message based on information received from the other applications.

According to an exemplary embodiment, a particular module of middleware may periodically monitor a status of other applications regardless of reception of an incoming call and obtain information for generating a response message from the other applications. According to another exemplary embodiment, a particular module of middleware may periodically monitor a status of other applications when an incoming call is received and obtain information for generating a response message from the other applications.

The storage 240 may store time information input via an application installed on the device 2000. According to an exemplary embodiment, the storage unit 240 may receive time information, which is input via an application, via an API, and store the received time information. Accordingly, even if no phone call or message is received by the device 2000, the storage unit 240 may store time information when the corresponding time information is input to an application, and thus a current situation of a user at a point of time when a phone call or a message is received may be easily determined. Therefore, if a point of time when a phone call or a message is received corresponds to stored time information, the control unit 230 may provide a response message.

The display 250 may display UI elements including a plurality of options corresponding to an incoming call. Furthermore, the display 250 may display texts, icons, and emoticons based on a plurality of selection requests.

According to another exemplary embodiment, the device 2000 may further include an audio output unit. The audio output unit may output UI elements including a plurality of options corresponding to an incoming call. Furthermore, the audio output unit may output voices, that is, audio signals corresponding to a plurality of selection requests.

Figure 65:
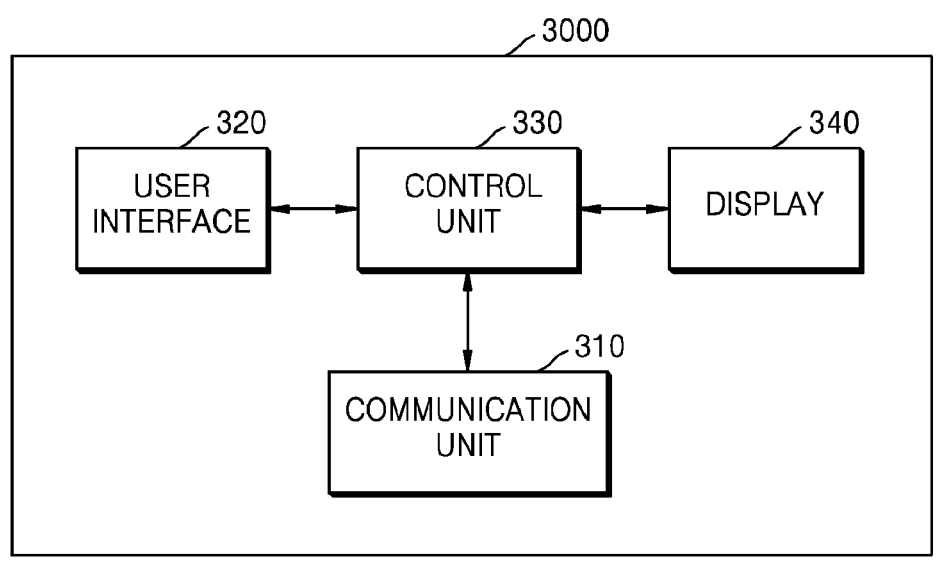
FIG. 65 is a block diagram illustrating a configuration of a wearable device according to an exemplary embodiment.

FIG. 65 is a block diagram illustrating a configuration of a wearable device 3000 according to an exemplary embodiment.

Referring to FIG. 65, the configuration of the wearable device 3000 may be applied to the third device 300. The wearable device 3000 may include a communication unit 310 (e.g., communicator), a user input unit 320 (e.g., user interface), a control unit 330 (e.g., controller), and a display unit 340 (e.g., display). The wearable device 3000 may further include a sensor unit, and the sensor unit may include at least one sensor for obtaining status information regarding the wearable device 3000.

The communication unit 310 may communicate with an external device (e.g., the first and second devices 100 and 200). In detail, the communication unit 310 may exchange data, control signals, and status signals with external devices. Furthermore, the communication unit 310 may provide a plurality of communication methods, in which types of communication methods provided by the communication unit 310 may vary according to exemplary embodiments.

Figure 66:
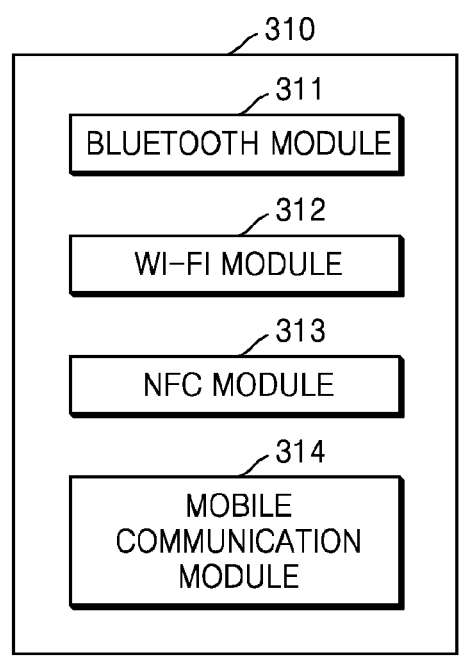
FIG. 66 is a block diagram illustrating an example configuration of a communication unit included in the wearable device.

FIG. 66 is a block diagram illustrating an example configuration of the communication unit 310 included in the wearable device 3000 of FIG. 65.

Referring to FIG. 66, the communication unit 310 according to an exemplary embodiment may include at least one of a Bluetooth module 311, a Wi-Fi module 312, a NFC module 313, and a mobile communication module 314. The Bluetooth module 311, the Wi-Fi module 312, the NFC module 313, and the mobile communication module 314 may be selectively arranged according to exemplary embodiments.

The mobile communication module 314 may transmit a phone call and a message via a mobile communication network and perform data communication via the mobile communication network. The mobile communication network may include networks using at least one of $2^{nd}$ generation mobile communication, such as code division multiple access (CDMA), global system for mobile communication (GSM), and personal digital cellular (PCD), a $3^{rd}$ generation mobile communication, such as international mobile telecommunication 2000 (IMT-device 2000), wideband code division multiple access (W -CDMA), and code division multiple access 2000 (CDMA2000), and $4^{th}$ generation mobile communication, such as long term evolution (LTE) and long term evolution advanced (LTE-A).

Referring to FIG. 65, according to an exemplary embodiment, the communication unit 310 may communicate with the first device 100 to which an incoming call is received and receive a notification of reception of the incoming call from the first device 100. Furthermore, the communication unit 310 may communicate with the second device 200 that transmits an incoming call and may transmit a response message to the second device 200. However, exemplary embodiments are not limited thereto. According to another exemplary embodiment, the communication unit 310 may transmit a response message to the first device 100, and the first device 100 may forward the response message received from the third device 300 to the second device 200. According to another exemplary embodiment, the third device 300 may transmit information for generating a response message to the first device 100. The first device 100 may generate a response message based on the information received from the third device 300 and transmit the generated response message to the second device 200.

The user input unit 320 may receive various instructions from a user and may include a key, a touch panel, and a pen recognition panel. According to an exemplary embodiment, the user input unit 320 may receive a user input for selecting one of a plurality of options included in UI elements corresponding to an incoming call. Furthermore, the user input unit 320 may receive a user input regarding a plurality of selection requests.

The control unit 330 may control the overall operation of the wearable device 3000. According to an exemplary embodiment, the control unit 330 may determine at least one of a location, a route, or a situation of a user based on information regarding an application that is being currently executed or previously executed on the wearable device 3000 and generate a response message including a current situation including at least one of the determined location, route, and activity. Furthermore, the control unit 330 may estimate a point of time when a user will be available to reply to an incoming call based on information regarding an application that is being currently executed or previously executed and may generate a response message including a future situation including the estimated point of time when a user will be available to reply to an incoming call.

According to another exemplary embodiment, the control unit 330 may determine at least one of a location, a route, and an activity of a user based on information regarding an application that is being currently executed or previously executed on the first device 100 or the fourth device 400 and generate a response message including a current situation including at least one of the estimated location, route, and activity. Furthermore, the control unit 330 may estimate a point of time when a user will be available to reply to an incoming call based on information regarding an application that is being currently executed or previously executed on the first device 100 or the fourth device 400 and may generate a response message including a future situation including the estimated point of time when a user will be available to reply to an incoming call.

According to an exemplary embodiment, when an incoming call is received, the control unit 330 may automatically generate a response message by referring to information regarding an application that is being currently executed or previously executed and automatically transmit the generated response message to a calling user. Next, to notify a user that the response message is transmitted, the control unit 330 may display a notification that transmission of the response message is completed on the display unit 340.

According to another exemplary embodiment, when an incoming call is received, the control unit 330 may display UI elements including a plurality of options corresponding to the incoming call on the display unit 340 and, when transmission of a response message is selected from among the plurality of options, the control unit 330 may automatically generate a response message by referring to information regarding an application that is being currently executed or previously executed and automatically transmit the generated response message to a calling user.

According to another exemplary embodiment, when an incoming call is received, the control unit 330 may display UI elements including a plurality of options corresponding to the incoming call on the display unit 340 and, when rejection/declination is selected from among the plurality of options, the control unit 330 may select one of a plurality of response message types based on at least one of contact information stored in the wearable device 3000 and a call history with respect to a calling user corresponding to the incoming call and generate a response message based on information regarding an application that is being currently executed or previously executed according to the selected message type.

According to another exemplary embodiment, the control unit 330 may display UI elements including a plurality of options corresponding to the incoming call on the display unit 340 and, when transmission of a response message is selected from among the plurality of options, the control unit 330 automatically generates response message candidates by referring to information regarding an application that is being currently executed or previously executed and display the generated response message candidates on the display unit 340 together with general frequently used messages. Accordingly, the control unit 330 may provide a response message list including response message candidates and general frequently used messages. Next, when a user selects one response message in the response message list, the control unit 330 may transmit the selected response message to a calling user.

The display unit 340 may display status information regarding the wearable device 3000, application execution screen image, indication regarding one from among a plurality of applications and functions, etc. The display unit 340 may include a liquid crystal display (LCD) device or an organic luminescent display device, for example. The display unit 340 may be arranged at various locations and in various forms based on shape of the wearable device 3000. According to an exemplary embodiment, the display unit 340 may display UI elements including a plurality of options corresponding to an incoming call. Furthermore, the display unit 340 may display texts, icons, and emoticons based on a plurality of selection requests.

Figure 67:
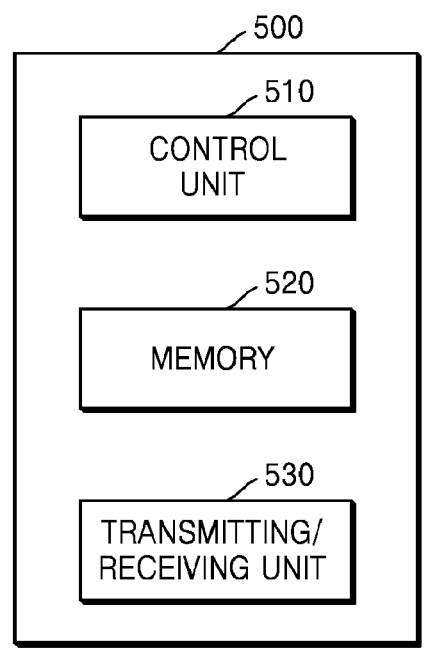
FIG. 67 is a block diagram illustrating a configuration of a server according to an exemplary embodiment.

FIG. 67 is a block diagram illustrating a configuration of the server 500 according to an exemplary embodiment.

Referring to FIG. 67, the server 500 may include a control unit 510 (e.g., controller), a memory 520, and a transmitting/receiving unit 530 (e.g., transmitter/receiver). However, the server 500 may be embodied with more or less components than those shown in FIG. 67. Detailed descriptions of the components will be given below.

The control unit 510 may control the overall operations of the server 500. For example, a response message to be output by a device may be generated by executing programs (or modules) stored in the memory 520.

According to an exemplary embodiment, the control unit 510 may determine at least one of a location, a route, or a situation of a user based on information regarding an application that is being currently executed or previously executed on a device and generate a response message including a current situation including at least one of the determined location, route, and activity. Furthermore, the control unit 510 may estimate a point of time when a user will be available to reply to an incoming call based on information regarding an application that is being currently executed or previously executed and may generate a response message including a future situation including the estimated point of time when a user will be available to reply to an incoming call.

According to another exemplary embodiment, the control unit 510 may select one of a plurality of response message types based on at least one of contact information stored in a device and a call history with respect to a calling user corresponding to the incoming call, and generate a response message based on information regarding an application that is being currently executed or previously executed according to the selected message type.

According to an exemplary embodiment, when an incoming call is received, the control unit 510 may automatically generate a response message by referring to information regarding an application that is being currently executed or previously executed and automatically transmit the generated response message to a calling user.

According to another exemplary embodiment, when an incoming call is received, the control unit 510 may display UI elements including a plurality of options corresponding to the incoming call on a device and, when transmission of a response message is selected from among the plurality of options, the control unit 510 may automatically generate a response message by referring to information regarding an application that is being currently executed or previously executed and automatically transmit the generated response message to a calling user.

According to another exemplary embodiment, when an incoming call is received, the control unit 510 may display UI elements including a plurality of options corresponding to the incoming call on a device and, when rejection/declination is selected from among the plurality of options, the control unit 510 may select one of a plurality of response message types based on at least one of contact information stored in the device and a call history with respect to a calling user corresponding to the incoming call and generate a response message based on information regarding an application that is being currently executed or previously executed according to the selected message type.

According to another exemplary embodiment, when an incoming call is received, the control unit 510 may display UI elements including a plurality of options corresponding to the incoming call on a device and, when transmission of a response message is selected from among the plurality of options, the control unit 510 automatically generates response message candidates by referring to information regarding an application that is being currently executed or previously executed and displays the generated response message candidates on the device together with general frequently used messages. Accordingly, the control unit 510 may provide a response message list including response message candidates and general frequently used messages. Next, when a user selects one response message in the response message list, the control unit 510 may transmit the selected response message to a calling user.

The memory 520 may store programs for processing operations and controlling operations of the control unit 510 and may also store input/output data (e.g., details of user settings, a call history, etc.). Furthermore, programs stored in the memory 520 may be categorized into a plurality of modules based on functions thereof.

The transmitting/receiving unit 530 may include one or more components that enable communication between the server 500 and a device. According to an exemplary embodiment, the transmitting/receiving unit 530 may receive information notifying that transmission of a response message is selected at a device from among a plurality of options corresponding to an incoming call. According to another exemplary embodiment, the transmitting/receiving unit 530 may receive information notifying that rejection/declination is selected at a device from among a plurality of options corresponding to an incoming call Applications installed on the device 2000 of FIG. 64 or the wearable device 3000 of FIG. 65 may provide information for generating a response message to the server 500 via an API, and the server 500 may generate a response message based on received information. According to an exemplary embodiment, the server 500 may periodically monitor a status of applications regardless of reception of an incoming call and obtain information for generating a response message from the applications. According to another exemplary embodiment, the server 500 may periodically monitor a status of applications when an incoming call is received and obtain information for generating a response message from the applications.

One or more exemplary embodiments may be implemented as computer instructions which can be executed by various computer means, and recorded on a non-transitory computer-readable medium. The computer-readable medium may include program commands, data files, data structures or a combination thereof. Program instructions recorded on the medium may be particularly designed and structured for the inventive concept or available to those skilled in computer software. Examples of a computer-readable recording medium include magnetic media, such as a hard disk, a floppy disk, and a magnetic tape; optical media, such as a compact disk-read only memory (CD-ROM) and a digital versatile disc (DVD); magneto-optical media, such as floptical disks; a read-only memory (ROM); a random access memory (RAM); and a flash memory. The medium may be a transmission medium, such as an optical or metal line, a waveguide, or carrier waves transferring program commands, data structures, and the like. Program commands may include, for example, a high-level language code that can be executed by a computer using an interpreter, as well as a machine language code made by a complier.

It should be understood that exemplary embodiments described herein should be considered in a descriptive sense only and not for purposes of limitation. Descriptions of features or aspects within exemplary embodiments should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A device comprising:
   a communication unit configured to receive a call request from a calling user; and
   a control unit configured to execute at least one application among a plurality of applications, and in response to a rejection regarding the call request, control the communication unit to provide a response message to the calling user, which includes a current situation about an activity of a user that is based on information about the at least one application currently being executed,
   wherein the control unit is further configured to, if a call request is received during the executing of each of the plurality of applications, control the communication unit to provide a response message to the calling user, which includes a current situation based on information about each application, and
   wherein the current situation is variable based on types of the plurality of applications.

2. The device of claim 1, wherein the response message further comprises a time when the user will be available to respond to the call request, based on time information obtained from the at least one application currently being executed and a time when the call request is received.

3. The device of claim 1, wherein the at least one application currently being executed is an application being executed on the device when the call request is received.

4. The device of claim 1, wherein the at least one application currently being executed is an application being executed on an external device at a time when the call request is received, and
   the communication unit is configured to obtain information about the at least one application from the external device.

5. The device of claim 1, wherein the control unit is further configured to control the communication unit to provide a message to the calling user in response to the current situation changing.

6. The device of claim 1, wherein the control unit is further configured to control the communication unit to provide the response message to the calling user via at least one communication medium from among a plurality of communication media.

7. The device of claim 1, wherein the control unit is further configured to control the communication unit to communicate with a wearable device.

8. A device comprising:
   a communication unit configured to receive a call request from a calling user;
   a memory configured to store time information received via at least one application among a plurality of applications installed in the device; and
   a control unit configured to, in response to a rejection regarding the call request and a time when the call request is received corresponding to the stored time information, control the communication unit to provide a response message to the calling user, which includes a current situation about an activity of a user that is based on information about the at least one application,
   wherein the control unit is further configured to, if a time when a call request is received corresponds to time information received via each of the plurality of applications, control the communication unit to provide a response message to the calling user, which includes a current situation based on information about each application, and
   wherein the current situation is variable based on types of the plurality of applications.

9. The device of claim 8, wherein the response message further comprises a time when the user will be available to respond to the call request, based on the stored time information and the time when the call request is received.

10. The device of claim 8, wherein the information comprises at least one of schedule information and ticket reservation details, which are input via the at least one application and the stored time information.

11. The device of claim 8, wherein the control unit is further configured to control the communication unit to provide a message in response to the current situation changing.

12. The device of claim 8, wherein the control unit is further configured to control the communication unit to provide the response message to the calling user via at least one communication medium from among a plurality of communication media.

13. A method of providing a response message, the method comprising:
    receiving a call request from a calling user;
    obtaining information about at least one application being executed at a time when the call request is received, among a plurality of applications which are executable in a device; and
    in response to a rejection regarding the call request, providing a response message to the calling user including a current situation based on the information,
    wherein if a call request is received during executing each of the plurality of applications, providing a response message to the calling user, which includes a current situation about an activity of a user that is based on information about each application, and
    wherein the current situation is variable based on types of the plurality of applications.

14. The method of claim 13, wherein the obtaining the information further comprises obtaining property information and time information about the at least one application, and
    the providing the response message further comprises including the current situation based on the property information and a time when the user will be available to respond to the call request based on the time information and the time when the call request is received.

15. The method of claim 13, wherein the at least one application being executed is an application being executed on the device at the time when the call request is received.

16. The method of claim 13, wherein the at least one application being executed is an application being executed on an external device at the time when the call request is received,
    further comprising receiving the information about the at least one application from the external device.

17. The method of claim 13, further comprising providing a message to the calling user in response to the current situation changing.

18. A method of providing a response message, the method comprising:
    obtaining time information from at least one application among a plurality of applications installed in a device;
    receiving a call request from a calling user; and in response to a rejection regarding the call request and a time when the call request is received corresponding to the obtained time information, providing a response message to the calling user, which includes a current situation about an activity of a user that is based on information about the at least one application to the calling user, wherein if a time when a call request is received corresponds to time information received via each of the plurality of applications, providing a response message to the calling user, which includes a current situation about an activity of a user that is based on information about each application, and wherein the current situation is variable based on types of the plurality of applications.

19. The method of claim 18, wherein the response message further comprises a time when the user will be available to respond to the call request based on the obtained time information and the time when the call request is received.

20. The method of claim 18, wherein the information comprises schedule information and ticket reservation details from the at least one application and the time information.

21. The method of claim 18, further comprising providing a message in response to the current situation changing.

22. A non-transitory computer-readable recording medium having recorded thereon program instructions executable by a processor for performing the method of claim 13.

23. A non-transitory computer-readable recording medium having recorded thereon program instructions executable by a processor for performing the method of claim 18.

* * * * *